United States Patent
Okada et al.

(10) Patent No.: US 7,933,035 B2
(45) Date of Patent: Apr. 26, 2011

(54) PRINTING SYSTEM, JOB PROCESSING METHOD, PRINTING APPARATUS, STORAGE MEDIUM, AND PROGRAM

(75) Inventors: Hideyuki Okada, Kawasaki (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 11/487,036

(22) Filed: Jul. 14, 2006

(65) Prior Publication Data
US 2007/0019224 A1    Jan. 25, 2007

(30) Foreign Application Priority Data

Jul. 20, 2005  (JP) ................. 2005-210303
Jun. 12, 2006  (JP) ................. 2006-162816

(51) Int. Cl.
  *G06F 3/12*  (2006.01)
  *B65H 33/04*  (2006.01)
  *B65H 39/00*  (2006.01)

(52) U.S. Cl. ............. 358/1.15; 270/58.16; 270/58.11; 270/58.17; 270/58.12; 270/58.07

(58) Field of Classification Search ........ 358/1.12–1.18; 399/43, 82; 270/58.08, 58.09, 58.16, 58.17, 270/58.07, 58.11, 58.12, 58.27; 377/8; 271/155
See application file for complete search history.

(56) References Cited

U.S. PATENT DOCUMENTS

| | | | | |
|---|---|---|---|---|
| 5,609,333 A | * | 3/1997 | Mandel et al. | 270/58.09 |
| 5,864,732 A | * | 1/1999 | Kato | 399/43 |
| 6,137,855 A | * | 10/2000 | Hill et al. | 377/8 |
| 6,244,583 B1 | * | 6/2001 | Ohmichi et al. | 270/58.09 |
| 6,290,225 B1 | * | 9/2001 | Linder et al. | 271/155 |
| 6,481,703 B2 | * | 11/2002 | Yoshida et al. | 270/58.08 |
| 6,714,316 B1 | * | 3/2004 | Nishiyama | 358/1.18 |
| 7,280,236 B2 | * | 10/2007 | Konagaya | 358/1.12 |
| 2004/0062562 A1 | * | 4/2004 | Nakatani et al. | 399/82 |
| 2006/0119871 A1 | * | 6/2006 | Nakamura et al. | 358/1.12 |
| 2008/0154426 A1 | * | 6/2008 | Kikuchi | 700/219 |

FOREIGN PATENT DOCUMENTS

JP    2005-165722    6/2005

* cited by examiner

*Primary Examiner* — James A Thompson
*Assistant Examiner* — Satwant K Singh
(74) *Attorney, Agent, or Firm* — Cowan, Liebowitz & Latman, P.C.

(57) ABSTRACT

A printing system capable of increasing the working efficiency of an operator engaged in a post-process necessary after printing can be provided. For this purpose, the user interface unit can execute a display which allows the operator to explicitly input, for each job, instruction information in consideration of a post-process necessary after a printing process in a job requiring a printing process by a printing apparatus in a printing system capable of stacking, on a stacking unit, printed materials having undergone the printing process. When the job to be processed is a job for which the operator inputs the instruction information via the display, printed materials of the job for which the operator inputs the instruction information are stacked on the stacking unit while the printed materials are classified every printed materials on the basis of the instruction information input by the operator for the job.

13 Claims, 55 Drawing Sheets

FIG. 3

| MEDIUM | THICKNESS PROCESSIBLE AT ONCE |
|---|---|
| PLAIN PAPER | 100mm |
| THICK PAPER | 50mm |
| THIN PAPER | 200mm |
| ... | ... |
| ... | .... |

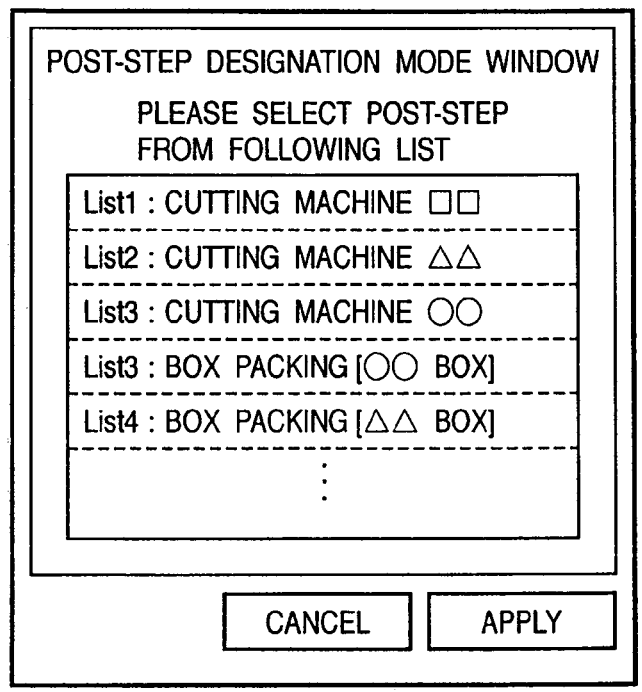
F I G. 21

FIG. 26

(CASE 1)
[CONTENTS OF JOB TO BE PROCESSED: 4-PAGE DOCUMENT DATA]
[OUTPUT PAPER SIZE: A4 SIZE], [OUTPUT PAPER TYPE: PLAIN PAPER], [THICKNESS OF ONE OUTPUT PAPER SHEET: 0.1 mm]
[OUTPUT COPY COUNT: 50 COPIES], [PRINT SETTING: SINGLE-SIDED PRINTING]
[NUMBER OF SHEETS FOR USE: 4 PAGES × 50 COPIES = 200 SHEETS]
[TOTAL HEIGHT: 200 SHEETS × 0.1 mm = 20 mm (2 cm)]
[SORTING METHOD: FIRST MODE (MODE IN WHICH SHEETS ARE STACKED WHILE THEY ARE CLASSIFIED EVERY COPY)]

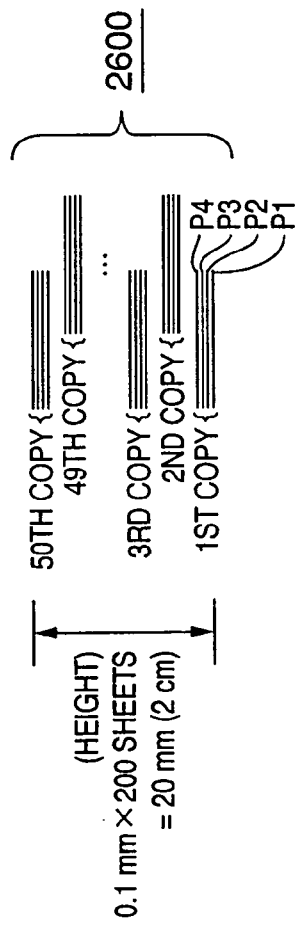

FIG. 27

(CASE 2)
[CONTENTS OF JOB TO BE PROCESSED: 4-PAGE DOCUMENT DATA]
[OUTPUT PAPER SIZE: A4 SIZE], [OUTPUT PAPER TYPE: PLAIN PAPER], [THICKNESS OF ONE OUTPUT PAPER SHEET: 0.1 mm]
[OUTPUT COPY COUNT: 50 COPIES], [PRINT SETTING: SINGLE-SIDED PRINTING]
[NUMBER OF SHEETS FOR USE: 4 PAGES × 50 COPIES = 200 SHEETS]
[TOTAL HEIGHT: 200 SHEETS × 0.1 mm = 20 mm (2 cm)]
[SORTING METHOD: SECOND MODE (MODE IN WHICH SHEETS ARE STACKED WITHOUT CLASSIFYING THEM)]

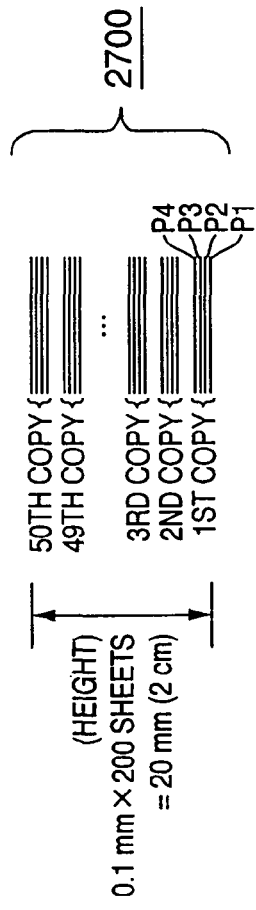

FIG. 31

(CASE 5)
[CONTENTS OF JOB TO BE PROCESSED: 4-PAGE DOCUMENT DATA]
[OUTPUT PAPER SIZE: A4 SIZE], [OUTPUT PAPER TYPE: COLORED PAPER], [THICKNESS OF ONE OUTPUT PAPER SHEET: 0.5 mm], [OUTPUT COPY COUNT: 30 COPIES], [PRINT SETTING: SINGLE-SIDED PRINTING], [NUMBER OF SHEETS FOR USE: 4 PAGES × 30 COPIES = 120 SHEETS], [TOTAL HEIGHT: 120 SHEETS × 0.5 mm = 60 mm (6 cm)], [FINISHING BY IMAGE FORMING APPARATUS IS DESIGNATED (STAPLING).]
[SORTING METHOD: THIRD MODE (MODE IN WHICH SHEETS ARE STACKED WHILE THEY ARE CLASSIFIED IN UNIT BASED ON POST-PROCESS STEP FOR JOB TO BE PROCESSED)]
→[POST-PROCESS STEP INFORMATION OF JOB: ITEM no 1 (WORK STEP OF CUTTING OUTPUT SHEETS OF JOB BY CUTTING MACHINE IS NECESSARY.)]

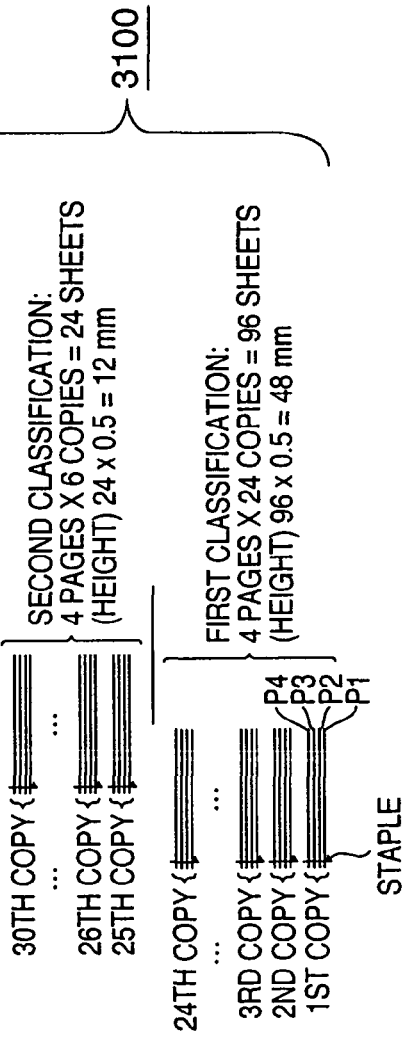

F I G. 33
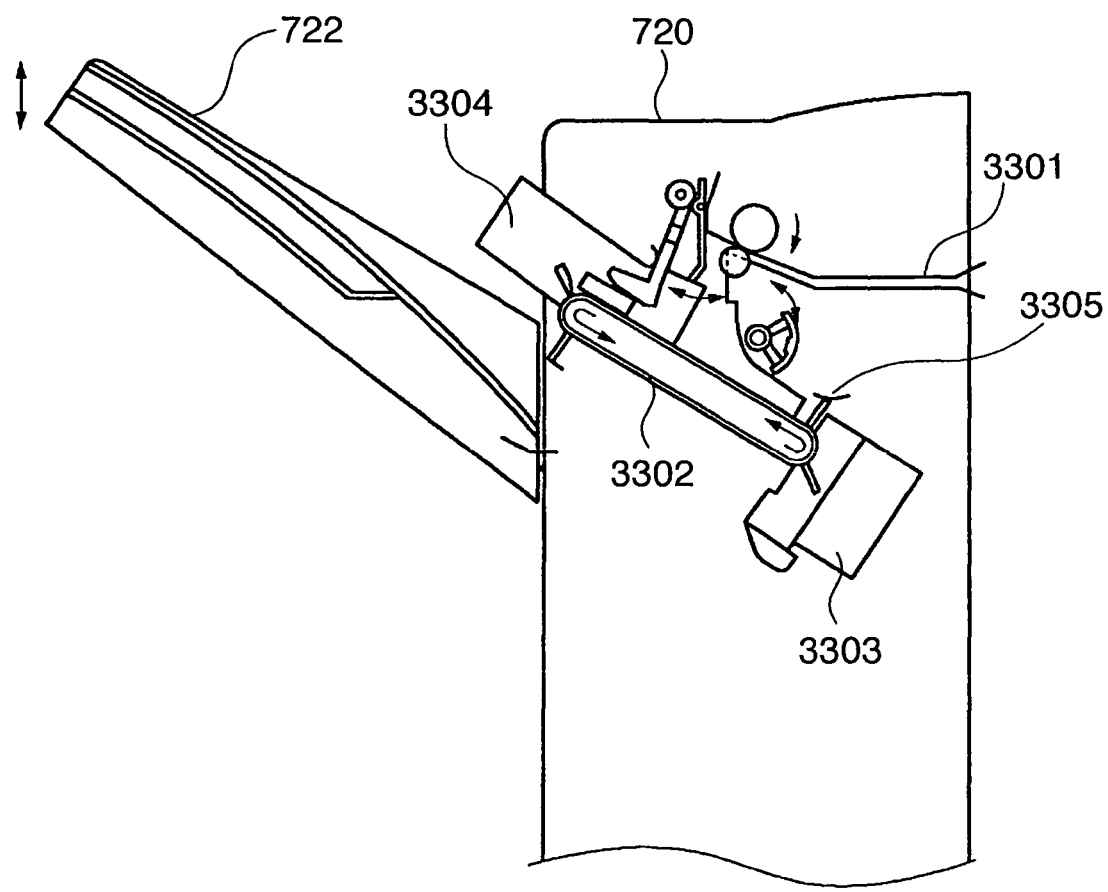

FIG. 39A

USER BOX / 01 : ushiyama TOTAL 5

◁ 1/1 ▷  3901

| TYPE | DOCUMENT NAME | PAPER SIZE | PAGE | DATE / TIME |
|---|---|---|---|---|
| 📄 | DOCUMENT A | A4 | 003 | 11/18 08:50 |
| 📄 | DOCUMENT 1 | A4 | 001 | 11/18 08:50 |
| 📄 | DOCUMENT B | A4 | 002 | 11/18 08:51 |
| 📄 | DOCUMENT 2 | A4 | 020 | 11/18 08:51 |
| 📄 | DOCUMENT 3 | A4 | 006 | 11/18 08:52 |

SELECT ALL   3902   DETAILED INFORMATION ▲   ERASE   EDIT MENU

PRINT ▲   SCAN DOCUMENT ▲   SEND ▲   CLOSE

MOVE / COPY ▲

USER BOX / 01 : ushiyama  TOTAL 5

◁ 1/1 ▷  3901

| | TYPE | DOCUMENT NAME | PAPER SIZE | PAGE | DATE/TIME |
|---|---|---|---|---|---|
| 1 | 📄 | DOCUMENT A | A4 | 003 | 11/18 08:50 |
| | 📄 | DOCUMENT 1 | A4 | 001 | 11/18 08:50 |
| 2 | 📄 | DOCUMENT B | A4 | 002 | 11/18 08:51 |
| | 📄 | DOCUMENT 2 | A4 | 020 | 11/18 08:51 |
| | 📄 | DOCUMENT 3 | A4 | 006 | 11/18 08:52 |

RESET SELECTION  3902  DETAILED INFORMATION ▲  ERASE  EDIT MENU

PRINT ▲  SCAN DOCUMENT ▲  SEND ▲  CLOSE

MOVE/COPY ▲

3900B

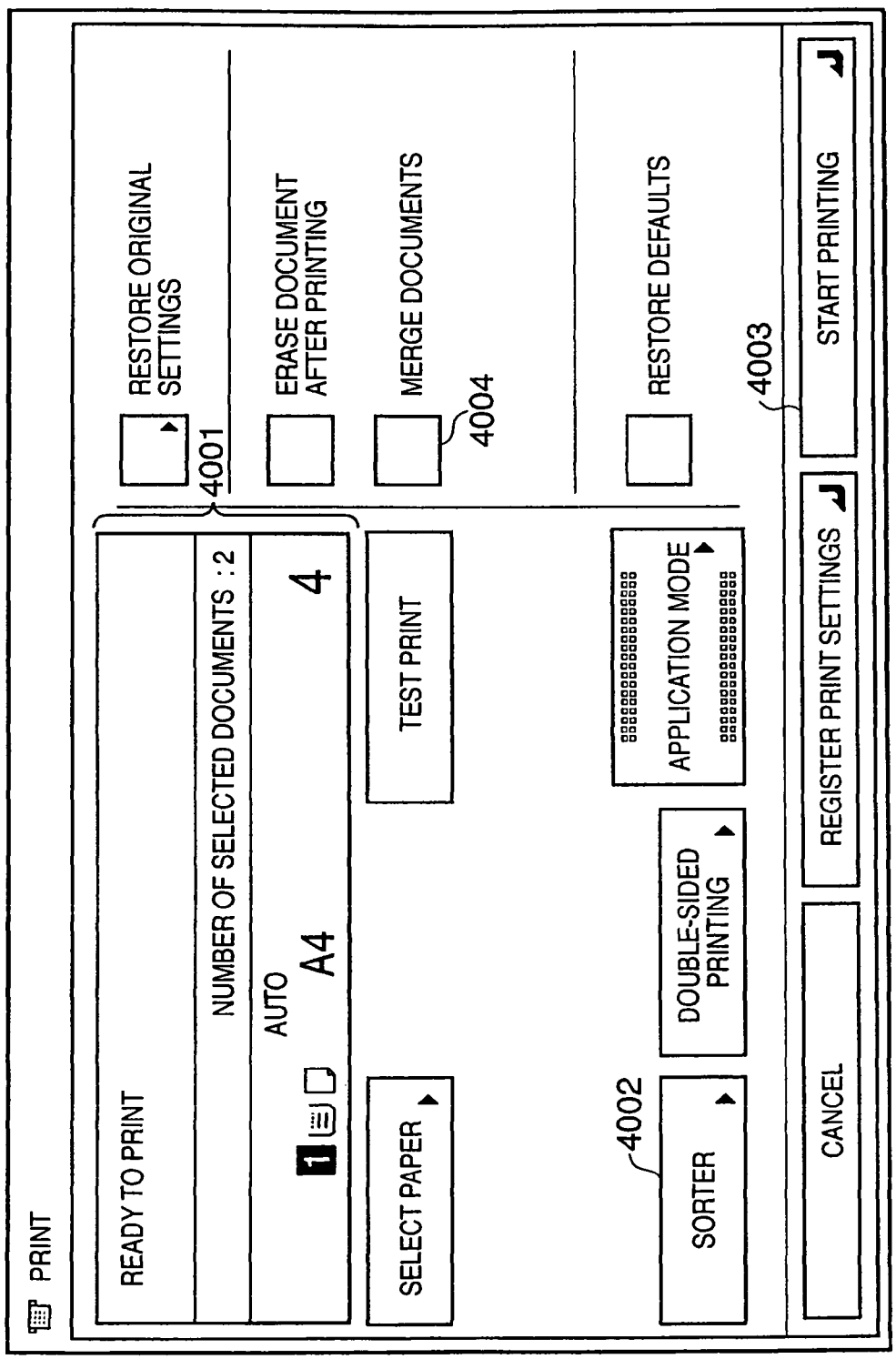

FIG. 41A (CASE C)
[PROCESS CONDITION] 3-PAGE DOCUMENT DATA (DOCUMENT A) AND 2-PAGE DOCUMENT DATA (DOCUMENT B) ARE SUCCESSIVELY PRINTED AS SEPARATE DOCUMENTS (SUCCESSIVE PRINTING IS PERFORMED, BUT NO DOCUMENT MERGE IS PERFORMED.)
[OUTPUT PAPER SIZE: A4 SIZE], [OUTPUT PAPER TYPE: THICK PAPER], [THICKNESS OF ONE OUTPUT PAPER SHEET: 1 mm],
[OUTPUT COPY COUNT: 4 COPIES], [PRINT SETTING: SINGLE-SIDED PRINTING]
[NUMBER OF SHEETS FOR USE: (3 PAGES OF DOCUMENT A × 4 COPIES) + (2 PAGES OF DOCUMENT B × 4 COPIES) = 20 SHEETS]
[TOTAL HEIGHT: 20 SHEETS × 1 mm = 20 mm (2 cm)]
[SORTING METHOD: FIRST MODE (MODE IN WHICH SHEETS ARE STACKED WHILE THEY ARE CLASSIFIED EVERY COPY)]

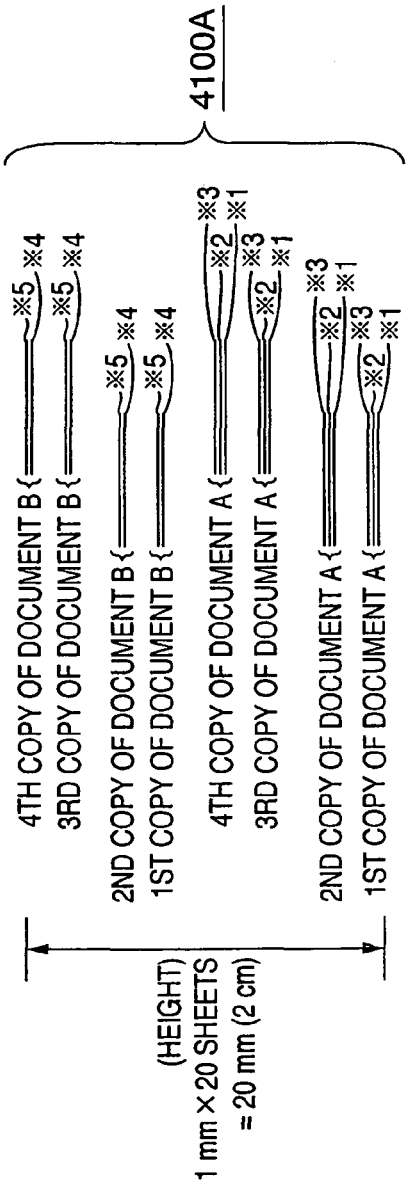

※1 : PRINTING RESULT OF 1ST PAGE OF DOCUMENT A  ※4 : PRINTING RESULT OF 1ST PAGE OF DOCUMENT B
※2 : PRINTING RESULT OF 2ND PAGE OF DOCUMENT A  ※5 : PRINTING RESULT OF 2ND PAGE OF DOCUMENT B
※3 : PRINTING RESULT OF 3RD PAGE OF DOCUMENT A

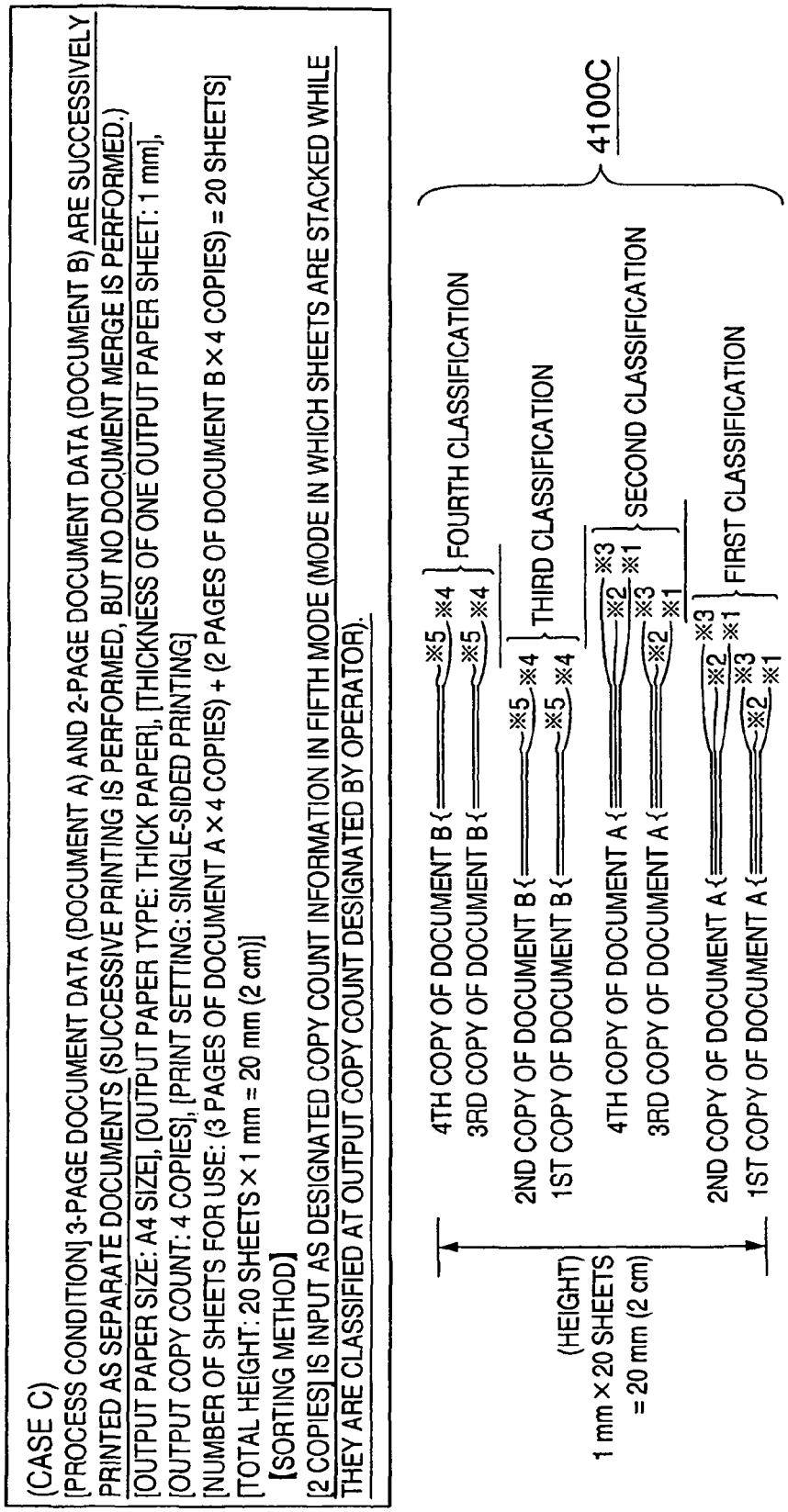

FIG. 41D (CASE D)
[PROCESS CONDITION] 3-PAGE DOCUMENT DATA (DOCUMENT A) AND 2-PAGE DOCUMENT DATA (DOCUMENT B) ARE PRINTED AT ONCE AS ONE DOCUMENT (SUCCESSIVE PRINTING IS PERFORMED, AND DOCUMENT MERGE IS PERFORMED.)
[OUTPUT PAPER SIZE: A4 SIZE], [OUTPUT PAPER TYPE: THICK PAPER], [THICKNESS OF ONE OUTPUT PAPER SHEET: 1 mm],
[OUTPUT COPY COUNT: 4 COPIES], [PRINT SETTING: SINGLE-SIDED PRINTING]
[NUMBER OF SHEETS FOR USE: (MERGED DOCUMENT OF TOTAL OF 5 PAGES OF 3 PAGES OF DOCUMENT A + 2 PAGES OF DOCUMENT B) × 4 COPIES = 20 SHEETS]
[TOTAL HEIGHT: 20 SHEETS × 1 mm = 20 mm (2 cm)]
[SORTING METHOD]
[ITEM no 3] IS DESIGNATED AS POST-STEP INFORMATION IN THIRD MODE (MODE IN WHICH SHEETS ARE STACKED WHILE THEY ARE CLASSIFIED IN UNIT BASED ON POST-PROCESS STEP FOR JOB TO BE PROCESSED), [10 mm] IS INPUT AS HEIGHT INFORMATION IN FOURTH MODE (MODE IN WHICH SHEETS ARE STACKED WHILE THEY ARE CLASSIFIED IN UNIT BASED ON HEIGHT DESIGNATED BY OPERATOR), OR [2 COPIES] IS INPUT AS DESIGNATED COPY COUNT INFORMATION IN FIFTH MODE (MODE IN WHICH SHEETS ARE STACKED WHILE THEY ARE CLASSIFIED AT OUTPUT COPY COUNT DESIGNATED BY OPERATOR).

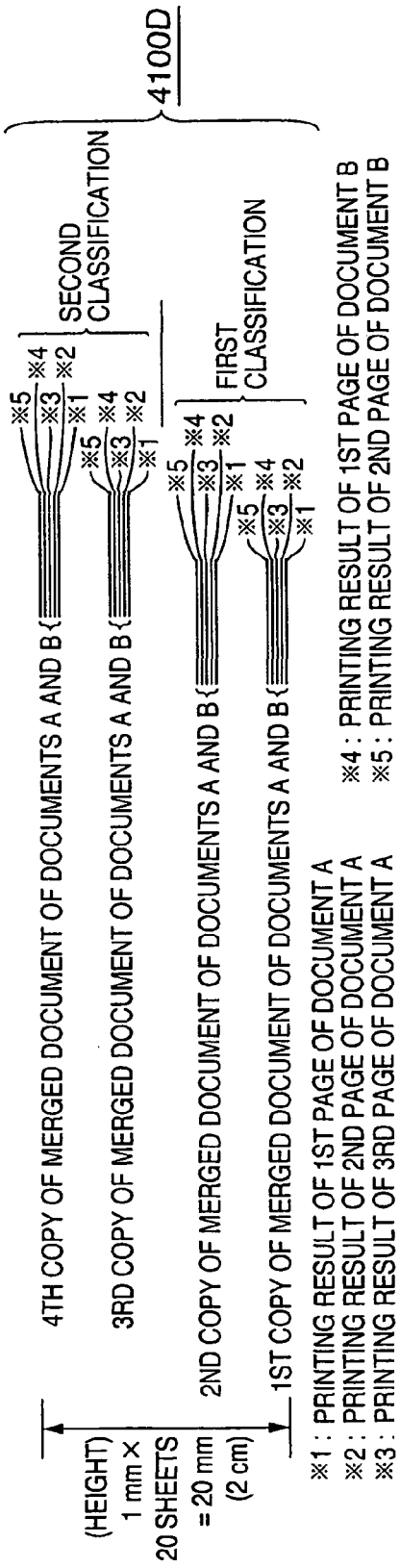

※1 : PRINTING RESULT OF 1ST PAGE OF DOCUMENT A
※2 : PRINTING RESULT OF 2ND PAGE OF DOCUMENT A
※3 : PRINTING RESULT OF 3RD PAGE OF DOCUMENT A
※4 : PRINTING RESULT OF 1ST PAGE OF DOCUMENT B
※5 : PRINTING RESULT OF 2ND PAGE OF DOCUMENT B

FIG. 42A

| | | |
|---|---|---|
| 4201A | RECEIPT NUMBER | INFORMATION 1 |
| 4202A | JOB TYPE (COPY, PRINT, FAX, OR BOX) | INFORMATION 2 |
| 4203A | JOB NAME (DOCUMENT NAME OR USER NAME) | INFORMATION 3 |
| 4204A | DOCUMENT SIZE | INFORMATION 4 |
| 4205A | PRINT SETTING | INFORMATION 5 |
| 4206A | OUTPUT PAPER SIZE | INFORMATION 6 |
| 4207A | OUTPUT PAPER TYPE | INFORMATION 7 |
| 4208A | THICKNESS OF ONE OUTPUT PAPER SHEET | INFORMATION 8 |
| 4209A | TOTAL PRINT COUNT | INFORMATION 9 |
| 4210A | TOTAL NUMBER OF PAGES | INFORMATION 10 |
| 4211A | TOTAL NUMBER OF OUTPUT PAPER SHEETS FOR USE | INFORMATION 11 |
| 4212A | TOTAL HEIGHT OF OUTPUT PAPER SHEETS | INFORMATION 12 |
| 4213A | WHETHER TO EXECUTE SORTING OPERATION | INFORMATION 13 |
| 4214A | SORTING CONDITION | INFORMATION 14 |
| 4215A | TOTAL NUMBER OF CLASSIFICATIONS | INFORMATION 15 |
| 4216A | JOB STATUS | INFORMATION 16 |
| 4217A | PROGRESS | INFORMATION 17 |

[INFORMATION OF JOB X DURING PRINTING (BEFORE INTERRUPTION OF PRINTING)]

| | | |
|---|---|---|
| 4201B | RECEIPT NUMBER | 001 |
| 4202B | JOB TYPE | COPY |
| 4203B | JOB NAME | JOB X |
| 4204B | DOCUMENT SIZE | A4 |
| 4205B | PRINT SETTING | SINGLE-SIDED PRINTING |
| 4206B | OUTPUT PAPER SIZE | A4 |
| 4207B | OUTPUT PAPER TYPE | THICK PAPER |
| 4208B | THICKNESS OF ONE OUTPUT PAPER SHEET | 1mm |
| 4209B | TOTAL PRINT COUNT | 4 COPIES |
| 4210B | TOTAL NUMBER OF PAGES | 4 PAGES |
| 4211B | TOTAL NUMBER OF OUTPUT PAPER SHEETS FOR USE | 4 COPIES × 4 PAGES=16 SHEETS |
| 4212B | TOTAL HEIGHT OF OUTPUT PAPER SHEETS | 1 mm × 16 SHEETS=16 mm |
| 4213B | WHETHER TO EXECUTE SORTING OPERATION | TO EXECUTE SORTING |
| 4214B | SORTING CONDITION | FIRST MODE (SHIFT EVERY COPY) |
| 4215B | TOTAL NUMBER OF CLASSIFICATIONS | 4 COPES ÷ 1 COPY=4 CLASSIFICATIONS |
| 4216B | JOB STATUS | DURING PRINTING |
| 4217B | PROGRESS | SHEETS UP TO SECOND SHEET OF SECOND COPY HAVE BEEN PRINTED = SHEETS UP TO SECOND SHEET OF SECOND CLASSIFICATION HAVE BEEN PRINTED. |

[INFORMATION OF JOB X DURING INTERRUPTION OF PRINTING]

| | | |
|---|---|---|
| 4201B | RECEIPT NUMBER | 001 |
| 4202B | JOB TYPE | COPY |
| 4203B | JOB NAME | JOB X |
| 4204B | DOCUMENT SIZE | A4 |
| 4205B | PRINT SETTING | SINGLE-SIDED PRINTING |
| 4206B | OUTPUT PAPER SIZE | A4 |
| 4207B | OUTPUT PAPER TYPE | THICK PAPER |
| 4208B | THICKNESS OF ONE OUTPUT PAPER SHEET | 1mm |
| 4209B | TOTAL PRINT COUNT | 4 COPIES |
| 4210B | TOTAL NUMBER OF PAGES | 4 PAGES |
| 4211B | TOTAL NUMBER OF OUTPUT PAPER SHEETS FOR USE | 4 COPIES × 4 PAGES=16 SHEETS |
| 4212B | TOTAL HEIGHT OF OUTPUT PAPER SHEETS | 1 mm × 16 SHEETS=16 mm |
| 4213B | WHETHER TO EXECUTE SORTING OPERATION | TO EXECUTE SORTING |
| 4214B | SORTING CONDITION | FIRST MODE (SHIFT EVERY COPY) |
| 4215B | TOTAL NUMBER OF CLASSIFICATIONS | 4 COPES ÷ 1 COPY=4 CLASSIFICATIONS |
| 4216B | JOB STATUS | DURING INTERRUPTION OF PRINTING |
| 4217B | PROGRESS | SHEETS UP TO SECOND SHEET OF THIRD COPY HAVE BEEN PRINTED = SHEETS UP TO SECOND SHEET OF THIRD CLASSIFICATION HAVE BEEN PRINTED. |

[INFORMATION OF JOB Y DURING PRINTING (BEFORE INTERRUPTION OF PRINTING)]

| | | |
|---|---|---|
| 4201C | RECEIPT NUMBER | 002 |
| 4202C | JOB TYPE | COPY |
| 4203C | JOB NAME | JOB X |
| 4204C | DOCUMENT SIZE | A4 |
| 4205C | PRINT SETTING | SINGLE-SIDED PRINTING |
| 4206C | OUTPUT PAPER SIZE | A4 |
| 4207C | OUTPUT PAPER TYPE | THICK PAPER |
| 4208C | THICKNESS OF ONE OUTPUT PAPER SHEET | 1mm |
| 4209C | TOTAL PRINT COUNT | 4 COPIES |
| 4210C | TOTAL NUMBER OF PAGES | 4 PAGES |
| 4211C | TOTAL NUMBER OF OUTPUT PAPER SHEETS FOR USE | 4 COPIES × 4 PAGES=16 SHEETS |
| 4212C | TOTAL HEIGHT OF OUTPUT PAPER SHEETS | 1 mm × 16 SHEETS=16 mm |
| 4213C | WHETHER TO EXECUTE SORTING OPERATION | TO EXECUTE SORTING |
| 4214C | SORTING CONDITION | FIFTH MODE (SHIFT EVERY TWO COPIES) |
| 4215C | TOTAL NUMBER OF CLASSIFICATIONS | 4 COPES ÷ 2 COPIES=2 CLASSIFICATIONS |
| 4216C | JOB STATUS | DURING PRINTING |
| 4217C | PROGRESS | SHEETS UP TO SECOND SHEET OF SECOND COPY HAVE BEEN PRINTED = SHEETS UP TO SIXTH SHEET OF FIRST CLASSIFICATION HAVE BEEN PRINTED. |

[INFORMATION OF JOB Y DURING INTERRUPTION OF PRINTING]

| | | |
|---|---|---|
| 4201C | RECEIPT NUMBER | 002 |
| 4202C | JOB TYPE | COPY |
| 4203C | JOB NAME | JOB X |
| 4204C | DOCUMENT SIZE | A4 |
| 4205C | PRINT SETTING | SINGLE-SIDED PRINTING |
| 4206C | OUTPUT PAPER SIZE | A4 |
| 4207C | OUTPUT PAPER TYPE | THICK PAPER |
| 4208C | THICKNESS OF ONE OUTPUT PAPER SHEET | 1mm |
| 4209C | TOTAL PRINT COUNT | 4 COPIES |
| 4210C | TOTAL NUMBER OF PAGES | 4 PAGES |
| 4211C | TOTAL NUMBER OF OUTPUT PAPER SHEETS FOR USE | 4 COPIES × 4 PAGES=16 SHEETS |
| 4212C | TOTAL HEIGHT OF OUTPUT PAPER SHEETS | 1 mm × 16 SHEETS=16 mm |
| 4213C | WHETHER TO EXECUTE SORTING OPERATION | TO EXECUTE SORTING |
| 4214C | SORTING CONDITION | FIFTH MODE (SHIFT EVERY TWO COPIES) |
| 4215C | TOTAL NUMBER OF CLASSIFICATIONS | 4 COPES ÷ 2 COPIES=2 CLASSIFICATIONS |
| 4216C | JOB STATUS | DURING INTERRUPTION OF PRINTING |
| 4217C | PROGRESS | SHEETS UP TO SECOND SHEET OF THIRD COPY HAVE BEEN PRINTED = SHEETS UP TO SECOND SHEET OF SECOND CLASSIFICATION HAVE BEEN PRINTED. |

4200C

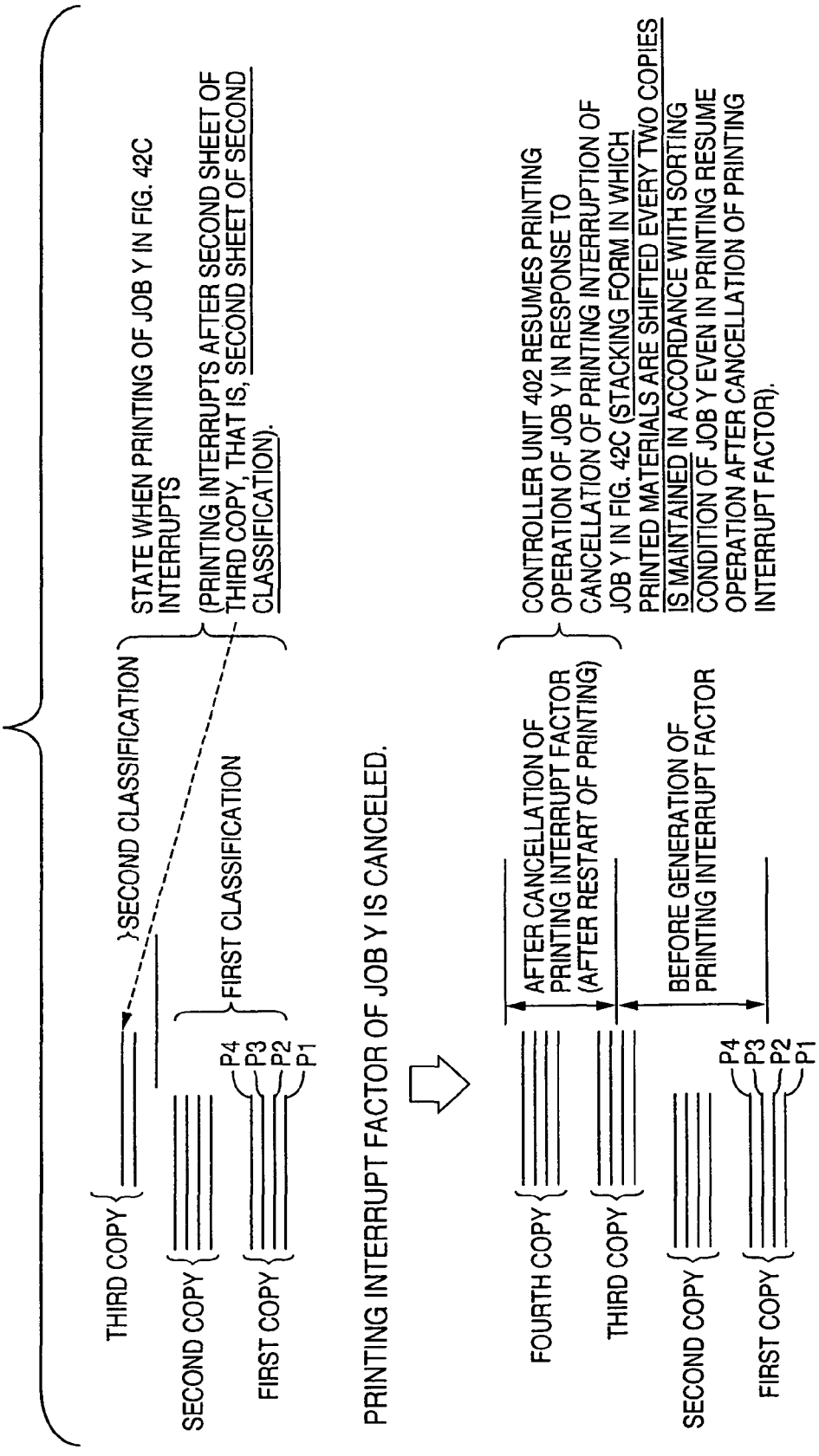

EXAMPLE OF SCHEMATIC APPEARANCE
OF LARGE-CAPACITY STACKER

SECTIONAL VIEW OF LARGE-CAPACITY STACKER

PRINTING SYSTEM, JOB PROCESSING METHOD, PRINTING APPARATUS, STORAGE MEDIUM, AND PROGRAM

BACKGROUND OF THE INVENTION

1. Field of the Invention

The present invention relates to a printing system capable of classifying sheets of a job to be processed, a job processing method, a printing apparatus, a storage medium, and a program.

2. Description of the Related Art

Conventionally in the commercial printing industry, a publication is issued through various work steps such as entry of a document, designing of the document, layout editing, comprehensive layout (presentation by printing), proofreading (layout correction and color correction), proof (proof print), block copy preparation, printing, post-process, and shipping.

In particular, the commercial printing industry often uses an offset reproduction printing press in the printing step, and the block copy preparation step is inevitable. However, once the block copy is prepared, it is difficult and disadvantageous in cost to correct the block copy. In block copy preparation, therefore, careful proofreading (i.e., careful layout check and color confirmation) is indispensable. Some period of time is generally required until issuing of a publication is completed.

In the commercial printing industry, most apparatuses used in respective work steps are bulky and expensive. In addition, work in each step requires expert knowledge. Know-how of experts is indispensable.

With the advent of high-speed and high-quality electrophotographic and inkjet printing apparatuses, a so-called print-on-demand (to be referred to as POD hereinafter) market is coming into being against the commercial printing industry.

The POD market appears to replace large-scale printing presses and printing methods so as to deal with jobs of relatively small lots within a short period of time without using any bulky apparatuses or systems.

In the POD market, digital printing using electronic data can be implemented to provide printing services and the like by making the best of digital image printing apparatuses such as a digital copying machine and digital multi-functional peripheral.

In the POD market, digitization advances more than in the conventional commercial printing industry. Management and control using computers has become widespread, and printed material can be actually issued within a short period of time. As another advantage, the POD market does not require any know-how of the operator. Recently, the image quality of printed materials by POD printing is coming close to the level of the commercial printing industry.

In this situation, office-equipment makers and the like are examining new entry into this new POD market (see Japanese Patent Laid-Open No. 2005-165722).

In order to enter the POD market, it is desirable on the assumption of the circumstance of the POD market to cope with any situation which hardly occurs in the office environment. A full study is necessary toward the practical use of POD printing.

For example, it is expected that only the functions of a printing apparatus such as a digital copying machine or digital multi-functional peripheral, which is satisfactorily adapted to the office environment, may not always match the POD environment or the like. In the POD environment, the operator must make detailed settings and work in order to create a final material which meets a customer's request. This environment is aware of shortening of the work time and cost reductions. In the office environment, the user often instructs the printing apparatus to print his document in accordance with his instructions, and then receives his material printed by the printing apparatus. In the POD environment, in most cases, one who requests creation of a printed material is a customer, and one who instructs the printing apparatus or printing system about an operation for creating the printed material is an operator engaged at the work site in the POD environment. In many cases, in the POD environment, unlike the office environment, an operator who instructs the printing apparatus (or the printing system having the printing apparatus) to run for a job to be processed is not one who receives the final material of the job. In order to commercialize a printing apparatus and printing system for a printing environment such as the POD environment which tends to be different from the office environment, it is important to find out use cases and user needs unique to a printing environment such as the POD environment. In addition, a mechanism capable of dealing with use cases and user needs unique to a printing environment such as the POD environment that are not expected in a printing environment such as the office environment must be proposed for commercialization. In this manner, the printing apparatus or printing system can be desirably applied not only to the office environment but also to a printing environment such as the POD environment.

More specifically, in the POD environment, a situation is assumed in which a printing apparatus as described above is installed at the work site, and a dedicated post-processing apparatus such as a cutting machine is also installed independently of the printing apparatus. In this printing environment, assumable work steps necessary for a job to be processed are work of cutting, with the cutting machine, materials printed by the printing apparatus, and work of packing printed materials in a box. Even after a process for a target job by the printing apparatus (or the printing system having the printing apparatus) ends, post-steps necessary after the printing step may exist in the job. At the work site, the operator may take out, from the delivery portion of the printing apparatus, materials which are printed by the printing apparatus and stacked on the delivery portion of the printing apparatus. To perform steps such as cutting and box packing, the operator may rearrange or sort printed materials. In a printing environment such as the POD environment, intervention work by the operator may be required for a job to be processed after the end of a printing process by the printing apparatus. In addition, many operations may be requested of the operator in intervention work by the operator that is necessary for a job to be processed after a printing process.

Examination of why this situation occurs arrives at the conclusion that the conventional printing apparatus (or the printing system having the conventional printing apparatus) is designed in consideration of the office environment. For example, the conventional printing apparatus (or the printing system having the conventional printing apparatus) does not have any specification considering a work step after a printing process, which may occur in the POD environment.

As described above, there is room for further study in commercializing a printing apparatus and printing system adaptable not only to the office environment but also to the POD environment.

SUMMARY OF THE INVENTION

It is an object of the present invention to provide a printing system, job processing method, printing apparatus, storage medium, and program capable of solving the above problems.

It is another object of the present invention to provide a convenient printing environment adaptable not only to the office environment but also to the POD environment.

It is still another object of the present invention to provide a printing environment which minimizes intervention work by the operator that may occur in the POD environment due to, e.g., the configuration of a printing apparatus assuming the office environment. It is still another object of the present invention to implement efficient work by reducing the work load of the operator at the actual work site in a printing environment such as the POD environment.

The present invention flexibly copes with a printing environment where one who receives a final material and one who requests an operation of the printing apparatus or printing system in order to create the final material are different, similar to the relationship between the customer and the operator in the POD environment. For this purpose, it is still another object of the present invention to provide a flexible user interface environment more friendlily to an operator who actually operates the printing apparatus or printing system.

The present invention intends an effect capable of increasing the efficiency of intervention work of an operator who engages in a post-process necessary after printing by the printing apparatus in a job to be processed in a printing environment such as the POD environment. In addition, an excellent operation environment where an increase in the efficiency of intervention work of an operator who engages in a post-process necessary after printing is considered and the operator will is respected as much as possible can be provided via a printing apparatus or printing system to the operator who operates the printing apparatus or printing system. The present invention intends an effect capable of constructing a highly convenient user interface environment in consideration of a printing environment such as the POD environment. It is still another object of the present invention to achieve these two effects in consideration of a printing environment such as the POD environment.

It is still another object of the present invention to provide a printing environment capable of flexibly meeting various needs from various users as much as possible on the assumption of various situations and use environments.

Further features of the present invention will become apparent from the following description of exemplary embodiments (with reference to the attached drawings).

BRIEF DESCRIPTION OF THE DRAWINGS

FIG. 3 is a table showing an example of a table (post-process device performance table) which describes information on the thickness of media processible at once by a cutting machine in a cutting process by the cutting machine as a post-step to be used in control of the embodiment;

FIG. 21 is a view for explaining still another example of the user interface to be controlled in the embodiment;

FIG. 26 is a view for explaining a control example in the embodiment;

FIG. 27 is a view for explaining a control example in the embodiment;

FIG. 31 is a view for explaining a control example in the embodiment;

FIG. 33 is a sectional view for explaining a control example in the embodiment;

FIGS. 39A and 39B are views for explaining examples of the user interface to be controlled in the embodiment;

FIGS. 40A to 40C are views for explaining examples of the user interface to be controlled in the embodiment;

FIGS. 41A to 41D are views for explaining control examples in the embodiment;

FIGS. 42A to 42C are tables for explaining control examples in the embodiment;

FIGS. 43A and 43B are views for explaining control examples in the embodiment;

DESCRIPTION OF THE EMBODIMENTS

Preferred embodiments of the present invention will be described in detail below with reference to the accompanying drawings, as needed.

First Embodiment

Overall Configuration of Printed Material Publishing System

Figure 1:
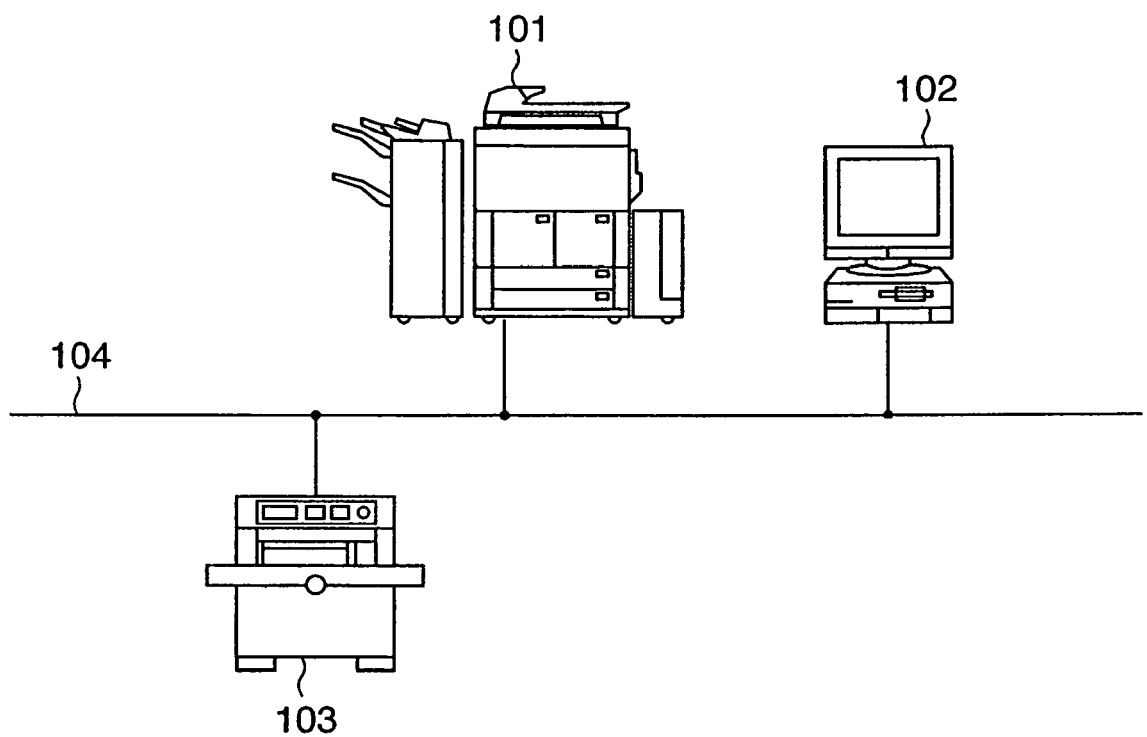
FIG. 1 is a view for explaining an example of a printed material publishing system including an image forming apparatus to be controlled in an embodiment.
Figure 2:
FIG. 2 is a table showing an example of a medium information table which holds information on a print medium to be used in control of the embodiment.

FIG. 1 is a view showing an example of the configuration of a printed material publishing system having an image printing apparatus (e.g., digital multi-functional peripheral) according to the first embodiment of the present invention. Note that the image printing apparatus in the first embodiment is also called an image forming apparatus or printing apparatus. A system having the image forming apparatus in the first embodiment is also called an image forming system or printing system. The printed material publishing system described in the first embodiment assumes an actual work site in a printing environment such as the POD environment where the printing system can be installed. The printed material publishing system illustrated in FIG. 1 comprises a digital multi-functional peripheral (image printing apparatus) 101, client PC 102, and cutting machine 103, which are connected to each other by a network 104. The digital multi-functional peripheral 101 holds a table (medium information table) as shown in FIG. 2 which describes information on media, and a table (post-process device performance table) as shown in FIG. 3 which describes information on the thickness of media processible at once by the cutting machine 103 in a cutting process by the cutting machine 103 as a post-step.

Note that the cutting machine 103 is an example of the post-processing device of the digital multi-functional peripheral 101 which forms the printed material publishing system, and the post-processing device is not limited to the cutting machine. In the first embodiment, a multi-functional printing apparatus having a plurality of functions such as the copy function and print function will be explained as an example of the printing apparatus. The first embodiment can be applied to even a single-functional printing apparatus such as an apparatus having only a print function of printing print data from an external apparatus, or an apparatus having only a copy function of printing print data input from the own document reader.

<Functional Configuration of Digital Multi-Functional Peripheral>

The functional configuration of the digital multi-functional peripheral 101 corresponding to an example of the printing apparatus (image printing apparatus) of the present invention will be explained with reference to FIG. 4. The digital multi-functional peripheral 101 disclosed in this specification comprises a function of printing print data of a job to be processed on a print medium (printed material). Thus, the digital multi-functional peripheral disclosed in this specification is also called a printing apparatus. The system disclosed in this specification comprises the printing apparatus, and is also called a printing system. In the printing system of the first embodiment having the printing apparatus 101 (main body) and a sheet processing apparatus 720, materials printed by the printing apparatus 101 can be stacked at the stacking unit (e.g., a delivery tray 722 in FIG. 7) of the sheet processing apparatus 720.

Figure 4:
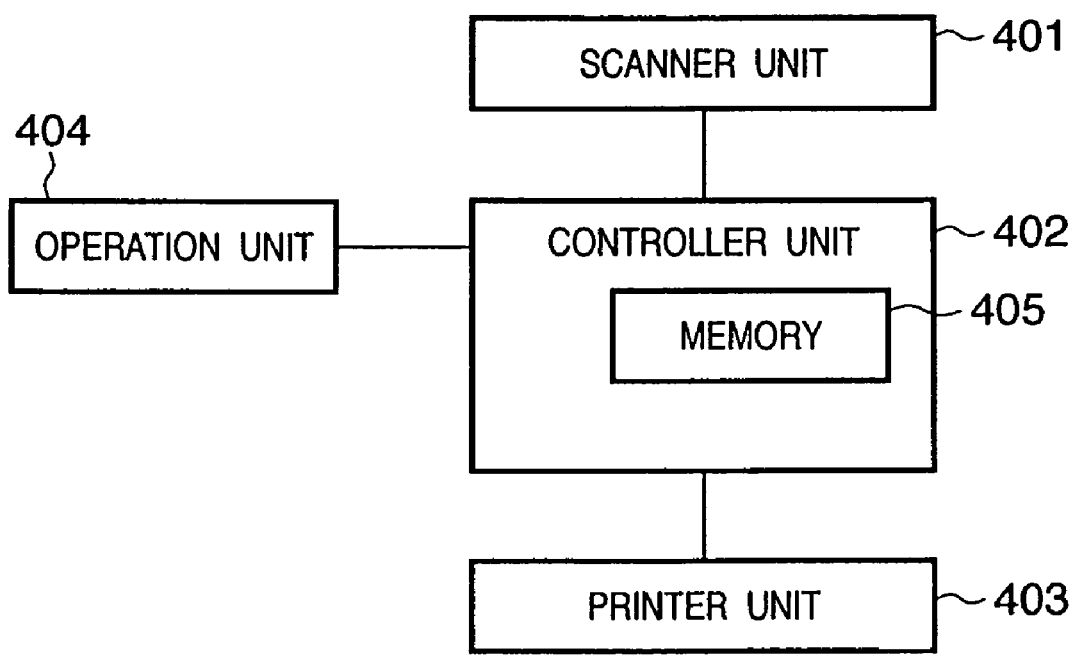
FIG. 4 is a block diagram for explaining an example of the internal configuration of an image forming apparatus to be controlled in the embodiment.

FIG. 4 is a block diagram showing the functional configuration of the digital multi-functional peripheral 101, and illustrating the units of a digital multi-functional peripheral having functions such as copying, printing, and FAX.

In FIG. 4, reference numeral 401 denotes a scanner unit which scans a document. Reference numeral 402 denotes a controller unit which performs an image process for an image scanned by the scanner unit 401 and stores the resultant data in a memory 405. Reference numeral 404 denotes an operation unit which sets various printing conditions for an image scanned by the scanner unit 401. The operation unit 404 corresponds to an example of a user interface to be controlled in the first embodiment. The operation unit 404 is an operation panel of the printing apparatus 101, and comprises a liquid crystal touch panel having various information display functions and a function to input various instructions from the operator. Reference numeral 403 denotes a printer unit which prints on a medium under printing conditions set via the operation unit 404 on the basis of image data (print data) read out from the memory 405. The units of the printing apparatus in the first embodiment illustrated in FIG. 4 are comprehensively controlled by the controller unit 402.

<Detailed Configuration of Controller Unit 402>

Details of the hardware configuration of the controller unit 402 which corresponds to an example of the control unit in the first embodiment, controls the digital multi-functional peripheral 101, and is arranged in the apparatus 101 will be explained with reference to FIG. 5.

Figure 5:
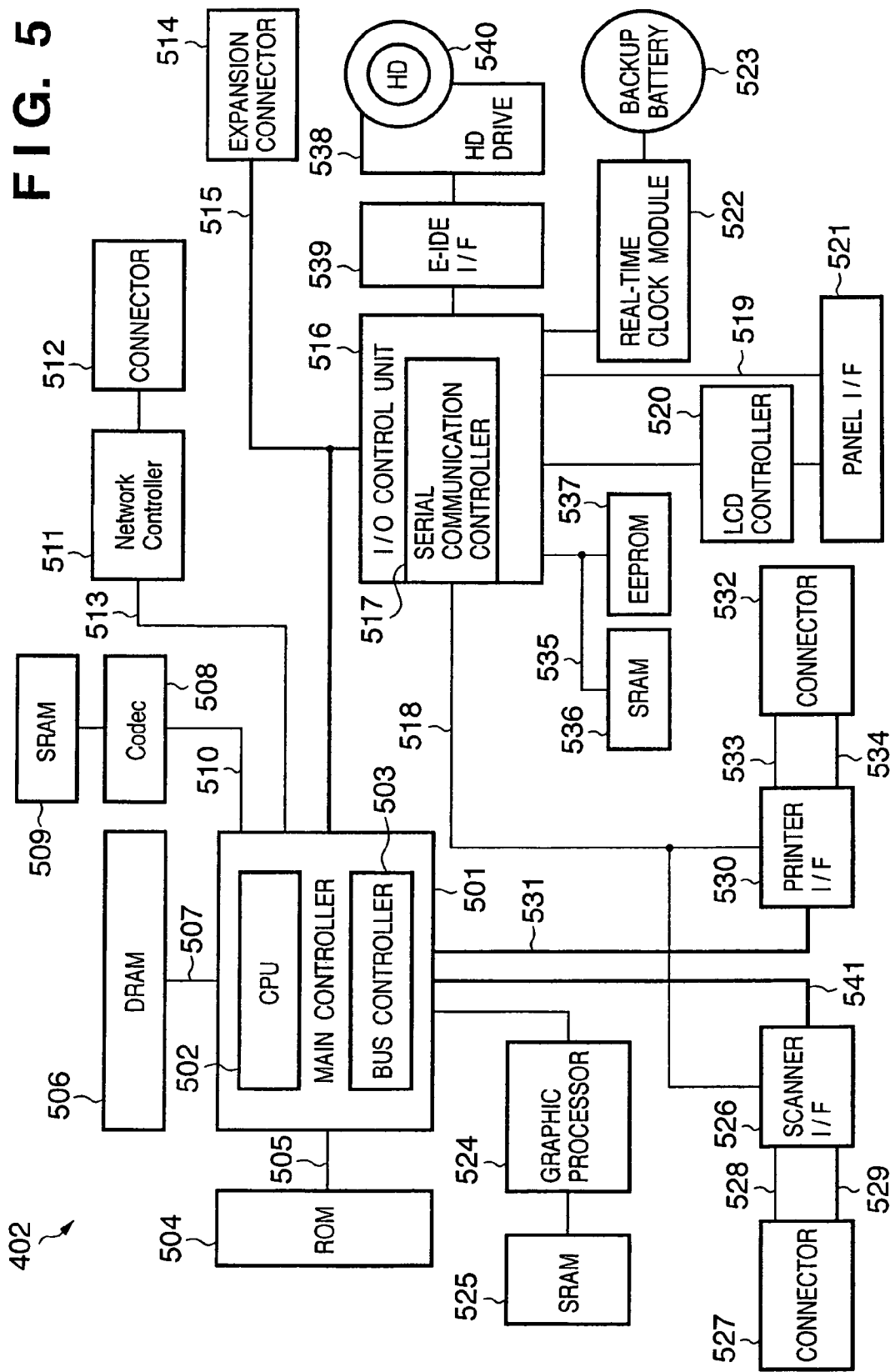
FIG. 5 is a block diagram for explaining an example of the detailed hardware configuration of the controller unit of the image forming apparatus in the embodiment.

As shown in FIG. 5, a main controller 501 in the controller unit 402 is mainly formed from a CPU 502, bus controller 503, and various I/F controller circuits.

The CPU 502 and bus controller 503 control the whole operation of the digital multi-functional peripheral 101. The CPU 502 runs on the basis of a program loaded from a ROM 504 via a ROM I/F 505. This program also describes an operation of interpreting received PDL (Page Description Language) code data and expanding the data into raster image data, and is processed by software. The bus controller 503 controls transfer of data input/output from each I/F, and performs arbitration upon bus contention and control of DMA data transfer.

A DRAM 506 is connected to the main controller 501 via a DRAM I/F 507, and used as a work area for operating the CPU 502 and an area for accumulating image data.

A Codec 508 compresses raster image data accumulated in the DRAM 506 by a format such as MH/MR/MMR/JBIG/JPEG, and decompresses compressed/accumulated code data into raster image data. An SRAM 509 is used as a temporary work area for the Codec 508. The Codec 508 is connected to the main controller 501 via an I/F 510, and data is DMA-transferred between the Codec 508 and the DRAM 506 under the control of the bus controller 503.

A graphic processor 524 performs image rotation, image scaling, color space conversion, and binarization for raster image data accumulated in the DRAM 506. An SRAM 525 is used as a temporary work area for the graphic processor 524. The graphic processor 524 is connected to the main controller 501 via an I/F, and data is DMA-transferred between the graphic processor 524 and the DRAM 506 under the control of the bus controller 503

A network controller 511 is connected to the main controller 501 via an I/F 513, and to the network 104 via a connector 512. The network is generally Ethernet®.

A general-purpose high-speed bus 515 connects an I/O control unit 516 and an expansion connector 514 for connecting an expansion board. The general-purpose high-speed bus is generally a PCI bus. The I/O control unit 516 is equipped with start-stop synchronization serial communication controllers 517 of two channels that transmit/receive control commands to/from the CPUs of the scanner unit 401 and printer unit 403. The I/O control unit 516 is connected to a scanner I/F circuit 526 and printer I/F circuit 530 via an I/O bus 518.

A panel I/F 521 is connected to an LCD controller 520, and formed from an I/F for display on the liquid crystal screen of the operation unit 404 and a key input I/F for inputs from hard keys and touch panel keys.

The operation unit 404 comprises a liquid crystal display, a touch panel input device adhered onto the liquid crystal display, and a plurality of hard keys. A signal input from the touch panel or hard key is transmitted to the CPU 502 via the panel I/F 521, and the liquid crystal display unit displays image data sent from the panel I/F 521. The liquid crystal display unit displays functions, image data, and the like in the operation of the digital multi-functional peripheral 101.

A real-time clock module 522 updates and saves a date and time managed in the apparatus, and is backed up by a backup battery 523.

An E-IDE connector 539 connects an external storage device. In the first embodiment, the I/F is used to connect a hard disk drive 538, store image data in a hard disk 540, and read out image data from the hard disk 540. Connectors 527 and 532 are respectively connected to the scanner unit 401 and printer unit 403, and made up of start-stop synchronization serial I/Fs (528 and 533) and video I/Fs (529 and 534).

The scanner I/F 526 is connected to the scanner unit 401 via the connector 527 and to the main controller 501 via a scanner bus 541. The scanner I/F 526 has a function of performing a predetermined process for an image received from the scanner unit 401, and also has a function of outputting to the scanner bus 541 a control signal generated on the basis of a video control signal sent from the scanner unit 401. Data transfer from the scanner bus 541 to the DRAM 506 is controlled by the bus controller 503.

The printer I/F 530 is connected to the printer unit 403 via the connector 532 and to the main controller 501 via a printer bus 531. The printer I/F 530 has a function of performing a predetermined process for image data output from the main controller 501 and outputting the processed data to the printer unit 403, and also has a function of outputting to the printer bus 531 a control signal generated on the basis of a video control signal sent from the printer unit 403.

Transfer of raster image data expanded in the DRAM 506 to the printer unit 403 is controlled by the bus controller 503, and the raster image data is DMA-transferred to the printer unit 403 via the printer bus 531 and video I/F 534.

An SRAM 536 is a memory capable of holding storage contents by power supplied from a backup battery even when the overall digital multi-functional peripheral 101 is turned off. The SRAM 536 is connected to the I/O control unit via a bus 535. An EEPROM 537 is a memory connected to the I/O control unit via the bus 535, too. Details of the hardware configuration of the controller unit 402 have been described.

<Structure of Operation Unit 404>

Figure 6:
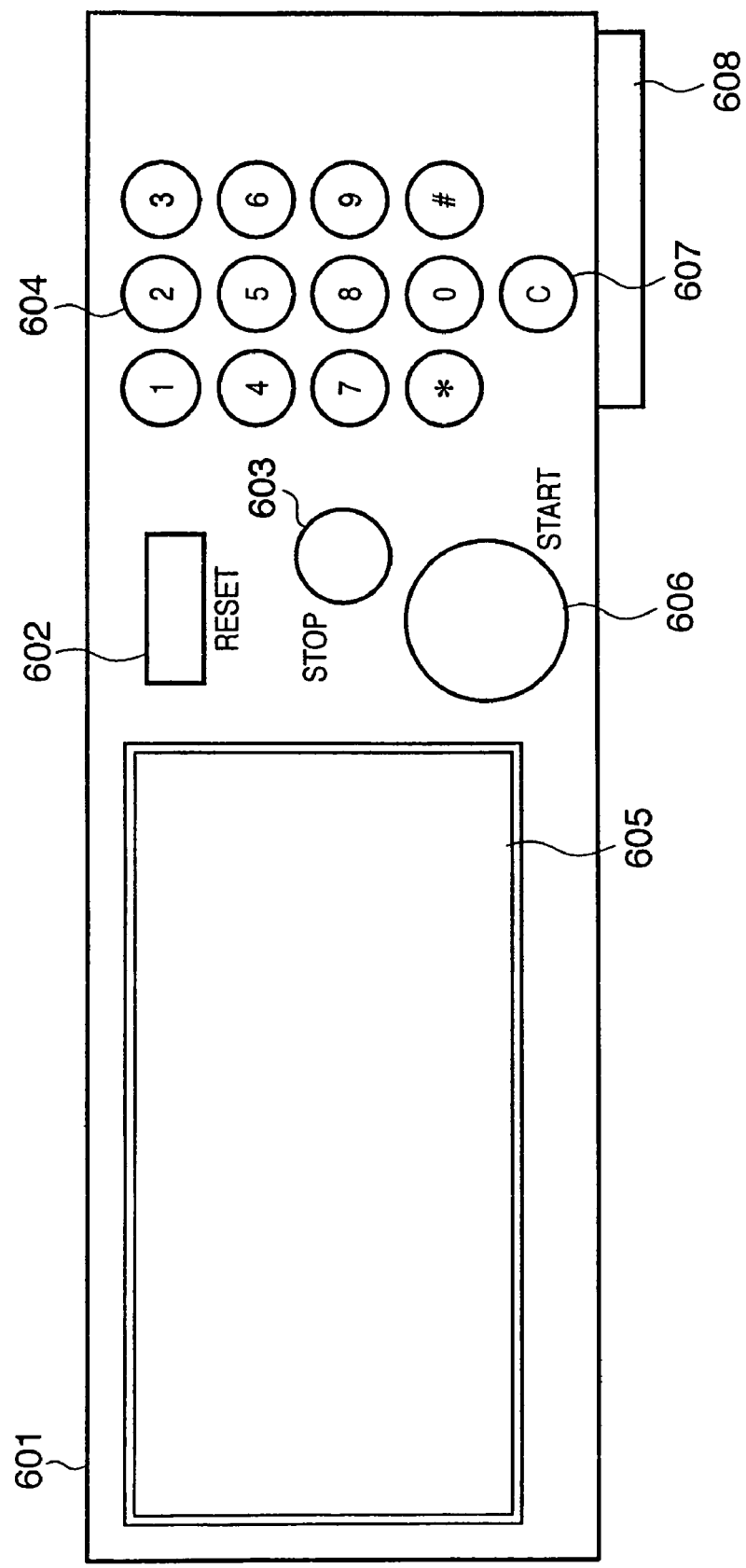
FIG. 6 is a view for explaining an example of a user interface unit to be controlled in the embodiment.
Figure 10:
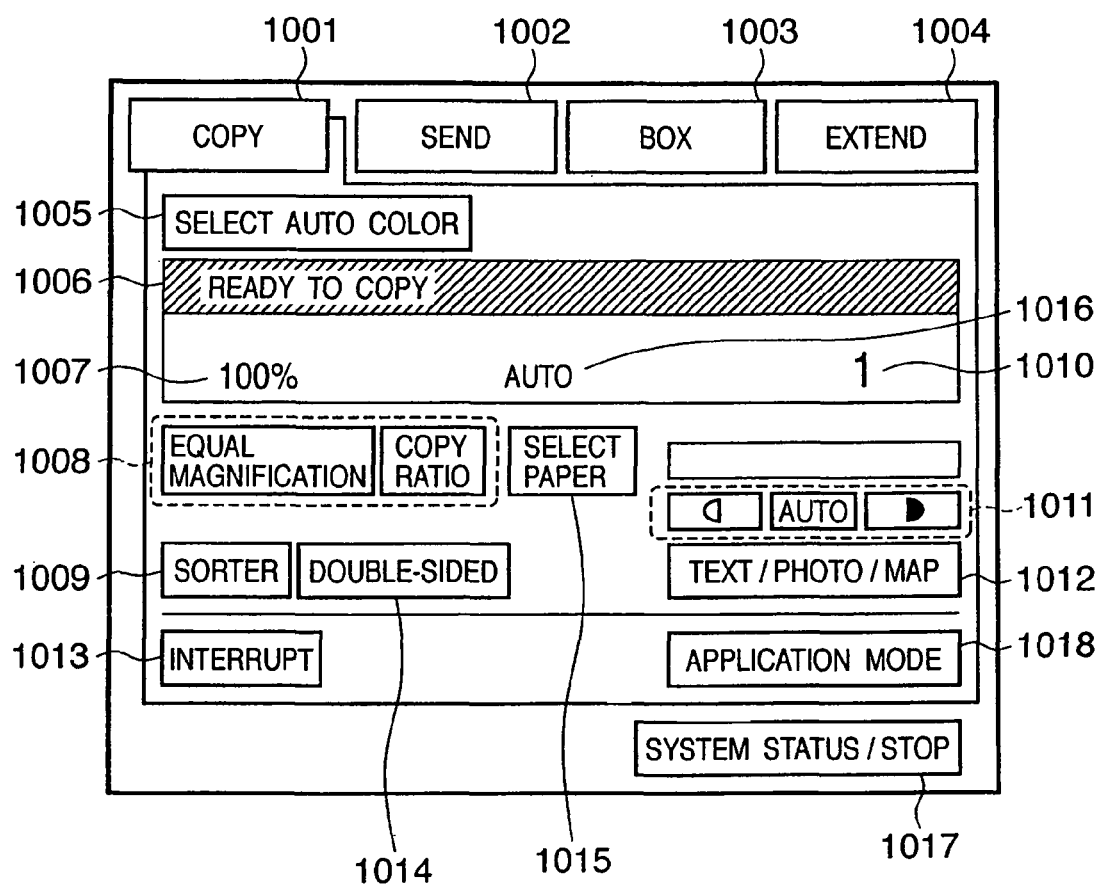
FIG. 10 is a view for explaining an example of a user interface to be controlled in the embodiment.

The structure of the operation unit 404 for setting various printing conditions will be explained. An operation unit 601 in FIG. 6 is connected to the panel I/F 521 in FIG. 5. Reference numeral 602 denotes a reset key for canceling, e.g., values set by the user. Reference numeral 603 denotes a stop key used to stop a job in progress. Reference numeral 604 denotes a ten-key pad for inputting numerical values such as entries. Reference numeral 605 denotes a touch panel type display unit which displays various operation windows (windows registered in advance) as illustrated in FIG. 10. The display unit 605 has many touch panel buttons for making various settings. Reference numeral 606 denotes a start key for starting a job such as read of a document. Reference numeral 607 denotes a clear key for clearing settings and the like. The controller unit 402 which controls the operation unit 404 accepts various instructions as described above which are input via the operation unit 404 including the display unit 605 from the operator to the printing system including the printing apparatus 101. In addition, the controller unit 402 causes the printing system to execute an operation based on an instruction input from the operator via the operation unit 404. Also, the controller unit 402 causes the display unit 605 to, e.g., display a confirmation to prompt the operator to confirm an operator's operation on the operation unit 404, and display information (e.g., the job processing status or status information of the system) of which the operator is to be notified. In this manner, the controller unit 402 executes various control operations for performing interactive exchanges with an operator who operates the operation unit 404 of the printing apparatus 101. The system configuration capable of executing various control operations via the operation unit 404 of the printing apparatus 101 is a feature of the first embodiment for fully exhibiting effects not only in the office environment but also in the POD environment. The operation unit 404 having the touch panel type display unit 605 of the printing apparatus 101 is also called an operation panel or control panel.

<Hardware Configurations of Scanner Unit 401 and Printer Unit 403>

Figure 7:
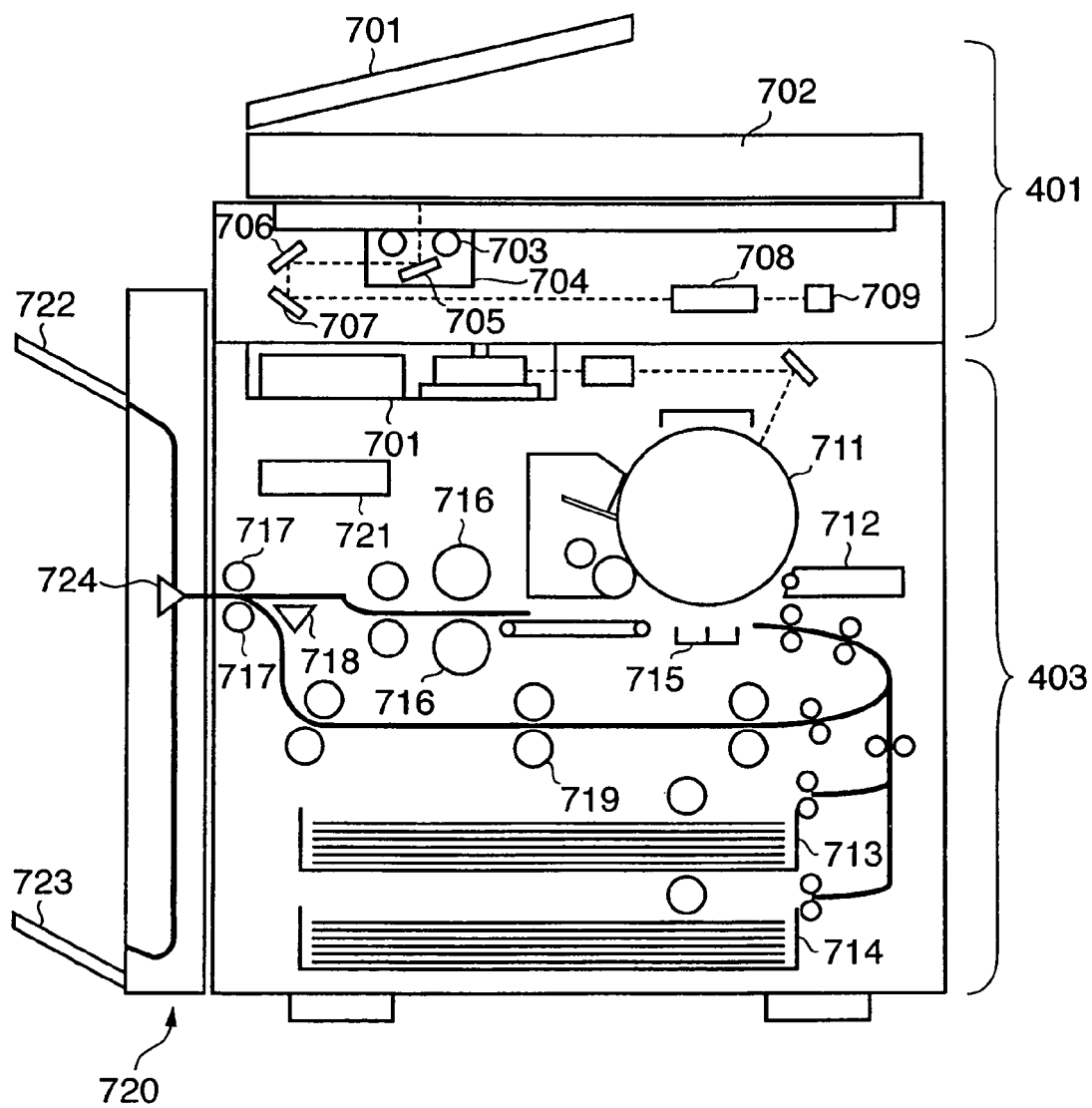
FIG. 7 is a sectional view for explaining an example of the mechanical structure of the image forming apparatus to be controlled in the embodiment.

FIG. 7 is a sectional view showing the scanner unit 401 and printer unit 403. A document feeder 701 of the scanner unit 401 feeds document pages one by one from the last page onto a platen glass 702. After the end of reading the document page, the document page on the platen glass 702 is discharged.

After the document is conveyed onto the platen glass 702, a lamp 703 is turned on, and movement of a scanner unit 704 starts to expose and scan the document. Light reflected by the document is guided to a CCD 709 via mirrors 705, 706, 707, and 708.

The image of the scanned document is read by the CCD 709. Image data output from the CCD 709 is stored in a hard disk (e.g., an HD in the memory 405 in FIG. 4) which is arranged in the printing apparatus 101 and can store print data of print jobs. Printing of image data of a job to be printed is executed by the printer unit 403 via the HD. A series of printing operations for a job whose print data is input from the document reading unit is also controlled by the controller unit 402.

The printer unit 403 comprises a laser driver for driving a laser-emitting unit 710. The laser driver drives the laser-emitting unit 710 in accordance with image data output from the scanner unit 401 to emit a laser beam.

A printer control unit 721 is connected to the outside via a network, processes input image data, and drives the laser-emitting unit 710 in accordance with the image data to emit a laser beam.

The laser beam is swept by a rotary polygon mirror, and irradiates a photosensitive drum 711 to form a latent image corresponding to exposure of the laser beam on the photosensitive drum 711. A developer is attached from a developing unit 712 to the latent image on the photosensitive drum 711.

At a timing synchronized with the start of laser beam irradiation, a print sheet is fed from either a sheet feed cassette 713 or sheet feed cassette 714, and conveyed to a transfer portion 715 to transfer the developer attached on the photosensitive drum 711 onto the medium.

The medium on which the developer is transferred is conveyed to fixing portions 716, and fixed onto the medium by the heat and pressure of the fixing portions 716.

The medium having passed through the fixing portions 716 is discharged by discharge rollers 717. The sheet processing apparatus 720 sorts media by storing discharged media at respective bins.

The top bin of the sheet processing apparatus 720 is the delivery tray 722. In addition, the sheet processing apparatus 720 has a stacking tray 723 capable of stacking a large number of discharged media. Which of the delivery tray 722 and stacking tray 723 receives discharged media is switched by a flapper 724.

When double-sided printing is set, the rotational direction of the discharge roller 717 is reversed to guide a medium to the refeed convey path by a flapper 718. When multiple printing is set, a medium is guided to the refeed convey path by the flapper 718 so as not to convey the medium to the discharge rollers 717. The medium guided to the refeed convey path is fed to the transfer portion 715 at the above-described timing.

<Configuration of Client PC>

The configuration of the information processing apparatus (in this example, client PC) 102 corresponding to an example of a remote external apparatus different from the printing apparatus 101 in the printing system of FIG. 1 will be explained.

Figure 8:
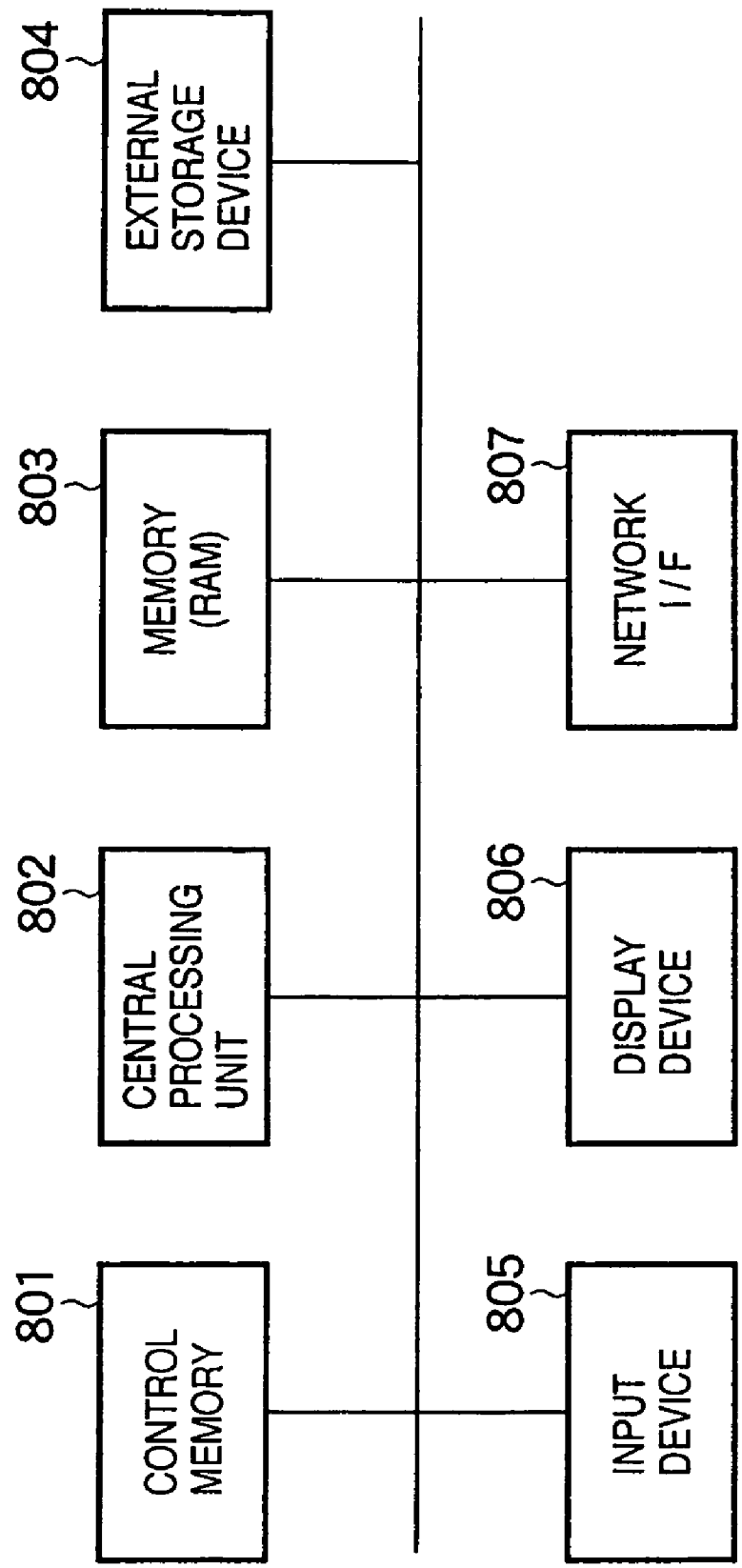
FIG. 8 is a block diagram for explaining an example of the internal configuration of an information processing apparatus to be controlled in the embodiment.

The client PC 102 comprises, e.g., various units shown in FIG. 8. In FIG. 8, reference numeral 801 denotes a control memory (ROM); 802, a central processing unit (CPU); 803, a memory (RAM); 804, an external storage device; 805, an input device; 806, a display device; 807, a network I/F; 808, a bus. A control program (e.g., a printer driver for the digital multi-functional peripheral 101) for implementing an information processing function according to the first embodiment, and data used by the control program are stored in the control memory 801. The control programs and data are properly loaded into the memory 803 via the bus 808 under the control of the central processing unit 802, and executed by the central processing unit 802. The central processing unit 802 of the client PC 102 accepts an instruction from the operator of the client PC 102 via the input device 805 (mouse and keyboard) and the display device 806 which correspond to examples of the user interface in the first embodiment. The central processing unit 802 causes the client PC 102 to execute an operation corresponding to the instruction. For example, the central processing unit 802 causes the client PC 102 to transmit various data (print data and printing condition data) of a job to be processed to the printing apparatus 101 of the first embodiment via the network I/F 807 together with a printing execution request. Then, the central processing unit 802 controls the printing apparatus 101 to print the job to be processed in accordance with the printing condition data of the job.

Note that the first embodiment also comprises constituent elements when the client PC 102 executes control associated with a process to classify printed materials to be output by the printing apparatus 101 to be described later. For example, the central processing unit 802 causes the client PC 102 to acquire information on a post-processing apparatus necessary for control from the printing apparatus 101 or an external apparatus such as a near-line post-processing apparatus (to be described later). Alternatively, the central processing unit 802 causes the client PC 102 to register information on the post-processing apparatus in the memory of the client PC 102 in advance. On the premise of this configuration, the central processing unit 802 causes the display device 806 of the client PC 102 to display, in response to a user operation to the client PC 102, a user interface window associated with a classification process (to be described later). Further, the central processing unit 802 accepts various requests associated with the classification process (to be described later) from the operator of the client PC 102 via window. The central processing unit 802 causes the printing apparatus 101 to execute, by a classification process corresponding to a request from the operator of the client PC 102, the printing operation of a print job for which execution of printing is requested from the client PC 102. This configuration will be described in detail in the second embodiment and the like.

<Process Flow in Copying by Digital Multi-Functional Peripheral to Be Controlled in First Embodiment>

Figure 9:
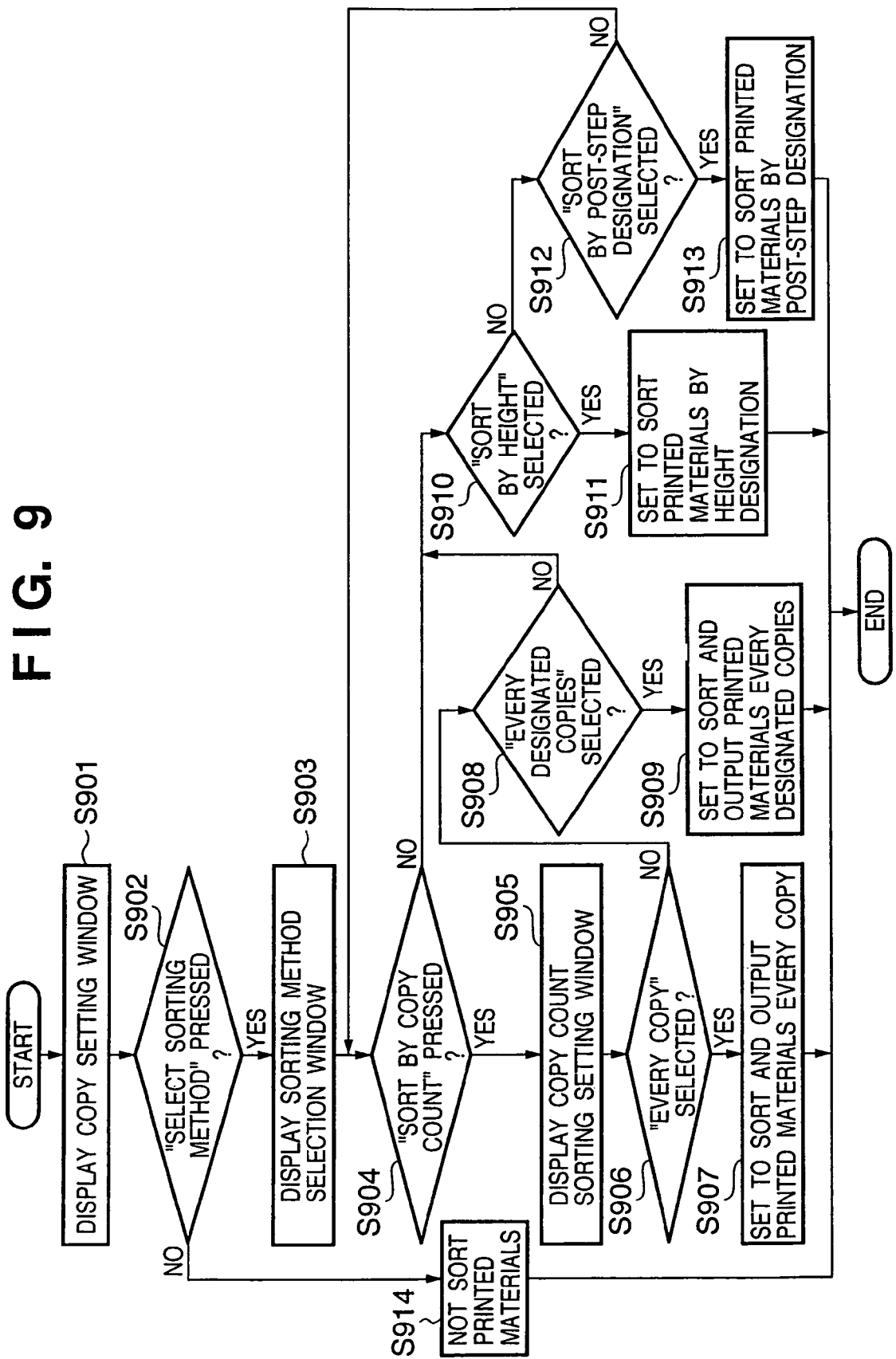
FIG. 9 is a flowchart for explaining control in the embodiment.

FIG. 9 is a flowchart for explaining control in the first embodiment. In the first embodiment, the controller unit 402 of the printing apparatus 101 controls the printing apparatus 101 so that it can execute processes and operations in steps illustrated in the flowchart of FIG. 9. Program codes for causing the printing apparatus 101 to execute the processes of the flowchart in FIG. 9 are stored as program data in advance in the memory 405 of the printing apparatus 101. By reading out and executing the data, the controller unit 402 causes the printing apparatus 101 to execute various process operations illustrated in FIG. 9. The flowchart illustrated in FIG. 9 mainly shows a series of process procedures in control associated with a printed material sorting method executed by the controller unit 402 in copying by the digital multi-functional peripheral.

In S901, after the printing apparatus 101 is turned on by the operator, the controller unit 402 causes the display unit 605 of the operation unit 404 to display a setting window illustrated in FIG. 10 as an initial window. The controller unit 402 causes the display unit 605 to display function selection keys (copy tab, send tab, box tab, and extend tab) 1001 to 1004 which are arrayed and displayed at the top in the display area of the display unit 605 illustrated in FIG. 10 even while the operation window of a function other than the copy function is displayed. The controller unit 402 causes the display unit 605 to execute the display illustrated in FIG. 10 in response to press of the function selection key (copy tab) 1001 by the user in a window other than that of the copy function.

The copy setting window which is illustrated in FIG. 10 and displayed on the display unit 605 by the controller unit 402 comprises various keys ranging from a color selection setting key 1005 to an application mode key 1018 illustrated in FIG. 10 in addition to the function selection keys 1001 to 1004. The color selection setting key 1005 is an operation instruction key for designating, by the user, a document scan mode for a job to be scanned by the scanner unit 401 of the printing apparatus 101. The status display portion 1006 functions as a display portion which displays information for notifying the user of the operation status of the printing apparatus 101. The copy ratio display portion 1007 functions as a display portion for prompting the user to confirm a parameter currently set as the printing ratio of print data of a job to be printed. The copy ratio setting key 1008 functions as an operation instruction portion for setting, by the user, the printing ratio of print data of a job to be printed.

The sorter key 1009 is a display key for accepting, from the user, a request to cause the display unit 605 to execute a display for allowing the user (synonymous with the operator) of the apparatus 101 to designate a printed material sorting method for a job to be printed by the apparatus 101 from a plurality of selection candidates. When the sorter key 1009 is pressed by the user, the controller unit 402 controls the display unit 605 of the printing apparatus 101 to display a display window illustrated in FIG. 11. The sorter key 1009 in FIG. 10 and a sorter key 4002 (see FIG. 40: to be described later) are display keys for displaying a display window which allows the operator to specify a sorting method from a plurality of selection candidates. Thus, the sorter keys 1009 and 4002 may also be named "sorting method selection" keys. In the first embodiment, a "sorting process" is defined and referred to as a "classification process", which will be described later. Hence, the sorter keys 1009 and 4002 may also be named "classification process method selection" keys. In this manner, the display building elements may also be properly modified unless they conflict with the gist of the present invention. The controller unit 402 causes the sheet count display area 1010 of the UI window illustrated in FIG. 10 to display the total print count input by the operator via the ten-key pad 604 of the operation unit 404 or the like for a print job to be processed. The UI window illustrated in FIG. 10 also comprises various operation instruction keys such as the density setting key 1011, image mode setting key 1012, interruption key 1013, double-sided setting key 1014, paper selection key 1015, paper size display key 1016, system monitor key 1017, and application mode key 1018. The controller unit 402 causes the printer unit 403 to execute a printing operation complying with various printing conditions input by the operator via the window displayed on the display unit 605 as illustrated in FIG. 10 or a hard key input portion (various hard keys except the display unit 605 in FIG. 6). Jobs to be printed by an operator's operation from the operation unit 404 include a print job whose print data is input from the scanner unit 401, and a print job whose print data has already been stored in the HD of the printing apparatus 101 by a box function to be described later.

As illustrated in FIG. 10, the function selection keys 1001 to 1004 which are arrayed and displayed at the top in the display area of the display unit 605 are display keys for allowing the operator to select which of the operation windows of functions provided by the digital multi-functional peripheral 101 is to be displayed on the display unit 605. For example, the apparatus 101 comprises four functions: copy function, send function, box function, and extend function. The controller unit 402 causes the display unit 605 to display the function selection key (copy tab) 1001, function selection key (send tab) 1002, function selection key (box tab) 1003, and function selection key (extend tab) 1004. For example, the controller unit 402 causes the display unit 605 to display the operation window of the box function in FIG. 39 or 40 (to be described later) in response to selection of the function selection key (box tab) 1003 in the window illustrated in FIG. 10. The box operation will be described later.

After the controller unit 402 causes the display unit 605 to execute the display in FIG. 10, it determines in step S902 on the basis of information from the touch panel sensor whether the sorter key 1009 in the display of FIG. 10 has been pressed by the operator. If the controller unit 402 determines in step S902 that the sorter key 1009 has been pressed by the operator, it advances to step S903 to cause the display unit 605 to display a sorting method selection window illustrated in FIG. 1.

Figure 11:
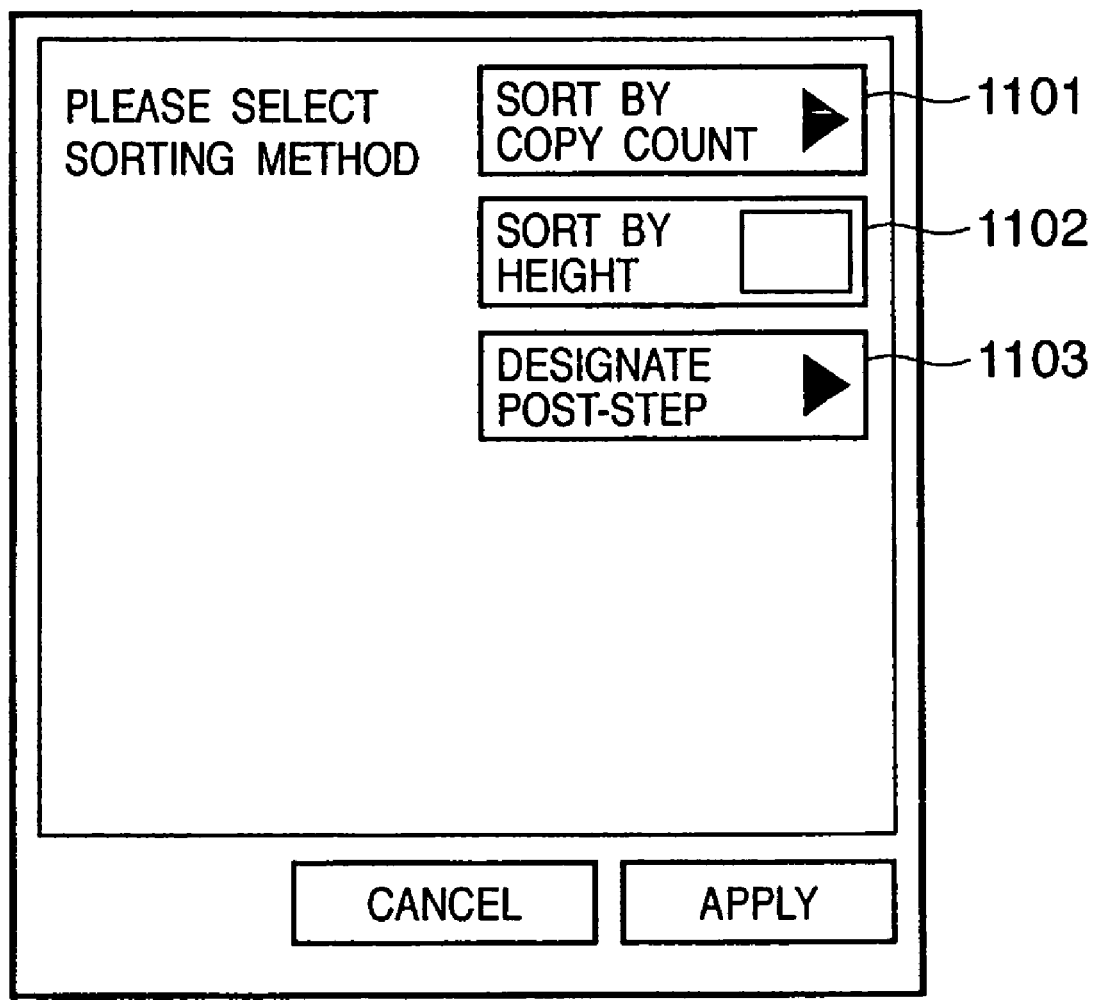
FIG. 11 is a view for explaining another example of the user interface to be controlled in the embodiment.

As illustrated in FIG. 11, the controller unit 402 causes the display unit 605 to display a window for allowing the operator to select a desired type of sorting method for a job to be processed from a plurality of types of printed material sorting methods executable by the printing apparatus 101. In the example of FIG. 11, the controller unit 402 causes the display unit 605 to display an operation window having a "sort by copy count" button 1101, "sort by height" button 1102, and "designate post-step" button 1103. For example, if the operator presses the "sort by copy count" button 1101 in the window of FIG. 11, the controller unit 402 determines that the operator selects a "sort by copy count" mode as a printed material sorting method for a print job to be processed in accordance with a printing execution request input by the operator via the operation unit 404. If the operator presses the "sort by height" button 1102 of the window in FIG. 11, the controller unit 402 determines that the operator selects a "sort by height" mode as a printed material sorting method for a print job to be processed. If the operator presses the "designate post-step" button 1103 of the window in FIG. 11, the controller unit 402 determines that the operator selects a "designate post-step" mode as a printed material sorting method for a print job to be processed.

Figure 12:
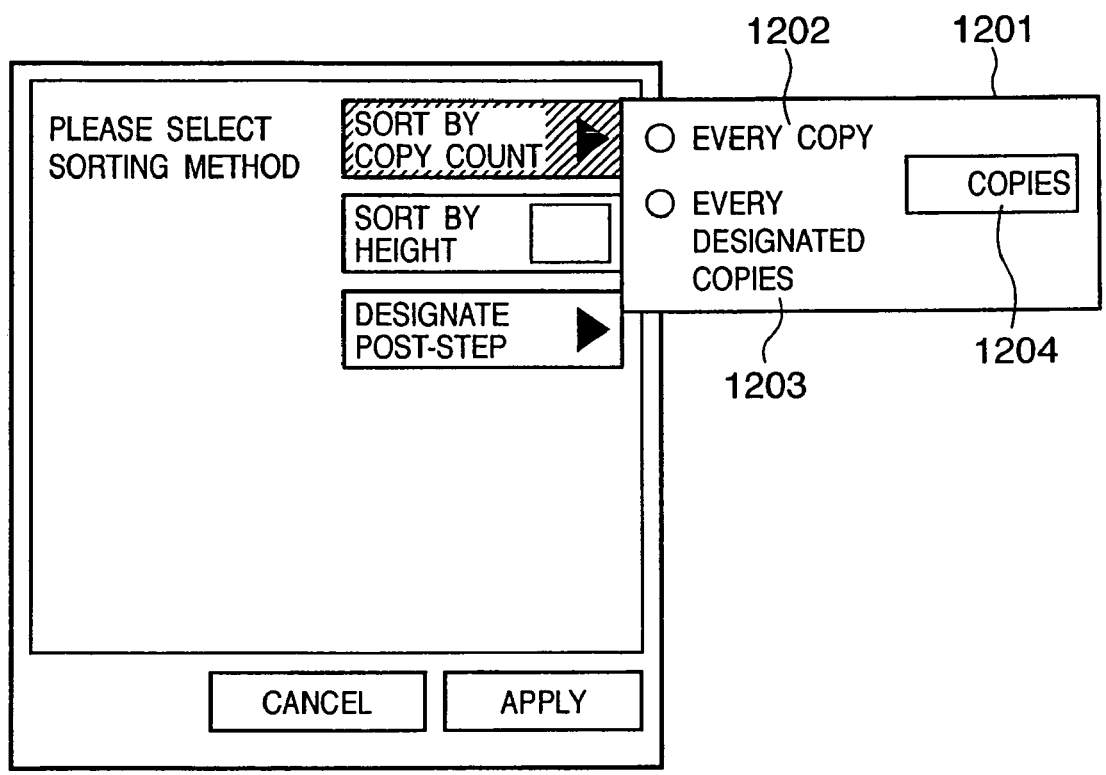
FIG. 12 is a view for explaining still another example of the user interface to be controlled in the embodiment.

The controller unit 402 causes the display unit 605 to execute the display of FIG. 11 in S903, and determines in S904 on the basis of information from the touch panel sensor whether the operator has pressed the "sort by copy count" button 1101. If the controller unit 402 determines that the operator has pressed the "sort by copy count" button 1101, it advances to step S905 to cause the display unit 605 to execute a display illustrated in FIG. 12. A copy count sorting setting window 1201 in FIG. 12 pops up in the window of FIG. 11. When the operator presses the "sort by copy count" button 1101, the controller unit 402 causes the display unit 605 to execute the copy count sorting setting window 1201 having three display building elements: "every copy" button 1202, "every designated copies" button 1203, and copy count input field 1204, as illustrated in FIG. 12. The controller unit 402 controls to allow the operator to select a desired sorting method from two sorting methods corresponding to the "every copy" button 1202 and "every designated copies" button.

For example, the operator sets "4" with the ten-key pad 604 as a total print count for a job to be processed. This job requires printing of copies. For the job which requires printing of a total print count "4 copies", the operator presses the "every copy" button 1202 in the copy count sorting setting window 1201. Then, the operator inputs a printing execution request for the job by pressing the start key 606. In this case, the controller unit 402 controls the system so that printed materials of the print job requiring printing of four copies in total by the printer unit 403 are stacked on the stacking unit of the system while these printed materials are sorted (classified) every printed bundle of one copy. In this fashion the "every copy" button 1202 is a display building element functioning to sort printed materials every copy upon printing.

For example, the operator sets "6" with the ten-key pad 604 as a total print count for a job to be processed. This job also requires printing of copies. For the job which requires printing of a total print count "6 copies", the operator presses the "every designated copies" button 1203 of the copy count sorting setting window 1201. In this case, the controller unit 402 enables the copy count input field 1204, and permits the operator to input a desirably designated copy count via the copy count input field 1204. For example, the operator inputs "3" as a designated copy count via the copy count input field 1204. Then, the operator inputs a printing execution request for the job by pressing the start key 606. In this case, the controller unit 402 inhibits stacking of printed materials of the print job requiring printing of six copies in total by the printer unit 403 on the stacking unit of the system while these printed materials are sorted (classified) every printed bundle of one copy. The controller unit 402 controls the printing system so that printed materials of the print job requiring printing of six copies in total by the printer unit 403 are stacked on the stacking unit of the system while these printed materials are sorted (classified) every printed bundle of three copies.

As described above, the "every designated copies" button 1203 and copy count input field 1204 are an example of display building elements functioning to classify printed materials of a job requiring printing of copies every printed materials at a designated copy count manually input by the operator without classifying the printed materials every printed materials of one copy. X represents the value of a designated copy count permitted to be manually input by the operator into the copy count input field 1204, and Y represents the value of a total print count manually input by the operator for a print job to be processed.

While the controller unit 402 causes the display unit 605 to display the sheet count display area 1010 of FIG. 10 for prompting the operator to confirm a total print count necessary for a job to be printed, it controls to allow the operator to manually input the total print count (Y) of the job. In response to press of the sorter key 1009 by the operator after the operator inputs the total print count (Y) via the display of FIG. 10, the controller unit 402 controls to allow the display unit 605 to display the copy count input field 1204 of FIG. 12. While the copy count input field 1204 in FIG. 12 is enabled on the display unit 605, the controller unit 402 controls to allow the operator to manually input the designated copy count (X) for the job whose total print count (Y) has already been set by the operator. When the operator manually inputs the total print count (Y) and designated copy count (X), he inputs numerical values with the ten-key pad 604. The controller unit 402 manages, as entry data, both the total print count (Y) and designated copy count (X) which are input as numerical values by the operator. The controller unit 402 associates these entry data as printing process condition parameters of a job to be processed, with print data of the job, and utilizes the entry data in a printing process by the printing apparatus 101. The controller unit 402 holds these entry data in the internal HDD of the memory 405 in association with the print data until the process of the job to be printed is completed by the printing apparatus 101. This configuration can cope with a case where printing suspends upon generation of a printing interrupt factor in the job.

The total print count (Y) of a job to be printed by the printing apparatus 101 and the designated copy count (X) for the job have a relation "$2 \leq X < Y$ (both of which are positive integers (natural numbers))". The controller unit 402 also manages this relation (relational expression) as a job process condition, and controls to inhibit execution of an operator setting or operation contradictory to this relation.

For example, the total print count (Y) accepted from the operator while the operation unit 404 executes the display in FIG. 10 is "2", and a larger value "4" is input by the operator as the designated copy count (X) via the copy count input field 1204 in FIG. 12. Then, the operator presses the start key 606 in order to input a printing execution request for the job. In this case, the controller unit 402 determines that these settings do not satisfy the condition of the above relational expression. Thus, the controller unit 402 invalidates the settings by the operator, and causes the display unit 605 to execute a warning display which notifies the operation of a message to this effect. In this case, the operator has already input the printing execution request with the start key 606. However, the controller unit 402 invalidates the printing execution request itself from the operator, and inhibits the printing apparatus 101 from starting a series of printing operations for the job including a document scanning operation and printing operation. In such a case, the controller unit 402 cancels a printing process for a job to be processed. In this way, the first embodiment achieves an effect capable of minimizing an operation error by the operator or malfunction of the apparatus caused by the operation error in a job of which the operator requests a sorting (classification) process every designated copies.

Note that the above configuration considers the possibility of operation errors by the operator, and is not indispensable. For example, the total print count (Y) accepted from the operator while the operation unit 404 executes the display in FIG. 10 is "5" and a larger value "10" is input by the operator as the designated copy count (X) via the copy count input field 1204 in FIG. 12. Then, the operator presses the start key 606 in order to input a printing execution request for the job. In this case, these settings do not satisfy the condition of the above relational expression, but the controller unit 402 permits the start of a printing operation for the job without canceling printing of the job. Although the operator designates "10 copies" as the designated copy count (X) for the job, the controller unit 402 causes the printing apparatus 101 to print a total of five copies in the printing operation of the job without printing 10 copies. As for the print count, priority is given to the value of the total print count (Y) over that of the designated copy count (X). As for a classifying (sorting) process, priority is given to the value of the designated copy count (X) over that of the total print count (Y). For example, the controller unit 402 controls the printing system so that all printed materials of five copies in a job requiring printing of five copies in total are sequentially stacked on the stacking unit (e.g., the delivery tray 722) without classifying all the printed materials. This configuration can attain an effect of giving priority to a condition intentionally set by the operator in the POD environment who is expected to be familiar with advanced operations, and giving priority to high productivity without stopping the operation of the printing system as much as possible.

Considering which of suppression of operation errors and high productivity has priority, which of the above-described two control operations associated with the relation between the designated copy count (X) and the total print count (Y) is executed is desirably determined in accordance with a printing environment where the printing system is introduced. Further, which of these control operations is executed may be selected and determined as an initial setting by the operator in advance.

As described above, the controller unit 402 executes various control operations to the printing system including the printing apparatus 101 after the process in S909 of FIG. 9 for a job requiring printing of plural copies in total and stacking of printed materials while classifying them every designated copies.

While the controller unit 402 causes the display unit 605 to execute the display in FIG. 12, it determines in step S906 on the basis of information from the touch panel sensor of the display unit 605 whether the "every copy" button 1202 in the copy count sorting setting window 1201 of FIG. 12 has been selected. If the controller unit 402 determines that the "every copy" button 1202 has been selected, it advances to step S907. In S907, the controller unit 402 sets to print and sort printed materials every copy for a job to be processed for which printing conditions are set by the operator via the operation unit 404. After the process in S907, the controller unit 402 accepts a printing start request for the job from the operator in response to press of the start key 606. Then, the controller unit 402 controls the printing system (printing apparatus 101) so that printed materials of the job to be processed at this setting are stacked on the stacking unit (e.g., the delivery tray 722) while the printed materials are classified every printed bundle of one copy.

If the controller unit 402 determines in step S906 that the "every copy" button 1202 has not been selected, it advances to step S908 to determine on the basis of information from the touch panel sensor of the display unit 605 whether the operator has selected the "every designated copies" button 1203 in the copy count sorting setting window 1201 of FIG. 12. In S908, the controller unit 402 also determines whether the operator has input an arbitrarily designated copy count of at least 2 or more via the copy count input field 1204 in the copy count sorting setting window 1201 of FIG. 12. In response to press of the "every designated copies" button 1203, the controller unit 402 enables display of the copy count input field 1204. When the operator inputs a numerical value with the ten-key pad 604 in this state, input of the designated copy count to the copy count input field 1204 is completed. After press of the "every designated copies" button 1203 by the operator and input of the designated copy count by the operator are confirmed, the controller unit 402 advances the process from S908 to S909. The controller unit 402 sets to print and sort printed materials at a designated copy count input in the copy count input field 1204 of FIG. 12 for a job to be processed for which printing conditions are set by the operator via the operation unit 404. After the process in S909, the controller unit 402 accepts a printing start request for the job from the operator in response to press of the start key 606. Then, the controller unit 402 controls the system so that printed materials of the job to be processed at this setting are stacked on the stacking unit (e.g., the delivery tray 722) while the printed materials are classified every printed bundle of designated copies corresponding to the numerical value (X) input by the operator via the copy count input field 1204. Various control operations associated with S909 have been described above.

To the contrary, if the controller unit 402 confirms in S904 that the operator has not pressed the "sort by copy count" button 1101 displayed on the display unit 605, or confirms in S908 that the operator has not pressed the "every designated copies" button 1203 displayed on the display unit 605, the controller unit 402 advances the process to step S910. In S910, the controller unit 402 determines on the basis of information from the touch panel sensor of the display unit 605 whether the operator has pressed the "sort by height" button 1102 displayed on the display unit 605. If the controller unit 402 confirms in S910 that the operator has pressed the "sort by height" button 1102 displayed on the display unit 605, it advances the process from S910 to S911. In S911, the controller unit 402 sets to print and sort printed materials every predetermined height (within the allowance of the stacking height) for a print job to be processed. After the process in S911, the controller unit 402 accepts a printing start request for the job from the operator in response to press of the start key 606. In this case, the controller unit 402 controls the printing system so that printed materials of the print job to be processed are stacked on the stacking unit (e.g., the delivery tray 722) while the printed materials are classified every height based on numerical value information input by the operator from the operation unit 404. The numerical value information corresponds to the stacking amount of printed materials on the stacking unit, in other words, represents the height of printed materials when the printed materials are stacked on the stacking unit. The controller unit 402 accepts numerical value information representing the height of printed materials from the operator on condition that the operator presses the "sort by height" button 1102 in FIG. 11 displayed on the display unit 605. For example, in response to press of the "sort by height" button 1102, the controller unit 402 enables a display input field (height information input field) on the right of the "sort by height" button 1102. In this state, the controller unit 402 accepts input of height information from the operator via the input field of the "sort by height" button 1102. The controller unit 402 controls the system so that printed materials of the job to be processed at this setting are stacked on the stacking unit (e.g., the delivery tray 722) while the printed materials are classified every height based on the height information (every stacking amount based on the information) input by the operator via the input field of the "sort by height" button 1102.

If the controller unit 402 confirms in S910 that the "sort by height" button 1102 displayed on the display unit 605 has not been pressed, it advances the process from S910 to S912. In S912, the controller unit 402 determines on the basis of information from the touch panel sensor of the display unit 605 whether the operator has pressed the "designate post-step" button 1103 displayed on the display unit 605. If the controller unit 402 determines in S912 that the operator has pressed the "designate post-step" button 1103, it advances the process from S912 to S913. In S913, the controller unit 402 causes the display unit 605 to display a post-step designation mode window illustrated in FIG. 13.

Figure 13:
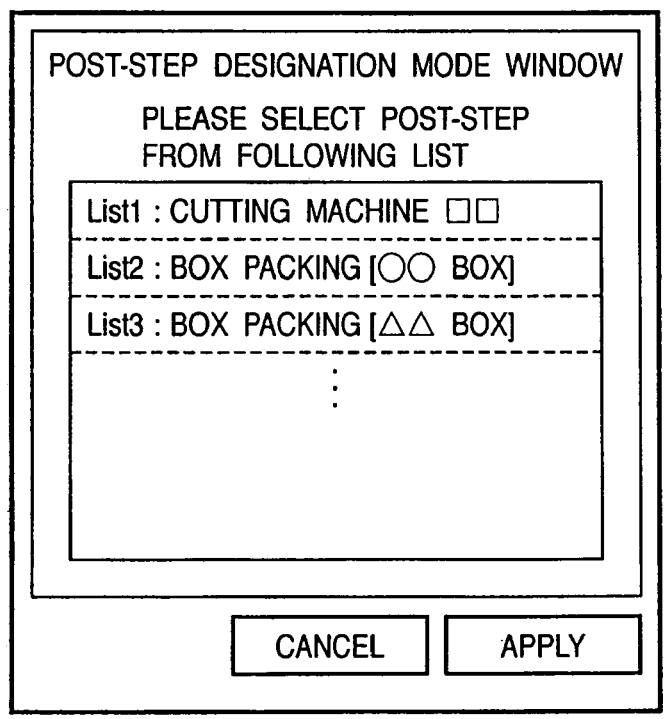
FIG. 13 is a view for explaining still another example of the user interface to be controlled in the embodiment.

In the post-step designation mode window which is illustrated in FIG. 13 and displayed on the display unit 605, the controller unit 402 displays a list of candidates selectable by the operator as a post-step of a print job to be processed at the setting of the "designate post-step" button 1103. This function deals with a case to be described below.

For example, according to the first embodiment, a cutting process by the cutting machine 103 in FIG. 1 can be executed for materials of a job printed by the printing apparatus 101 capable of executing a process based on the setting. The cutting process by the cutting machine 103 is not a post-process executable by the printing apparatus 101. In other words, the cutting process by the cutting machine 103 does not correspond to a post-process to be executed by the post-processing apparatus of the printing system including the printing apparatus 101. That is, the cutting process by the cutting machine 103 corresponds to a post-process which is not executed by the post-processing apparatus of the printing system. However, the controller unit 402 controls the printing apparatus 101 so as to allow the operator to explicitly input, via the list in the display of FIG. 13, a post-process to be executed by a print job requiring a post-process which is not executed by the post-processing apparatus of the printing system. After the operator designates a post-step in the list of FIG. 13 for the print job to be processed, he presses the start key 606. In response to this, the controller unit 402 controls the system (printing apparatus 101) so that printed materials of the job to be processed at this setting are stacked on the stacking unit while the printed materials are classified every stacking amount based on the post-step designated by the operator in the list of FIG. 13. This control can minimize operator work necessary to execute a post-process which is necessary after printing by the printing apparatus 101 and is not executed by the printing system. In this fashion, the first embodiment comprises control for dealing with a case where a cutting process by the cutting machine 103 is performed as a post-step of the digital multi-functional peripheral 101. Post-steps include, e.g., a box packing process in addition to the cutting process, and the controller unit 402 controls to display the process contents of the box packing process in the post-step designation mode window, too. This will also be described later.

Post-step information to be displayed in the list of the display of FIG. 13 on the display unit 605 by the controller unit 402 includes information which is to be displayed by automatically acquiring information on a post-processing apparatus by the printing apparatus 101. An example of this information is the first information List 1 in the display of FIG. 13 that corresponds to information on the cutting machine 103. The following control is executed in displaying the information on the cutting machine 103 in the list of the display of FIG. 13.

The controller unit 402 causes the printing apparatus 101 to transmit, to the cutting machine 103 via the network 104, a request command to acquire information on the cutting machine 103 (e.g., information on the device name, the type of executable finishing, and capability). When the cutting machine 103 receives this command, the controller unit 402 causes the cutting machine 103 to transmit the information on the cutting machine 103 as a reply result to the printing apparatus 101, and causes the printing apparatus 101 to receive the information. When the printing apparatus 101 externally acquires the information on the cutting machine 103, as described above, the controller unit 402 controls the display unit 605 so as to reflect and display information based on the received information in the list of FIG. 13.

In this manner, the controller unit 402 displays information on a near-line post-processing apparatus in the post-step information list of FIG. 13 by automatically acquiring the information by the printing apparatus 101 (without any manual input operation by the operator). The near-line post-processing apparatus (also called the near-line post-processing unit) described here is defined as a post-processing apparatus which satisfies at least the following two definitions, which will be explained later.

[Definition 1 of Near-Line Post-Processing Unit] The near-line post-processing unit is a post-processing apparatus configured not to be able to receive materials printed by the printing apparatus of the system without the mediacy of intervention work (e.g., takeout or conveyance of printed materials or preparations associated with a post-process) by the operator after a printing process. In other words, the near-line post-processing unit is a post-processing apparatus physically disconnected from the printing apparatus 101.

[Definition 2 of Near-Line Post-Processing Unit] The near-line post-processing unit is a post-processing apparatus configured to be able to connect to a data communication medium such as the network 104 and communicate data with a device such as the controller unit 402 of the printing apparatus 101. In other words, the near-line post-processing unit is a post-processing apparatus electrically connected to the printing apparatus 101.

A post-processing apparatus which meets both [Definition 1] and [Definition 2] of the near-line post-processing unit is defined as a near-line post-processing apparatus (near-line post-processing unit). In the cutting machine 103 serving as an example of the near-line post-processing apparatus, printed materials to be cut are set through intervention work such as takeout of printed materials by the operator after a printing process by the printing apparatus 101. After that, the cutting machine 103 can cut the printed bundle. Further, the cutting machine 103 can transmit its information to the printing apparatus 101 via the network 104 connected to the cutting machine 103. The cutting machine 103 in FIG. 1 corresponds to a post-processing apparatus which is physically disconnected from the printing apparatus 101 but electrically connected. Hence, the cutting machine 103 is defined as a near-line post-processing apparatus.

How this system operates with a configuration which allows the operator to input a choice corresponding to a near-line post-processing apparatus selectable from the list in the display of FIG. 13 will be exemplified.

For example, a job to be processed requires a cutting process by the cutting machine 103 connected to the network 104 in FIG. 1 as a post-process after a printing process by the printing apparatus 101. In this case, the controller unit 402 allows the operator to input List 1 in the display of FIG. 13 that corresponds to the cutting process by the cutting machine 103 before the controller unit 402 causes the printing apparatus 101 to print the job to be processed, i.e., the operator presses the start key 606 to send a printing start request. In response to an input from the start key 606 upon selecting the item List 1 in FIG. 13 by the operator, the controller unit 402 causes the printing apparatus 101 to print the print job having this setting. At this time, the controller unit 402 controls the system so that printed materials of the job are stacked on the stacking unit (e.g., the delivery tray 722) while these printed materials are sorted (classified) in a unit complying with the post-process corresponding to List 1 in the display of FIG. 13 designated by the operator in the printing process for the print job having this setting. For example, as the processing capability of the cutting machine 103, the number of printed materials cuttable at once by the cutting machine 103 is a maximum of 100 A4-size print media each 0.1 mm thick. In this case, the controller unit 402 controls the system so that printed materials of a job to be processed at this setting are stacked on the stacking unit while these printed materials are classified in a unit complying with the processing capability (information that a maximum of 100 A4-size sheets each 0.1 mm thick can be stored) of the cutting machine 103.

In order to execute control corresponding to the processing capability of the above-described near-line post-processing apparatus by the controller unit 402, a post-processing apparatus such as the cutting machine 103 is configured to be connectable to the network 104 and functions as a near-line post-processing apparatus. In the first embodiment, the printing environment is equipped with a near-line post-processing apparatus which is physically disconnected from the printing apparatus 101 but electrically connected to it so as to execute data communication with a network device such as the printing apparatus 101.

Another example of the post-processing apparatus which can be contained as a near-line post-processing apparatus except the cutting machine 103 is a glue bookbinding machine capable of executing a glue bookbinding process such as a case binding process for materials of a job printed by the printing apparatus 101. Still another example of the post-processing apparatus is a punching machine capable of punching materials of a job printed by the printing apparatus 101. Still another example of the post-processing apparatus is a packing machine capable of packaging materials of a job printed by the printing apparatus 101.

Post-step information to be displayed in the list of the display of FIG. 13 on the display unit 605 by the controller unit 402 includes information which is displayed by manually inputting it in advance by the operator via a user interface such as the operation unit 404. Examples of this information are the second information List 2 and the third information List 3 in the display of FIG. 13. These pieces of information correspond to items to be selected by the operator in the display of FIG. 13 when box packing work by the operator is required for materials of a job printed by the printing apparatus 101.

For example, a job to be processed requires, as a post-process after a printing process by the printing apparatus 101, box packing work of printed materials by the operator using a packing member (packaging means or packing means) serving as a post-processing unit named "○○ box". In this case, the controller unit 402 allows the operator to input List 2 in the display of FIG. 13 that corresponds to the packing member before the controller unit 402 causes the printing apparatus 101 to print the job to be processed, i.e., the operator presses the start key 606 to send a printing start request. In response to an input from the start key 606 upon selecting the item List 2 in FIG. 13 by the operator, the controller unit 402 causes the printing apparatus 101 to print the print job having this setting. At this time, the controller unit 402 controls the system so that printed materials of the job are stacked on the stacking unit (e.g., the delivery tray 722) while these printed materials are sorted (classified) in a unit complying with the post-process corresponding to List 2 in the display of FIG. 13 designated by the operator in the printing process for the print job having this setting. For example, as the processing capability of the packing member named "○○ box", materials printed by the printing apparatus 101 can be stored by a maximum of 500 A4-size print media each 0.1 mm thick. In this case, the controller unit 402 controls the system so that printed materials of a job to be processed at this setting are stacked on the stacking unit while these printed materials are classified in a unit complying with the processing capability (information that a maximum of 500 A4-size sheets each 0.1 mm thick can be stored).

In contrast, for example, a job to be processed requires, as a post-process after a printing process by the printing apparatus 101, box packing work of printed materials by the operator using a packing member (packaging means or packing means) serving as a post-processing unit named "ΔΔ box". In this case, the controller unit 402 allows the operator to input List 3 in the display of FIG. 13 that corresponds to the packing member before the controller unit 402 causes the printing apparatus 101 to print the job to be processed, i.e., the operator presses the start key 606 to send a printing start request. In response to an input from the start key 606 upon selecting the item List 3 in FIG. 13 by the operator, the controller unit 402 causes the printing apparatus 101 to print the print job having this setting. At this time, the controller unit 402 controls the system so that printed materials of the job are stacked on the stacking unit (e.g., the delivery tray 722) while these printed materials are sorted (classified) in a unit complying with the post-process corresponding to List 3 in the display of FIG. 13 designated by the operator in the printing process for the print job having this setting. For example, as the processing capability of the packing member named "ΔΔ box", materials printed by the printing apparatus 101 can be stored by a maximum of 100 A4-size print media each 0.1 mm thick. In this case, the controller unit 402 controls the system so that printed materials of a job to be processed at this setting are stacked on the stacking unit while these printed materials are classified in a unit complying with the processing capability (information that a maximum of 100 A4-size sheets each 0.1 mm thick can be stored).

Post-processes specified by List 2 and List 3 in the display of FIG. 13 correspond to those by an off-line post-processing apparatus (off-line post-processing unit) which requires intervention work by the operator after a printing process by the printing apparatus of the system. The off-line post-processing apparatus (also called an off-line post-processing unit) described here is defined as a post-processing apparatus which satisfies at least the following two definitions, which will be explained later.

[Definition 1 of Off-Line Post-Processing Unit] The off-line post-processing unit is a post-processing apparatus configured not to be able to receive materials printed by the printing apparatus of the system without the mediacy of intervention work (e.g., takeout or conveyance of printed materials or preparations associated with a post-process) by the operator after a printing process. In other words, the off-line post-processing unit is a post-processing apparatus physically disconnected from the printing apparatus 101.

[Definition 2 of Off-Line Post-Processing Unit] The off-line post-processing unit is a post-processing apparatus configured to be unable to connect to a data communication medium such as the network 104 or communicate data with a device such as the controller unit 402 of the printing apparatus 101. In other words, the off-line post-processing unit is a post-processing apparatus even electrically disconnected from the printing apparatus 101.

A post-processing apparatus which meets both [Definition 1] and [Definition 2] of the off-line post-processing unit is defined as an off-line post-processing apparatus (off-line post-processing unit). For example, "○○ box" in List 2 of FIG. 13 and "ΔΔ box" in List 3 serving as examples of the off-line post-processing unit are merely packing members (e.g., cardboard box) capable of storing printed materials. In other words, these boxes are post-processing units capable of executing a box packing process for printed materials by the operator through intervention work such as takeout of printed materials by the operator after a printing process by the printing apparatus 101. These post-processing units do not comprise any network communication function, or cannot transmit data to the printing apparatus 101. Storage boxes serving as packing means (packaging means) corresponding to "○○ box" in List 2 of FIG. 13 and "ΔΔ box" in List 3 correspond to post-processing apparatuses which are physically and electrically disconnected from the printing apparatus 101. Thus, these post-processing apparatuses are defined as off-line post-processing apparatuses (off-line post-processing units). In order to reflect information on the off-line post-processing apparatus in the list of FIG. 13, for example, the information on the off-line post-processing apparatus to be displayed in the list is registered in advance by the operator in the internal hard disk of the memory 405 of the printing apparatus 101. The controller unit 402 controls to acquire the information on the off-line post-processing apparatus through manual input by the operator, display the acquired information on the off-line post-processing apparatus in the list of the display of FIG. 13, and present the information as a selection candidate by the operator.

As described in the control example using FIG. 13, the controller unit 402 allows the operator to explicitly input, before the start of printing, what kind of post-process (post-step) is to be performed after a printing process by the printing apparatus 101 in a job requiring a post-process which is not executed by the system including the apparatus 101. Further, the controller unit 402 makes a setting based on an operator input via the display of FIG. 13 in S913. The controller unit 402 controls the system so that printed materials of the job to be processed at this setting are stacked on the stacking unit (e.g., the delivery tray 722) while these printed materials are sorted (classified) in a unit based on the post-process corresponding to the item whose step has explicitly been designated by the operator in S913.

In this way, the controller unit 402 executes the setting of printing and sorting for a job to be processed on the basis of the list selected in the post-step designation mode window in step S913.

Note that the sheet processing apparatus 720 is an example of the post-processing apparatus of the printing apparatus 101 itself, but is a post-processing apparatus demountable from the printing apparatus 101 as an optional apparatus of the printing apparatus 101. In the first embodiment, the printing apparatus itself may comprise the sheet processing apparatus 720, or the sheet processing apparatus 720 may be connectable as an option of the printing apparatus to the printing apparatus 101. The present invention can adopt either configuration. In the first embodiment, the sheet processing apparatus 720 corresponds to an in-line post-processing apparatus (in-line post-processing unit). The in-line post-processing apparatus (also called an in-line post-processing unit) described here is defined as a post-processing apparatus which satisfies at least the following two definitions, which will be explained later.

[Definition 1 of In-Line Post-Processing Unit] The in-line post-processing unit is a post-processing apparatus configured to be able to receive materials printed by the printing apparatus of the system without the mediacy of intervention work (e.g., takeout or conveyance of a printed material or preparations associated with a post-process) by the operator after a printing process. In other words, the in-line post-processing unit is a post-processing apparatus physically connected to the printing apparatus 101.

[Definition 2 of In-Line Post-Processing Unit] The in-line post-processing unit is a post-processing apparatus configured to be able to connect to a data communication medium such as a signal line in the printing apparatus 101 and communicate data with a device such as the controller unit 402 of the printing apparatus 101. In other words, the in-line post-processing unit is a post-processing apparatus electrically connected to the printing apparatus 101.

A post-processing apparatus which meets both [Definition 1] and [Definition 2] of the in-line post-processing unit is defined as an in-line post-processing apparatus (in-line post-processing unit). The sheet processing apparatus 720 serving as an example of the in-line post-processing unit can directly introduce materials of a job printed by the printer unit 403 into the printing apparatus 101 via the sheet convey path in the printing apparatus 101 without intervention work by the operator after a printing process by the printing apparatus 101. Moreover, information (information on the presence/absence of paper, and error information such as paper jam or staple jam) on the sheet processing apparatus 720 can be transmitted to the controller unit 402 via a signal line in the apparatus. The sheet processing apparatus 720 in FIG. 7 corresponds to a post-processing apparatus which is physically and electrically connected to the printing apparatus 101. Hence, the sheet processing apparatus 720 is defined as an in-line post-processing apparatus. When the configuration of the printing system having the printing apparatus 101 is viewed from the whole system, the printing system in the first embodiment means a configuration having the printing apparatus 101 (main body) and the in-line post-processing apparatus. Further, the controller unit 402 comprehensively controls the printing system having the printing apparatus 101 (main body) and the in-line post-processing apparatus.

It should be noted that the controller unit 402 in the first embodiment allows the printing system to execute even control which considers a post-process by a non-in-line post-processing apparatus (non-in-line post-processing unit) not corresponding to the post-processing apparatus (post-processing unit) of the printing system. The non-in-line post-processing unit means a post-processing apparatus (post-processing unit) which satisfies the definitions of at least either the near-line post-processing apparatus (near-line post-processing unit) or the off-line post-processing apparatus (off-line post-processing unit), as described above. In other words, the non-in-line post-processing apparatus (non-in-line post-processing unit) satisfies the following definitions.

[Definition of Non-In-Line Post-Processing Unit] The non-in-line post-processing unit is a post-processing apparatus (post-processing unit) not corresponding to a post-processing apparatus (post-processing unit) which is physically and electrically connected to the printing apparatus of the printing system. For example, the above-described cutting machine 103 corresponds to the non-in-line post-processing unit. In other words, the non-in-line post-processing unit is a post-processing apparatus (post-processing unit) at least not having a configuration capable of receiving materials of a job printed by the printing apparatus 101 without intervention work by the operator after a printing process of the job. For example, sheet storage box A in FIG. 28 also corresponds to the non-in-line post-processing unit. In other words, the non-in-line post-processing unit is a post-processing apparatus (post-processing unit) not having a configuration capable of communicating data with a device such as the controller unit 402.

A post-processing apparatus (post-processing unit) which meets [Definition of Non-In-Line Post-Processing Unit] is defined as a non-in-line post-processing apparatus (non-in-line post-processing unit) in the first embodiment. In the first embodiment, the system can execute the above-described control as control which considers the non-in-line post-processing apparatus (synonymous with the non-in-line post-processing unit).

For example, the controller unit 402 controls the operation unit 404 so as to allow the operator to explicitly input information on a post-process associated with the non-in-line post-processing unit on the basis of (in consideration of) the post-process (post-step) by the non-in-line post-processing unit that is required by a job to be printed by the system.

For example, as described above, the controller unit 402 controls to display the copy count input field 1204 on the display unit 605 so as to enable the copy count input field 1204 in FIG. 12 in response to a key operation by the operator to the sorter key 1009, "sort by copy count" button 1101, or "every designated copies" button 1203. The controller unit 402 controls to allow the operator to explicitly manually input, via the copy count input field 1204 displayed on the display unit 605 under the display control, the designated copy count value (X) for a job requiring printing of copies. Further, the controller unit 402 controls the printing system so that printed materials of the print job to be processed for which the designated copy count information (X) is input by the operator are sequentially stacked on the stacking unit of the printing system while these printed materials are sorted (classified) every printed bundle based on the designated copy count information (X). This control is executed after the above-described process in S909 of FIG. 9, and corresponds to a control example illustrated in FIG. 36.

As another example, as described above, the controller unit 402 causes the display unit 605 to display the "sort by height" button 1102 in FIG. 11. The controller unit 402 controls to allow the operator to explicitly manually input, via the copy count input field 1204 displayed on the display unit 605 under the display control, height information on the stacking amount (height) of printed materials for a job to be printed. In addition, the controller unit 402 controls the printing system so that printed materials of the print job to be processed for which the height information is input by the operator are sequentially stacked on the stacking unit of the printing system while these printed materials are sorted (classified) every stacking amount based on the height information. This control is executed after the above-described process in S911 of FIG. 9, and corresponds to a control example illustrated in FIG. 30.

As still another example, as described above, the controller unit 402 causes the display unit 605 to display the list in FIG. 13. The controller unit 402 controls to allow the operator to explicitly manually input, via the list in FIG. 13 displayed on the display unit 605 under the display control, information for specifying the processing capability of a non-in-line post-processing unit used for a post-process executed after a printing process in a job to be printed. Also, the controller unit 402 controls the system so that printed materials of the job to be processed for which capability information of the non-in-line post-processing unit is input by the operator are sequentially stacked on the stacking unit of the printing system while these printed materials are sorted (classified) every stacking amount based on the capability information. This control is executed after the above-described process in S913 of FIG. 9, and corresponds to a control example illustrated in FIG. 29 or 31.

Control illustrated in FIG. 26 corresponds to a control example executed by the controller unit 402 when the operator presses the start key 606 after the above-described process in S907. Control illustrated in FIG. 27 corresponds to a control example executed by the controller unit 402 when the operator presses the start key 606 after the above-described process in S914.

<Flow of Height-Designated Sorting Process>

Figure 14:
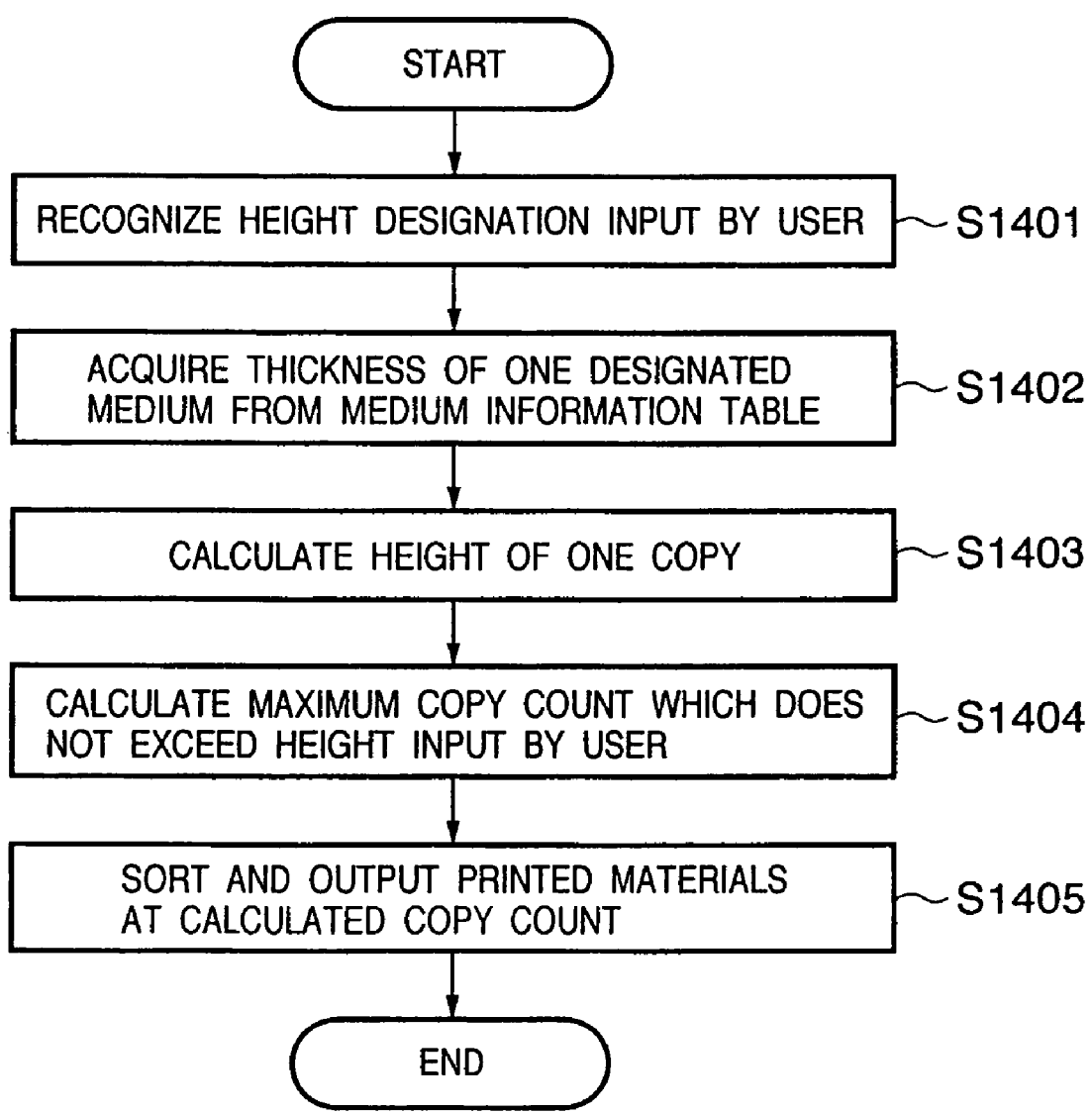
FIG. 14 is a flowchart for explaining control in the embodiment.

Details of the height-designated sorting process in step S911 will be explained. FIG. 14 is a flowchart showing details of the height-designated sorting process. In the first embodiment, similar to the control illustrated in FIG. 9, the controller unit 402 of the printing apparatus 101 controls the printing apparatus 101 so that it can execute processes and operations in steps illustrated in the flowchart of FIG. 14. Program codes for causing the printing apparatus 101 to execute processes in the flowchart of FIG. 14 are also stored as program data in advance in, e.g., the memory 405 of the printing apparatus 101 in association with the process program of the flowchart illustrated in FIG. 9. By reading out and executing the data, the controller unit 402 causes the printing apparatus 101 to execute various process operations illustrated in FIG. 14.

In S1401 of FIG. 14, the controller unit 402 recognizes, on the basis of information from the operation unit 404, a height information value (allowance of the stacking height) corresponding to a printed material stacking amount which has been set by an operator input via the "sort by height" button 1102 of the display of FIG. 11 in the above-described S911 for a job to be printed. In S1402, the controller unit 402 acquires the thickness of one print medium (print paper) necessary to print the job, on the basis of medium information in the medium information table which is illustrated in FIG. 2 and registered in advance in the internal HDD of the memory 405. The size and type of paper necessary to print the job are recognized by the controller unit 402 on the basis of paper information designated as a printing condition by the operator. For example, the controller unit 402 recognizes, as information set by the operator, paper information set via a paper setting window (not shown) displayed on the display unit 605 by the controller unit 402 in response to press of the paper selection key 1015 in the operation window of FIG. 10 by the operator. The controller unit 402 searches the management table in FIG. 2 for paper thickness information corresponding to the paper designated by the operator. The controller unit 402 determines that the thickness information specified as the search result from the table is information on the thickness of one paper sheet necessary for the print job.

In S1403, the controller unit 402 calculates the height of printed materials per printed bundle of one copy necessary for the print job to be processed. For example, the type of job to be processed is a copy job. In response to press of the start key 606 by the operator, the controller unit 402 starts a document scanning operation for a document bundle of the job that is set in the ADF (Auto Document Feeder) of the scanner unit 401. The controller unit 402 stores image data of the document scanned by the scanner unit 401 in the internal HD (Hard Disk) of the memory 405 sequentially in page order. While the document data are accumulated in the HD, the controller unit 402 executes a document sheet counting operation to count one by one the number of document sheets to be scanned in the Job. After all the document sheets to be scanned in the job are fed from the ADF and all the document data of the job are stored in the HD, the controller unit 402 specifies the total number of document pages of the job on the basis of the document sheet count result of the counting operation. Also, the controller unit 402 multiplies the total number of document pages by the thickness of one paper sheet necessary to print the job that has already been acquired in S1402. Based on data corresponding to the product, the controller unit 402 acquires a printed material height value necessary to print one copy of the job. The controller unit 402 executes the above-described process as a process in S1403. In S1404, the controller unit 402 compares the height information which has been input by the operator via the "sort by height" button 1102 and acquired in the process of S1401, with the height information of a printed bundle of one copy that has been acquired in S1403 and is necessary for the job. On the basis of these pieces of information, the controller unit 402 calculates, for the job, a maximum copy count which does not exceed the height input by the operator.

The controller unit 402 causes the printing apparatus 101 to print the job on condition that the operator presses the start key 606 after the above-described process in S911. As the printing operation, a process in S1405 is executed. That is, the controller unit 402 controls the printing system so as to inhibit sorting of printed materials every printed bundle of one copy and sort a printed bundle of the job at the copy count calculated in S1404, as the printing operation of the job requiring sorting of printed materials by height designation.

A concrete example of the process described with reference to FIG. 14 will be explained. For example, "plain paper" is set as the paper type (medium type) by the operator via a paper selection window (not shown) displayed on the display unit 605 by the controller unit 402 in response to press of the paper selection key 1015 by the operator for a job to be printed. The controller unit 402 acquires "0.05 mm/sheet" from the medium information table in FIG. 2 as information on the thickness of one "plain paper" sheet. This process is done in S1402. Assume that this job requires printing of 50 copies in total as a printing process for an original (document bundle) of a 100-page document. As described above, the controller unit 402 acquires the total page count information of the document on the basis of the counting result of the document sheet count by the controller unit 402 during the document scanning operation of the job. As described above, the controller unit 402 also acquires total print count information by confirming the total print count (Y) input by the operator with the ten-key pad while the display unit 605 displays the sheet count display area 1010 in FIG. 10. Based on these pieces of determination information, the controller unit 402 acquires information "0.05 mm×100 pages=5 mm" as a printed bundle thickness necessary to print one copy of the job. This process is done in S1403. Assume that "60 mm" is designated as the height by the operator via the "sort by height" button 1102 for the job of which the operator requests sorting of printed materials by height designation. The controller unit 402 acquires this height information in the process of S1401. Then, the controller unit 402 executes the process of S1404 on the basis of various types of determination information. For example, in S1404, the controller unit 402 calculates "60 mm/5 mm=12" for the job. This means that printed materials of the job can be stacked up to 12 copies (=sorting amount) as one sorted bundle without sorting (that one classification can contain a printed bundle of 12 copies at maximum). The controller unit 402 controls to execute a sorting process based on the calculation result acquired in S1404 in a printing process of the job. This process corresponds to that in S1405.

The printing results of the job by the system in the process of FIG. 14 are as follows.

[Results] A printed bundle of one copy (one set) of 100 paper sheets is created on which a series of document image data from the first page to the last page (100th page) of the job are printed page by page in page order. A printed bundle containing a total of 12 sets is created as a printed bundle of one classification without sorting printed bundles every set. A total of four printed bundles each formed from one classification including printed bundles of 12 sets without sorting them are stacked on the stacking unit (e.g., the delivery tray 722) while these printed bundles are classified every classification. Further, printed bundles of two sets are stacked over the printed bundle of the fourth classification on the stacking unit (e.g., the delivery tray 722) without sorting the printed bundles of two sets. Printing results in this stacking state can be obtained by the printing system.

Figure 30:
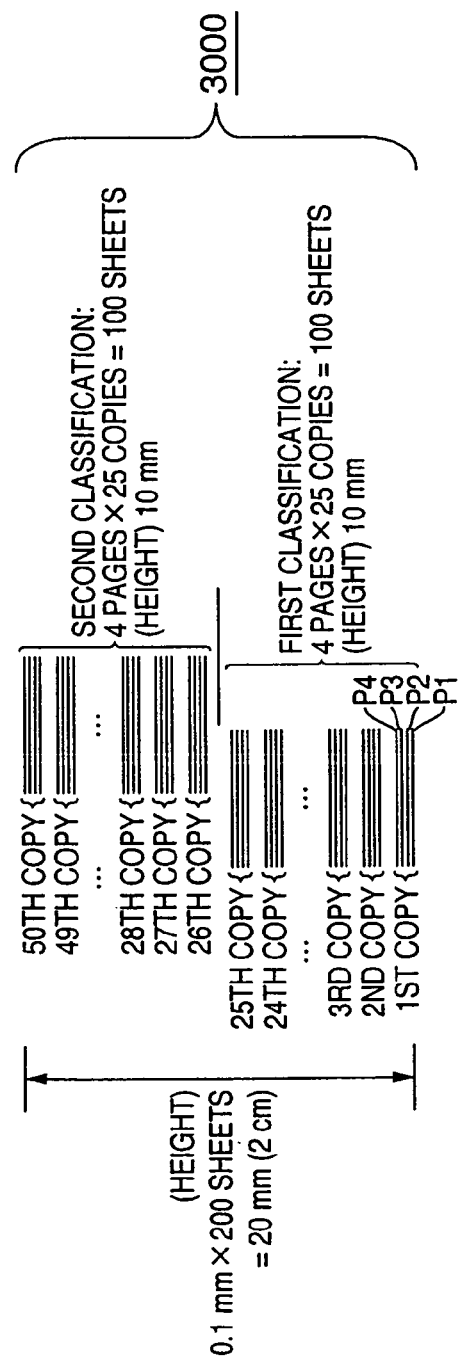
FIG. 30 is a view for explaining a control example in the embodiment.

Note that the control example based on the process in the flowchart of FIG. 14 corresponds to that in FIG. 30.

<Flow of Post-Step Designation Process>

Figure 15:
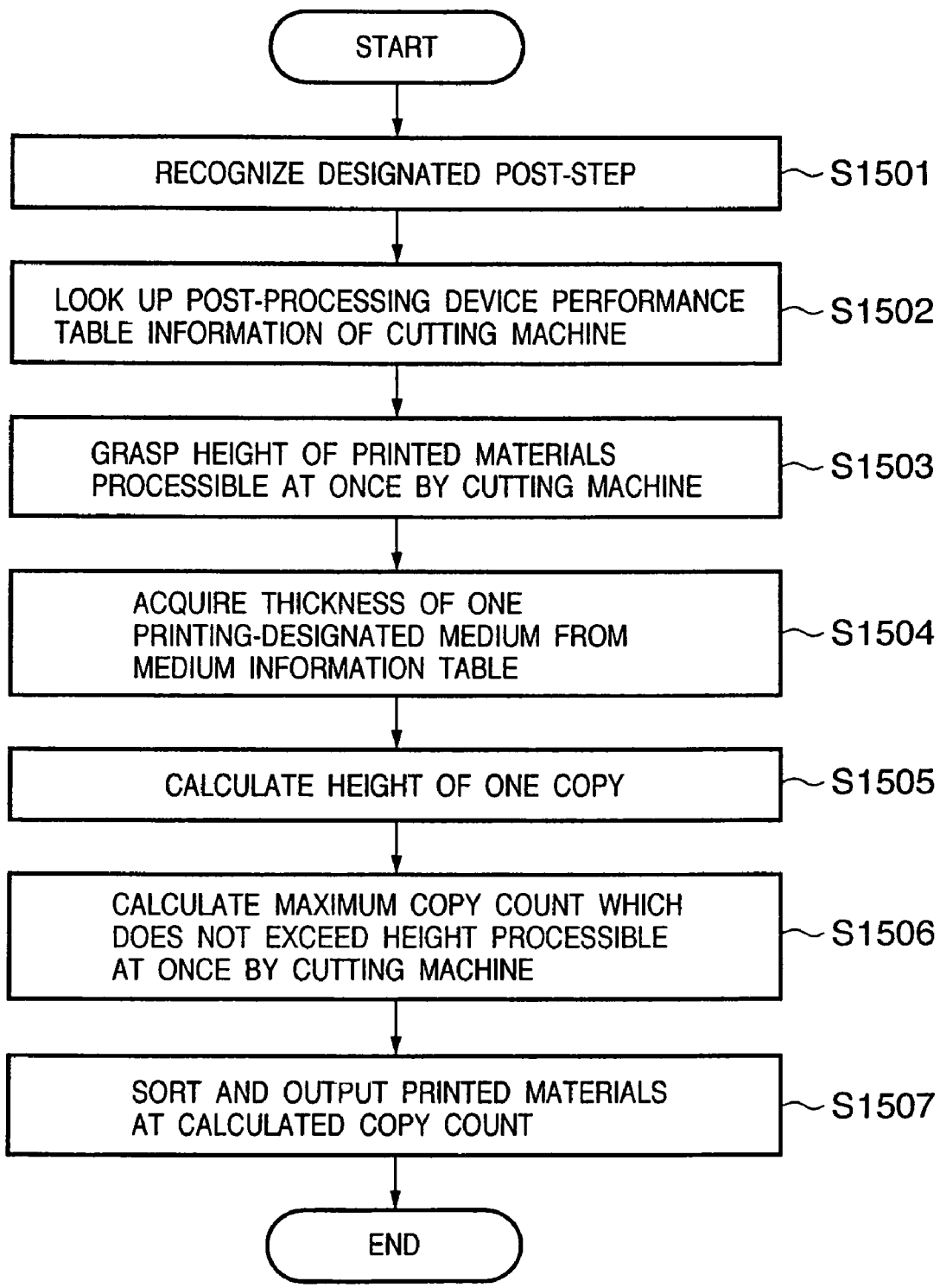
FIG. 15 is a flowchart for explaining control in the embodiment.

Details of the post-step designation process in step S913 will be explained. FIG. 15 is a flowchart showing details of the post-step designation process. In the first embodiment, similar to the control operations illustrated in FIGS. 9 and 14, the controller unit 402 of the printing apparatus 101 controls the printing apparatus 101 so that it can execute processes and operations in steps illustrated in the flowchart of FIG. 15. Program codes for causing the printing apparatus 101 to execute processes in the flowchart of FIG. 15 are also stored as program data in advance in, e.g., the memory 405 of the printing apparatus 101 in association with the process programs of the flowcharts illustrated in FIGS. 9 and 14. By reading out and executing the data, the controller unit 402 causes the printing apparatus 101 to execute various process operations illustrated in FIG. 15.

As a process in S1501 of FIG. 15, the controller unit 402 recognizes a post-step designated by the operator for a job to be printed in S912. For example, the controller unit 402 determines, on the basis of information from the touch panel sensor, which of post-steps is designated by the operator via the list in FIG. 13 displayed on the display unit 605.

For example, the operator selects "List 1" (cutting machine) in FIG. 13 as a post-step in step S912. The cutting machine in List 1 corresponds to the cutting machine 103 in FIG. 1. In S1502, the controller unit 402 looks up the post-processing device performance table in FIG. 3 that is registered in advance in the internal HD of the memory 405. In S1503, the controller unit 402 grasps the thickness (allowance of the stacking height) of printed materials processible at once by the cutting machine 103 on the basis of information of the post-processing device performance table.

In S1504, the controller unit 402 acquires the thickness of one designated medium from the medium information table shown in FIG. 2. The designated medium means paper designated by the operator as paper necessary for a printing process of the job to be processed. That is, the designated medium means paper which is designated as paper used for printing by the operator via the paper selection key 1015 or the like, as described in S1402 of FIG. 14. In other words, the process in S1504 is the same as that in S1402. In S1505, the controller unit 402 calculates the height of one copy of printed materials of the job (height of printed materials necessary to print one copy of the job) on the basis of the thickness of one medium from the medium information table (FIG. 2). The process in S1505 is also the same as that in S1403, and details thereof will be omitted.

In S1506, the controller unit 402 performs calculation based on the thickness of printed materials processible at once by the cutting machine 103, which corresponds to the information acquired in S1503, and the height of one copy of printed materials, which corresponds to the information acquired in S1505. For example, when the cutting machine 103 is to cut printed materials of the job, the controller unit 402 calculates a maximum copy count which does not exceed an amount (height of printed materials) processible at once by the cutting machine 103. This means that the controller unit 402 executes in S1506 calculation which considers a post-step (post-process) to be executed by a near-line post-processing apparatus in the job after a printing process by the printing apparatus 101.

The controller unit 402 causes the printing apparatus 101 to print the job on condition that the operator presses the start key 606 after the above-described process in S913. As the printing operation, a process in S1507 is executed. More specifically, the controller unit 402 controls the printing system so as to inhibit sorting of printed materials every printed bundle of one copy and sort a printed bundle of the job at the copy count calculated in S1506, as the printing operation of the job requiring sorting of printed materials by post-step designation.

A concrete example of the above process will be explained. For example, plain paper is designated as the medium, and the thickness of printed materials processible at once by the cutting machine 103 is 100 mm when the post-processing device performance table is looked up. A printing condition to copy 50 copies of a 100-page original is set. Since the thickness of plain paper is 0.05 mm/sheet from the medium information table in FIG. 2, the thickness of one copy of printed materials is 0.05×100 pages=5 mm. As a result, 100 mm/5 mm=20, and a maximum of 20 copies (=sorting amount) can be stacked.

The printing results of the job by the system in the process of FIG. 15 are as follows.

[Results] A printed bundle of one copy (one set) of 100 paper sheets is created on which a series of document image data from the first page to the last page (100th page) of the job are printed page by page in page order. A printed bundle containing a total of 20 sets is created as a printed bundle of one classification without sorting printed bundles every set. A total of two printed bundles each formed from one classification including printed bundles of 20 sets without sorting them are stacked on the stacking unit (e.g., the delivery tray 722) while these printed bundles are classified every classification. Further, printed bundles of 10 sets are stacked over the printed bundle of the second classification on the stacking unit (e.g., the delivery tray 722) without sorting the printed bundles of 10 sets. Printing results in this stacking state can be obtained by the printing system.

Note that the control example based on the process in the flowchart of FIG. 15 corresponds to that in FIG. 31.

As is apparent from the above description, the first embodiment executes control which considers a post-step (post-process) such as cutting work or delivery work using a non-in-line post-processing apparatus (non-in-line post-processing unit). For example, in the first embodiment, the controller unit 402 of the printing apparatus 101 executes control which considers a post-process using a non-in-line post-processing apparatus (non-in-line post-processing unit) necessary after printing by the printing apparatus 101 in a job to be printed by the printing apparatus 101. Consequently, the first embodiment can attain an effect capable of minimizing, by control disclosed in the printing system, work of the operator that is needed in a post-step using a non-in-line post-processing apparatus (non-in-line post-processing unit). The first embodiment can realize efficient work by reducing the work load of the operator at the actual work site in a printing environment such as the POD environment where use cases and user needs are different from those in the office environment.

The first embodiment can minimize, by control disclosed in the printing system, work of the operator that is required in a post-step using a non-in-line post-processing apparatus (non-in-line post-processing unit). Thus, an increase in the total working efficiency of jobs and reduction of working cost can be expected in a printing environment such as the POD environment where it is important to efficiently process many jobs.

The first embodiment can prevent problems such as a problem of causing a non-in-line post-processing apparatus (non-in-line post-processing unit) to process printed materials more than a printed material amount (e.g., the number of print sheets or the thickness of printed materials of one bundle) which is limited in advance on the basis of the performance of the non-in-line post-processing apparatus (non-in-line post-processing unit). Also, the first embodiment can suppress human errors such as damage of the non-in-line post-processing apparatus (non-in-line post-processing unit) by the above problems. Since such problems can be suppressed, risk coming with work can also be reduced. Further, for example, even a POD operator other than an experienced operator who is familiar with a non-in-line post-processing apparatus (non-in-line post-processing unit) can easily execute a post-step using the non-in-line post-processing apparatus (non-in-line post-processing unit) for materials printed by the printing apparatus 101.

As described above, the printing system in the first embodiment comprises the following constituent elements.

For example, the printing system can stack materials printed by the printing apparatus 101 on the stacking unit (e.g., the delivery tray 722).

The system allows the operator to explicitly input, for each job, instruction information which considers a post-process using a non-in-line post-processing apparatus (non-in-line post-processing unit) necessary after a printing process in a job requiring the printing process by the printing apparatus 101. For this purpose, the system comprises the controller unit 402 which executes control of causing the operation unit 404 to display operation windows that are illustrated in FIGS. 11 to 13 and allow the operator to explicitly input, for each job, instruction information.

On the premise of this configuration, for example, the operator explicitly inputs instruction information for one job to be processed via the display in one of FIGS. 11 to 13 that is executed on the operation unit 404 by the controller unit 402. In this case, the controller unit 402 inhibits stacking of printed materials of the job on the stacking unit (e.g., the delivery tray 722) while these printed materials are classified every printed materials of one copy. The controller unit 402 stacks printed materials of the job on the stacking unit (e.g., the delivery tray 722) while these printed materials are classified every printed materials on the basis of the instruction information explicitly input by the operator for the job.

On the premise of this configuration, for example, the operator does not explicitly input the instruction information for one job to be processed via the display in one of FIGS. 11 to 13 that is executed on the operation unit 404 by the controller unit 402. In this case, the controller unit 402 inhibits stacking of printed materials of the job on the stacking unit (e.g., the delivery tray 722) while these printed materials are classified every printed materials on the basis of instruction information. For example, the controller unit 402 controls the printing system so as to stack printed materials of the job on the stacking unit (e.g., the delivery tray 722) while classifying these printed materials every printed materials of one copy.

As described above, the printing system allows the operator to explicitly input, for each job, instruction information via the UI unit of the printing apparatus 101 itself. The controller unit 402 controls the printing system so as to execute the above-described classification operation selectively for each job to be processed on the basis of the presence/absence of instruction information or the like.

As described above, the instruction information is explicitly input for each job by the operator via the UI unit. More specifically, as described above, the instruction information is "instruction information which considers a post-process (post-step) using a non-in-line post-processing apparatus (non-in-line post-processing unit) necessary after a printing process by the printing apparatus 101 in a job to be processed". In the first embodiment, as described above, the instruction information corresponds to at least the following pieces of instruction information. Note that various types of instruction information to be described below are contained in the above instruction information. These pieces of instruction information are different in instruction style, and thus are treated as a plurality of types of instruction information in different instruction styles.

[First Type Instruction Information] This instruction information is [entry information corresponding to the designated copy count (X)] which is explicitly input manually by the operator for each job via the copy count input field 1204 displayed on the operation unit 404 by the controller unit 402.

[Second Type Instruction Information] This instruction information is [height information corresponding to a value obtained by expressing the amount of printed materials by height] which is explicitly input manually by the operator for each job via the "sort by height" button 1102 displayed on the operation unit 404 by the controller unit 402.

[Third Type Instruction Information] This instruction information is [post-step information on the processing capability of a non-in-line post-processing apparatus (non-in-line post-processing unit)] which can be explicitly input manually by the operator for each job via the list in FIG. 13 displayed on the operation unit 404 by the controller unit 402.

Note that the first embodiment assumes that the entry (X) corresponding to the first type instruction information is a natural number (positive integer) of at least 2 or more. In other words, in the first embodiment, an entry "1" does not correspond to "instruction information which considers a post-step". This is because setting of "1" designated copy count means classification of printed materials every copy. This process is less likely to classify printed materials in a unit corresponding to a prospective post-step in a printing environment such as the POD environment. However, this setting does not always apply as far as even the entry "1" serving as a designated copy count corresponds to information which considers a post-process necessary after a printing process by the printing apparatus 101 in a job to be processed. In this case, even the entry "1" serving as a designated copy count may be contained in [first type instruction information].

As described above, the printing system in the first embodiment can execute control operations corresponding to all the three types of instruction information. However, the printing system may be configured to execute only one type of control corresponding to one of the three types of instruction information. Alternatively, the printing system may be configured to execute two types of control corresponding to two of the three types of instruction information. Any configuration falls within the scope of the present invention as far as control corresponding to at least one type of instruction information can be executed. This has been described in control examples illustrated in FIGS. 26 to 38. The UI unit (user interface unit) of the printing apparatus 101 itself can provide at least a UI function provided by the first embodiment. In addition, the operator can explicitly input the above-mentioned instruction information for each job via the UI unit (user interface unit) of the printing apparatus 101 itself. Further, the printing system can execute control based on the instruction information explicitly input by the operator via the UI unit (user interface unit) of the printing apparatus 101 itself for a job to be processed. The printing system is desirably configured in this manner. This configuration assumes the following situations and achieves the following effects.

For example, the POD environment is a printing environment which tends to be different from the office environment in use cases and user needs. It is common practice in the office environment that the user instructs the printing apparatus to print his document in accordance with his instruction, and goes to receive his material printed by the printing apparatus. In the POD environment, in most cases, one who requests creation of a printed material is a customer, and one who instructs the printing apparatus (or the printing system having the printing apparatus) to create the printed material is an operator engaged at the work site in the POD environment. In many cases, in the POD environment, unlike the office environment, an operator who instructs the printing apparatus (or the printing system having the printing apparatus) to run for a job to be processed is not one who receives the final material of the job.

Figure 16:
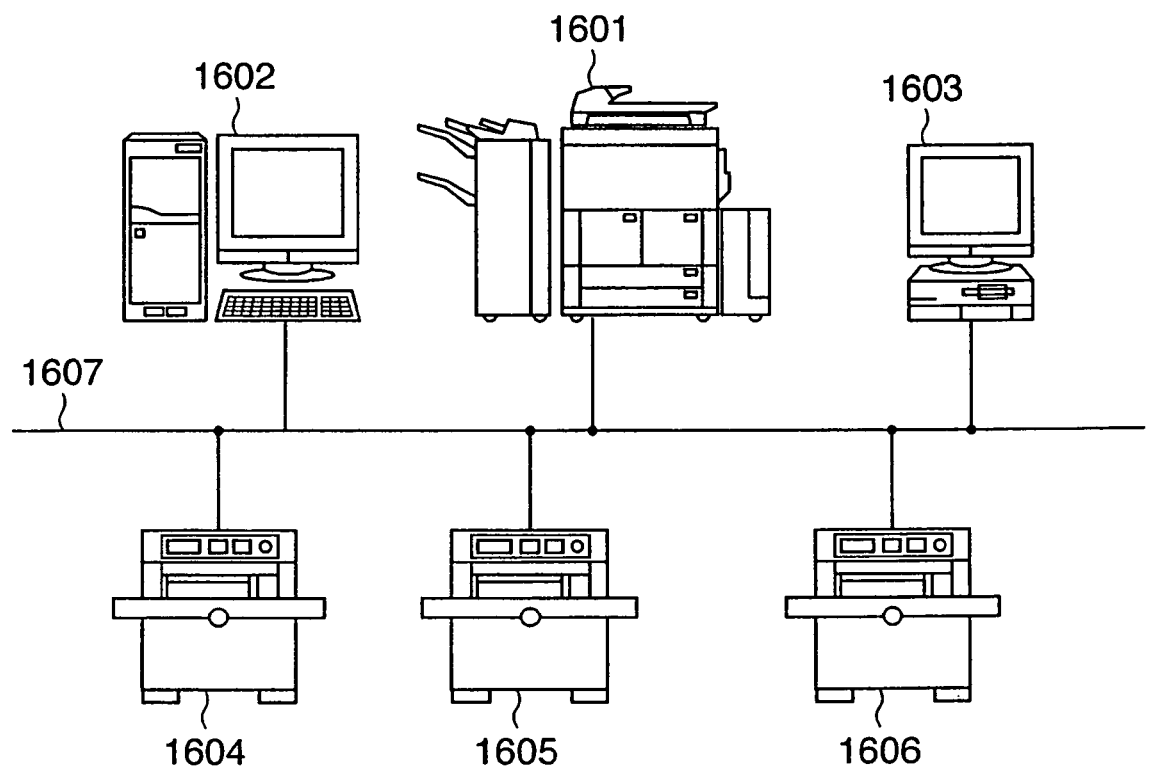
FIG. 16 is a view showing another example of the printed material publishing system including the image forming apparatus to be controlled in the embodiment.

In a printing environment such as the POD environment, a situation is assumed in which the printing apparatus is installed at the work site, and a dedicated post-processing apparatus such as a cutting machine is installed independently of the printing apparatus, as shown in FIGS. 1 and 16 in the embodiment. In this printing environment, assumable work steps necessary for a job to be processed are work of cutting, with the cutting machine, materials printed by the printing apparatus, and work of packing printed materials in a box. Even after a process for a target job by the printing apparatus (or the printing system having the printing apparatus) ends, steps to be performed for the job after the printing step by the printing apparatus may exist. At the work site, the operator may take out, from the delivery portion of the printing apparatus, materials which are printed by the printing apparatus and stacked on the delivery portion of the printing apparatus. To perform steps such as cutting and box packing, the operator may rearrange or sort printed materials. As described above, in a printing environment such as the POD environment, intervention work by the operator is often required for a job to be processed after the end of a printing process by the printing apparatus. In addition, many operations may be requested of the operator in intervention work by the operator that is necessary for a job to be processed after a printing process.

Moreover, in a printing environment such as the POD environment, it is assumed to efficiently process a plurality of jobs in real time in order to satisfy requests from a larger number of customers by quick delivery within short periods. In this case, the operator may always stay in front of the printing apparatus. If any factor which influences productivity occurs, the operator must quickly cope with the factor at the work site. The situation in which the operator must deal with any factor at the printing work site in order to maintain high productivity is as follows.

For example, many print jobs are scheduled in advance in order to meet delivery dates, many print jobs are input in advance to the memory 405 of the printing apparatus 101 according to the schedule, and another urgent print job must be printed suddenly.

As another example, a post-processing apparatus (post-processing unit) available at the work site where the printing apparatus 101 is installed changes before and after a print job to be processed is input to the printing apparatus 101. For example, a non-in-line post-processing apparatus (post-processing unit) which did not exist at the work site before a print job is input to the printing apparatus 101 is newly introduced into the work site after the print job is input to the apparatus 101. Alternatively, a post-processing apparatus (post-processing unit) which is unavailable because it is out of order or is in use by another job becomes available immediately before or after a print job to be processed is input to the printing apparatus 101.

As described above, in a printing environment such as the POD environment, the operator may quickly deal with any factor at the work site in order to maintain high productivity.

In order to contend with this situation, demands arise for a configuration capable of explicitly accepting various requests from the operator via the operation unit 404 of the printing apparatus 101 which is highly likely to exist at a position nearest to a position where the operator who actually works at the work site exists. Also, demands arise for a configuration capable of flexibly, dynamically handling a job with the above configuration even upon a change in situation that may occur at the work site in the POD environment and influences productivity. Furthermore, demands arise for a configuration capable of quickly coping at the work site with a situation in which the order of jobs to be processed or the process conditions of a job to be processed must be changed suddenly.

In other words, when the above-mentioned situation occurs, no prompt action can be taken and no demand can be satisfied with a configuration which cannot meet these demands. This leads to a fatal problem in a printing environment where the productivity of jobs is important, such as the POD environment by a POD company which does business with a merit of a short delivery period.

More specifically, the POD operator must often move between the printing apparatus 101 and an external apparatus such as a PC unless various requests can be accepted directly from the POD operator via the operation unit 404 of the printing apparatus. Such unwanted action may pose a problem in a printing environment such as the POD environment where it is important to process a plurality of jobs at high productivity.

Considering the above-described matters, it is desired to flexibly cope with even a printing environment where one who receives a final material and one who requests an operation of the printing apparatus or printing system in order to create the final material are different, similar to the relationship between the customer and the operator in the POD environment. For this purpose, it is preferable to provide a flexible user interface environment more friendly to an operator who actually operates the printing apparatus in the first embodiment (in other words, the printing system having the printing apparatus in the first embodiment).

In particular, the first embodiment achieves an effect capable of increasing the efficiency of intervention work of an operator who engages in a post-process necessary after printing by the printing apparatus 101 in a job to be processed in a printing environment such as the POD environment. In addition, an excellent operation environment where an increase in the efficiency of intervention work of an operator who engages in a post-process necessary after printing is considered and the operator' will is respected as much as possible can be provided via the UI unit of the printing apparatus 101 to the operator who operates the printing apparatus 101. The first embodiment achieves an effect capable of constructing a highly convenient user interface environment in consideration of a printing environment such as the POD environment. The printing system is desirably configured to obtain these two effects considering a printing environment such as the POD environment.

The configuration of the first embodiment can deal with the above-described situations, problems, and demands. More specifically, an operation environment which satisfies not only the office environment but also the POD operator can be provided via the operation unit 404 of the printing apparatus 101.

As a mechanism for obtaining the above effects, the configuration of the first embodiment is preferable. Note that the above-described matters also apply to various control examples to be described with reference to FIG. 26 and subsequent drawings, and are common throughout this specification.

Second Embodiment

The first embodiment has mainly explained sorting when a document scanned by the scanner unit is copied by the digital multi-functional peripheral (printing apparatus 101). However, the present invention is not limited to this, and can also be applied to sorting when image data held in a client PC is printed by a digital multi-functional peripheral. According to the configuration of the second embodiment, the same effects as those of the first embodiment can be obtained by an operation from an external apparatus spaced apart from the printing apparatus. For example, according to the second embodiment, the same control as that executed by the controller unit 402 in the first embodiment is executed mainly by the control unit (e.g., a central processing unit 802 in FIG. 8) of a client PC serving as an example of the external apparatus. Further, according to the second embodiment, the same function as the user interface function provided by the operation unit 404 in the first embodiment can be provided using the UI unit (e.g., an input device 805 and display device 806 in FIG. 8) of the client PC serving as an example of the external apparatus.

For example, when the copy function of the printing apparatus 101 is to be used, the display unit 605 of the printing apparatus displays an operation window for performing various setting operations associated with sorting, as described above. To the contrary, the configuration to be described in the second embodiment utilizes a print function of printing by transmitting image data to be printed from a client PC to a printing apparatus 101. In this case, various settings on sorting are made via a window displayed on the client PC operated by the PC operator before a print job is input. Details of the second embodiment will be described below.

<Configuration of Printed Material Publishing System>

FIG. 16 is a view showing an example of a printed material publishing system having an image printing apparatus (digital multi-functional peripheral) and an information processing apparatus (client PC) according to the second embodiment of the present invention. Note that the printed material publishing system to be described below also assumes an actual work site in a printing environment such as the POD environment where the printing system can be installed.

In FIG. 16, reference numeral 1601 denotes a digital multi-functional peripheral (image printing apparatus) which prints on the basis of a print job; and 1603, a client PC which inputs a print job; and 1602, a server which manages a print job. These devices are examples of an information processing apparatus corresponding to an external apparatus of the printing system according to the second embodiment. Reference numerals 1604 to 1606 denote cutting machines for performing cutting work as a post-process after a printing process. These devices are communicably connected to each other via a network 1607.

Note that the image forming apparatus 101 in FIG. 1 and the image forming apparatus 1601 in FIG. 16 are identical to each other, and a description of the internal configuration will be omitted. In other words, the apparatus 1601 comprises, as constituent elements, units identical to those illustrated in FIG. 4 including at least the operation unit 404, controller unit 402, memory 405, and printer unit 403. The image forming apparatus (also called an image printing apparatus or printing apparatus) in the second embodiment is a multi-functional apparatus having a plurality of functions such as the copy function, print function, and box function, but the configuration is not particularly limited. For example, the second embodiment can be applied to even a single-functional image forming apparatus such as an apparatus having only the copy function, or an apparatus having a print function of printing data from a PC.

<Process Flow in Client PC in Printing>

Figure 17:
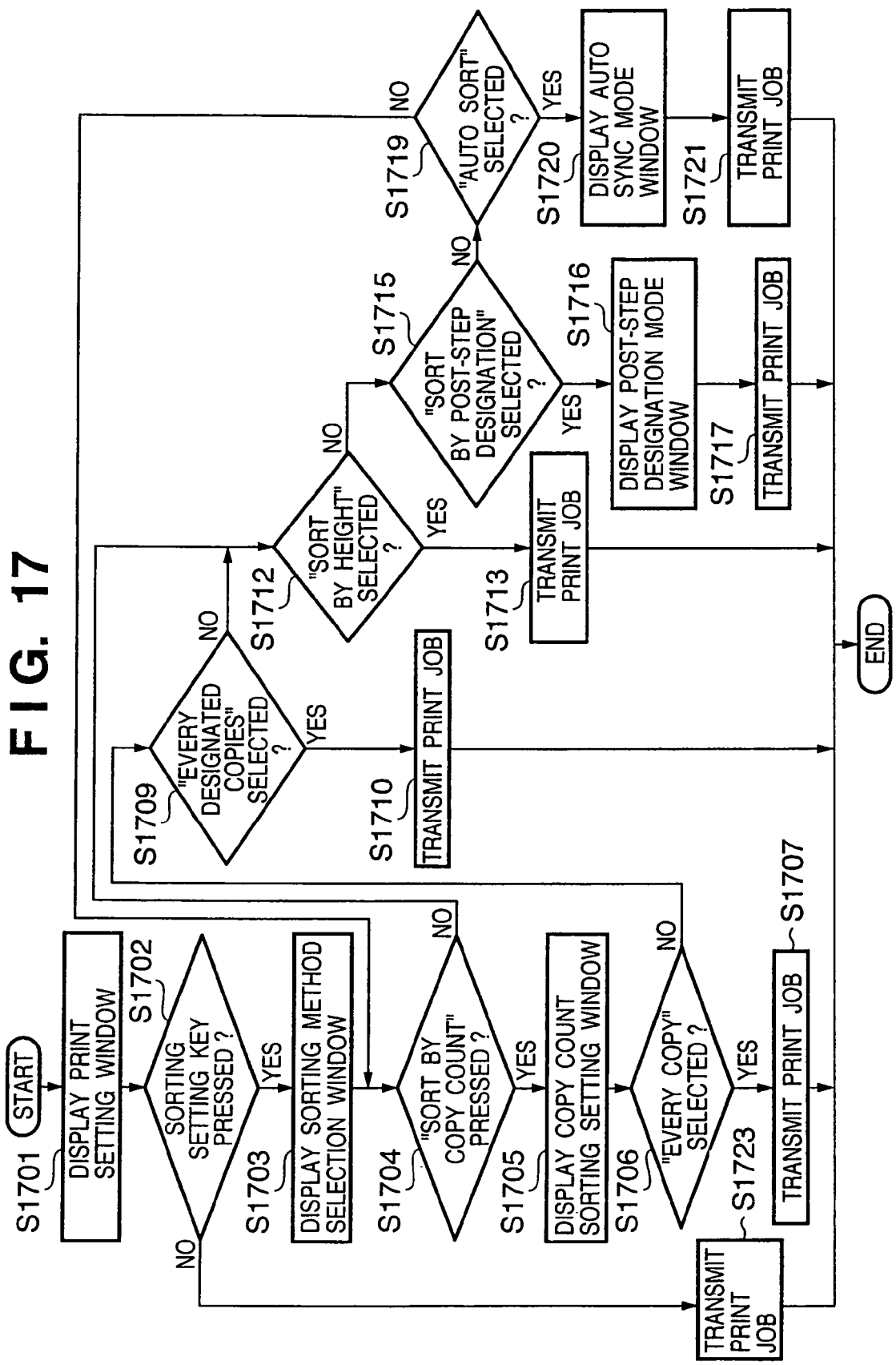
FIG. 17 is a flowchart for explaining control in the embodiment.

FIG. 17 is a flowchart showing a process flow in the client PC 1603 when the digital multi-functional peripheral 1601 prints on the basis of image data transmitted from the client PC 1603. The following process is executed by a printer driver (printer driver for the digital multi-functional peripheral 1601) installed in the client PC 1603. For example, control for executing various processes illustrated in FIG. 17 by the client PC 1603 is executed mainly by the control unit (corresponding to, e.g., the central processing unit 802 in FIG. 8) of the client PC 1603. A control program for executing a process in the flowchart of FIG. 17 is stored in the memory (corresponding to, e.g., a control memory 801 in FIG. 8) of the client PC 1603. This control program is downloaded from an external Web page when the client PC 1603 accesses the Web page using a network. Alternatively, when a storage medium (e.g., a CD-ROM) removable from the client PC 1603 is set in the client PC 1603, the control program is downloaded from the storage medium. In either case, the configuration is arbitrary as far as the control program can be read out and executed by the control unit of the client PC 1603.

Figure 23:
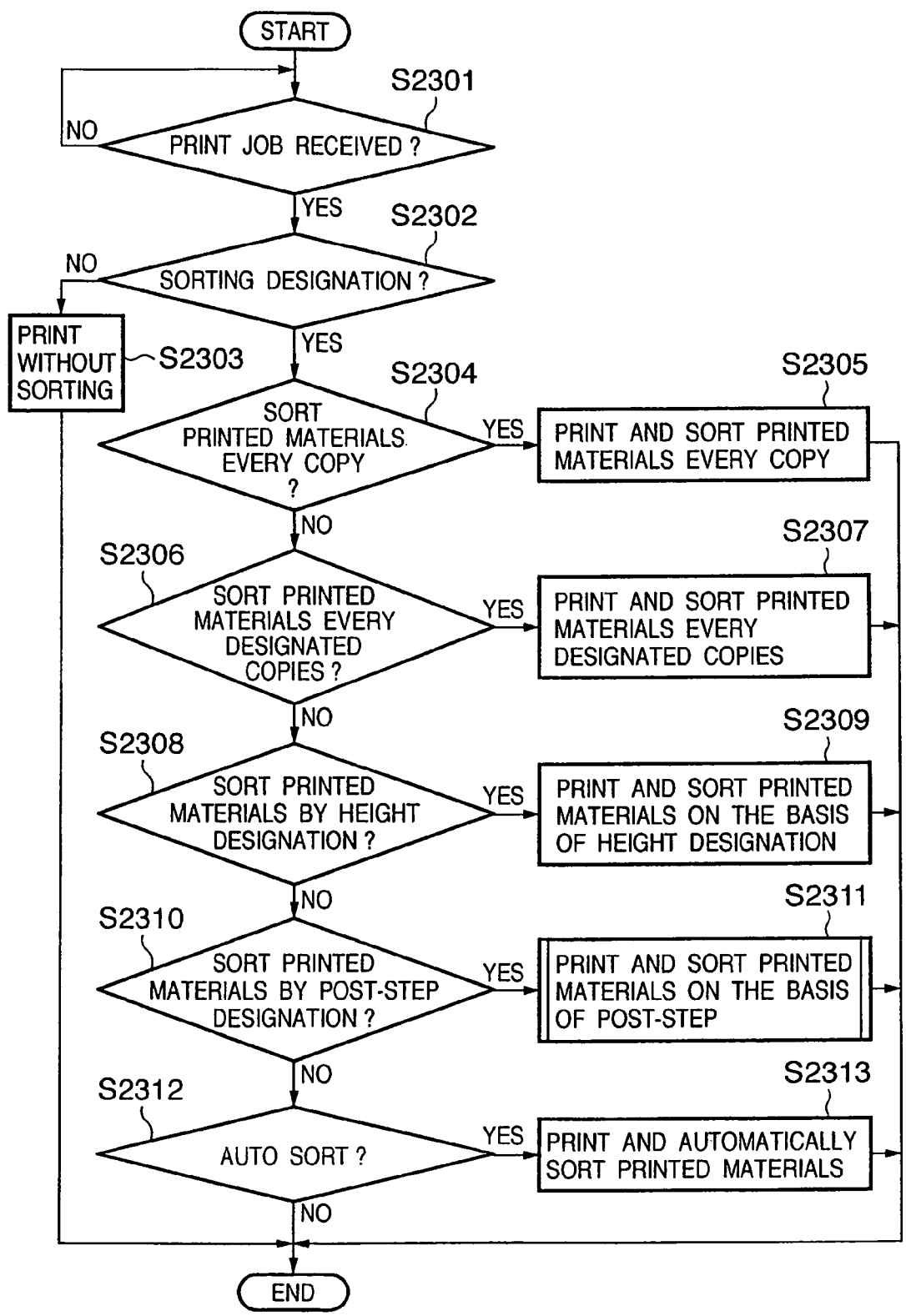
FIG. 23 is a flowchart for explaining control in the embodiment.

It should be noted in advance that the "user" described in the following flowchart of FIG. 17 means the operator of the client PC 1603 who remote-controls the printing apparatus 1601 via the UI unit (input device 805 and display device 806 in FIG. 8) of the client PC 1603. Various UI windows (UI windows in FIGS. 18 to 22) subjected to display control in the process of the flowchart of FIG. 17 are displayed on the display unit (corresponding to, e.g., the display device 806 in FIG. 8) of the client PC 1603 by the control unit of the client PC 1603. The process of the flowchart illustrated in FIG. 23 is executed mainly by the printing apparatus 1601. That is, control associated with various processes of the flowchart illustrated in FIG. 23 is executed mainly by the control unit (corresponding to, e.g., a controller unit 402 in FIG. 4) of the printing apparatus 1601. On this premise, the flowchart in FIG. 17 will be explained.

Figure 18:
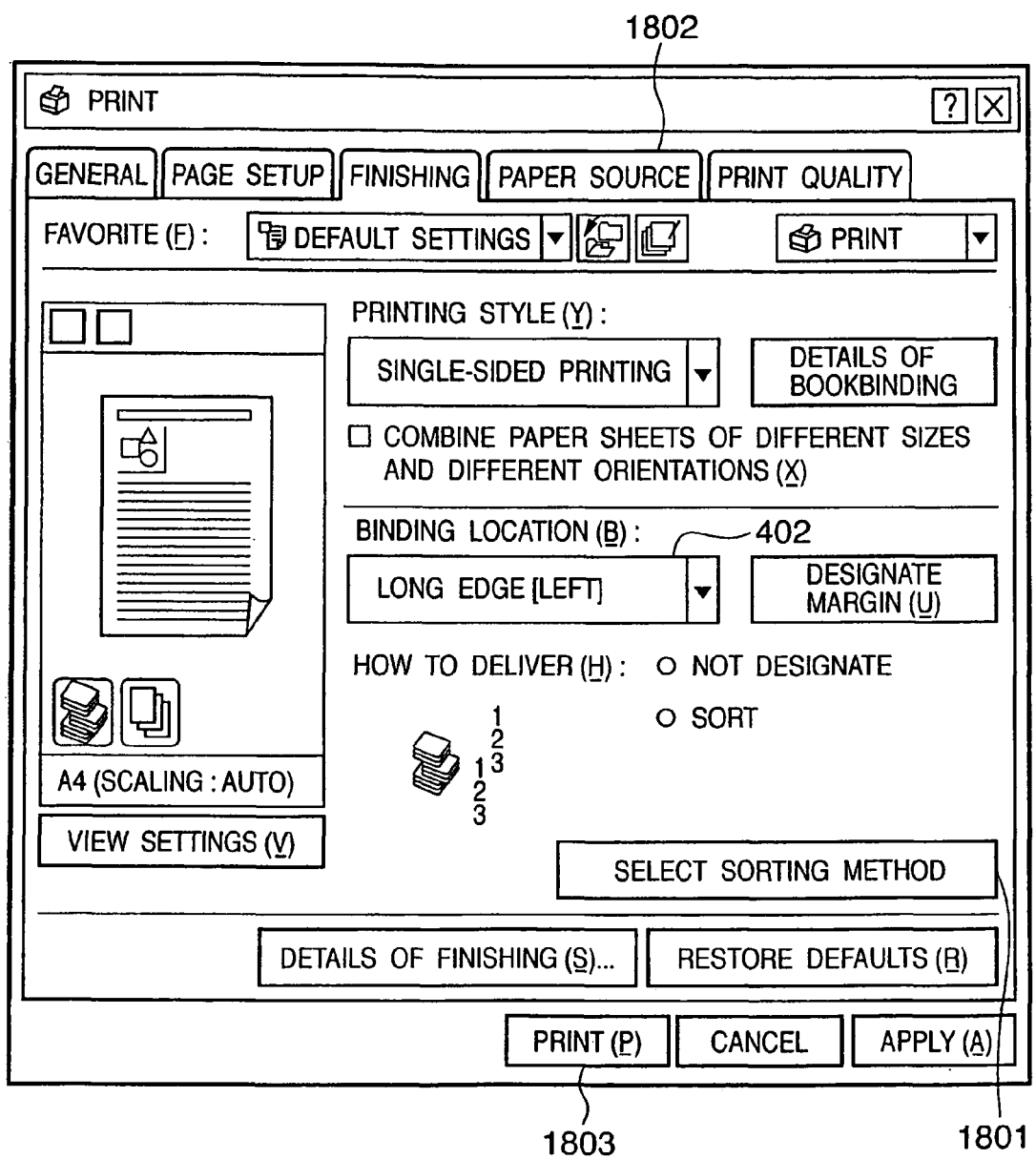
FIG. 18 is a view for explaining an example of the user interface to be controlled in the embodiment.

If a print instruction is input from the user, a print setting window shown in FIG. 18 is displayed in step S1701. The print setting window (FIG. 18) has a sorting method selection key 1801. In step S1702, it is determined whether the sorting method selection key 1801 has been pressed.

If it is determined in step S1702 that a print key 1803 has been pressed without pressing the sorting method selection key 1801, the flow advances to step S1723 to transmit, to the digital multi-functional peripheral 1601 via the server 1602, a print job to which setting contents (in this case, setting contents except the sorting method) in the printing system window (FIG. 18) are added.

Figure 19:
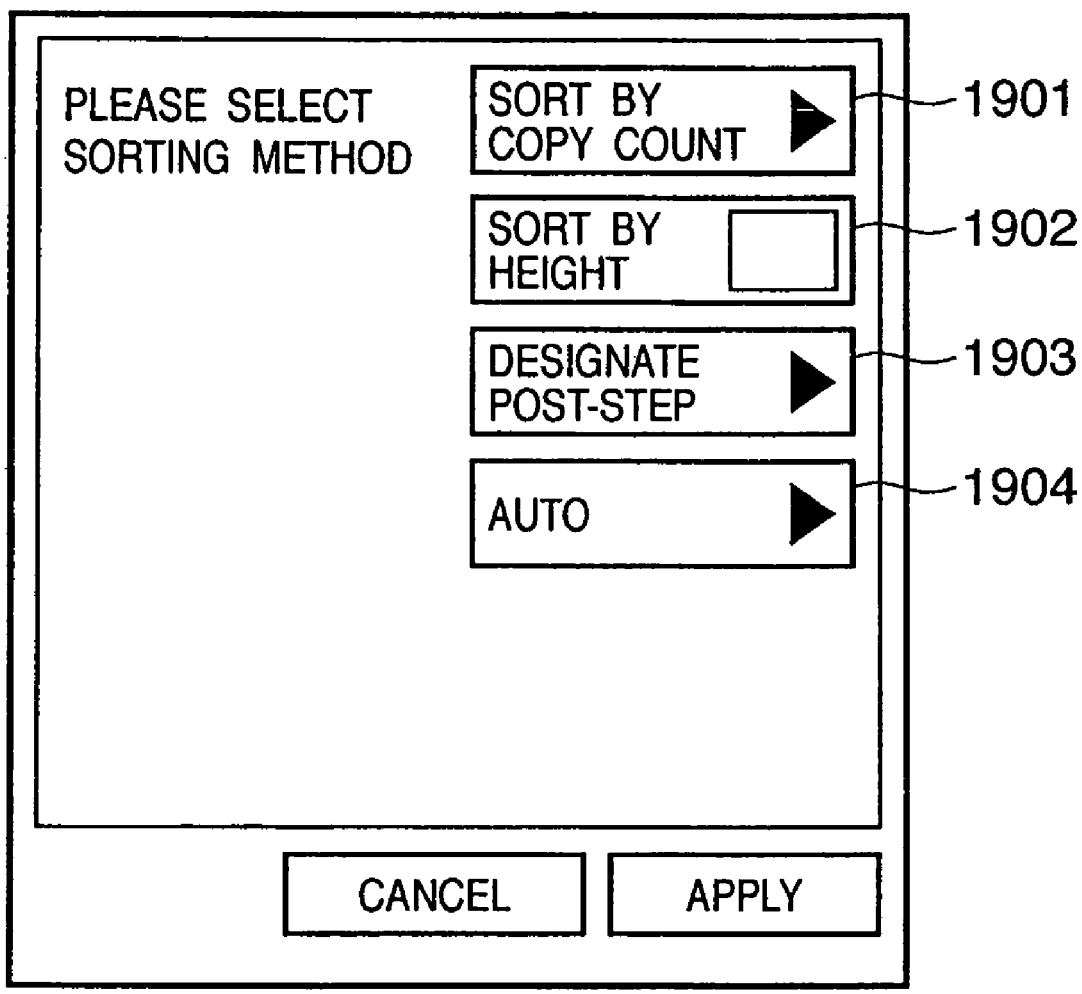
FIG. 19 is a view for explaining another example of the user interface to be controlled in the embodiment.

If it is determined in step S1702 that the sorting method selection key 1801 has been pressed, the flow advances to step S1703 to display a sorting method selection window shown in FIG. 19. The sorting method selection window (FIG. 19) displays a "sort by copy count" button 1901, "sort by height" button 1902, "designate post-step" button 1903, and "AUTO" button 1904. The user can select an arbitrary sorting method.

In step S1704, it is determined whether the "sort by copy count" button 1901 has been pressed. If it is determined that the "sort by copy count" button 1901 has been pressed, the flow advances to step S1705 to display a copy count sorting setting window 2001 shown in FIG. 20.

The copy count sorting setting window 2001 displays an "every copy" button 2002 and "every designated copies" 2003, and the user can select either button. The "every copy" button 2002 is used to sort printed materials every copy upon printing. The "every designated copies" 2003 is used to sort printed materials at a copy count input in a copy count input field 2004.

In step S1706, it is determined whether the "every copy" button 2002 has been selected. If it is determined that the "every copy" button 2002 has been selected, and then the print key 1803 is pressed, the flow advances to step S1707 to add to a print job a description of printing and sorting every copy, and transmit the print job to the digital multi-functional peripheral 1601 via the server 1602.

If it is determined in step S1706 that the "every copy" button 2002 has not been selected, the flow advances to step S1709 to determine whether the "every designated copies" 2003 has been selected. If it is determined that the "every designated copies" 2003 has been selected, and then the print key 1803 is pressed, the flow advances to step S1710 to add to a print job a description of printing and sorting at a copy count input in the copy count input field 2004, and transmit the print job to the digital multi-functional peripheral 1601 via the server 1602.

If it is determined in step S1704 that the "sort by copy count" button 1901 has not been pressed, the flow advances to step S1712 to determine whether the "sort by height" button 1902 has been pressed. If it is determined in step S1712 that the "sort by height" button 1902 has been pressed, and then the print key 1803 is pressed, the flow advances to step S1713 to add to a print job a description of printing and sorting so as to arrange printed materials to a predetermined height, and transmit the print job to the digital multi-functional peripheral 1601 via the server 1602.

If it is determined in step S1712 that the "sort by height" button 1902 has not been pressed, the flow advances to step S1715 to determine whether the "designate post-step" button 1903 has been pressed. If it is determined in step S1715 that the "designate post-step" button 1903 has been pressed, the flow advances to step S1716 to display a post-step designation mode window shown in FIG. 21.

The post-step designation mode window displays a plurality of lists. In the second embodiment, a cutting process by the cutting machine 1604 is done as a post-step after a printing process by the digital multi-functional peripheral 1601. Post-steps include, e.g., a box packing process in addition to the cutting process, and these process contents are displayed in the post-step designation mode window.

If a post-step is selected in the post-step designation mode window and then the print key 1803 is pressed, a description of printing and sorting on the basis of a post-processing device performance table corresponding to the list selected in the post-step designation mode window is added to a print job, and the print job is transmitted to the digital multi-functional peripheral 1601 via the server 1602 in step S1717.

If it is determined in step S1715 that the "designate post-step" button 1903 has not been pressed, the flow advances to step S1719 to determine whether the "AUTO" button 1904 has been pressed. If it is determined that the "AUTO" button 1904 has been pressed, the flow advances to step S1720 to display an AUTO sync mode window shown in FIG. 22.

If the print key 1803 is pressed, information on the currently set post-step is added to a print job, and the print job is transmitted to the digital multi-functional peripheral 1601 via the server 1602 in step S1721.

<Process Flow in Digital Multi-Functional Peripheral in Printing>

FIG. 23 is a flowchart showing a process flow in the digital multi-functional peripheral 1601 when the digital multi-functional peripheral 1601 prints on the basis of a print job transmitted from the client PC 1603.

In step S2301, it is determined whether a print job has been received. If it is determined that a print job has been received, the flow advances to step S2302. In step S2302, it is determined whether the received print job contains information on sorting designation. If it is determined that the received print job does not contain any information on sorting designation, the flow advances to step S2303 to print on the basis of the print job without sorting.

If it is determined in step S2302 that the received print job contains information on sorting designation, the flow advances to step S2304 to determine whether the information on sorting designation is a description of "sort every copy".

If it is determined in step S2304 that the information is a description of "sort every copy", the flow advances to step S2305 to print and sort printed materials every copy.

If it is determined in step S2304 that the information is not a description of "sort every copy", the flow advances to step S2306 to determine whether the information is a description of "sort every designated copies". If it is determined that the information is a description of "sort every designated copies", the flow advances to step S2307 to print and sort printed materials every designated copies.

If it is determined in step S2306 that the information is not a description of "sort every designated copies", the flow advances to step S2308 to determine whether the information is a description of "sort by height designation". If it is determined in step S2308 that the information is a description of "sort by height designation", the flow advances to step S2309 to calculate a sorting copy count on the basis of the designated height and medium type, print, and sort printed materials at the sorting copy count. Note that contents of the sorting process are the same as those in steps S1402 to S1405 of FIG. 14, and a description thereof will be omitted.

If it is determined in step S2308 that the information is not a description of "sort by height designation", the flow advances to step S2310 to determine whether the information is a setting of "sort by post-step designation". If it is determined in step S2310 that the information is a setting of "sort by post-step designation", the flow advances to step S2311 to print and sort printed materials on the basis of the post-step (cutting process in the second embodiment). Note that contents of the sorting process are the same as those in steps S1502 to S1508 of FIG. 15, and a description thereof will be omitted.

If it is determined in step S2310 that the information is not a description of "sort by post-step designation", the flow advances to step S2312 to determine whether the information is a description of "auto sort". If it is determined in step S2312 that the information is a description of "auto sort", the flow advances to step S2313 to print and automatically sort printed materials, details of which will be described below.

<Flow of Automatic Sorting Process>

Figure 24:
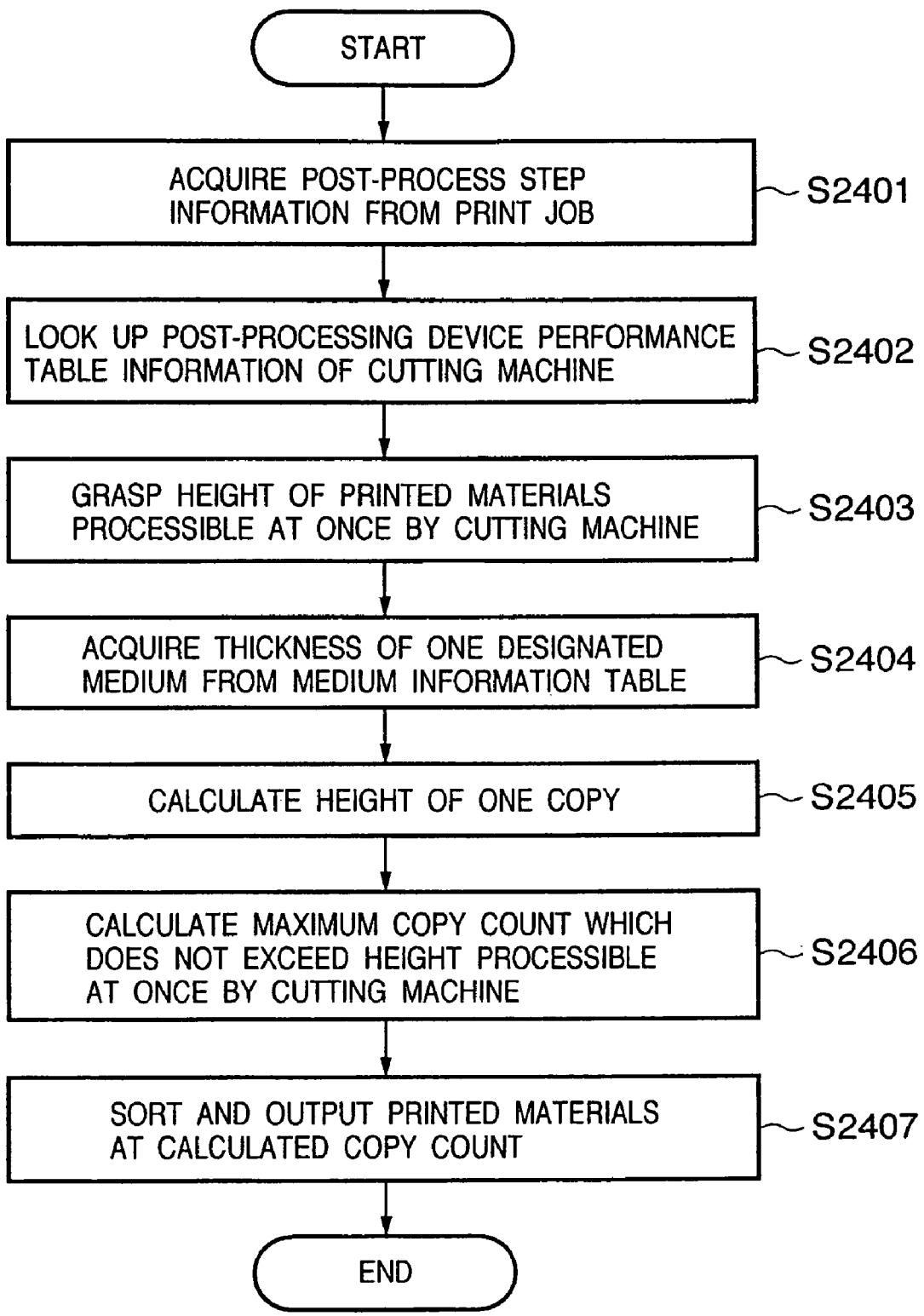
FIG. 24 is a flowchart for explaining control in the embodiment.
Figure 25:
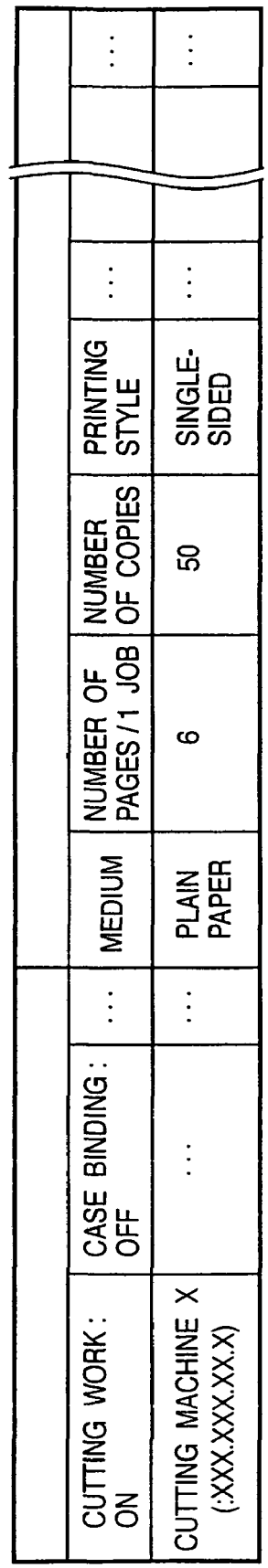
FIG. 25 is a table for explaining a control example in the embodiment.

Details of automatic sorting printing in step S2313 will be explained. FIG. 24 is a flowchart showing the flow of a detailed process of automatic sorting printing. In step S2401, information on a post-step contained in a received print job is acquired. FIG. 25 is a table showing an example of a print job transmitted to the digital multi-functional peripheral 1601 when the "AUTO" button 1904 is pressed. As shown in FIG. 25, information on a post-step (in this case, a cutting process by the cutting machine 1604) is described.

In step S2402, post-processing device performance table information shown in FIG. 3 is looked up. In step S2403, the height of printed materials processible at once by the cutting machine 1604 is grasped on the basis of the post-processing device performance table information.

In step S2404, the thickness of one designated medium is acquired from the medium information table shown in FIG. 2. In step S2405, the height of one copy of printed materials is calculated on the basis of the height of printed materials processible at once by the cutting machine 1604, and the thickness of one medium in the medium information table.

In step S2406, the maximum copy count which does not exceed the height processible at once by the cutting machine 1604 is calculated on the basis of the height of printed materials processible at once by the cutting machine 1604, and the height of one copy of printed materials.

In step S2407, it is set to print and sort printed materials at the copy count calculated in step S2406.

A concrete example of the above process will be explained. For example, plain paper is designated as the medium, and the height of printed materials processible at once by the cutting machine 1604 is 100 mm in the post-processing device performance table. Printing of 50 copies each formed from 100-page image data is set as a printing condition. Since the thickness of plain paper is 0.05 mm/sheet from the medium information table in FIG. 2, the thickness of one copy of printed materials is 0.05×100 pages=5 mm. As a result, 100 mm/5 mm=20, and a maximum of 20 copies of printed materials can be stacked.

When the print key 1803 is pressed to execute printing of 50 copies, discharged printed materials are sorted into two piles each of 20 copies and one pile of 10 copies.

A further explanation will be omitted because an explanation necessary for the second embodiment except the above one is the same as an explanation in other embodiments including the first embodiment other than the second embodiment, or can be understood by properly developing and applying the above explanation.

As described above, the second embodiment can achieve various effects described in the first embodiment, and can also exhibit the same effects as various effects described in the first embodiment even for a print job for which execution of printing is requested from an external apparatus in the printing system of the second embodiment. For example, when a print job transmitted from the client PC is to be printed, sorting of materials printed by the digital multi-functional peripheral is determined in consideration of a post-step such as cutting work or delivery work, reducing the work load of the operator in the post-step.

Along with reduction of the work load of the operator in the post-step, a higher working efficiency of the entire printed material publishing work can be expected, and working cost can be reduced.

Since the post-step device processes printed materials of more than a sheet count or thickness limited on the basis of the performance of the post-step device, human errors such as damage of the device can be prevented, and risk coming with work can be reduced.

In the second embodiment, [first type instruction information] to [third type instruction information] described in the first embodiment are input via the UI unit of an external apparatus such as the client PC 1603. These pieces of information have been described above, but will be summarized below with reference to the computer-side block diagram of FIG. 8. Similar to the first embodiment, these pieces of information are contained in "instruction information which considers a post-process (post-step) using a non-in-line post-processing apparatus (non-in-line post-processing unit) necessary after a printing process by the printing apparatus of the embodiment in a job to be processed".

Figure 20:
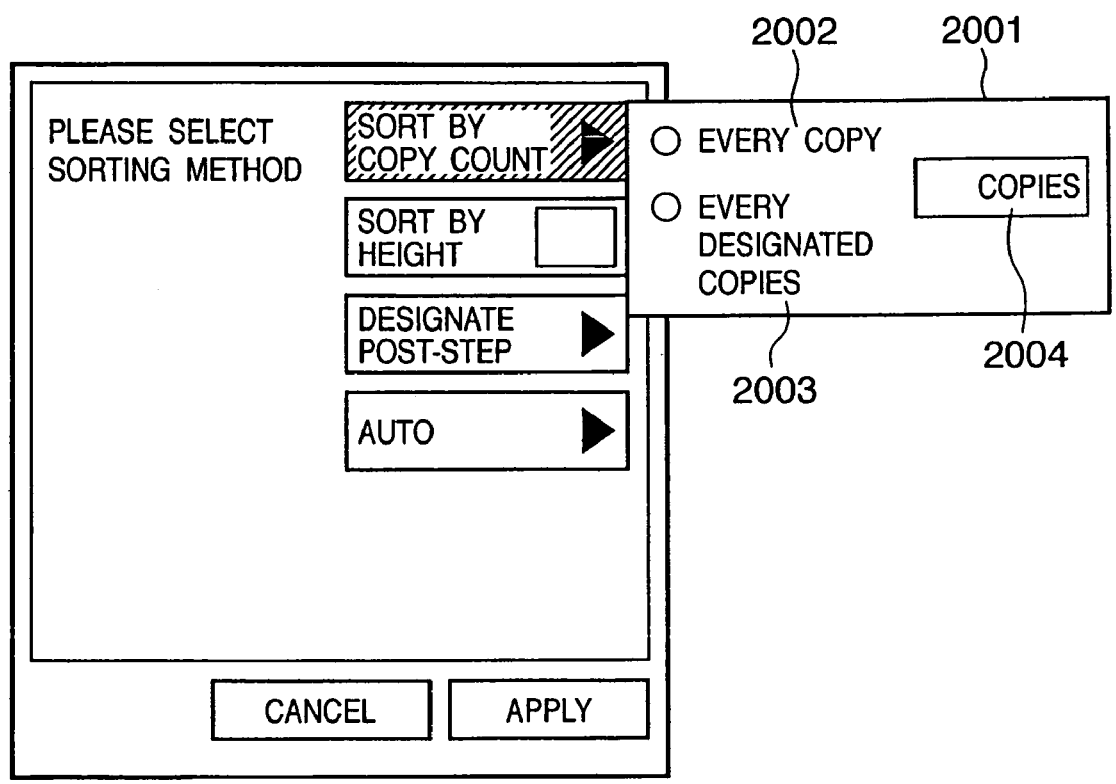
FIG. 20 is a view for explaining still another example of the user interface to be controlled in the embodiment.
Figure 22:
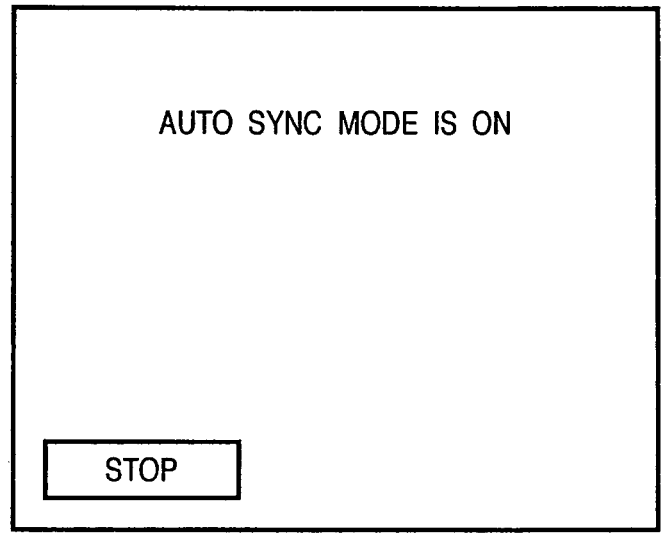
FIG. 22 is a view for explaining still another example of the user interface to be controlled in the embodiment.

[First Type Instruction Information] This instruction information is [entry information corresponding to the designated copy count (X)] which can be explicitly input manually by the operator of the client PC 1603 for each job via the copy count input field 2004 in FIG. 20 displayed on the display device 806 of the client PC 1603 by the central processing unit 802 of the client PC 1603. This information is an example of the first type instruction information to be input via the UI unit of an external apparatus in the second embodiment.

[Second Type Instruction Information] This instruction information is [height information corresponding to a value obtained by expressing the amount of printed materials by height] which can be explicitly input manually by the operator of the client PC 1603 for each job via the "sort by height" button 1902 in FIG. 19 displayed on the display device 806 of the client PC 1603 by the central processing unit 802 of the client PC 1603. This information is an example of the second type instruction information to be input via the UI unit of an external apparatus in the second embodiment.

[Third Type Instruction Information] This instruction information is [post-step information on the processing capability of a non-in-line post-processing apparatus (non-in-line post-processing unit)] which can be explicitly input manually by the operator of the client PC 1603 for each job via the list in FIG. 21 displayed on the display device 806 of the client PC 1603 by the central processing unit 802 of the client PC 1603. This information is an example of the third type instruction information to be input via the UI unit of an external apparatus in the second embodiment.

In the first embodiment, the UI unit is the operation unit 404 having a touch panel type display unit, so the operator directly operates display buttons. In the second embodiment, the operator inputs the instruction information with the input device 805 such as a pointer or mouse. Although the first and second embodiments are slightly different in configuration, it is desirable that the configuration does not depart from the gist of the present invention.

It is common to the first and second embodiments that even a configuration other than one which satisfies all the three types of instruction information also falls within the applicable scope of the present invention. In other words, only a configuration which copes with one of the three types of instruction information may be adopted. Alternatively, only a configuration which copes with two types of instruction information may be adopted. The configuration is arbitrary if it does not depart from the gist of the present invention.

The second embodiment can obtain various effects described above even for a job for which execution of printing is accepted from the operator via the UI unit of an external apparatus such as the client PC. Since the second embodiment achieves these effects in addition to those of the first embodiment, various effects described in this specification can be further enhanced.

Third Embodiment

The first embodiment has described the use of a so-called copy function of printing a document scanned by the scanner unit 401. That is, the first embodiment has been explained in regard to a job to be processed with a function of accepting a printing execution request from the operator via the operation unit 404, scanning a document by the scanner unit 401, and then printing print data of the document. This print data means, e.g., scanned image data. The second embodiment has described the use of a so-called print function of printing print data transmitted from a client PC. That is, the second embodiment has been explained in regard to a job to be processed with a function of accepting a printing execution request from the operator via the UI unit of an external apparatus, and printing print data transmitted from the external apparatus. An example of this print data is PDL data which is transmitted from a computer and requires an expansion process into a bitmap image in the printing apparatus. However, the present invention is not limited to these embodiments. For example, the same control can also be executed even for a job to be processed with the box function of the multi-functional printing apparatus 101. The box function is to save all pages of print data input from the scanner unit 401 or an external apparatus (e.g., the client PC 1603) in a memory (e.g., the hard disk of the memory 405) capable of storing print data of jobs, while expanding these data into bitmap data. When the operator inputs a printing execution request via the operation unit 404 using the box function, printing of print data saved in the hard disk of the memory 405 is permitted. In inputting a printing execution request, print data are presented as selection candidates via the operation unit 404, and one or a plurality of desired print data are selected from the presented print data. For a job to be printed, a desired printing condition is accepted via the operation unit 404. When the operator inputs a printing execution request via the operation unit 404, the print data of the job can be printed by the printer unit 403 under the set printing process condition. The print data of the job to be processed with the box function are not erased from the hard disk of the memory 405 unless otherwise specified by the operator via the operation unit 404. Even after printing by the printer unit 403, the print data are held in the memory. Thus, the print data can be printed again every time the operator inputs a printing execution request via the operation unit 404. These control operations are also executed mainly by the controller unit 402. The box function provides this functions. The configuration described in the first embodiment can also be applied to even a job to be processed with the box function. The following description with reference to FIGS. 26 to 38 is also related to an example of the third embodiment. By exploiting the box function, the following control application with reference to FIGS. 39 to 41 can also be executed in the third embodiment, which will be described later.

On the basis of the configurations of the above-described embodiments, various control operations which can be executed by an image forming system (synonymous with a printing system) having an image forming apparatus (synonymous with a printing apparatus) disclosed in the third embodiment will be explained with concrete control examples.

A printing apparatus 101 (printing apparatus 1601 in FIG. 16) in the printing system according to the third embodiment comprises a storage unit such as a hard disk capable of storing data of jobs. For example, the printing apparatus 101 accepts job data from a scanner unit 401 of the apparatus. Also, the printing apparatus 101 accepts job data from an external apparatus (including apparatuses such as an information processing apparatus (e.g., a client PC 102 in FIG. 1 or a client PC 1603 or server 1602 in FIG. 16) and another printing apparatus) via a communication unit such as a network 104. In this manner, the printing apparatus 101 in the third embodiment can accept, from different input paths, a plurality of types of job data requiring execution of a printing process.

A controller unit 402 of the printing apparatus 101 stores a series of image data of jobs accepted via various data input paths in the internal hard disk of a memory 405 shown in FIG. 4 for each job in association with a series of process condition data set by the user.

The controller unit 402 accepts, distinctively for each job, a series of process condition data set by the user (synonymous with the operator) for the job to be processed via various user interface units such as an operation unit 404 of the apparatus 101 and the operation unit of an external apparatus. The controller unit 402 acquires, from various relevant units in the apparatus 101, various management information data stored in the management tables of FIGS. 2 and 3 and the like, and various determination information data such as status information of the apparatus. On the basis of these pieces of determination information, the controller unit 402 controls various operations in the printing system including the printing apparatus 101 in the third embodiment.

For example, the controller unit 402 causes a printer unit 403 to print data of a job to be processed that is stored in the hard disk of the memory, in accordance with a series of process condition data set by the user.

In this configuration, for example, the printing apparatus 101 accepts a job (to be referred to as job A hereinafter) of a series of 4-page document data.

For example, job A has a series of process conditions as process conditions set by the operator via a user interface window: (1) "output paper size=A4 size", (2) "paper type=plain paper", (3) "output copy count=50 copies", and (4) "single-sided printing is executed." as a setting of whether to perform single- or double-sided printing.

The thickness of one output paper sheet (synonymous with the print medium) is 0.1 mm. A total of output paper sheets necessary to process job A is 4 pages×50 copies=200 sheets. The height of sheets of job A when all the sheets (synonymous with print media) of job A are discharged onto the tray (a delivery tray 722 or stacking tray 723 in FIG. 7) is 200 sheets×0.1 mm=20 mm (2 cm).

For job A to be processed, for example, a "mode in which printed materials are sorted every copy" is set as a sheet process mode by the operator.

When job A is input from the scanner unit 401 of the apparatus 101, the user interface for the job is the operation unit 404.

Hence, when such a job is accepted, the controller unit 402 causes a display unit 605 of the operation unit 404 to display the window in FIG. 10. In response to press of a sorter key 1009 in the window by the operator, the controller unit 402 causes the display unit 605 to display the window in FIG. 11. In response to press of a "sort by copy count" button 1101 in the window of FIG. 11 by the operator, the controller unit 402 causes the display unit 605 to display a copy count sorting setting window 1201 shown in FIG. 12. In response to press of an "every copy" button 1202 in the copy count sorting setting window 1201 by the operator, the controller unit 402 sets the "mode in which printed materials are sorted every copy" for the job.

After the operator executes the series of operation procedures via the operation unit 404 serving as an example of the user interface unit in the third embodiment, he presses the start key 606. In response to the operator's operation, the controller unit 402 determines that job A received from the scanner unit 401 is a job for which the user has set the "mode in which printed materials are sorted every copy". In other words, the controller unit 402 controls the printing system so as to treat the target job A as a "job requiring printing of plural copies in total and a classification process every printed materials of one copy".

When job A is input via a network 1607 from a client PC 1603 in FIG. 16 serving as an example of an external apparatus spaced apart from the apparatus 101, the keyboard, mouse, and display of the client PC 1603 correspond to a user interface unit for the job.

In the third embodiment, when a job is accepted from a host computer, an instruction from the operator of the computer can be accepted via a printer driver which is displayed on the display unit of the computer for the printing apparatus 101 in the third embodiment. For example, in response to a key input operation by the operator of the client PC 1603, the control unit (central processing unit 802 in FIG. 8) of the client PC 1603 causes the display unit of the p client PC 1603 to display the printer driver window of the printing apparatus 101 in FIG. 18.

In response to press of a sorting method selection key 1801 in the window of FIG. 18 by the user of the client PC 1603 with the pointing device, the control unit of the client PC 1603 causes the display unit of the client PC 1603 to display the window in FIG. 19. In response to press of a "sort by copy count" button 1901 in the window of FIG. 19 by the user of the client PC 1603, the control unit of the client PC 1603 causes the display unit of the client PC 1603 to display a copy count sorting setting window 2001 shown in FIG. 20. In response to selection of an "every copy" button 2002 in the copy count sorting setting window 2001 by the user of the client PC 1603, the control unit of the client PC 1603 sets the "mode in which printed materials are sorted every copy" for the job.

After the user of the client. PC 1603 executes the series of operation procedures via the display unit of the client PC 1603 serving as an example of the user interface unit in the third embodiment, he presses a print key 1803 in FIG. 18. Then, the control unit of the client PC 1603 transmits, from the client PC 1603 to the printing apparatus 101, job data containing a series of 4-page document data to be processed. At this time, the control unit of the client PC 1603 also transmits, to the apparatus 101 in association with the document data, a series of process condition data for the job that are set by the user via the printer driver.

The printing apparatus 101 receives the job data containing the series of process condition data and print data, and the controller unit 402 analyzes the command of the data. On the basis of the analysis result of the data from the external apparatus, the controller unit 402 determines that the job received from the external apparatus is a job for which the user has set the "mode in which printed materials are sorted every copy". By this method, the controller unit 402 determines a job accepted from the external apparatus as a "job requiring printing of plural copies in total and a classification process every printed materials of one copy".

As described above, the printing apparatus 101 in the third embodiment can accept both job data generated by the data generation device (scanner unit 401 in the third embodiment) of the printing apparatus 101 and job data generated by an external data generation device (e.g., a host computer or another image forming apparatus).

Data of a job to be processed for which the "mode in which printed materials are sorted every copy" is set is stored in the hard disk of the memory 405, and processed by the apparatus 101. As a process for the job data, the controller unit 402 of the apparatus 101 controls the printing system so as to execute the process as shown in FIG. 26 by the apparatus 101.

(Case 1) shown in FIG. 26 exhibits the contents described above. The controller unit 402 causes the printer unit 403 to print 50 copies of job A containing a series of 4-page document data by single-sided printing on the basis of an instruction from the operator. The controller unit 402 causes discharge rollers 717 of the apparatus 101 to convey, into a sheet processing apparatus 720 of the apparatus 101, a sheet (synonymous with a print medium or printed material) of job A that is printed by the printer unit 403. The controller unit 402 sequentially stacks printed materials of job A on, e.g., a delivery tray 722. The controller unit 402 controls the printing system so as to execute the series of operations for job A.

In the example of FIG. 26, the "mode in which printed materials are sorted every copy" is set for job A to be processed. In other words, job A is a "job requiring printing of a total of 50 copies and a classification process of printed materials every printed materials of one copy". When sheets (printed sheets, i.e., printed materials) of job A are to be stacked on the delivery tray 722, the controller unit 402 controls the apparatus 101 so as to stack printed materials of job A on the delivery tray 722 while classifying them every printed materials of one copy. In FIG. 26, this operation mode is defined as and called the first mode. In the third embodiment, "stacking printed materials while classifying them" means "executing stacking of printed materials so that the operator can recognize breaks between a plurality of printed bundles". The printing system executes stacking of printed materials while showing breaks clearly to the operator.

A sheet bundle 2600 in FIG. 26 is the stacking result of printed materials of job A on the delivery tray 722 after the printer unit 403 prints, and the printed materials are discharged from the inside of the main body by the discharge rollers 717 and stacked on the delivery tray 722. That is, the sheet bundle 2600 is a job output result on the delivery tray 722 after all processes executed by the apparatus 101 for the job are completed. When a job for which the first mode is set is to be processed, the controller unit 402 controls the printing system including the printing apparatus 101 so as to obtain this output result.

Figure 32:
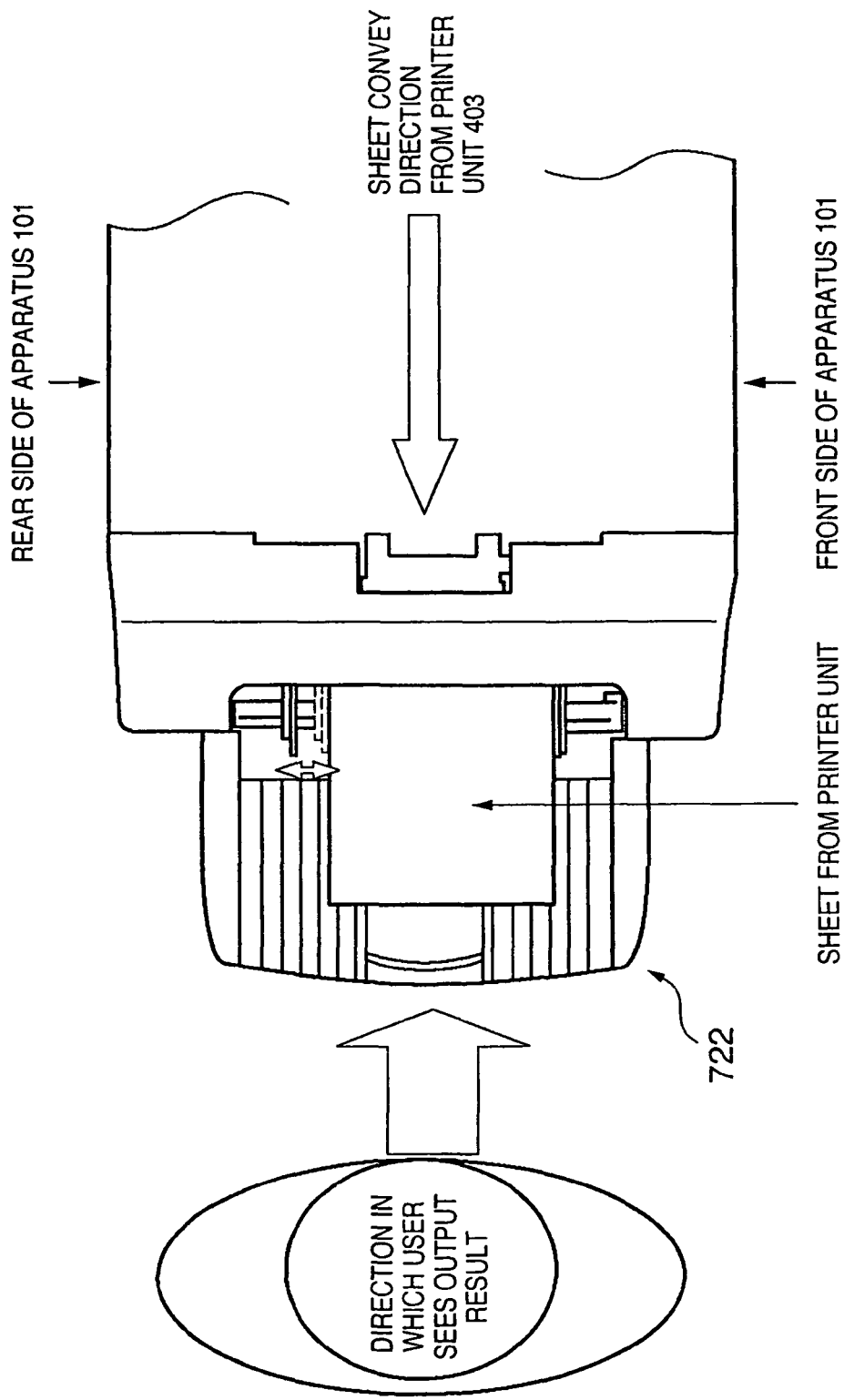
FIG. 32 is a plan view for explaining a control example in the embodiment.

The sheet bundle 2600 in FIG. 27 is an output result when an output bundle stacked on the delivery tray 722 of the printing apparatus 101 in FIG. 7 is viewed from the left of the front view of the apparatus 101 in FIG. 7. This state of the delivery tray 722 is shown in FIG. 32. FIG. 32 shows the state of the delivery tray 722 when the printing apparatus 101 is viewed from the top. The near side in FIG. 32 is the front of the apparatus 101, and the far side is the back of the apparatus. In the sheet convey direction from the printer unit 403, the right is the upstream side, and the left is the downstream side. The sheet bundle 2600 in FIG. 26 corresponds to a stacking state on the delivery tray 722 when the sheet bundle 2600 is viewed from a direction in which the user watches the output result in FIG. 32. Note that sheet bundles in FIGS. 27 to 31 are also expressed from the direction shown in FIG. 32.

By the above-described method, the controller unit 402 accepts a printing execution request for a job for which the operator sets job process conditions including the setting of the first mode as described in case 1 in FIG. 26. When the controller unit 402 causes the apparatus 101 to execute a job for which the first mode is set, it controls the printing system including the printing apparatus 101 so as to execute a sorting process for the job and obtain the sheet bundle 2600 in FIG. 26.

For example, as shown in FIG. 26, the controller unit 402 prints 50 copies of 4-page document data of job A by single-sided printing. In the printing process of job A, the controller unit 402 prints the first to fourth document pages of job A on four A4-size plain paper sheets each 0.1 mm thick by single-sided printing. The controller unit 402 defines these sheets as one set, and repetitively prints the document data at a total printout count of 50 sets which is set by the operator. As a result, 50 copies are printed.

The condition set by the operator for job A is the first mode. In other words, job A is a "job requiring printing of plural copies in total and a printed material classification process corresponding to the first mode". The controller unit 402 controls the printing system including the printing apparatus 101 so as to stack printed materials of job A printed by the printer unit 403 on the delivery tray 722 while classifying them every sheet bundle of one copy.

The printing apparatus 101 in the third embodiment comprises a function of storing a series of job print data of pages sequentially from the first page in the hard disk of the memory 405, reading out the print data from the first page, and printing sequentially from the first page. The printing apparatus 101 also comprises a function of reversing and delivering (face-down delivery) printed sheets, and stacking them sequentially from the output sheet of the first page at the delivery portion.

In this manner, the printing apparatus 101 in the third embodiment can process the first page of data to be printed. This configuration can shorten FCOT (First Copy On Time) or FPOT (First Print On Time) and increase the productivity of the entire job. In order to establish page order matching in executing this method, all sheets from the printer unit 403 are stacked on the delivery tray 722 with their image forming surfaces facing down. In other words, sheets (synonymous with print media) are sequentially stacked on the delivery tray 722 while printed surfaces face down on which print results corresponding to odd-numbered page data of print data are printed.

In FIG. 26, the first sheet bundle (P1 to P4) is stacked on the delivery tray 722 while all page image forming surfaces face down (face-down state) and sheet P1 bearing the first page image of the job is stacked at the bottom. Sheet P2 bearing the second page image, sheet P3 bearing the third page image, and sheet P4 bearing the fourth page image are sequentially stacked on sheet P1. This also applies to the second and subsequent copies. A total of 50 sets each formed from a 4-sheet bundle are output. However, the page order and whether to perform face-down delivery need not particularly be mentioned. For example, for an apparatus which prints from the last page, an output sheet of the last page may be stacked at the bottom at the delivery portion while the image forming surface faces up. The configuration suffices to execute at least the following control in the first mode.

The controller unit 402 controls the printing system including the printing apparatus 101 so that printed materials of a job for which the first mode is set are stacked in the stacking state as illustrated in FIG. 26. As shown in the control example of FIG. 26, the controller unit 402 controls to stack a sheet bundle of four sheets P1 to P4 of the first copy of the job and a sheet bundle of four sheets P1 to P4 of the second copy with a shift on the delivery tray 722. Also, the controller unit 402 controls to stack sheet bundles of the second and subsequent copies of the job with a shift every each copy on the delivery tray 722. In this specification, "stacking printed materials with a shift" means "executing stacking of printed materials on the stacking unit of the printing system while shifting them". That is, printed materials are stacked in the stacking state as shown in FIGS. 26, 29, 30, 31, 36, or the like.

In the above example, sheets (synonymous with printed materials) belonging to the first group which previously undergoes a printing process, and sheets belonging to the second group which undergoes a printing process subsequent to the first group exist in a series of process steps for the same job A. The controller unit 402 causes the printing system including the printing apparatus 101 to execute a printed material classification process so as to stack printed materials belonging to the first group and those belonging to the second group in the same job on the stacking unit while classifying the printed materials every group.

In the control example of FIG. 26, a job to be processed requires printing of plural copies in total, and the first mode is set for the job among a plurality of sheet process modes executable by the apparatus 101. In this case, as shown in the control example of FIG. 26, the controller unit 402 causes the apparatus 101 to execute the classification process before the printer unit 403 completes printing of a sheet bundle of one copy in a printing process for copies of the job. This configuration provides the stacking result of the sheet bundle 2600 on the delivery tray 722, which corresponds to a state after all printed materials of the first to 50th copies are stacked on the delivery tray 722, as shown in FIG. 26. That is, an output result of classifying printed materials of job A every copy is obtained as the stacking result of them on the delivery tray 722.

In the third embodiment, the state in which sheets are classified means a state in which the user can grasp a break between sheets when taking out, from the delivery portion, materials printed out from the apparatus 101. In the example of FIG. 26, a sheet bundle of the first copy and that of the second copy are stacked with a shift. This also applies to sheet bundles of the second and subsequent copies. Thus, the user can recognize the break of sheets of each copy.

In the third embodiment, as shown in FIG. 26 and FIGS. 27 to 30 (to be described later), a shift delivery process can be executed as one method of the classification process performed by the apparatus 101 under the control of the controller unit 402. According to this process, a bundle of sheets belonging to the same group and that of sheets belonging to another group are stacked with a shift on the same delivery tray. The shift delivery process will be explained with reference to FIGS. 33 and 34.

In the following description, the sheet processing apparatus 720 in FIG. 2 has a configuration shown in FIGS. 33 and 34.

FIG. 33 is a sectional view showing the sheet processing apparatus 720 when viewed from the front. A job sheet printed by the printer unit 403 is conveyed by the discharge rollers 717 and introduced into a convey path 3301 in the sheet processing apparatus 720. The sheet is temporarily stacked on a process tray 3302 in the sheet processing apparatus 720.

After all sheets to be stacked as sheets of one group are stacked on the process tray 3302, the sheet bundle can be stapled by a stapler 3303. After the completion of processing one bundle, the sheet bundle can be discharged onto the delivery tray 722.

For the job in FIG. 26, one bundle is made up of a total of four sheets P1 to P4. For this job, execution of a stapling process is not designated.

When sheets of this job are to be processed, the printer unit 403 prints data of the first to fourth pages sequentially from the first page, outputting the first copy. Sheets P1 to P4 of the first copy that are introduced into the convey path 3301 sequentially from the first sheet of the sheets of the first copy are stacked on the process tray 3302 sequentially from the first page with their image forming surfaces facing down.

When the fourth sheet P4 corresponding to the last sheet of the current copy is stacked on the process tray 3302, an alignment unit 3304 executes an alignment process to neatly align the edges of the bundle of sheets of the first copy. As a result, sheets P1 to P4 are aligned as one output bundle.

After the alignment unit 3304 executes the alignment process, sheets P1 to P4 of the first copy are discharged from the sheet processing apparatus 720 by a push member 3305 while keeping them as one output bundle. Then, the sheet bundle of the first copy is stacked on the delivery tray 722.

A delivery process for each sheet bundle of sheets will be called a bundle delivery process. Note that the delivery tray 722 is vertically movable. The delivery tray 722 can be moved down every time a predetermined number of sheets are stacked, and moved up when the user removes a sheet from the delivery tray 722. In other words, the distance between the sheet stacking surface of the delivery tray 722 and the delivery port from which a sheet is discharged from inside to outside the sheet processing apparatus 720 can be kept constant.

This configuration can prevent problems: for example, the delivery tray 722 is positioned at a height at which no delivered sheet can be stacked on the delivery tray 722, or the delivery tray 722 exists at an excessively low position and cannot stably support a delivered sheet.

In the example of FIG. 26, after the bundle discharge process for a sheet bundle of the first copy from the process tray 3302 to the delivery tray 722 is completed, the delivery process for a sheet bundle of the second copy is executed on the process tray 3302.

At this time, a sheet shift process is executed as the classification process. The sheet shift process will be explained with reference to FIG. 34.

Figure 34:
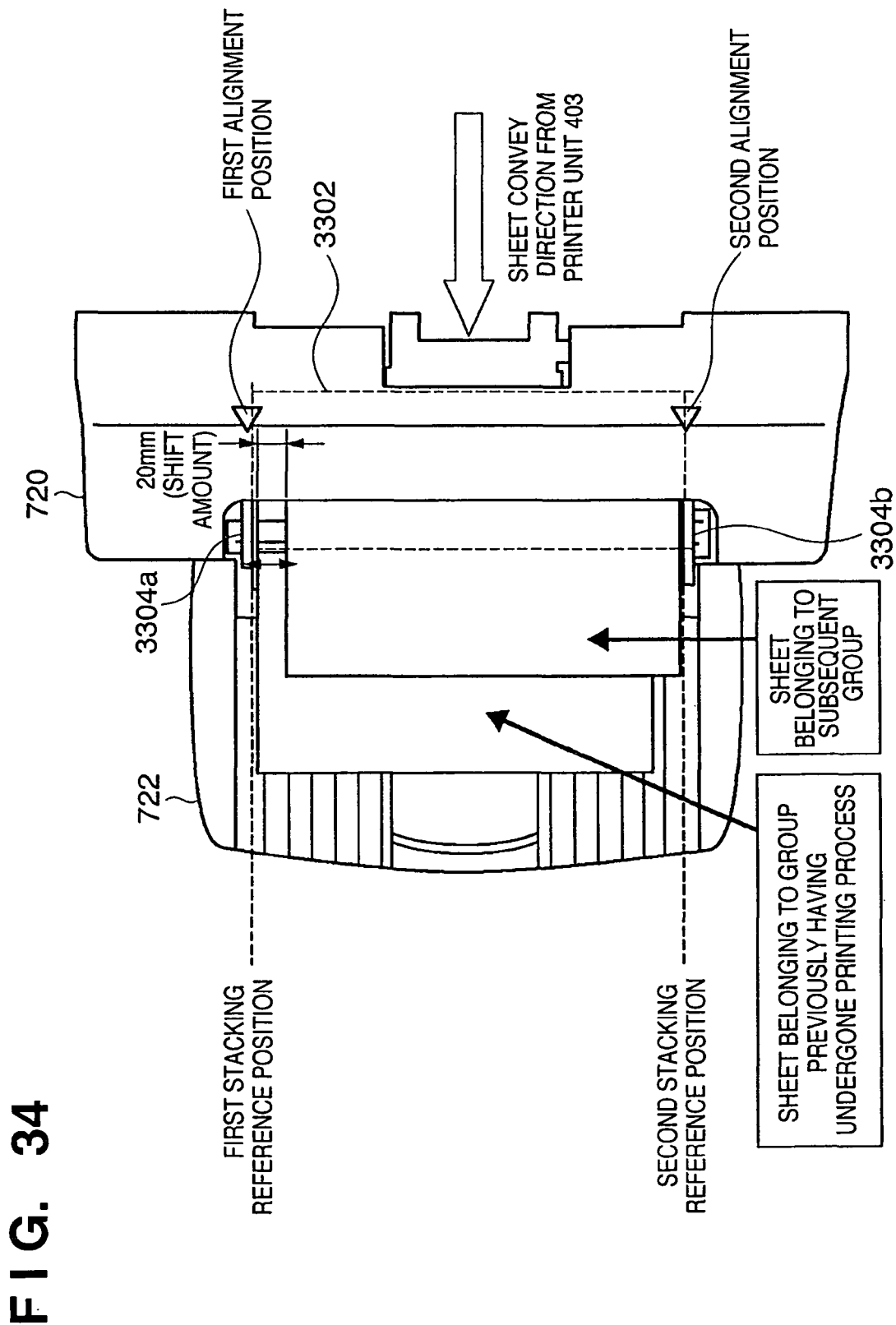
FIG. 34 is a plan view for explaining a control example in the embodiment.

FIG. 34 is a view showing part of the sheet processing apparatus 720 near the delivery tray 722 when viewed from the top, similar to FIG. 32. As shown in FIG. 33, the process tray 3302 exists on the sheet convey path within the sheet processing apparatus 720. The bird's eye view of FIG. 34 cannot directly show the process tray 3302. Thus, in FIG. 34, the process tray 3302 is represented in a dotted line to exhibit the presence of the process tray 3302 in the apparatus.

FIG. 34 is a view for explaining a state during the process of a job. More specifically, FIG. 34 shows a state after sheets of a group previously having undergone a printing process are stacked on the delivery tray 722 for a job to be processed. FIG. 34 also shows a state in which sheets of a group subsequent to the preceding group are currently stacked on the process tray 3302. In this state, the process tray 3302 is to execute a sheet shift process and bundle delivery process for the subsequent group.

If a sheet bundle stacked on the delivery tray 722 shown in FIG. 34 is that of the first copy in the sheet bundle 2600 shown in FIG. 26, sheets stacked on the process tray 3302 shown in FIG. 34 are those of the second copy in FIG. 26.

As shown in FIG. 33, the process tray 3302 comprises the two alignment units 3304, alignment units 3304a and 3304b in FIG. 34. The alignment units 3304a and 3304b can move in a direction perpendicular to the sheet convey direction shown in FIG. 34, and operate independently and alternatively.

For example, a sheet bundle of the first copy of the job in FIG. 26 is aligned on the process tray 3302 so as to align the far edges of sheets of the sheet bundle to the first alignment position serving as a reference in FIG. 34. The aligned sheet bundle of the first copy is delivered from the process tray 3302 to the delivery tray 722, and stacked at the first stacking position serving as a reference on the delivery tray 722. When the sheet bundle of the first copy is processed in this fashion, the controller unit 402 processes a sheet bundle of the second copy of the job as follows.

The alignment unit 3304 aligns sheets of the second copy of the job so as to align the near edges of the sheets to the second alignment position serving as a reference. For example, the alignment unit 3304b is fixed at a position shown in FIG. 34. While this state is maintained, the alignment unit 3304a is moved toward the alignment unit 3304b so as to make the near edges of the bundle of the sheets of the second copy abut against the alignment unit 3304b. Consequently, the sheet bundle of the subsequent group shifts to the second alignment position, as shown in FIG. 34.

Thereafter, the sheet bundle is delivered from the process tray 3302 to the delivery tray 722. The sheet bundle of the second copy can be stacked on the delivery tray 722 while the near edges of the sheets are aligned at the second stacking reference position.

By performing the series of processes, the stacking state as shown in FIG. 26 is achieved. That is, sheet bundles of the first and second copies are stacked on the delivery tray 722 with a shift from each other by a predetermined length in a direction perpendicular to the sheet convey direction. Referring to FIG. 34, the shift amount of each sheet bundle shown in FIG. 26 is 20 mm.

In processing a sheet bundle of the third copy corresponding to sheets of a group to be processed immediately after the sheet bundle of the second copy stacked at the second stacking reference position serving as a reference, the same bundle delivery process as that for processing the sheet bundle of the first copy is executed. More specifically, the sheet processing apparatus 720 is operated to stack the sheet bundle of the third copy on the delivery tray 722 at the first stacking reference position serving as a reference.

In processing a sheet bundle of the fourth copy corresponding to sheets of a group to be processed immediately after the sheet bundle of the third copy stacked at the first stacking reference position serving as a reference, the same bundle delivery process as that for processing the sheet bundle of the second copy is executed. More specifically, the sheet processing apparatus 720 is operated to stack the sheet bundle of the fourth copy on the delivery tray 722 at the second stacking reference position serving as a reference. In this way, every time a sheet bundle of one group is processed, the sheet stacking position on the delivery tray 722 is alternately switched.

The controller unit 402 controls the sheet processing apparatus 720 so as to execute this process for all sheet bundles to be processed in the job. Sheet bundles can be stacked while the stacking position of a sheet bundle of a preceding group on the delivery tray 722 and that of a sheet bundle of an immediately succeeding group on the delivery tray 722 in a job to be processed are shifted at a predetermined interval. The sheet bundle 2600 in the stacking state as shown in FIG. 26 can therefore be obtained.

As described above, the first mode among a plurality of sheet process modes is set by the user via the user interface unit for a job to be processed. In response to this setting, the controller unit 402 controls the printing system so as to attain an output result such as the sheet bundle 2600 shown in FIG. 26. As described above, the printing system means only the main body of the printing apparatus 101, the overall apparatus including both the printing apparatus 101 and sheet processing apparatus 720, or either of them.

When the first mode is set for a job to be processed, the controller unit 402 controls the printing system so that sheets of the job from the printer unit 403 are stacked on the stacking unit such as the delivery tray 722 while they are classified every sheet bundle of one copy. In the third embodiment, this control is defined as and called the first sequence.

By executing the first sequence, the apparatus 101 can provide high value which matches even the office environment. For example, a user wants to distribute a 4-page meeting material to 50 members of his department in the office. In this case, the user makes settings as represented by case 1 in FIG. 26, and can obtain the sheet bundle 2600 in which breaks between copies are clear, as shown in FIG. 26. The user can smoothly distribute the meeting material to all the members.

The relationship between the above-described [first type instruction information] to [third type instruction information] and the first sequence described using the control example in FIG. 26 will be explained additionally.

As described above, all [first type instruction information] to [third type instruction information] correspond to examples of [instruction information which considers a post-process necessary after a printing process in a job requiring the printing process by the printing apparatus 101]. In the third embodiment, instruction information corresponding to at least one of these types of instruction information can be explicitly input by the operator for each job via the UI unit disclosed in the third embodiment.

For example, in the third embodiment, the controller unit 402 executes the first sequence shown in the control example of FIG. 26 for a job to be processed on condition that all the following conditions are satisfied.

(Condition 1) The job to be processed is one for which the operator requests execution of printing via the UI unit without inputting any of the first type instruction information, second type instruction information, and third type instruction information via the UI unit in the third embodiment.

(Condition 2) The job to be processed is one for which the operator inputs, via the UI unit, instruction information to classify printed materials every printed materials of one copy, and requests execution of printing via the UI unit.

In the third embodiment, a job which satisfies both (condition 1) and (condition 2) is a "job which requires printing of copies and for which the operator explicitly designates 'every copy' in the "every copy" button 1202 of the display of FIG. 12". Alternatively, this job is a "job which requires printing of copies and for which the operator designates 'every copy' in the "every copy" button 2002 of the display of FIG. 20". If the job to be processed is either of the above-mentioned jobs, the controller unit 402 executes the first sequence as shown in the control example of FIG. 26. As is apparent from the description, in the third embodiment, "instruction information from the operator to stack printed materials while classifying them every printed materials of one copy" is not "instruction information which considers a post-process necessary after a printing process in a job requiring the printing process by the printing apparatus 101". In other words, explicit instruction information which is input from the operator via the "every copy" button 1202 or 2002 is not "instruction information which considers a post-process necessary after a printing process in a job requiring the printing process by the printing apparatus 101". The above-described [first type instruction information] to [third type instruction information] and the first sequence have this relationship.

The printing system disclosed in the third embodiment can execute the above control, and can also execute control which assumes the following environment so as to flexibly meet various needs from various users.

The control described with reference to

FIG. 26 mainly matches the office environment. On the contrary, control which satisfactorily deals with the POD environment can also be executed.

The POD environment to be described later assumes the following environment. For example, a print service company which purchased the apparatus 101 is requested by a customer (to be referred to as customer A hereinafter) to quickly print out 50 copies of a 4-page document with A4-size plain paper sheets by single-sided print setting. The customer does not request any more printing process condition. In order to fulfill the customer's request, the print service company may process this job (to be referred to as job B hereinafter) by giving priority to delivery (short delivery period). In this situation, the controller unit 402 can execute the following control for an operator who operates the apparatus 101 in the print service company. FIG. 27 shows an example of this control.

Case 2 shown in FIG. 27 has the same job process conditions as those of case 1 in FIG. 26 except that the sorting method is different from that in case 1 in FIG. 26. In case 2 shown in FIG. 27, as the sorting method, the second mode is set as a sheet process mode by the user for job B to be processed.

For example, if a 4-page document is received as a paper document from customer A, an operator (to be referred to as operator A hereinafter) who processes job B of customer A utilizes the scanner unit 401 of the apparatus 101 in order to fully exploit the apparatus 101. That is, image data of job B is input from the scanner unit 401 of the apparatus 101. Operator A sets the process conditions of job B via the operation unit 404 of the apparatus 101 serving as an example of the user interface unit in the third embodiment.

The controller unit 402 controls to accept process conditions corresponding to the job process conditions in case 2 of FIG. 27 from the operator via, e.g., the window of FIG. 10 displayed on the display unit 605 of the operation unit 404. When operator A sets OFF execution of a classification process in the third embodiment with the sorter key 1009 in the window of FIG. 10, the controller unit 402 determines that the second mode is set for the job to be processed.

In the second mode, it is inhibited to stack sheets of a job to be processed on the stacking unit while classifying them, as represented by the sheet bundle in FIG. 26 and sheet bundles in FIGS. 29 to 31 (to be described later). That is, sheets of a job to be processed are stacked on the stacking unit without classifying them.

For example, if a 4-page document is received as electronic data from customer A, the operator (to be referred to as operator A hereinafter) who processes job B of customer A inputs the job into the apparatus 101 by using the computer of the system. In this case, for example, image data of job B is input from the client PC 1603 in FIG. 16. Operator A sets the process conditions of job B via the display unit of a host computer serving as an example of the user interface unit of the third embodiment.

When the printer driver of the apparatus 101 is activated in the client PC 1603, the control unit of the client PC 1603 displays the window of FIG. 18 on the display unit of the client PC 1603. The control unit controls to accept process conditions corresponding to the job process conditions in case 2 of FIG. 27 from operator A via, e.g., the window of FIG. 18 displayed on the display unit of the client PC 1603. When operator A sets OFF execution of a classification process in the third embodiment with the sorting method selection key 1801 in the window of FIG. 18, the control unit of the PC transmits data of job B in FIG. 27 as job in the second mode to the apparatus 101. When the apparatus 101 receives the data, the controller unit 402 analyzes the job data to be processed, and determines that the second mode is set for job B.

When the second mode is set as a sheet process mode for job B to be processed, as represented by case 2 in FIG. 27, the controller unit 402 controls the printing system so as to obtain a sheet bundle 2700 in FIG. 27. In other words, job B is a "job in which all printed materials of the job to be processed need to be stacked on the stacking unit without executing any classification process". The controller unit 402 controls the printing system including the printing apparatus 101 so as to execute the following operation in a series of printing processes of job B.

For example, as the printing process of job B, the controller unit 402 prints document data of the first to fourth pages of job B page by page on four A4-size plain paper sheets each 0.1 mm thick by single-sided printing. The controller unit 402 defines these sheets as one set, and repetitively prints job B at a total printout count of 50 sets which is set by operator A. As a result, 50 copies of job B are printed. Note that the second mode is set for job B. That is, for job B, all printed materials of the job to be processed need to be stacked on the stacking unit without executing any classification process.

For this reason, the controller unit 402 inhibits the alignment unit 3304 from executing the shift operation as shown in FIG. 26 for sheets of job B that are introduced from the printer unit 403 into the convey path 3301 of the sheet processing apparatus 720. The controller unit 402 directly delivers sheets of job B from the printer unit 403 onto the delivery tray 722 via the process tray 3302 without executing any shift operation.

In order to prevent collapse of printed materials, a sheet stacking process is executed so that the edges of all sheets are aligned at either of the first and second stacking reference positions on the delivery tray 722. In this way, the controller unit 402 controls the apparatus 101 to execute an operation for job B.

The stacking state (stacking result) of printed materials of job B on the delivery tray 722 is an output result as represented by the sheet bundle 2700 in FIG. 27. The job is processed so that all sheets of 50 copies set by operator A are stacked on the delivery tray 722 without classifying them even at breaks between copies.

The reason why a series of control operations (to be referred to as the second sequence hereinafter) in the second mode can satisfy the customer's request described above is that the sheet bundle 2700 in FIG. 27 need not undergo any sheet classification process, unlike the sheet bundle 2600 in FIG. 26. In order to obtain the sheet bundle 2600 in FIG. 26, sheet bundles must be shifted 49 times by way of the process tray 3302.

In contrast, the sheet bundle 2700 in FIG. 27 can be obtained without executing any shift operation. Since the sheet shift operation can be omitted, job B is output more quickly than the job in FIG. 26. That is, job B in FIG. 27 can be processed at higher productivity in a shorter delivery period than job A in FIG. 26.

In this manner, the system including the apparatus 101 in the third embodiment can also execute the second sequence. This configuration is one mechanism for obtaining the above effects of coping with various situations and flexibly satisfying various needs from various users.

The relationship between the above-described [first type instruction information] to [third type instruction information] and the second sequence described using the control example in FIG. 27 will be explained additionally.

As described above, all [first type instruction information] to [third type instruction information] correspond to examples of [instruction information which considers a post-process necessary after a printing process in a job requiring the printing process by the printing apparatus 101]. In the third embodiment, instruction information corresponding to at least one of these types of instruction information can be explicitly input by the operator for each job via the UI unit disclosed in the third embodiment.

For example, in the third embodiment, the controller unit 402 executes the second sequence shown in the control example of FIG. 27 for a job to be processed on condition that all the following conditions are satisfied.

(Condition 1) The job to be processed is one for which the operator requests execution of printing via the UI unit without inputting any of the first type instruction information, second type instruction information, and third type instruction information via the UI unit in the third embodiment.

(Condition 2) The job to be processed is one for which the operator requests execution of printing via the UI unit without inputting, via the UI unit, even instruction information to classify printed materials every printed materials of one copy.

In the third embodiment, a job which satisfies both (condition 1) and (condition 2) is a job for which the operator requests execution of printing via the operation unit 404 without inputting any instruction information from the operator even from, e.g., any of the displays in FIGS. 11 to 13. Also, this job is a job for which the operator requests execution of printing via the UI unit of the client PC 1603 without inputting any instruction information from the operator even from, e.g., any of the displays in FIGS. 19 to 21. If the job to be processed is either of these jobs, the controller unit 402 executes the second sequence as shown in the control example of FIG. 27. Assume that the operator does not input either "instruction information which considers a post-process necessary after a printing process in a job requiring the printing process by the printing apparatus 101" or "instruction information from the operator to stack printed materials while classifying them every printed materials of one copy". In this case, as represented by the second sequence in FIG. 27, the controller unit 402 stacks all printed materials of a job to be processed on the stacking unit while inhibiting classification of the printed materials. The above-described [first type instruction information] to [third type instruction information] and the second sequence have this relationship.

The third embodiment is premised on the above configuration. Considering the current situation and future development of the POD environment, the following control can also be executed to fully exhibit the above-described effects when the system is put into practical use.

For example, a print service company which introduces the apparatus 101 is requested by a given company client (to be referred to as customer B hereinafter) to output 50 copies of 4-page document data with A4-size plain paper sheets by single-sided print setting. These printing process conditions are the same as those of a job in case 1 of FIG. 26 or case 2 of FIG. 27.

In addition to the above conditions, customer B further designates the following condition. For example, customer B requests that printouts for customer B are stored in a packing member prepared by the print service company and delivered as a final material to customer B. An example of a sheet storage box applicable as an example of the packing member is a sheet storage box A 2800 shown in FIG. 28. Customer B does not make any more request.

Figure 28:
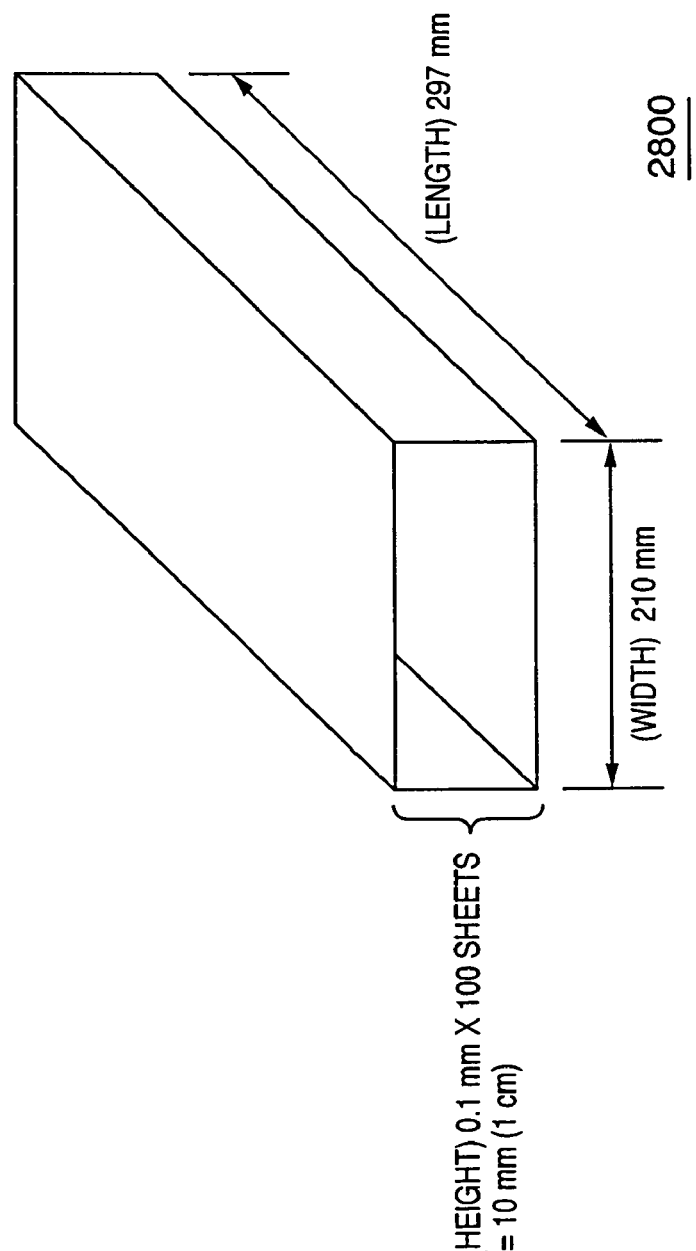
FIG. 28 is a view for explaining a control example in the embodiment.

The sheet storage box A 2800 has a shape and the like as shown in FIG. 28. Numerical values shown in FIG. 28 mean the internal volume of the sheet storage box A 2800, and the size is 297 mm in length, 210 mm in width, and 10 mm in height. As shown in FIG. 28, the sheet storage box A 2800 has a capacity of up to 100 A4-size sheets each 0.1 mm thick.

The third embodiment assumes a situation in which an operator (to be referred to as operator B hereinafter) who processes a job (to be referred to as job C hereinafter) of customer B having the series of process conditions takes out, from the delivery tray 722, a sheet bundle of job C which is printed by the printer unit 403 and stacked on the delivery tray 722, and manually packs the sheet bundle in the sheet storage box A 2800 of FIG. 28.

This work corresponds to an example of a post-process step executed by the image forming system which receives attention in the third embodiment. The reason why this work is called a post-step in the third embodiment is that it is described in association with a printing process by the printer unit 403 of the apparatus 101. For example, a series of work steps (also called a workflow) including a plurality of process steps to be executed by the system for job C requires at least the sheet storage step by the operator using a sheet storage box. The sheet storage step by the operator using a sheet storage box is a post-step (post-process) which must be executed after a printing process step by the printer unit 403 of the apparatus 101.

The printing system including the printing apparatus 101 in the third embodiment can deal with even such a situation. FIG. 29 is a view for explaining an example of the configuration.

A sheet bundle of job C is made up of all A4-size sheets, and the total number of sheets is 4 pages×50 copies=200 sheets. The thickness of one sheet is 0.1 mm, and thus the thickness (height) of the whole sheet bundle of job C is 200×0.1 mm=20 mm (2 cm). The size of the whole sheet bundle of job C is 297 mm In length, 210 mm in width, and 20 mm in height.

As is apparent from a comparison between the entire sheet bundle of job C, the sheet storage box A 2800 shown in FIG. 28, and the sheet capacity of one box, all the sheets of the sheet bundle of job C cannot be stored in one sheet storage box A 2800. In this example, two sheet storage boxes A 2800 are necessary.

In this situation, a post-step (post-process) by intervention work of operator B is needed after all the sheets of job C for which a printing step is to start are stacked on the delivery tray 722. For example, operator B divides the sheet bundle of job C into two sheet bundles each of 25 copies. Then, the two sheet bundles must be separately stored in the two sheet storage boxes A 2800. Job C requires a post-process by intervention work of the operator after the printing process of job C by the printing apparatus 101.

In this case, if the printing process of job C is executed in the first sequence described with reference to FIG. 26, the following work is required of operator B.

For example, the sheet bundle 2600 in FIG. 26 is an output material generated by the apparatus 101 by executing control of stacking sheets of a job to be processed on the delivery tray 722 while shifting them every sheets of one copy. Operator B eliminates the shifts of the sheets of the sheet bundle 2600 so as to align the edges of the sheets of the sheet bundle 2600 taken out from the delivery tray 722. Then, operator B divides the sheet bundle 2600 so as to store the sheets in the two sheet storage boxes A 2800. At this time, operator B counts sheet bundles of 25 copies. Operator B sorts the sheet bundle 2600 to bring sheet bundles of the first to 25th copies together into a sheet bundle of the first group and those of the 26th to 50th copies together into a sheet bundle of the second group. The series of intervention work operations by operator B is needed.

Through the series of intervention work operations by operator B, operator B stores the sheet bundles sorted into two groups in the two sheet storage boxes A 2800.

In order to obtain the final material of job C, the post-process step, i.e., the sheet storage process by operator B using the sheet storage boxes A 2800 in FIG. 28 must be executed in the system in a series of process steps of job C.

If the controller unit 402 executes the first mode (first sequence) for job C, similar to the above-mentioned control example of FIG. 26, the series of intervention work operations by operator B occurs in performing the post-process step by operator B. The series of intervention work operations is, e.g., "work to align sheet bundles which are shifted every copy work to divide one sheet bundle 2600 into two sheet bundles each formed from sheets of 25 copies in order to store the sheet bundle 2600 in two boxes".

Even if the controller unit 402 causes the apparatus 101 to execute the second mode (second sequence) for job C, similar to the above-mentioned control example of FIG. 27, the series of intervention work operations is also required in performing the post-process step by operator B.

This is because, for example when the second mode (second sequence) is selected, the controller unit 402 controls the apparatus 101 to inhibit stacking of sheets of a job to be processed on the delivery tray 722 while classifying them, and to stack all the sheets on the delivery tray 722 while aligning them. Accordingly, an output material in FIG. 27 can be obtained.

For this reason, operator B need not align sheet bundles which are shifted every copy. Even in this case, however, operator B must divide one sheet bundle 2700 into two sheet bundles each formed from sheets of 25 copies in order to store the output material of job C in the two sheet storage boxes A 2800.

The third embodiment can minimize even such intervention work by the operator that may occur in the POD environment and the like. From this viewpoint, the third embodiment can achieve the effects of providing a printing system which can cope with various environments, flexibly meet various needs from various users, and targets future digital printing systems.

As a concrete configuration for this purpose, in the third embodiment, the controller unit 402 can execute control based on a post-step executed in a series of workflows necessary to obtain the final material of a job to be processed.

More specifically, in the third embodiment, the controller unit 402 causes the UI unit of the embodiment to execute a display for allowing the operator to explicitly input, for each job, instruction information which considers a post-process necessary after a printing process in a job requiring the printing process by the printing apparatus 101. On the premise of this configuration, a job which is accepted by the system and is to be processed is not one for which no instruction information is input by the operator via the display, but one for which the instruction information is input by the operator via the display. In this case, the controller unit 402 inhibits stacking, on the stacking unit of the system, of printed materials of the job for which the instruction information is input by the operator while the printed materials are classified every printed materials of one copy. Further in this case, the controller unit 402 stacks, on the stacking unit, printed materials of the job for which the instruction information is input by the operator while the printed materials are classified on the basis of the instruction information input by the operator for the job. In this fashion, the controller unit 402 controls the printing system having the printing apparatus 101.

An example of this control is the third sequence executed by the apparatus 101 when the user selects the third mode from a plurality of sheet process modes, which will be explained with reference to FIG. 29.

Figure 29:
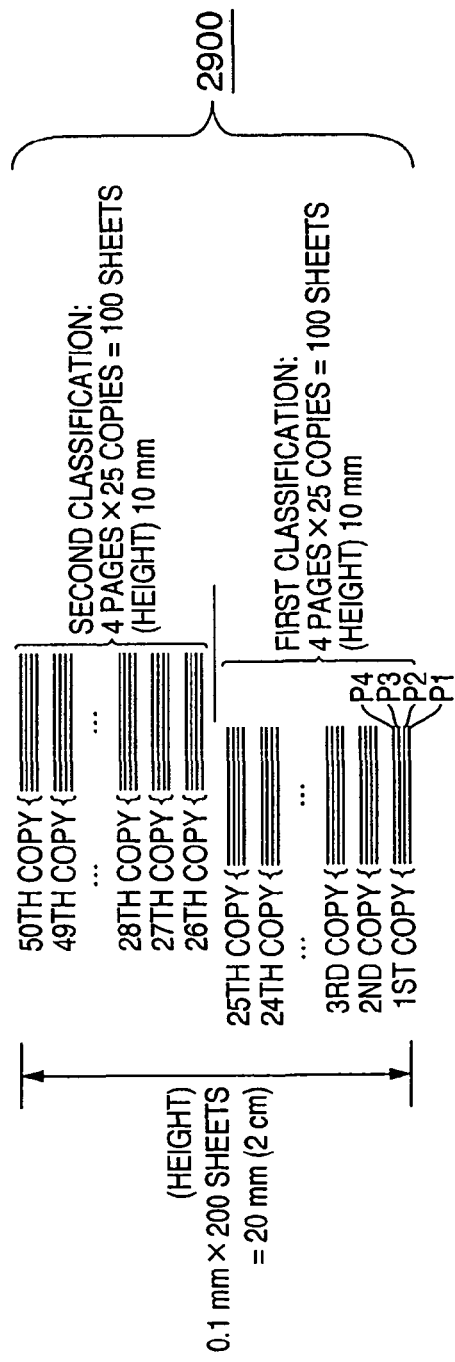
FIG. 29 is a view for explaining a control example in the embodiment.

In the third mode illustrated in FIG. 29, sheets of a job to be processed can be stacked on the delivery tray 722 serving as an example of the sheet stacking unit while they are classified in a unit based on a post-process step executed in the job.

Case 3 shown in FIG. 29 has the same job process conditions as those shown in FIGS. 26 and 27 except the sorting method (sheet process mode).

When operator B processes job C, the third mode is set for job C, and the apparatus 101 executes a printing process for job C. As a result, a sheet bundle 2900 shown in FIG. 29 can be obtained. The sheet bundle 2900 in FIG. 29 means the final stacking state (stacking result) of printed materials of job C on the delivery tray 722.

As one feature associated with the third mode, the third embodiment can also deal with an off-line post-step, and further a near-line post-step (to be described later) at the work site in a printing environment such as the POD environment where the printing system having the printing apparatus 101 is installed.

The off-line post-step described in the third embodiment is defined on the basis of the printing apparatus 101. For example, a sheet storage process (box packing work) in the sheet storage box A 2800 of FIG. 28 corresponds to an example of the off-line post-step because the sheet storage box A 2800 in FIG. 28 is an example of a unit capable of storing sheets. The sheet storage box A 2800 is an example of a post-processing unit which is electrically and physically disconnected from the apparatus 101.

Electrical disconnection also means that no data communication can be established between two units. Physical disconnection also means that a post-processing unit is not mechanically connected to the apparatus 101. Connection does not mean only a state in which two units are not spaced apart from each other but are coupled to each other. Disconnection means a state in which sheets conveyed from the printer unit 403 by the discharge rollers 717 of the apparatus 101 cannot be accepted without the mediacy of any manual work by the operator.

On the basis of this concept, the third embodiment discriminates a plurality of types of post-processing units disclosed in the embodiment as follows, and can cope with any type of post-processing unit.

For example, the sheet processing apparatus 720 will be called an on-line post-processing unit with reference to FIG. 7. The sheet processing apparatus 720 can internally communicate data with at least the image forming apparatus 101. For example, the sheet processing apparatus 720 communicates data such as sheet presence/absence detection information to the controller unit 402 between an internal unit such as the controller unit 402 of the apparatus 101 and an internal unit such as the sensor (not shown) of the sheet processing apparatus 720. The controller unit 402 communicates, to the internal controller of the sheet processing apparatus 720, a control signal for controlling the operation of the sheet processing apparatus 720. That is, the sheet processing apparatus 720 and controller unit 402 are electrically connected to each other.

In addition, the sheet processing apparatus 720 is a post-processing apparatus which can be coupled to the apparatus 101, and directly accept sheets from the printer unit 403 of the apparatus 101 via the discharge rollers 717 without the mediacy of intervention work by the operator. That is, the sheet processing apparatus 720 and apparatus 101 are physically connected to each other.

Hence, the sheet processing unit is called an on-line post-processing unit in the third embodiment. The sheet processing unit is called an in-line post-processing unit because the path for conveying a sheet from the printer unit 403 runs between the sheet processing unit and the apparatus 101. As described at the beginning of the third embodiment, the sheet processing apparatus 720 of the printing system corresponds to an example of an in-line type post-processing unit.

On the contrary, the sheet storage box A 2800 in FIG. 28 is an example of an off-line post-processing unit. As described above, the sheet storage box A 2800 is a post-processing unit capable of storing sheets printed by the printer unit 403. However, the sheet storage box A 2800 corresponds to a post-processing unit which is neither electrically nor physically connected to the printing apparatus 101. Also as described at the beginning of the third embodiment, the sheet storage box A 2800 corresponding to an example of an off-line post-processing unit is an example of a non-in-line type post-processing unit.

As one feature, the printing system in the third embodiment comprises a post-processing unit defined as a near-line post-processing unit which is an intermediate unit between these two types of post-processing units exhibiting different properties. The third embodiment can deal with even a post-processing unit of this type. Examples of the near-line post-processing unit are cutting machines 1604 to 1606 in FIG. 16.

The cutting machines 1604 to 1606 can communicate data via a predetermined data communication medium with at least any external apparatus such as the printing apparatus 101 (1601) or the information processing apparatus (e.g., the server 1602 or client PC 1603).

For example, the cutting machines 1604 to 1606 can transmit, to an external apparatus via the network 1607, status information of the machines and various data such as device attribute data available as information to be stored in various management tables described above. Examples of the status information are information representing whether a sheet cutting process is executed, and information which notifies the external apparatus that an error occurs. Examples of the device attribute data are information for specifying which type of post-process is possible, and device-specific information (e.g., device name information) which can be recognized by the control unit of another apparatus. There are also pieces of post-process capability information such as information on the maximum number of sheets processible at once by one post-process and on the thickness of a sheet.

In this way, the cutting machines 1604 to 1606 in the third embodiment are electrically connected to another apparatus. However, the cutting machines 1604 to 1606 are not physically connected to the printing apparatus.

For example, the cutting machines 1604 to 1606 can perform a cutting process as a post-process for sheets of a job printed by the printer unit 403 of the image forming apparatus 101. However, the cutting machines 1604 to 1606 require intervention work by the operator in order to accept sheets of the job to be cut.

For example, the operator must take out a sheet bundle stacked on the delivery tray 722 and set it on the cutting machine.

In other words, the cutting machines 16Q4 to 1606 do not have any machine configuration capable of directly conveying sheets into the cutting machine from the printer unit 403 via the discharge rollers 717 of the image forming apparatus 101 without the mediacy of any operation by the operator (the cutting machines 1604 to 1606 are not in the in-line state).

For the above reason, in the third embodiment, a post-processing apparatus (e.g., the cutting machines 1604 to 1606) which is electrically connected to another apparatus but physically disconnected is defined as a near-line post-processing unit. "Near-line" means that the near-line post-processing unit is close to the on-line one. In the third embodiment, a post-process step using the near-line post-processing unit is called a near-line post-process. As described at the beginning of the third embodiment, the cutting machines 1604 to 1606 corresponding to an example of the near-line post-processing unit correspond to an example of a non-in-line type post-processing unit.

The third mode will be explained with reference to FIG. 29 on the basis of the above configuration. When the job to be processed is printed, the controller unit 402 controls the apparatus 101 so that it can execute the third mode on the basis of a setting instruction input from the operator via the user interface unit provided in the third embodiment.

Assume that document data of job C is input from the scanner unit 401. In this case, the controller unit 402 causes the display unit 605 of the operation unit 404 to display the window in FIG. 10. Through this window, the controller unit 402 accepts, from operator B, a series of printing process conditions shown in case 3 of FIG. 29, i.e., a series of process conditions concerning job C, such as the output paper size=A4 size, the paper type=0.1 mm-thick plain paper, the output copy count=50 copies, and the printing style=single-sided printing.

When the user presses the sorter key 1009, the controller unit 402 causes the display unit 605 to display the sorting method selection window in FIG. 11.

A sorting method for job C to be processed among a plurality of types of sorting method selection candidates can be accepted from operator B via the window in FIG. 11. In response to press of the "designate post-step" button 1103 in the window of FIG. 11, the controller unit 402 causes the display unit 605 to display the post-process mode window shown in FIG. 13.

In the third embodiment, when the post-process designation mode is selected, it is controlled to present the user via the user interface unit with post-process step selection candidates which can be designated in the image forming system for a job to be processed. Further, it is controlled to allow the user to designate a desired post-step from the selection candidates. As a post-step candidate selectable by the user, the selection candidates include even a post-step executed in the off-line state using an off-line post-processing unit as described above. In addition, a post-step in the near-line state using a near-line post-processing unit is also available as a post-step candidate selectable by the user. This configuration is also one mechanism for obtaining the above effects.

For example, in FIG. 13, List 1 for selecting a cutting process by the cutting machine 103 in FIG. 1 is displayed in the list as an example of a post-step using a near-line post-processing unit. Also, List 2 and List 3 for selecting box packing work (sheet storage process) using a sheet storage box are displayed in the list as examples of a post-step using an off-line post-processing unit. In this manner, the controller unit 402 controls the display unit 605.

Display items (selection candidates) in the list are controlled to reflect information registered in advance in the internal memory of the apparatus.

For example, the above-mentioned management table is prepared in the hard disk of the apparatus 101. Information on a post-step manually set by the operator is registered in the table data. Information received from a near-line post-processing unit via the network 104 is registered.

Note that information on the near-line post-processing unit can be automatically registered when the near-line post-processing unit is connected to the network 104. Alternatively, information acquisition request command data is transmitted from the apparatus 101 to the near-line post-processing unit. Various types of device information as described above which are transmitted from the near-line post-processing unit in response to the command data are received and can be automatically registered. Alternatively, the device information is spontaneously.

15. periodically transmitted by polling from the near-line post-processing unit to the apparatus 101, and can be automatically registered.

Information on the near-line post-processing unit may be registered by any method. The controller unit 402 controls the display unit 605 to execute a display based on the registered information.

When, for example, information on the sheet storage box A 2800 in FIG. 28 is registered as information on an off-line post-processing unit, the operator registers various types of information on the unit via the operation unit 404 in advance. As the registered information, the name, type, and capacity information of the unit as shown in FIG. 28 can be registered. In this example, the operator has registered in advance a box packing work step using the sheet storage box A 2800 in association with List 3 in FIG. 13.

The controller unit 402 causes the display unit 605 to display a list based on information registered in the memory in advance, as shown in FIG. 13.

In this configuration, assume that List 3 is selected from the list in FIG. 13 as the setting of job C to be processed by operator B. In this case, the controller unit 402 determines that job C undergoes a sheet storage process using the sheet storage box A 2800 as an off-line post-step after the whole sheet bundle is stacked on the delivery tray 722.

When operator B makes the series of settings and presses the start key 606 to input a printing start request, the controller unit 402 receives 4-page document image data of job C from the scanner unit 401. The controller unit 402 sequentially stores the data of job C in the hard disk of the memory 405, thereby accepting the data of job C.

Assume that document data of job C is input from the client PC 1603 in FIG. 16. In this case, the control unit of the client PC 1603 causes its display unit to display the printer driver window in FIG. 18, and accepts various printing process conditions represented in case 3 of FIG. 29 from operator B via the window. That is, the control unit of the client PC 1603 accepts a series of process condition parameters concerning job C, such as the output paper size=A4 size, the paper type=0.1 mm-thick plain paper, the output copy count=50 copies, and the printing style=single-sided printing.

When the user presses the sorting method selection key 1801, the control unit of the client PC 1603 causes its display unit to display the sorting method selection window in FIG. 19.

A sorting method for job C to be processed among a plurality of types of sorting method selection candidates can be accepted from operator B via the window in FIG. 19. In response to press of the "designate post-step" button 1903 in the window of FIG. 19, the control unit of the client PC 1603 causes its display unit to display the post-process mode window shown in FIG. 21.

Also in the window of the PC, a post-step by an off-line post-processing unit is set as a selection candidate. A post-step by a near-line post-processing unit is also set as a selection candidate. The list information may be acquired from the memory of the apparatus 101 or registered in the internal memory of the client PC 1603. In the window of FIG. 21, List 1 to List 3 correspond to steps by the cutting machines 1604 to 1606, respectively. The client PC 1603 can acquire information on a near-line post-processing unit from the near-line post-processing unit via the network 1607 directly or by way of the server 1602.

Assume that operator B designates box packing work using the sheet storage box A 2800 via the list in FIG. 21 displayed on the display unit of the client PC 1603, sets a series of printing conditions, and presses the print key 1803 in the window of FIG. 18. Then, the control unit of the client PC 1603 transmits the series of printing process conditions for job C as job data from the client PC 1603 to the image forming apparatus 101 together with 4-page image data of job C. When the apparatus 101 receives the data of job C from the client PC 1603, the controller unit 402 sequentially stores the data in the hard disk, completing acceptance of the data of job C.

By various methods described above, the controller unit 402 controls the printer unit 403 to print, on the basis of the process conditions of job C, data of job C that is stored in the hard disk of the image forming apparatus 101.

At the start of the printing process, the controller unit 402 confirms the sheet process mode of job C on the basis of the user setting information. For example, the post-step mode is selected for job C. Further, job C is subjected to a sheet storage process using the sheet storage box A 2800 as an off-line post-step after all processes executed by the image forming apparatus 101 are completed.

After confirming the process conditions for job C including the sheet process mode, the controller unit 402 causes the printer unit 403 to start printing job C.

More specifically, the controller unit 402 controls the apparatus 101 on the basis of the confirmation result to obtain the sheet bundle 2900 shown in FIG. 29 as the output result of job C by the apparatus 101. How to create the sheet bundle 2900 of job C will be explained below.

As the printing process of job C, document data of the first to fourth pages of job C are printed page by page on four A4-size plain paper sheets each 0.1 mm thick by single-sided printing. These sheets are defined as one set, and the document data are repetitively printed at a printout count of 50 sets which is set by operator B. As a result, 50 copies are printed. Note that the third mode is set as a sheet process mode for job C.

Thus, the controller unit 402 inhibits the alignment unit 3304 from executing the classification process as shown in FIG. 26 on the process tray 3302 for sheets of job C from the printer unit 403. Further, the controller unit 402 inhibits the apparatus 101 to execute stacking of sheets of job C on the delivery tray 722 without executing any classification process, as shown in FIG. 27.

For job C, operator B is to execute box packing work using the sheet storage box A 2800 in FIG. 28 as an off-line post-process step upon completion of a printing process by the apparatus 101. The controller unit 402 has already confirmed, on the basis of information set by operator B in the post-step designation mode window, that the above processes are scheduled as the workflow of job C.

The controller unit 402 operates the apparatus 101 to stack sheets of job C on the delivery tray 722 while classifying them in a unit based on information on the sheet storage box A 2800 to be used in an off-line post-step. More specifically, the controller unit 402 causes the apparatus 101 to create the sheet bundle 2900 as shown in FIG. 29 as output materials of job C.

Job C has the same process conditions as those shown in case 1 of FIG. 26 and case 2 of FIG. 27 except the sorting method. The controller unit 402 confirms information on sheets necessary to complete the printing process of job C. As the confirmation method, the controller unit 402 refers to printing process condition information set by operator B. At this time, the controller unit 402 also confirms page count information for specifying how many pages the job is formed from in total. As an example of the confirmation method, the operator is prompted to input the total number of pages in advance. Alternatively, the controller unit 402 confirms the information when all pages of the job data are stored in the hard disk of the memory 405. When the job is transmitted from the host, the controller unit 402 confirms the information by acquiring the last page command upon transmitting the last page from the host. For a scan job, the controller unit 402 confirms the information when no scan document page exists on the ADF tray of the scanner unit 401 having an ADF function of successively feeding and scanning a plurality of document pages. In this fashion, the page count confirmation method is arbitrary.

After the confirmation process, the controller unit 402 determines that job C is to print a series of document data of four pages by 50 copies on A4-size plain paper sheets each 0.1 mm thick by single-sided printing. At the same time, the controller unit 402 confirms that the total number of sheets necessary to complete the printing process of job C is 4 pages×50 copies=200 sheets. The controller unit 402 also confirms that the height (thickness) of sheets is 200 sheets× 0.1 mm=20 mm.

The controller unit 402 compares sheet information necessary to complete the printing process of job C with post-step information of job C. Based on the comparison result, the controller unit 402 determines the timing when the sheet processing apparatus 720 classifies sheets of job C in a series of printing process steps for job C.

For example, the controller unit 402 grasps post-process step information of job C by looking up information in the above-mentioned management table in which various types of necessary information are registered in advance manually or automatically. For example, the controller unit 402 recognizes, from the table information, that the sheet storage box A 2800 is 10 mm [1 cm] high. Alternatively, the controller unit 402 recognizes that the sheet storage box A 2800 is a sheet storage unit capable of storing a maximum of 100 A4-size sheets each 0.1 mm thick. In this fashion, capability information of the unit is utilized.

On the basis of various types of determination information described above, the controller unit 402 regards, as sheets of the first group, sheets from the first sheet P1 of the first copy of job C to the fourth sheet P4 of the 25th copy. In terms of a total of 200 sheets necessary for job C, the controller unit 402 regards, as sheets of the same group, the first to 100th sheets out of sheets used for job C. Sheets belonging to this group will be referred to as sheets of the first classification.

Similarly, on the basis of these pieces of information, the controller unit 402 regards, as sheets of the second group, sheets from the first sheet P1 of the 26th copy of job C to the fourth sheet P4 of the 50th copy. In terms of a total of 200 sheets necessary for job C, the controller unit 402 regards, as sheets of the same group, the 101st to 200th sheets out of sheets used for job C. Sheets belonging to this group will be referred to as sheets of the second classification.

In making this determination, the controller unit 402 determines the timing when the sheet processing apparatus 720 classifies sheets of job C in a series of printing process steps for job C.

In this example, the sheet shift process is adopted as an example of the classification process. Hence, the controller unit 402 can also execute, e.g., the following control.

All sheets belonging to sheets of the first classification are stacked at the same stacking position on the delivery tray 722. In addition, all sheets belonging to sheets of the second classification are stacked at the same stacking position on the delivery tray 722. The sheets belonging to sheets of the first classification and those belonging to sheets of the second classification are stacked on the delivery tray 722 while their sheet stacking positions shift from each other so that the user can recognize a break.

That is, the controller unit 402 controls the apparatus 101 so that sheets belonging to sheets of the first classification of job C to be processed and those belonging to sheets of the second classification are stacked on the delivery tray 722 while these sheets are classified as represented by the sheet bundle 2900 in FIG. 29.

For example, as shown in FIG. 34, the controller unit 402 stacks all sheets belonging to sheets of the first classification of job C so as to align their far edges at the first stacking reference position. In this case, the controller unit 402 stacks all sheets belonging to sheets of the second classification of job C so as to align their near edges at the second stacking reference position. To obtain this result of job C, the controller unit 402 executes the shift operation using the alignment unit 3304 on the process tray 3302, and the bundle delivery operation on the delivery tray 722 by the push member 3305, which have been described in detail above.

For example, for sheets of the first classification of job C, the far edge of a sheet is aligned at the first alignment position. When the sheet of the first classification is stacked on the process tray 3302, the alignment unit 3304a is fixed at this position, and the alignment unit 3304b is moved toward the first alignment position, thereby shifting the sheet to the first alignment position. The sheet of the first classification of job C with its far edge aligned at the first alignment position is delivered onto the delivery tray 722 while its far edge is kept at the position. This operation is executed until all sheets of the first classification are delivered. That is, this sheet process is executed from the first to 100th sheets of job C.

Then, for sheets of the second classification of job C, i.e., for the 101st and subsequent sheets of job C, the near edge of a sheet is aligned at the second alignment position. When the sheet of the second classification is stacked on the process tray 3302, the alignment unit 3304b is fixed at this position, and the alignment unit 3304a is moved toward the second alignment position, thereby shifting the sheet to the second alignment position. The sheet of the second classification of job C with its near edge aligned at the second alignment position is delivered onto the delivery tray 722 while its near edge is kept at the position. This operation is executed until all sheets of the second classification are delivered. That is, this sheet process is executed from the 101st to 200th sheets of job C.

The above-described series of sheet processes are executed for job C. Resultantly, all sheets belonging to sheets of the first classification of job C can be stacked on the delivery tray 722 so as to align their far edges at the first stacking reference position. At the same time, all sheets belonging to sheets of the second classification of job C can be stacked on the delivery tray 722 so as to align their near edges at the second stacking reference position.

To stack all sheets belonging to sheets of the first classification of job C so as to align their near edges at the second stacking reference position, a sheet process reverse to the above example is executed. In this case, all sheets belonging to sheets of the second classification of job C are so stacked as to align their far edges at the first stacking reference position.

The controller unit 402 causes the apparatus 101 to execute the series of printing operations in the printing process step of job C. As the output result of job C, the sheet bundle 2900 in FIG. 29 is created. In this example, the sheet classification process for job C is executed every 100 sheets on the basis of the sheet storage process step using the sheet storage box A 2800 that is to be executed after the printing process step for job C.

The sheet bundle 2900 of job C having undergone the above sheet classification process can easily undergo a post-step by operator B.

This is because the sheet bundle 2900 is stacked on the delivery tray 722 while a sheet bundle belonging to the first classification and that belonging to the second classification are classified with a clear break, as shown in FIG. 29. First, operator B directly takes out from the delivery tray 722 all the sheets belonging to the second classification which are clearly sectioned from sheets of the first classification.

More specifically, operator B takes out from the delivery tray 722 a total of 100 sheets up to sheet P1 of the 26th copy from sheet P4 of the 50th copy of job C that corresponds to a sheet at the top of face-down-delivered sheets. The edges of all the sheets are aligned, and these sheets can be easily stored and fit in the first sheet storage box A 2800 without any unwanted space. Then, operator B takes out from the delivery tray 722 all the sheets of the first classification left on the delivery tray 722. More specifically, operator B takes out from the delivery tray 722 a total of 100 sheets up to sheet P1 of the first copy from sheet P4 of the 25th copy of job C that corresponds to a sheet at the top of face-down-delivered sheets at this time. The edges of all the sheets are aligned, and these sheets can be easily stored and fit in the second sheet storage box A 2800 without any unwanted space.

The workflow of job C is completed through the post-step using the off-line unit by operator B. The final materials of job C which are packed in the two sheet storage boxes A 2800 can be delivered to customer B.

In this manner, the third embodiment includes, as a function, a specification which considers even the POD environment. For example, when the third mode is set as a sheet process mode for a job to be processed, the controller unit 402 inhibits stacking of sheets of the job from the printer unit 403 on the delivery tray 722 while they are classified every sheets of one copy. The controller unit 402 stacks sheets of the job on the delivery tray 722 while they are classified in a unit based on a post-process step for the job. When the third mode is set for a job to be processed, the controller unit 402 causes the image forming apparatus 101 to execute this operation. This control is called the third sequence.

The third mode serving as the third sequence execution condition can be executed by prompting the user to concretely (explicitly) designate a post-step for a Job to be processed via the user interface unit. This is the same as the description of FIG. 13 or 21.

More specifically, in the third embodiment, the job to be processed in the third mode is one for which the operator requests execution of printing after explicitly inputting the third type instruction information by the operator via the UI unit in the third embodiment. If this type of job is to be processed, the controller unit 402 confirms post-step information on the processing capability of a non-in-line type post-processing unit which is explicitly designated by the operator via the UI unit for the job and is necessary after a printing process by the apparatus 101 in the job. The controller unit 402 controls to stack printed materials of the job on the stacking unit in the third embodiment while classifying them every printed materials on the basis of the post-step information without classifying them every printed materials of one copy. The third mode is based on this relationship.

In the third embodiment, the fourth mode can also be accepted as a sheet process mode for a job to be processed. Even when this mode is set for a job to be processed, the controller unit 402 controls to execute the third sequence. This example is shown in FIG. 30, and will be explained in comparison with the description using FIGS. 28 and 29.

In FIG. 29, the user interface unit executes the display in FIG. 13 or 21 as a user interface window in setting the third mode. The display list in FIG. 13 or 21 presents a near-line post-processing unit and off-line post-processing unit as choices. Information is automatically acquired from a near-line post-processing unit via a network.

Choices of the near-line post-processing unit are displayed in the list on the basis of the automatically acquired information. For an off-line post-processing unit, various types of information on it are registered in advance in the memory by an operator's operation. For example, operator B inputs the name, type, and capability information shown in FIG. 28 as information on the sheet storage box A 2800 in FIG. 28 via the operation unit 404 or a user interface unit (e.g., the operation unit of the host computer). The information on the off-line post-processing unit is stored as registration information in the memory. Choices of the off-line post-processing unit are displayed in the list on the basis of the manually input initial registration information.

In this manner, when the third mode is utilized, information on post-steps that is registered in the memory in advance becomes available. Once the information is registered in the memory, choices corresponding to post-steps can be selected by the operator when the third mode is selected. The operator can execute the third sequence by a simple operation, and obtain the result of the sheet bundle 2900 in FIG. 29 without labor.

The fourth mode is an operation mode serving as one method of executing the third sequence by a simpler operation. More specifically, an output identical to the sheet bundle 2900 in FIG. 29 can be created without registering, e.g., information on an off-line post-processing unit in advance, unlike the above example.

For example, operator B in charge of the process of job C understands the shape and capability of the sheet storage box A 2800 in FIG. 28 in advance. For example, operator B grasps that the off-line post-processing unit shown in FIG. 28 can store a maximum of 100 A4-size sheets each 0.1 mm thick. Operator B also understands that the height (maximum value) of sheets processible at once by the off-line post-processing unit is 0.1 mm×100 sheets=10 mm.

In this situation, the controller unit 402 allows operator B to press the "sort by height" button 1102 via, e.g., the sorting method selection window in FIG. 11. When the "sort by height" button 1102 is pressed, the controller unit 402 sets the height sort mode (fourth mode). The controller unit 402 allows the operator to input, with the ten-key pad 604, a numerical value corresponding to the height in the off-line post-step in mm order to the height input field of the "sort by height" button 1102. In this case, operator B inputs 10 mm corresponding to the height of the sheet storage box A 2800.

After that, setting of a series of printing process conditions for job C including the setting of the height sort mode (fourth mode) is completed. This process corresponds to case 4 in FIG. 30. Then, operator B presses the start key 606. In response to this, the controller unit 402 starts scanning the document of job C on the ADF, and stores the data of job C in the hard disk, completing acceptance of job C.

The above example is an example of the scan job. For a PDL job, the job is designated from a printer driver. For example, when operator B presses the "sort by height" button 1902 in the window of FIG. 19 displayed on the display unit of the client PC 1603, he can input, with the keyboard of the client PC 1603, 10 mm corresponding to the height of the sheet storage box A 2800. Then, print data of job C is accepted from the client PC 1603.

After job C is accepted by the above method, the controller-unit 402 causes the printer unit 403 to print job C. In this example, the first to fourth pages of job C are printed on four A4-size plain paper sheets each 0.1 mm thick by single-sided printing. These sheets are defined as one set, and the document data are repetitively printed at a copy count of 50 sets which is designated by operator B. Note that the fourth mode is set for job C.

For this reason, the controller unit 402 determines a condition concerning a classification process before a series of printing processes for job C starts. More specifically, the controller unit 402 determines the timing when sheets bearing data of job C are classified during the printing process of job C.

In this example, a total of sheets necessary for job C are 4 pages×50 copies=200 sheets. The thickness of one sheet is 0.1 mm. The value which is input by operator B via the height input field of the "sort by height" button 1102 in FIG. 11 and corresponds to the height of the sheet storage box A 2800 is 10 mm.

The controller unit 402 recognizes that the value "10 mm" is the maximum height of sheets processible at once by the post-step unit in a post-process step to be executed after a printing process step for job C in the workflow of job C.

The controller unit 402 executes a calculation process of dividing the value "10 mm" by the height "0.1 mm" of one sheet of job C. The quotient is 100, which corresponds to the number of sheets to be classified into one group when the apparatus 101 classifies sheets of job C. Accordingly, the rule to classify sheets of job C every 100 sheets established. The controller unit 402 controls the apparatus 101 to execute the sheet classification process based on this result for job C.

Since job C requires a total of 200 sheets, the first 100 sheets of job C are regarded as sheets of the first classification. The first sheet P1 of the first copy of job C to the fourth sheet P4 of the 25th copy belong to this group. The 101st to 200th sheets of job C are regarded as sheets of the second classification. The first sheet P1 of the 26th copy of job C to the fourth sheet P4 of the 50th copy belong to this group.

The controller unit 402 controls to stack sheets of job C on the delivery-tray 722 under the above classification. The method of the classification process is the same as that in FIG. 29, and a description thereof will be omitted. Job C is processed in the fourth mode, completing a sheet bundle 3000 shown in FIG. 30.

Operator B takes out the sheet bundle 3000 stacked on the delivery tray 722 while the sheets are classified as shown in FIG. 30. The post-step to take out the sheet bundle 3000 of job C from the delivery tray 722 and storing it in two sheet storage boxes A 2800 is the same as that in FIG. 29, and a description thereof will be omitted.

As described above, the third sequence can be executed by selecting the fourth mode without using the third mode.

More specifically, it is inhibited to stack sheets of a job to be processed on the stacking unit while classifying them every copy. It is permitted to stack the sheets while classifying them in a unit based on a post-step for the job.

This sequence can be executed even in a case where the fourth mode (height sort mode) is selected, in addition to a case where the third mode (post-step designation mode) is selected.

This obviates work to, e.g., initially register post-step information on a near-line post-processing unit and/or post-step information on an off-line post-processing unit in the memory in order to reflect the information in the list of FIG. 13 or 21. By using the fourth mode, the output result as shown in FIG. 30 can be obtained by a simpler operation than that in the third mode.

The third embodiment can, therefore, provide a system optimal for both the office environment and POD environment, and further enhance the effect capable of flexibly satisfying various needs from users.

The job to be processed in the fourth mode is one for which the operator requests execution of printing after explicitly inputting the second type instruction information via the UI unit in the third embodiment. If this type of job is to be processed, the controller unit 402 confirms "height information corresponding to a value obtained by expressing the amount of printed materials by height" which is explicitly input by the operator for the job via the UI unit. The controller unit 402 controls to stack printed materials of the job on the stacking unit in the third embodiment while classifying them every printed materials on the basis of the height information (stacking amount information) of the printed materials without classifying them every printed materials of one copy. The fourth mode is based on this relationship.

FIGS. 29 and 30 show control examples when a post-step of storing sheets in the sheet storage box A 2800 serving as an example of an off-line post-processing unit is executed after a printing step for a job in the workflow of the job to be processed.

However, the third embodiment is not limited to these control examples. For example, even when a post-step using another post-processing unit is executed in the workflow of a job to be processed, the third and fourth modes can be selected, and the third sequence can be executed.

This example will be explained using the cutting machine 103 in FIG. 1. In FIG. 1, the cutting machine 103 is connected to the network 104 so that it can communicate data with an external device. According to the definitions of the third embodiment, the cutting machine 103 in FIG. 1 is an example of a near-line post-processing unit.

The cutting machine 103 has a capability of, e.g., simultaneously cutting a maximum of 490 A4-size sheets each 0.1 mm thick by one cutting process. In this case, the maximum amount of sheets (the thickness of a sheet bundle) cuttable at once by the cutting machine 103 is 0.1 mm×490 sheets=49 mm.

The cutting machine 103 in FIG. 1 has a memory capable of storing various types of information such as the machine name, and capability information for specifying the capability of the cutting machine 103.

In this configuration, the controller unit 402 of the apparatus 101 acquires, e.g., various types of information on the cutting machine 103 from the cutting machine 103 via the network 104. Alternatively, the controller unit 402 receives various types of information on the cutting machine 103 from an external information processing apparatus such as the client PC 102.

The controller unit 402 registers, in the memory of the apparatus 101 in association with List 1 in the list of FIG. 13, the information on the cutting machine 103 in FIG. 1 that is acquired by the above method.

By registering the near-line post-processing unit in advance, the cutting machine 103 in FIG. 1 can be utilized as a choice of the near-line post-processing unit in the list of FIG. 13 or 21.

When the job to be processed is a print job (PDL job), the user interface unit is, e.g., the display unit of the host computer. In this case, the information on the cutting machine 103 is displayed in the list of FIG. 21 displayed on the display unit of the host computer.

For this purpose, the host computer receives various types of information on the cutting machine 103 from the cutting machine 103 or an external apparatus such as the server via the network 104. The control unit of the host registers the externally acquired information on the cutting machine 103 in FIG. 1 in the memory of the host in association with List 1 in the list of FIG. 21.

When the print Job is to be transmitted from the host computer to the apparatus 101, the cutting machine 103 in FIG. 1 can be selected as a near-line post-processing unit from the list of FIG. 21.

Assume that the cutting machine 103 in FIG. 1 is not connected to the network 104 in the system environment of FIG. 1, i.e., the cutting machine 103 is electrically and physically disconnected from another apparatus. According to the definitions described in the third embodiment, the cutting machine 103 in this situation is an example of an off-line post-processing unit.

In this case, various types of information on the cutting machine 103 serving as an example of an off-line post-processing unit are manually input by the operator via the operation unit 404. The controller unit 402 registers the manually input information on the cutting machine 103 in FIG. 1 in the memory of the apparatus 101 in association with List 1 in the list of FIG. 13.

When the job to be processed is a printer job, the user interface unit is, e.g., the display unit of the host computer. In this case, the information on the cutting machine 103 is displayed in the list of FIG. 21 displayed on the display unit of the host computer.

To display the information, the operator of the host manually inputs various types of information on the cutting machine 103 by using an operation instruction unit such as the keyboard or mouse of the host computer. The control unit of the host registers the manually input information in the memory of the host in association with List 1 in the list of FIG. 21.

When the print job is transmitted from the host computer to the apparatus 101, the user of the host can select the cutting machine 103 in FIG. 1 as an off-line post-processing unit from the list of FIG. 21.

By registering the off-line post-processing unit in advance, the cutting machine 103 in FIG. 1 is available as a selection candidate for an off-line post-processing unit in the list of FIG. 13 or 21.

In this fashion, when the cutting machine 103 is in the near- or off-line state, it is registered in the list of FIG. 13 or 21. Thereafter, the following job (to be referred to as job D hereinafter) is processed by the image forming system.

For example, the workflow (a series of process steps including a plurality of process steps to be executed by a plurality of devices) to be executed by the system is scheduled as follows for job D.

For example, for job D, a sheet cutting process step by the cutting machine 103 is to be executed as a post-step process upon completion of a process by the image forming apparatus 101.

In the printing process step executed by the image forming apparatus 101 for job D, the user (to be referred to as operator C hereinafter) instructs the apparatus 101 via the UI unit to execute a process based on the following process conditions. Note that job D is 4-page document data.

As a process condition for job D, a sheet with the output paper size=A4 size and the output paper type=colored paper is selected as print paper. The thickness of one output paper sheet is 0.5 mm.

As a printing process condition, the output copy count of 4-page job D is set to 30 copies. The printing style is single-sided printing. The total number of sheets necessary for job D is 4 pages×30 copies=120 sheets. In this case, the total height of sheets of job D is 120 sheets×0.5 mm=60 mm (6 cm).

In addition, as a printing process condition for job D, execution of finishing by the image forming apparatus is set. More specifically, an instruction to execute a stapling process by the stapler 3303 of the sheet processing apparatus 720 is input.

The series of process conditions are process conditions for job D that are directly related to processes to be executed by the image forming apparatus 101 itself.

Processes for job D are not completed only when processes by the image forming apparatus 101 are completed. Job D requires a process of cutting sheets of job D by the cutting machine 103 upon completion of the printing process by the image forming apparatus 101.

For example, the image forming apparatus 101 prints job D. The stapler 3303 of the sheet processing apparatus 720 of the apparatus 101 staples sheets of job D. The stapled sheet bundle of job D is delivered from the process tray 3302 onto the delivery tray 722. The sheet bundle of job D is stacked on the delivery tray 722. Consequently, the processes executed by the apparatus 101 for job D are completed.

Figure 35:
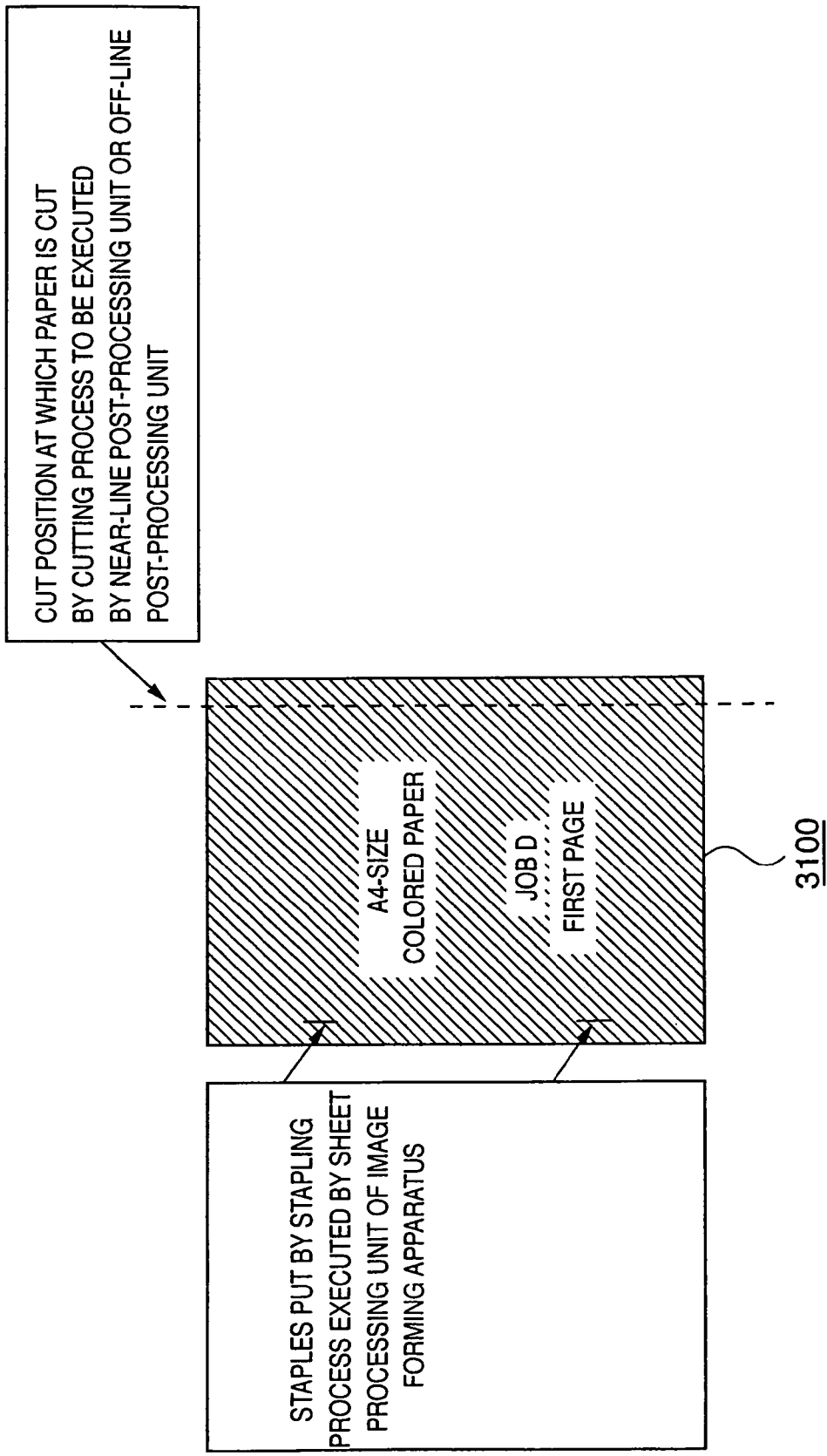
FIG. 35 is a view for explaining a control example in the embodiment.

After that, operator C takes out the sheet bundle of job D from the delivery tray 722, and sets it on the cutting machine 103. The cutting machine 103 executes a cutting process for the sheet bundle of job D as a post-step in the workflow of job D. As the cutting process, the cutting machine 103 executes, e.g., a one-side cutting process of cutting only one of the four edges of sheets, as shown in FIG. 35.

According to the above definitions, the sheet processing apparatus 720 is an example of an on-line post-processing unit. In contrast, the cutting machine 103 which is physically disconnected from the apparatus 101 is an example of a near-line post-processing unit if the cutting machine 103 is connected to the network 104 and electrically connected to another apparatus. However, if the cutting machine 103 is not connected to the network 104 and is not electrically connected to another apparatus, the cutting machine 103 is an example of an off-line post-processing unit.

In this situation, operator C selects the third mode as a sheet process mode for job D to be input to the image forming apparatus 101, and designates a cutting process by the cutting machine 103 as a post-step. This process corresponds to case 5 shown in FIG. 31. The third embodiment can deal with this situation.

When a series of printing process conditions for job D are set in the apparatus 101, the controller unit 402 causes the display unit 605 to display the window in FIG. 10. The controller unit 402 accepts the above-described parameters represented in case 5 from operator C via the window.

In response to press of the sorter key 1009 in the window of FIG. 10 by the operator, the controller unit 402 causes the display unit 605 to display the window of FIG. 11. The controller unit 402 makes it possible to accept the post-step designation mode (third mode) as a sheet sorting method for job D via the "designate post-step" button 1103 in the window of FIG. 11. Operator C selects the post-step designation mode with the "designate post-step" button 1103.

The controller unit 402 confirms that job D is a job whose sheets printed by the printer unit 403 are to be stacked on the stacking unit while they are classified in a unit based on information on a post-step for the job. In this example, job D is treated as a job whose sheets printed by the printer unit 403 are to be stacked on the delivery tray 722 while they are classified in a unit based on information on a cutting process by the cutting machine 103.

As the information on the cutting process by the cutting machine 103, the controller unit 402 acquires the following information by the following method.

When the user presses the "designate post-step" button 1103 in FIG. 11, the controller unit 402 sets the third mode. The controller unit 402 causes the display unit 605 to display the window of FIG. 13 having a display area for displaying a list of post-steps. The controller unit 402 makes it possible to accept the cutting step by the cutting machine 103 as a post-step for job D from operator C via the list in the window of FIG. 13. Note that list registration suffices to employ the above method or the like. In this example, the cutting machine 103 is associated with List 1 in FIG. 13.

Operator C selects the cutting machine in List 1 of the window of FIG. 13, sets all process conditions for job D, and presses the start key 606. Then, the controller unit 402 accepts data of job D.

In the above example, document data of job D is input from the scanner unit 401. When the document data of job D is accepted from the host, the settings of job D are accepted via the printer driver of the host, similar to the above-described example.

In the third embodiment, the data input form is arbitrary as far as the user can select sheet process modes including at least the third mode. Considering user friendliness, the configuration more preferably provides a user interface similar to that of the third embodiment.

When the apparatus 101 processes job D for which the third mode is set, the controller unit 402 inhibits execution of the first mode in which sheets of job D are output as represented by an output result in FIG. 26. The controller unit 402 also inhibits execution of the second mode in which sheets of job D are output as represented by an output result in FIG. 27.

The controller unit 402 controls the apparatus 101 to process job D in the third mode in which sheets of job D are output as represented by an output result in FIG. 31 on the basis of the settings by the user. In other words, the controller unit 402 causes the apparatus 101 to execute, as a post-step, a sheet classification process in consideration of cutting of a sheet bundle of job D by the cutting machine 103.

In printing job D, the controller unit 402 determines the timing when the sheet processing apparatus 720 classifies sheets of job D.

In this example, the maximum allowance of sheets processible by one cutting process as the capability of the cutting machine 103 is 49 mm which is the height of a sheet bundle. The thickness of one A4-size colored sheet selected by the user for job D is 0.5 mm.

The maximum allowance of sheets of job D of the above medium type that can be processed by the cutting machine 103 in one cutting process is 49 mm/0.5 mm=98 sheets on a sheet count basis. The total number of sheets necessary for job D is 4 pages×30 copies 120 sheets.

A case where no binding process (stapling process) by the sheet processing apparatus 720 itself serving as an example of an on-line post-processing unit is executed for job D will be explained. In this case, the controller unit 402 regards, as sheets of the first classification, the first to 98th sheets of job D printed by the printer unit 403. The controller unit 402 regards the 99th to 120th sheets of job D as sheets of the second classification.

In this example, however, execution of the sheet classification process is inhibited for job D because job D undergoes a binding process (stapling process) by the sheet processing apparatus 720 itself serving as an example of an on-line post-processing unit.

For example, the number of pages of one copy of job D is four, job D requires single-sided printing, and thus the number of sheets of one copy is four. In this example, the apparatus prints sequentially from the first page. Thus, the 98th sheet is contained in a sheet bundle of the 25th copy, i.e., corresponds to the second sheet (sheet P2) of a sheet bundle of the 25th copy.

If the classification process is executed when the 98th sheet is output, a sheet bundle of the 25th copy cannot be stapled. Alternatively, a sheet bundle of two, sheets P1 and P2 of the 25th copy is stapled, and a sheet bundle of two, sheets P3 and P4 of the 25th copy is stapled. Output materials which originally form one bundle are classified into two and bound. In this example, such a problem is prevented.

However, if attention is paid to only the above problem to solve it, another problem may occur in a subsequent post-process step to be executed for job D.

For example, after the 25th copy is set, the classification process is executed using the alignment unit 3304 of the sheet processing apparatus 720, i.e., sheets up to the 100th sheet are grouped as sheets of the first classification.

If this classification process is executed, sheets exceed the maximum allowance of sheets cuttable at once by the cutting machine 103. For example, the total height of sheets of the first classification that are stacked by the classification process is 100 sheets×0.5 mm=50 mm. The capability of the cutting machine 103 is 49 mm in height, and the sheet amount exceeds the capability by 1 mm.

That is, even if operator C takes out a sheet bundle of job D from the delivery tray 722, it cannot be cut at once in this classification state.

In order to efficiently cut the sheet bundle of job D by the cutting machine 103, operator C himself must classify again the sheet bundle of job D taken out from the delivery tray 722. This impairs the effects of the third embodiment.

In order to prevent the above problem, the controller unit 402 inhibits execution of the above-mentioned sheet classification process for sheets of job D.

The controller unit 402 controls to execute the sheet classification process for job D so as to stack sheets of job D into a sheet bundle 3100 in FIG. 31 on the delivery tray 722.

More specifically, the controller unit 402 inhibits classification of four sheets of the 25th copy into two, first and second classifications every two sheets. Further, the controller unit 402 causes the cutting machine 103 to cut a sheet bundle classified as that of one group without any user intervention work of, e.g., performing the classification process again by operator C.

The controller unit 402 controls the apparatus 101 to execute this operation. For example, the controller unit 402 causes the printer unit 403 to print a document of job D so that document data of the first to fourth pages of job D are printed page by page on four A4-size colored sheets each 0.5 mm thick by single-sided printing. After all the four sheets are stacked on the process tray 3302, the stapler 3303 staples the sheet bundle at binding positions as shown in FIG. 35 at the left edge of the sheet bundle. The stapled sheet bundle of the four sheets is delivered from the process tray 3302 onto the delivery tray 722 by using the push member 3305.

The controller unit 402 controls the apparatus 101 to execute the series of work operations by 30 times which corresponds to a total print count set by operator C. Job D having the stapling process setting is a job in the third mode in which a post-step by the cutting machine 103 has already been designated.

The controller unit 402 regards and groups sheet bundles of the first to 24th copies of job D as sheets of the first classification, and sheet bundles of the 25th to 30th copies of job D as sheets of the second classification.

The controller unit 402 keeps stacking sheets of job D on the delivery tray 722 with their far edges aligned at the first stacking reference position until sheet bundles of the first to 24th copies of job D are delivered onto the delivery tray 722.

In this case, the position of the alignment unit 3304*a* is fixed on the process tray 3302, and the alignment unit 3304*b* is moved toward the alignment unit 3304*a*. By this method, sheets are shifted to align their far edges at the first alignment position. After the shift operation is completed, a bundle of sheets of job D is delivered from the process tray 3302 onto the delivery tray 722 while the bundle is kept at the alignment position. This operation is repeated until a sheet bundle of the 24th copy is processed.

After the sheet bundle of the 24th copy is delivered from the process tray 3302 onto the delivery tray 722, the stacking position for subsequently delivered sheets of job D is changed from that for sheets of the first classification.

That is, sheets of job D are stacked on the delivery tray 722 so as to align their near edges at the second alignment position until sheet bundles of the 25th to 30th copies of job D are delivered onto the delivery tray 722.

In this case, the position of the alignment unit 3304b is fixed on the process tray 3302, and the alignment unit 3304a is moved toward the alignment unit 3304b. By this method, sheets are shifted to align their near edges at the second alignment position. After the shift operation is completed, a bundle of sheets of job D is delivered from the process tray 3302 onto the delivery tray 722 while the bundle is kept at the alignment position. This operation is repeated until a sheet bundle of the 25th copy to a sheet bundle of the 30th copy serving as the last copy are processed.

The controller unit 402 causes the apparatus 101 to execute the series of sheet classification processes in a printing process step for job D. Resultantly, the sheet bundle 3100 in FIG. 31 can be created.

Thereafter, the following process is executed as a post-step for job D in the workflow of job D.

Operator C takes out from the delivery tray 722 sheet bundles of job D that are classified as represented by the sheet bundle 3100 in FIG. 31. First, operator C takes out sheet bundles of the 25th to 30th copies corresponding to sheet bundles of second classification which are clearly sectioned from sheet bundles of the first classification. Operator C brings the sheet bundles to the cutting machine 103, and sets them at the cutting position.

The cutting machine 103 cuts, at once as one set, the sheet bundles of the 25th to 30th copies stapled every copy. That is, the cutting machine 103 cuts 4 sheets×6 copies=24 sheets (12 mm) at once as one cutting process.

Then, operator C takes out sheet bundles of the first to 24th copies corresponding to sheet bundles of first classification from the delivery tray 722 after the sheet bundles of the second classification are removed. Operator C brings the sheet bundles to the cutting machine 103, and sets them at the cutting position.

The cutting machine 103 cuts, at once as one set, the sheet bundles of the first to 24th copies stapled every copy. That is, the cutting machine 103 cuts 4 sheets×24 copies=96 sheets (48 mm) at once as one cutting process.

All cutting work operations for job D are completed, and the entire workflow of job D is completed.

Needles to say, the same output result can also be obtained in the fourth mode, i.e., height designation mode.

For example, operator C grasps the capability of the cutting machine 103 in advance. For example, the maximum allowance is 49 mm in height of the sheet bundle.

In this situation, the height sort mode is accepted from operator C via the height sort key in the window of FIG. 11. Operator C inputs a value corresponding to 49 mm via the height input field of the key.

If job D is accepted by this operation method, the controller unit 402 executes the same process as the above one without selecting the third mode. That is, the controller unit 402 causes the apparatus 101 to execute a classification process corresponding to the sheet bundle 3100 in FIG. 31 for job D.

The above configuration can make full use of the capability of the cutting machine 103 without exceeding its capability in a post-step for job D. By realizing this configuration, user intervention work of, e.g., classifying sheets again by the operator after printout can be omitted. In other words, the above effects can be achieved without generating the above-mentioned problems.

Case 2 in FIG. 27, case 3 in FIG. 29, case 4 in FIG. 30, and case 5 in FIG. 31 are specifications especially suited for the POD environment. However, these cases may occur even in the office environment, and these specifications are also suitable for the office environment.

Case 1 in FIG. 26 is a specification mainly suited for the office environment. However, this case may occur even in the POD environment, and the specification is also suitable for the POD environment.

Figure 36:
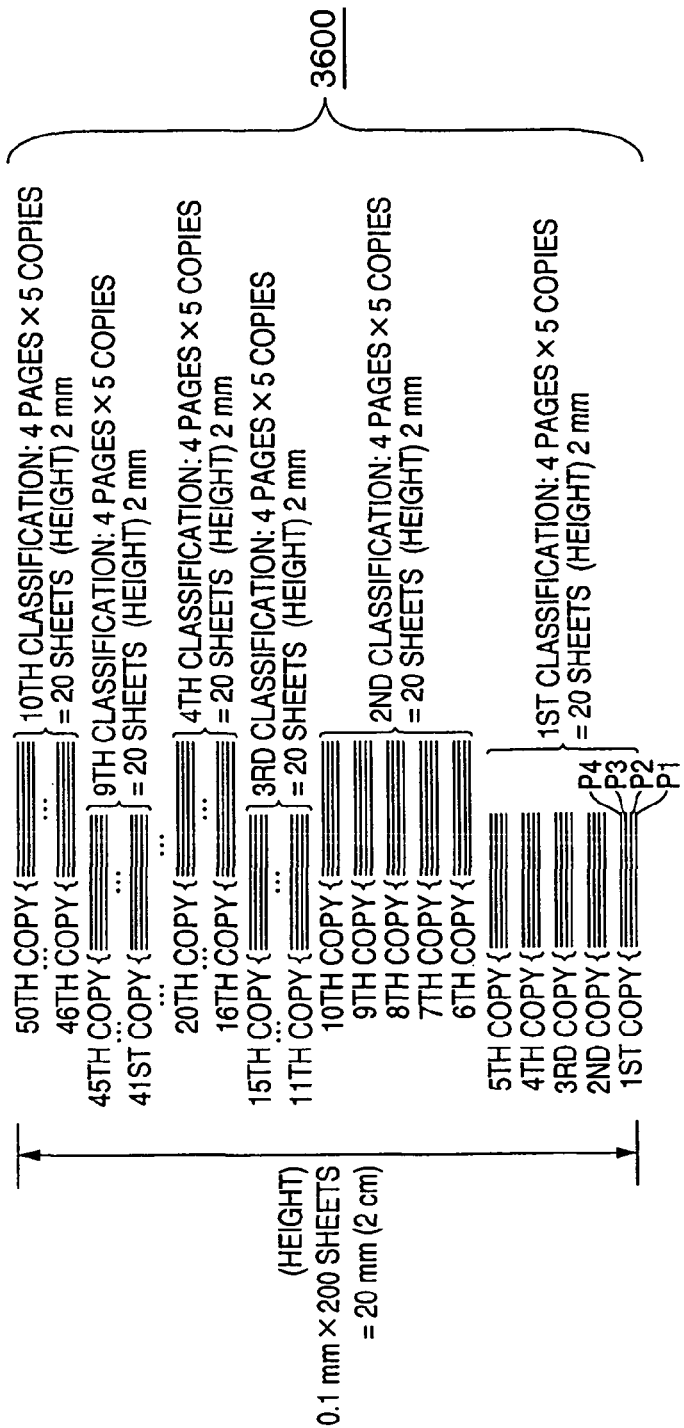
FIG. 36 is a view for explaining a control example in the embodiment.

In the third embodiment, a plurality of types of classification processes described above can be executed, and in addition, the following classification process can also be executed by the printing apparatus on the assumption of various use environments. This classification process corresponds to the fourth sequence executed for a job when the fifth mode is set as a sheet process mode for a job to be processed. FIG. 36 shows an example of the fourth sequence.

Case 6 shown in FIG. 36 has the same job process conditions as those in case 1 of FIG. 26, case 2 of FIG. 27, case 3 of FIG. 29, and case 4 of FIG. 30 except the sorting method.

Similar to case 6 in FIG. 30, a job (to be referred to as job E) for which the fifth mode is set as a sheet process mode is accepted as a job to be processed. In this case, the controller unit 402 controls the printing system including the printing apparatus 101 to classify sheets of job E every copies designated by the user of the job without classifying them every sheets of one copy.

When the fifth mode is set for the job to be processed, the controller unit 402 inhibits classification of sheets every sheets of one copy, like the sheet bundle 2600 in FIG. 26, i.e., inhibits execution of the first sequence. Also, the controller unit 402 inhibits operating the printing apparatus so as to stack sheets on the stacking unit without classifying them, like the sheet bundle 2700 in FIG. 27, i.e., inhibits execution of the second sequence. The controller unit 402 inhibits the classification process shown in FIGS. 29 and 30, i.e., inhibits the printing apparatus from classifying sheets of a job in a unit based on a post-step to be executed for the job after a printing step in the workflow of the job to be processed. That is, the controller unit 402 inhibits execution of the third sequence.

In setting job E, the controller unit 402 accepts various printing process conditions shown in case 6 of FIG. 36 from the user via the user interface unit provided in the third embodiment, similar to the above cases. For example, the controller unit 402 accepts from the user an instruction to print job E of 4-page document data by 50 copies on A4-size plain paper sheets by single-sided printing.

The thickness of one sheet selected in this job is 0.1 mm. The total number of sheets necessary for job E is 4 pages×50 copies=200 sheets. The height is 200 sheets×0.1 mm=20 mm.

In the fifth mode, none of the total sheet count information (200 sheets), the sheet thickness information (0.1 mm), and the sheet bundle thickness information (20 mm) is utilized. Without using these pieces of information, the controller unit 402 can classify sheets of job E.

For example, in response to press of the sorter key 1009 in the window of FIG. 10 by the user, the controller unit 402 causes the display unit 605 to display the window in FIG. 11. In response to press of the "sort by copy count" button 1101 in the window of FIG. 11, the controller unit 402 causes the display unit 605 to execute the copy count sorting setting window 1201 in FIG. 12. The controller unit 402 allows the user to designate execution of the fifth mode via the "every designated copies" button 1203 in the copy count sorting setting window 1201. The controller unit 402 allows the user to determine via the copy count input field 1204 how many copies the sheet classification process is executed.

In the example of FIG. 36, the user checks the "every designated copies" button 1203 for job E and sets the fifth mode. In response to an operation with the ten-key pad 604, "every 5 copies" is set as a designated copy count via the copy count input field 1204.

When the user sets the series of printing process conditions and presses the start key 606, the controller unit 402 causes the image forming apparatus 101 to starts processing job E, and accepts data of job E. Document image data of job E are scanned by the scanner unit 401, and sequentially stored in the hard disk of the memory 405. The controller unit 402 causes the printer unit 403 to print the data of job E in the memory.

In the above example, image data of job E is input from the scanner unit 401, and thus the operation unit 404 is used as a user interface. When a job is accepted from a computer, the control unit of the computer causes its display unit to execute the displays in FIGS. 18 to 20. The computer allows its user to input via these displays a series of process conditions including the setting of the fifth mode for job E. The image forming apparatus 101 receives data of job E which are transmitted from the computer in response to a printing execution instruction input via the printer driver of the computer upon completion of a series of user settings. The controller unit 402 stores, in the hard disk of the memory 405, the data of job E which are accepted in this manner. The controller unit 402 causes the printer unit 403 to print the data of job E in the memory.

Job E has the same job process conditions as those in case 1 of FIG. 26, case 2 of FIG. 27, case 3 of FIG. 29, and case 4 of FIG. 30 except the sheet sorting method. That is, similar to these examples, the controller unit 402 causes the printer unit 403 to print job E. For example, the first to fourth pages of job E are printed on four A4-size plain paper sheets each 0.1 mm thick by single-sided printing. These sheets are defined as one set, and the document data are repetitively printed at a print-out count of 50 sets which is set by the user. As a result, 50 copies are printed. Note that the fifth mode is set as a sheet process mode for job E.

Thus, the controller unit 402 controls the apparatus 101 to classify sheets of job E every copies designated by the user. The result of this classification is a sheet bundle 3600 in FIG. 36.

The output copy count set by the user is 50. In selecting the fifth mode (designated copy count mode), the user inputs an instruction to classify sheets every five copies. The controller unit 402 processes job E as follows. This process will be explained with reference to FIGS. 34 and 36.

Sheets (the first to 20th sheets of job E) from sheet bundles of the first to 5th copies of job E are stacked as sheets of the first classification on the delivery tray 722 with their far edges aligned at the first stacking reference position. The controller unit 402 executes, on the process tray 3302 using the alignment units 3304*a* and 3304*b*, a sheet shift operation and bundle deliver operation for obtaining this stacking state.

Note that the methods of the sheet shift operation and bundle deliver operation on the process tray 3302 have been described in detail, and a description thereof will be omitted in the description of job E.

All sheets belonging to the first classification of job E are delivered onto the delivery tray 722 and stacked on the delivery tray 722. Upon completion of stacking, the controller unit 402 controls to change the sheet stacking position on the delivery tray 722 for sheet bundles of the sixth to 10th copies of job E from that on the delivery tray 722 for sheets of the first classification.

For example, sheets (the 21st to 40th sheets of job E) from sheet bundles of the sixth to 10th copies of job E are stacked as sheets of the second classification on the delivery tray 722 with their near edges aligned at the second stacking reference position. The controller unit 402 executes, on the process tray 3302 using the alignment units 3304*a* and 3304*b*, a sheet shift operation and bundle deliver operation for obtaining this stacking state.

All sheets belonging to the second classification of job E are delivered onto the delivery tray 722 and stacked on the delivery tray 722. Upon completion of stacking, the controller unit 402 controls to change the sheet stacking position on the delivery tray 722 for sheet bundles of the 11th to 15th copies of job E from that on the delivery tray 722 for sheets of the second classification.

For example, sheets (the 41st to 60th sheets of job E) from sheet bundles of the 11th to 15th copies of job E are stacked as sheets of the third classification on the delivery tray 722 with their far edges aligned at the first stacking reference position. The controller unit 402 executes, on the process tray 3302 using the alignment units 3304*a* and 3304*b*, a sheet shift operation and bundle deliver operation for obtaining this stacking state.

By this method, the controller unit 402 causes the image forming apparatus 101 to execute the sheet classification process for job E every five copies designated by the user for job E. The controller unit 402 controls to repeat the above process until a sheet bundle of the 50th copy corresponding to a sheet bundle of the last copy of job E is processed.

That is, all sheets (4 pages×50 copies=a total of 200 sheets) of job E are stacked on the delivery tray 722 while they are classified as represented by the sheet bundle 3600 in FIG. 36.

When a job for which the fifth mode is set is accepted, the controller unit 402 causes the apparatus 101 to execute the series of processes.

More specifically, when data of a job to be processed are printed by a plurality of copies, the controller unit 402 inhibits stacking of sheets of the job while they are classified every sheets of one copy. The controller unit 402 controls to stack sheets of the job while they are classified at a copy count which is different from the number of copies to be printed and is designated by the user in selecting the fifth mode.

For example, when the controller unit 402 prints data of job E by 50 copies, like the control example of FIG. 36, it inhibits stacking of sheets of job E on the delivery tray 722 while they are classified every sheets of one copy. The controller unit 402 controls the printing apparatus 101 to stack sheets of job E on the delivery tray 722 while they are classified every five copies which are different from the "50" copies and are designated by the user in selecting the copy count designation mode.

A series of operations executed when the fifth mode is set is called the fourth sequence. If the sheet bundle 3600 in FIG. 36 can be created, the same effects as those obtained by the third sequence can be attained in a printing environment such as the POD environment. It should be noted that the fourth sequence can achieve another excellent effect capable of meeting, with a simple apparatus configuration and system configuration, use cases and user needs which may occur at the actual work site in a printing environment such as the POD environment and receive attention in the third embodiment, as described above.

For example, use cases and needs unique to a printing environment such as the POD environment, as described in the third embodiment, can be dealt with if the configuration does not correspond to the third or fourth mode but corresponds to the fifth mode. While the above effects are achieved, downsizing of the system and cost reduction can be realized because of the absence of the third and fourth modes. In commercialization of the system aimed at a printing environment such as the POD environment, effects in practical use of the printing system can also be expected which are weighted together with high job productivity, high operability, high working efficiency, and the like by a POD company assumed to be a system delivery destination.

In the third mode (operation mode based on the third type instruction information) and the fourth mode (operation mode based on the second type instruction information), the controller unit 402 must calculate the print amount of printed materials per classification in consideration of a post-process, as illustrated in FIGS. 14, 15, 29, and 30. In this calculation, the controller unit 402 must confirm the total number of pages of print data of a job to be processed. For example, for a job using the copy function, the controller unit 402 causes the scanner unit 401 to scan a series of document bundles made up of a plurality of document pages to be processed, and stores all the pages in the HD of the memory 405. At this timing, the total number of pages of document data of the job is finalized. For a job from an external computer, the controller unit 402 expands PDL data into a bitmap image, and after expanding all the pages of the input PDL data, stores the pages in the HD. At this timing, the total number of pages of document data of the job is finalized. In other words, the controller unit 402 calculates the print amount of printed materials per classification in consideration of a post-process for a job after all the pages of print data of the job to be processed are stored in the memory 405 of the printing apparatus. Then, the controller unit 402 causes the printing apparatus 101 to start a series of printing operations based on the calculation result. To the contrary, the fifth mode does not require any calculation process, as described above. In other words, the fifth mode does not require any process of, e.g., waiting until all the pages of a document to be processed are stored in the HD in order to count all the pages, and then starting printing the first page of the job.

In the third and fourth modes, therefore, the timing when printing of print data of the first page to be processed actually starts may delay from that in the fifth mode. That is, a configuration complying with the fifth mode can start printing the first page at an earlier timing and more quickly complete a job requiring stacking of printed materials in consideration of a post-step, compared to other modes. In this fashion, the fifth mode exhibits an excellent effect in a printing environment such as the POD environment where an increase in productivity is important.

However, the above description is merely an example, and the present invention is not limited to this. For example, even in the third and fourth modes, similar to the fifth mode, after print data of the first page is stored in the HD, the controller unit 402 causes the printer unit 403 to start printing print data of a job before print data of all pages are stored in the HD. While executing the printing operation, the controller unit 402 sequentially counts the number of pages, and receives from the printer unit 403 a notification representing the completion of printing print data of the last page for printed materials of the first set. At this timing, the controller unit 402 stops counting the document. At this timing, printing of printed materials of the first set (first copy) is completed, and the printing operation temporarily suspends. The controller unit 402 finalizes the total number of pages of document data of the job on the basis of the counting result, and performs the above calculation. The amount of printed materials of one classification is determined by the calculation. If printed materials of the second set (second copy) to be printed next need to be classified from those of the first set, the printed materials of the second set of the job are classified from those of the first set and stacked on the delivery tray 722. If the printed materials of the second set need not be classified from those of the first set, the printed materials of the second set of the job are stacked on the delivery tray 722 so as to align them at the same stacking reference position without classifying them from the printed materials of the first set. Even by this method, the same output result as those illustrated in FIGS. 14, 15, 29, and 30 can be obtained.

As described above, to commercialize the system aimed at a printing environment such as the POD environment, the third embodiment finds out potential use cases and user needs which are not expected in the office environment and may occur in a POD company serving as a system delivery destination. In addition, the third embodiment can provide a mechanism which can satisfy the use cases and user needs. In order to make full use of the effects of the configuration in the third embodiment, the third embodiment also assumes a printing environment different from one such as the POD environment, and intends to obtain an effect capable of applying the configuration to even the following situation.

Assume that the user is to distribute printed materials of a document of job E to all members of his department in the office environment. There are 50 members in the department. The members are present separately every five members on 10 floors. In this situation, the apparatus 101 executes the sorting process as shown in FIG. 36. Printed materials of job E can be easily distributed to the members on the floors.

Assume that a report is given in the conference room using printed materials of a document of a job E. The number of participants of the meeting is 50. In the conference room, 10 tables are prepared, and five members are seated at one table. In this situation, the apparatus 101 executes the sorting process as shown in FIG. 36. Printed materials of job E can be easily distributed to the participants at the tables.

Assume that printed materials of job E are inspected by five operators in the POD environment. The work is shared because whether printed materials of job E meet requests by the customer is visually checked more efficiently not by one operator but by five operators. In this situation, the apparatus 101 executes the sorting process as shown in FIG. 36. Output materials of job E can be easily distributed equally to the five operators.

In this way, various environments where the printing apparatus may be introduced are assumed, and various needs from various users can be flexibly satisfied.

The job to be processed in the fifth mode is one for which the operator requests execution of printing after he explicitly inputs the first type instruction information via the UI unit in the third embodiment. If this type of job is to be processed, the controller unit 402 confirms "entry information corresponding to the designated copy count (X)" which is explicitly input by the operator for the job via the UI unit in consideration of a post-process necessary after a printing process for the job. The controller unit 402 controls to stack printed materials of the job on the stacking unit in the third embodiment while classifying them every printed materials of designated copies without classifying them every printed materials of one copy. The fifth mode is based on this relationship.

As described with reference to FIGS. 26 to 36, the third embodiment can provide a plurality of types of sorting methods, and can process a target job by a sorting method desired by the user.

The third embodiment has described the configuration having the five sorting methods. For example, the third embodiment has described the configuration which allows the user to select the first to fifth modes. The third embodiment has also described the configuration capable of executing four control sequences as control sequences corresponding to selected modes. For example, the third embodiment has described the configuration capable of selectively executing the first to fourth sequences.

However, not all the configurations of the third embodiment need be employed. This is because these mechanisms target high value-added functions capable of flexibly satisfying various needs from various users on the assumption that the image forming apparatus is exploited in various environments. By achieving only some of various effects described above, problems assumed in BACKGROUND OF THE INVENTION can be solved, improving user friendliness and convenience.

For example, at least the third mode and/or fourth mode among the above-mentioned modes can be selected to cope with not only the office environment but also the POD environment. When the third or fourth mode is selected, the third sequence can be executed. This means a system configuration which allows inputting at least either of the second type instruction information and third type instruction information. This system configuration can also contend with the following situation.

For example, the "amount of printed materials processible at once" is determined as the performance of the cutting machine. In the POD environment, it may be demanded to sort printed materials discharged from the image printing apparatus into a predetermined amount for cutting work and process the printed materials at once by the cutting machine in consideration of working efficiency.

Even if this demand arises, a problem may occur when the image forming apparatus does not adopt control which considers a post-step, as described in the third embodiment.

For example, if materials are printed in the output form as shown in FIG. 26 without considering a post-step, the operator must arrange the printed materials in order to process them at once by the cutting machine. If materials are printed in the output form as shown in FIG. 27, they may exceed the amount of printed materials processible at once by the cutting machine. In this case, the quality of the cutting result may degrade, and the cutting machine itself may be damaged. Further, the "amount of printed materials processible at once" may change depending on the type of treated medium, for example, may change between hard paper and soft paper. The operator must do work in consideration of this point.

For this reason, efficient work may be hindered when the image forming apparatus does not adopt control which considers a post-step, as described in the third embodiment. Even if there is a cutting machine which changes its operation depending on the medium to be cut, the cutting machine of this type seems to require various settings by the operator before cutting work. As a result, the work load of the operator tends to increase.

These problems can be prevented by executing the third sequence.

For example, the image forming apparatus comprises at least the fifth mode, and can execute the fourth sequence in accordance with selection of the fifth mode. This means a system configuration which allows inputting at least the first type instruction information among the first type instruction information to third type instruction information.

In this manner, the configuration may comprise at least one of the third to fifth modes and at least either of the third and fourth sequences. Needless to say, the configuration may also comprise the first mode and/or second mode. The configuration may be flexibly customized.

It is preferable to employ at least modes except the first mode and/or second mode and execute at least sequences except the first sequence and/or second sequence. This is because the above-described environment cannot be sufficiently dealt with by an apparatus capable of executing only the first sequence, an apparatus capable of executing only the second sequence, or an apparatus capable of executing both the first and second sequences but incapable of executing the remaining sequences. That is, the effects of the third embodiment cannot be fully enhanced.

The sheet storage box A 2800 and cutting machine have been explained as the near-line post-processing unit and off-line post-processing unit (note that the sheet storage box A 2800 stores sheets printed by the image forming apparatus and thus is contained as an example of the post-processing apparatus in the above example).

However, the third embodiment can also treat a post-processing unit other than these post-processing apparatuses in order to flexibly cope with various use environments and user needs as described above.

Other examples of the near-line post-processing unit and/or off-line post-processing unit are a gluing apparatus capable of gluing sheets printed by the printer unit 403, a bookbinding apparatus capable of binding sheets printed by the printer unit 403, a packing apparatus capable of packaging sheets printed by the printer unit 403, a punching apparatus capable of punching sheets printed by the printer unit 403, and a stapling apparatus which staples sheets printed by the printer unit 403.

In the POD environment or the like, a truck, motorcycle, or the like may be used to deliver output materials printed by the image forming apparatus to the customer. Such transportation means can also be defined as one post-step which is a delivery step in the workflow. An apparatus for delivering sheets printed by the printer unit 403 may also be contained as an example of the near- or off-line post-processing unit.

Even when the printing system comprises various post-processing apparatuses, the first to fifth modes and the first to fourth sequences can be executed to obtain the above effects.

To this effect, the printing system in the third embodiment can be modified and applied. In the description of the third embodiment, as an example of the sheet classification process, the sheet processing apparatus 720 shifts sheets bearing data of a job to be processed. However, a process other than the sheet shift process can also be employed as a sheet classification process.

Figure 37:
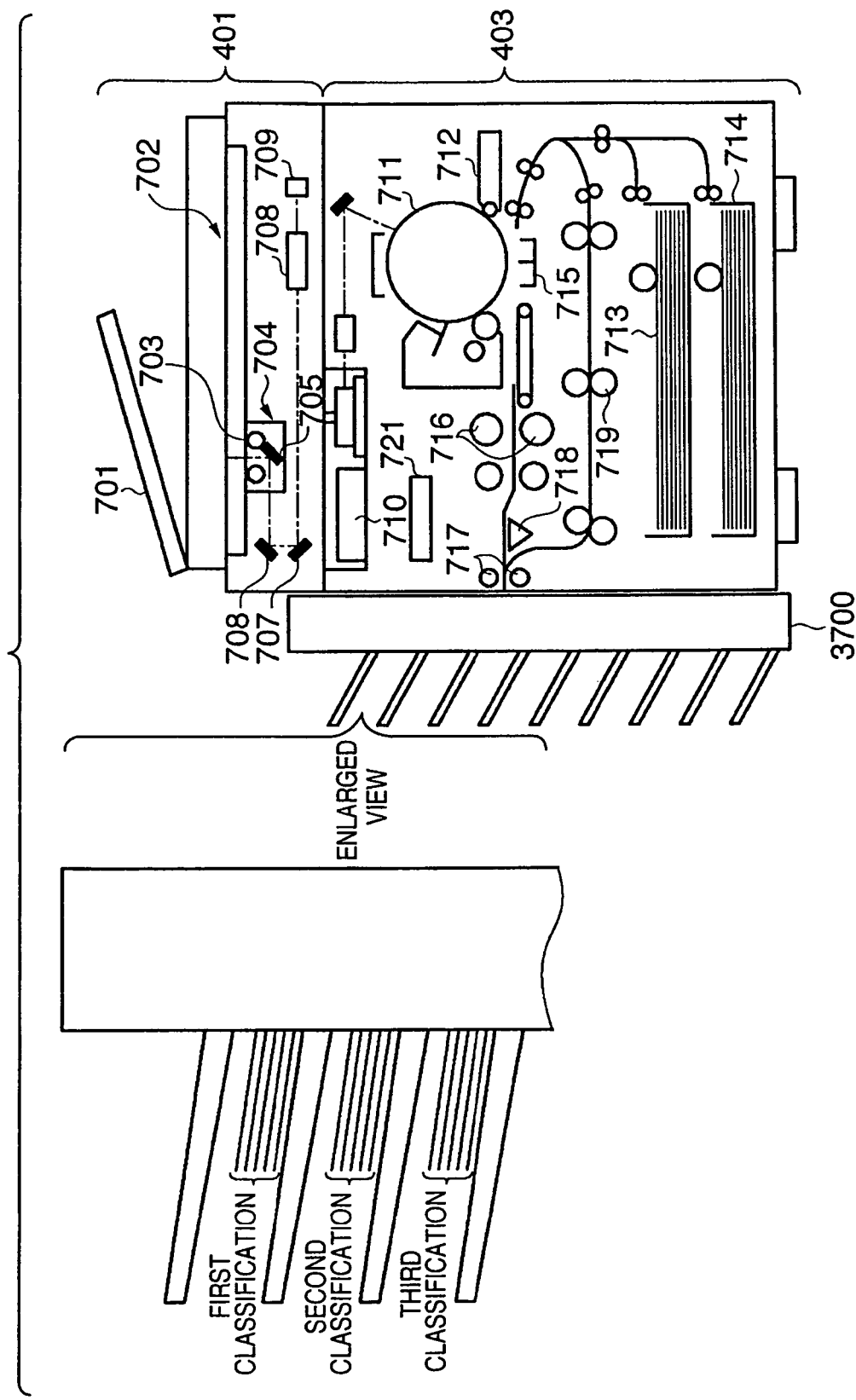
FIG. 37 is a sectional view for explaining a control example in the embodiment.

In the above example, the printing apparatus 101 uses the finisher type sheet processing apparatus 720 which internally executes finishing, as shown in FIG. 33. Instead of the sheet processing apparatus 720, a multi-bin sorter type sheet processing apparatus 3700 having many stacking bins, as shown in FIG. 37, may be connected as an on-line post-processing unit to the printing apparatus 101.

In this case, the controller unit 402 controls the sheet processing apparatus 3700 to sort, into a plurality of bins, sheets of a job to be processed which are conveyed by the discharge rollers 717 from the printer unit 403 to the sheet processing apparatus 3700. More specifically, the controller unit 402 controls to switch the delivery destination bin at the timing when the sheet classification process for a job to be processed is executed.

For example, all sheets belonging to the first classification out of sheets of a job to be processed are delivered onto the first stacking bin of the sheet processing apparatus 3700. Upon completion of this process, the controller unit 402 causes the sheet processing apparatus 3700 to switch the delivery destination so as to deliver all sheets belonging to the second classification of the job to the second stacking bin. For example, the sheet convey path is switched by a flapper or the like so as to introduce sheets to the second bin. Sheets of a subsequent group are also properly delivered to another bin (see the enlarged view of the sheet processing apparatus 3700 in FIG. 37).

In this fashion, only sheets belonging to a group classified by one classification process may be stacked on one stacking bin.

This sheet delivery destination switching process using a multi-bin type sorter as an on-line post-processing unit can be executed. By this method, the sheet classification process can be executed. As a matter of course, the multi-bin sorter type sheet processing apparatus 3700 is an example of an in-line type post-processing unit in the third embodiment.

In addition to the above method, various methods can be adopted as the classification process. An example of this method is one shown in FIG. 38. This method implements the sheet classification process by executing a sheet feed selection process using a plurality of sheet feed units so as to alternately use sheets in the first and second orientations every time one classification process is completed.

In this case, print sheets whose paper size and paper type are designated by a job to be processed are set in the first orientation in the first sheet feed unit among a plurality of sheet feed units including sheet feed cassettes 713 and 714 in FIG. 7. Print sheets of the same size and type as those of print sheets set in the first sheet feed unit are set in the second sheet feed unit in the second orientation perpendicular to the first orientation. For example, A4 print paper sheets are set in the landscape orientation in the sheet feed cassette 713, whereas A4 print paper sheets are set in the portrait orientation in the sheet feed cassette 714.

Figure 38:
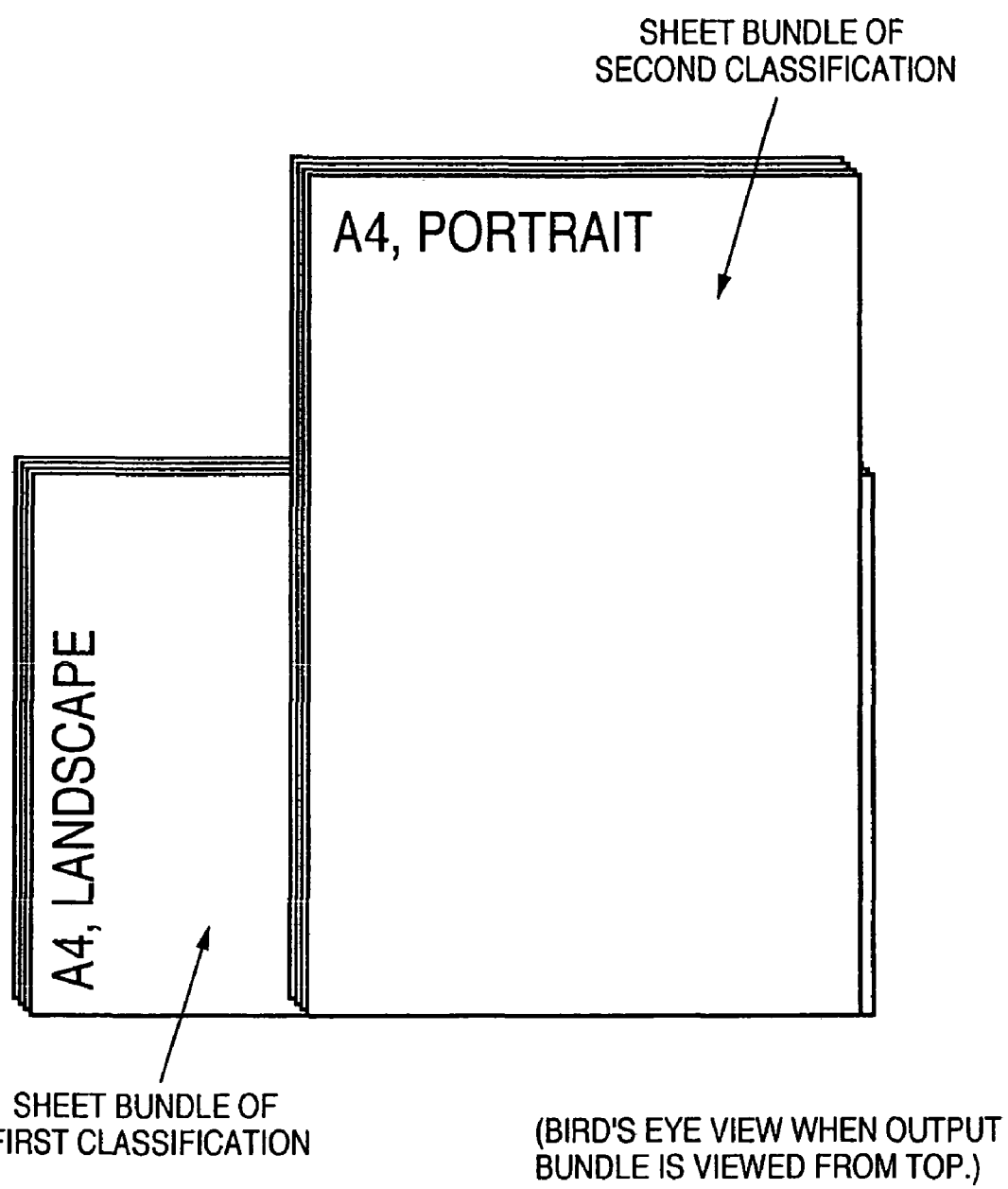
FIG. 38 is a view for explaining a control example in the embodiment.

After the preparations are completed, for example, the controller unit 402 causes the image forming apparatus 101 to execute a classification process by the method as shown in FIG. 38.

In this case, for example, the controller unit 402 feeds all sheets belonging to the first classification as sheets of a job to be processed from the sheet feed cassette 713. The A4 sheets undergo a printing process in the landscape orientation, and are stacked on the delivery tray 722 without changing their orientation.

After sheets of the first classification are processed, the controller unit 402 feeds all sheets belonging to the second classification of the job from the sheet feed cassette 714. The A4 sheets undergo a printing process in the portrait orientation, and are stacked on the delivery tray 722 without changing their orientation.

Note that data printed on sheets of either classification are data of the same job. The controller unit 402 causes the image processing unit to properly execute an image rotation process for making the orientations of the images of output results coincide with each other.

For example, for A4 landscape printing, image data is printed by rotating through 90° the orientation from the image orientation used to print an image on A4 paper in the portrait orientation.

After sheets of the second classification are processed, the controller unit 402 feeds all sheets belonging to the third classification of the job from the sheet feed cassette 713. The A4 sheets undergo a printing process in the landscape orientation, and are stacked on the delivery tray 722 without changing their orientation. FIG. 38 shows the result of this process.

Sheets of subsequent classifications are also printed by alternately using the sheet feed cassettes 713 and 714.

In this manner, sheet feed control can be so executed as to alternately use sheets in the first orientation and those in the second orientation different from the first orientation every time sheets belonging to one classification are printed.

In addition to this, the controller unit 402 may control the printing apparatus 101 to insert an interleaving sheet between a sheet bundle of the first classification and that of the second classification. As the classification process, a sheet insertion process using an interleaving sheet can be executed.

As described above, the sheet classification process may be implemented by any method. It is preferable to stack sheets so that the user who takes out a sheet bundle from the stacking unit can grasp a break between sheets as much as possible.

Note that the first to fifth modes may also be called the first to fifth sheet stacking modes in the sense that classified sheets are stacked.

As described above, the controller unit 402 makes it possible to select, from a plurality of types of sheet stacking modes, a stacking mode based on an instruction which is input from the user via the user interface unit. The controller unit 402 controls the printing apparatus in the third embodiment to stack sheets of a job to be processed on the stacking unit such as the delivery tray 722 by a stacking method (stacking form) corresponding to the selected stacking mode.

That is, printed materials can be stacked as illustrated by the sheet bundle 2600 in FIG. 26, the sheet bundle 2700 in FIG. 27, the sheet bundle 2900 in FIG. 29, the sheet bundle 3000 in FIG. 30, the sheet bundle 3100 in FIG. 31, the sheet bundle 3600 in FIG. 36, and the like. Sheets (synonymous with print media or printed materials) of a job to be processed can be stacked in a stacking form desired by the operator on the stacking unit of the printing system including the printing apparatus 101. This configuration can achieve the above effects.

As described above, the printing system in the third embodiment can provide a mechanism capable of coping with various printing environments as described above with an eye toward future digital printing systems. In order to further enhance the effects of the third embodiment, the following control may be executed.

As described in the third embodiment and the like, the printing system is also compatible with the box function. Hence, the following configuration is provided.

For example, the operator presses the function selection key (box tab) 1003 in the display of FIG. 10 executed by the display unit 605. In response to the press, the controller unit 402 determines that the box function has been selected. In this case, the controller unit 402 causes the display unit 605 to display a document list selection window 3900A as illustrated in FIG. 39A. The document list selection window 3900A is a display window configured to allow the operator to select one or a plurality of desired documents from document data of jobs to be processed with the box function that are saved in the hard disk (to be referred to as the HD hereinafter) of the memory 405 of the printing apparatus 101.

For example, the operator selects the first 3-page document data (to be referred to as document A hereinafter) in the list via a list 3901 in FIG. 39A. In addition, the operator selects the third 2-page document data (to be referred to as document B hereinafter) in the list via the list 3901 in FIG. 39A. In response to the document selection operation by the operator in the list 3901, the controller unit 402 controls the display unit 605 to reflect the display selection state by the operator in the display contents. For example, the controller unit 402 changes the display contents of the document selection window from display contents in FIG. 39A to those in FIG. 39B in response to the document selection operation by the operator in the list 3901.

As represented by the display of FIG. 39B, the controller unit 402 executes display control to allow the operator to specify that he selected document A first from the list 3901 and then selected document B. Further, when a document is selected from the list 3901, the controller unit 402 executes display control to allow the operator to explicitly designate a process to the document selected by the operator in the document selection window.

For example, when the operator does not select any document from the list 3901, operation keys (e.g., a print key 3902) for inputting various instructions are disabled in the window, as represented by the display of FIG. 39A. As the display disabling method, for example, the display may be grayed out, as represented by the display example of FIG. 39A. Alternatively, the display may be hatched. In any configuration, it is controlled to inhibit acceptance of an instruction from the operator so as not to input any erroneous instruction from the operator.

In contrast, when the operator selects a document from the list 3901, the controller unit 402 controls the display unit 605 to enable, in the document selection window, the operation keys (e.g., the print key 3902) for inputting various instructions for the document selected from the list 3901, as represented by the display of FIG. 39B.

As described above, the operator selects a plurality of document data of a plurality of independent jobs from the list 3901. The printing apparatus 101 in the third embodiment comprises a multi-document successive print function based on a condition that document data of a plurality of jobs are selected from the list 3901.

For example, when documents are selected from the list 3901, as described above, the controller unit 402 reads out, from the HD, document data corresponding to document A selected first from the list 3901, and causes the printer unit 403 to print the document data. Successively, the controller unit 402 reads out, from the HD, document data corresponding to document B selected next from the list 3901, and causes the printer unit 403 to print the document data.

The printing apparatus 101 comprises this successive print function of causing the printer unit 403 to successively print document data of independent jobs selected by the operator from the list 3901 in the same order as the order of selecting these documents from the list 3901. Note that successive printing of a plurality of document data means that a plurality of document data are successively printed in response to one printing execution request input operation without inputting a plurality of printing execution requests by the operator.

The printing apparatus 101 in the third embodiment comprises a document merge function of treating and outputting a plurality of document data to be successively printed as document data of one job. In addition, the printing apparatus 101 comprises a document non-merge function of treating and outputting a plurality of document data to be successively printed as document data of separate jobs.

On the premise of this configuration, the controller unit 402 allows the operator to select whether to merge and successively print independent document data to be successively printed as one merged document data or successively print the document data as separate ones.

For example, the operator presses the print key 3902 enabled in the window while selecting documents A and B in the order named, as shown in the document example of FIG. 39B. Then, the controller unit 402 causes the display unit 605 to execute a display as illustrated in FIG. 40A.

Figure 40A:
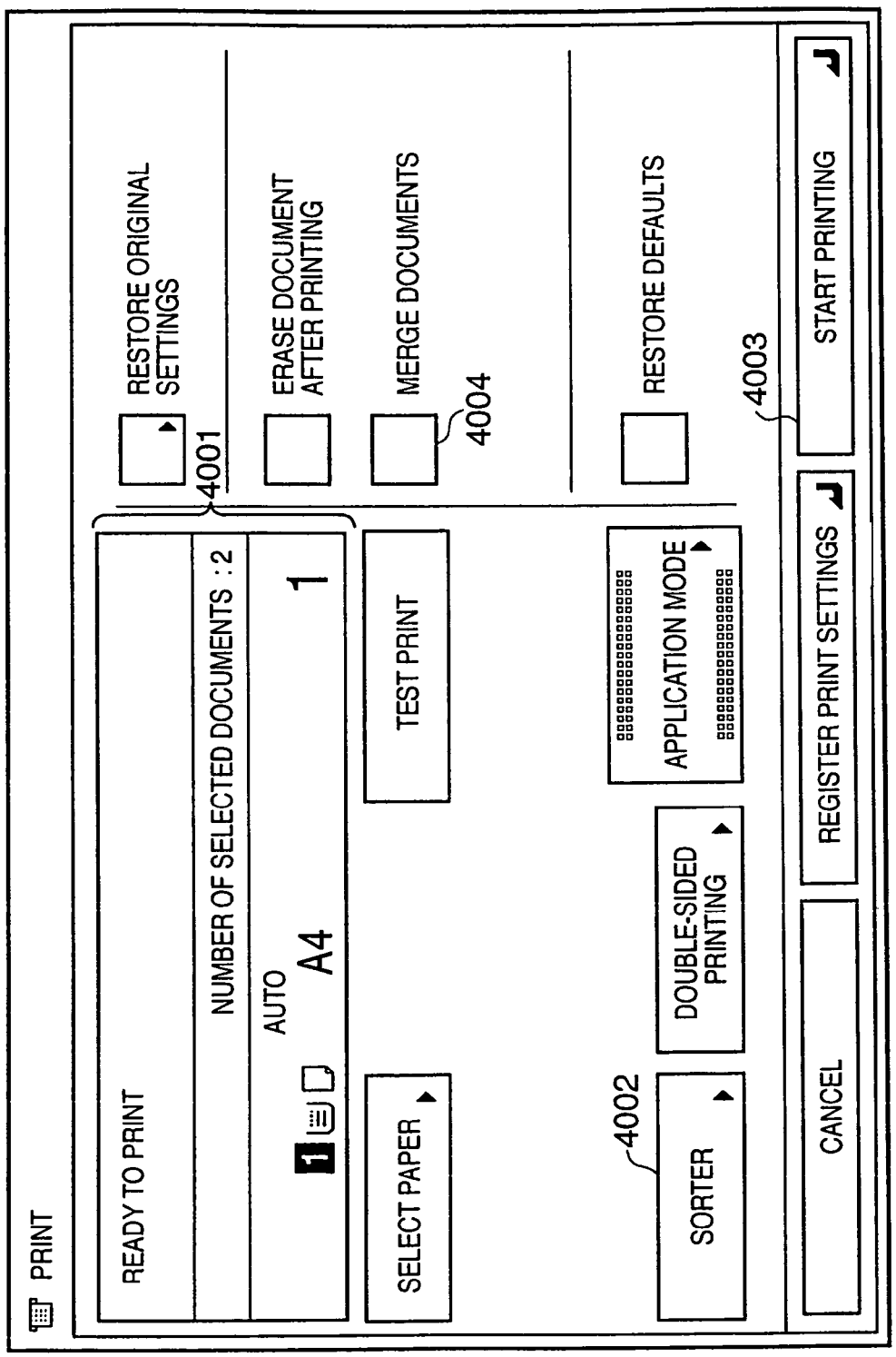

The display in FIG. 40A is a display window having a function of making print settings for a document selected from the list 3901 and a function of inputting a printing start instruction. The display in FIG. 40A executed on the display unit 605 by the controller unit 402 comprises the following display building elements.

(Display Field 4001) A display field 4001 displays information which allows the operator to confirm the number of documents selected by the operator from the list 3901, and information which allows the operator to confirm printing process conditions currently set for the selected document data. In this example, the operator selects two documents A and B from the list 3901. As illustrated in FIG. 40A, the controller unit 402 displays "the number of selected documents: 2" in the display field 4001 in order to notify the operator of the selected documents. In this example, the paper size="A4 size", the paper type="thick paper 1 mm in thickness", and the total print count="1" are set as the printing process conditions of the selected document data. In this case, as illustrated in FIG. 40A, the controller unit 402 displays, in the display field 4001, that "the paper size: A4, the print count: 1" are currently set as the printing process conditions of the selected documents.

(Sorter Key 4002) A sorter key 4002 is an operation instruction key used by the operator to input an instruction for displaying on the display unit 605 a display window for allowing the operator to explicitly input one of the first type instruction information to third type instruction information described above for each job. For example, when the operator presses the sorter key 4002, the controller unit 402 causes the display unit 605 to execute the display in FIG. 11 in response to the press. After that, the controller unit 402 causes the display unit 605 to execute the displays in FIGS. 12 and 13 in response to an operation by the operator, as described in detail in the first embodiment. By performing UI control in this example, the controller unit 402 can execute a printed material classification process in consideration of a non-in-line type post-processing unit even for a box function job requiring a printing process for document data selected from the list 3901.

(Document Merge Key 4004) A document merge key 4004 is an operation instruction key used by the operator to determine whether to print a plurality of independent document data selected by the operator from the list 3901 as one document data or successively print them as separate document data. In this example, if the operator presses the document merge key 4004 and then presses a print start key 4003, the controller unit 402 determines that an instruction "merge documents" is input. In this case, the controller unit 402 prints out, as one document, two independent documents A and B selected by the operator from the list 3901. If the operator presses the print start key 4003 without pressing the document merge key 4004, the controller unit 402 determines that no "merge documents" instruction is input. In this case, the controller unit 402 prints out, as separate documents, two independent documents A and B selected by the operator from the list 3901. Even in this case, documents A and B are successively printed in the same order as the document selection order in the list 3901. That is, print data of documents A and B are successively printed except that the printout style changes between whether to output documents A and B as one document and whether to output them as separate documents, depending on whether or not to merge documents.

(Print Start Key 4003) The print start key 4003 is an operation instruction key used by the operator to input a printing execution instruction for a document selected from the list 3901 after the operator sets various printing process conditions as illustrated in FIG. 40A.

The controller unit 402 causes the display unit 605 to execute the display in FIG. 40A as a window having these display building elements. Through the display in FIG. 40A, the operator can set the print count of a job to be processed, paper, and various application modes (e.g., reduction layout).

In the printing system, the controller unit 402 controls to successively print a plurality of document data selected by the operator from a plurality of document data in the HD of the printing apparatus 101, like the above-described box function job. Also, the printing apparatus 101 comprises the document merge function of merging a plurality of documents to be successively printed and printing the merged document in the successive print mode. Further, the printing apparatus 101 comprises the document non-merge function of printing a plurality of documents subjected to successive printing in the successive print mode without merging them. The operator can select whether to merge documents. When an instruction to merge documents is input with the document merge key 4004, the controller unit 402 merges a plurality of independent document data to be successively printed into one document data, and prints the merged document data. When no instruction to merge documents is input with the document merge key 4004, the controller unit 402 prints a plurality of independent document data to be successively printed as separate document data without merging the documents. The controller unit 402 controls the printing system including the printing apparatus 101 in the third embodiment to execute this selective operation.

In the third embodiment, even when a plurality of document data to be successively printed are printed, as described above, the controller unit 402 controls the printing system to execute, for a job to be processed, an operation concerning the above-described printed material classification process of the third embodiment. In the above-described case, the controller unit 402 controls the system to execute a "printed material classification process in consideration of a post-process using a non-in-line post-processing unit necessary after a printing process by the printing apparatus 101 for a job to be processed".

For example, the operator explicitly inputs instruction information corresponding to one of the first type instruction information to third type instruction information via the operation unit 404 for a "job requiring successive printing of a plurality of documents and document merge of them". In this case, the controller unit 402 stacks, on the stacking unit (e.g., the delivery tray 722), printed materials of a "job requiring successive printing of a plurality of documents and document merge of them" while classifying the printed materials every printed materials in consideration of a post-process for the job. On the contrary, the operator explicitly inputs instruction information corresponding to one of the first type instruction information to third type instruction information via the operation unit 404 for a "job requiring successive printing of a plurality of documents but no document merge of them". Also in this case, the controller unit 402 stacks, on the stacking unit (e.g., the delivery tray 722), printed materials of a "job requiring successive printing of a plurality of documents but no document merge of them" while classifying the printed materials every printed materials in consideration of a post-process for the job.

It should be noted in the third embodiment that the classification method of a printed material classification operation which considers a post-process (post-step) is changed (discriminated) between a job requiring successive printing and document merge and a job not requiring document merge. A concrete example of this control executed by the controller unit 402 will be explained using a control example in which documents A and B are selected as successive printing targets from the list 3901 illustrated in FIG. 39B.

A control example associated with a printed material classification operation executed when no document is merged will be described.

For example, the operator selects document A and then document B from the list 3901, and presses the print key 3902. In response to this, the controller unit 402 changes the display contents of the display unit 605 from the display window in FIG. 39B to that in FIG. 40A.

In the window of FIG. 40A, a total print count of four copies is set for a "job for successively printing documents A and B in order of document A document B". The controller unit 402 controls the display unit 605 to reflect the operator setting in the display contents. For example, the controller unit 402 changes the display state from a window 4000A in FIG. 40A to a window 4000B in FIG. 40B.

Thereafter, the operator presses the sorter key 4002 in the display of FIG. 40B. In response to the operator's operation, the controller unit 402 causes the display unit 605 to execute the display in FIG. 11. Then, the operator presses the "sort by copy count" button 1101 in the display of FIG. 11. In response to the operator's operation, the controller unit 402 causes the display unit 605 to execute the display in FIG. 12.

While the display window in FIG. 12 is displayed on the display unit 605, the operator presses the "every copy" button 1202 to input an instruction "to stack printed materials while classifying them every printed materials of one copy" for the job. Upon completion of the settings by the operator in the display of FIG. 12, the controller unit 402 causes the display unit 605 to display the display window in FIG. 40B again.

As described above, the operator inputs an instruction on the printed material sorting operation. Then, for example, the operator presses the print start key 4003 to input a printing execution request for the job to be processed without inputting any document merge instruction with the document merge key 4004 in the window 4000B of FIG. 40B.

When the operator makes various settings and requests execution of printing, as described above, the controller unit 402 determines that the job is a "job requiring successive printing of documents A and B in order of document A→document B, but not requiring document merge". In addition, the controller unit 402 determines that the job is a "job requiring printing of four copies in total and stacking of printed materials while classifying them every printed materials of one copy". The controller unit 402 controls the printing system to execute a series of printing operations based on the process conditions set by the operator for the job. More specifically, the controller unit 402 controls the printing system to execute, for the job, a series of printing operations for obtaining a sheet bundle 4100A illustrated in FIG. 41A as the final stacking result of the printed materials of the job on the stacking unit (e.g., the delivery tray 722). Note that the "series of printing operations" means that the printing operations include both a printing process for printed materials by the printer unit 403 and a classification process for the printed materials. Control executed by the controller unit 402 for the job will be explained in more detail with reference to FIG. 41A.

For example, on the basis of the above-mentioned setting instruction by the operator on the operation unit 404, the controller unit 402 determines that the process conditions of the job are those shown in (case A) of FIG. 41A. That is, the operator inputs the following process conditions via the operation unit 404 for the job.

(Condition 1) Document A of 3-page document data and document B of 2-page document data are successively printed as separate documents in print order of document A→document B. This means that "successive printing is performed, but no document merge is performed".

(Condition 2) The output paper size is A4 size, the output paper type is thick paper, the thickness of one paper sheet is 1 mm, the total output count is four copies, and single-sided printing is executed.

In this case, the total number of sheets (also called print paper or print media) necessary for the job is 20 sheets=a sum of 12 sheets necessary to print 3-page document A by four copies by single-sided printing, and 8 sheets necessary to print 2-page document B by four copies by single-sided printing. The stacking amount (total height) of all printed materials of the job is 20 sheets×1 mm=2 cm.

(Condition 3) The job requires a printed material classification process every printed materials of one copy. In other words, the first mode is designated as a sorting method for the job.

The controller unit 402 controls the printing system to execute a series of printing operations complying with these process conditions so as to obtain the stacking result as shown in FIG. 41A for the job. In the series of printing operations, the following steps are executed sequentially in the following order. Note that the reference method for the sheet bundle 4100A in FIG. 41A is the same as that described with reference to FIG. 26 and the like, and will be briefly explained.

[Step 1] Data of document A are read out from the HD, and single-sided printing of the three pages of document A is executed. The printed materials are defined as those of the first set. The bundle is so delivered as to align the edges of the printed materials of the first set at the first stacking reference position (see FIG. 34) on the delivery tray 722.

[Step 2] The data of document A are read out from the HD, and single-sided printing of the three pages of document A is executed. The printed materials are defined as those of the second set. The printed materials of the second set are stacked with a shift from those of the first set. In other words, the shift operation and bundle delivery operation are so executed as to align the edges of the printed materials of the second set at the second stacking reference position (see FIG. 34) on the delivery tray 722.

[Step 3] The data of document A are read out from the HD, and single-sided printing of the three pages of document A is executed. The printed materials are defined as those of the third set. The printed materials of the third set are stacked with a shift from those of the second set. In other words, the shift operation and bundle delivery operation are so executed as to align the edges of the printed materials of the third set at the first stacking reference position (see FIG. 34) on the delivery tray 722.

[Step 4] The data of document A are read out from the HD, and single-sided printing of the three pages of document A is executed. The printed materials are defined as those of the fourth set. The printed materials of the fourth set are stacked with a shift from those of the third set. In other words, the shift operation and bundle delivery operation are so executed as to align the edges of the printed materials of the fourth set at the second stacking reference position (see FIG. 34) on the delivery tray 722.

[Step 5] Data of document B are read out from the HD, and single-sided printing of the two pages of document B is executed. The printed materials are defined as those of the fifth set. The printed materials of the fifth set are stacked with a shift from those of the fourth set. In other words, the shift operation and bundle delivery operation are so executed as to align the edges of the printed materials of the fifth set at the first stacking reference position (see FIG. 34) on the delivery tray 722.

[Step 6] The data of document B are read out from the HD, and single-sided printing of the two pages of document B is executed. The printed materials are defined as those of the sixth set. The printed materials of the sixth set are stacked with a shift from those of the fifth set. In other words, the shift operation and bundle delivery operation are so executed as to align the edges of the printed materials of the sixth set at the second stacking reference position (see FIG. 34) on the delivery tray 722.

[Step 7] The data of document B are read out from the HD, and single-sided printing of the two pages of document B is executed. The printed materials are defined as those of the seventh set. The printed materials of the seventh set are stacked with a shift from those of the sixth set. In other words, the shift operation and bundle delivery operation are so executed as to align the edges of the printed materials of the seventh set at the first stacking reference position (see FIG. 34) on the delivery tray 722.

[Step 8] The data of document B are read out from the HD, and single-sided printing of the two pages of document B is executed. The printed materials are defined as those of the eighth set. The printed materials of the eighth set are stacked with a shift from those of the seventh set. In other words, the shift operation and bundle delivery operation are so executed as to align the edges of the printed materials of the eighth set at the second stacking reference position (see FIG. 34) on the delivery tray 722.

Accordingly, the series of printing operations for the job is completed. The final stacking result of the job corresponding to (case A) in FIG. 41A on the delivery tray 722 is the stacking result as represented by the sheet bundle 4100A in FIG. 41A. Note that the series of printing operations in [step 1] to [step 8] for obtaining the stacking result in FIG. 41A is sequentially, automatically executed by inputting only one printing execution request by the operator with the print start key 4003 in FIG. 40B.

The control example in FIG. 41A executed by the controller unit 402 corresponds to a control example of inhibiting document merge of documents A and B, printing documents A and B, and stacking printed materials of the job while classifying them every printed materials of one copy.

The printing system is configured as follows when a printing process requiring document merge of documents A and B is executed to stack printed materials of the job while classifying the printed materials every printed materials of one copy.

For example, in the above-described control example, the operator executes the same settings up to display of the display window in FIG. 40B again on the display unit 605. In this stage, the operator presses the document merge key 4004 in the display of FIG. 40B.

Figure 40C:
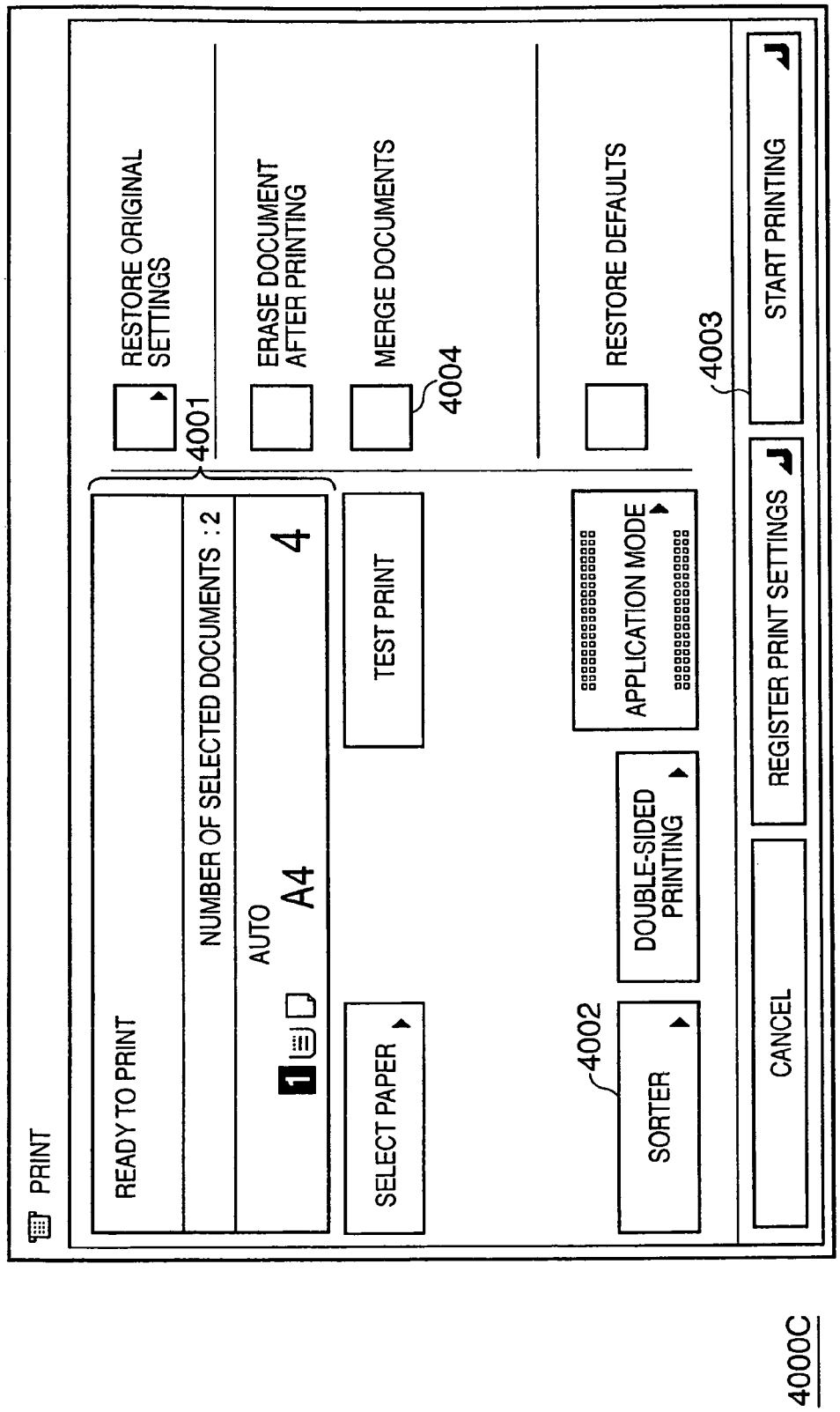

In response to the operator's operation, the controller unit 402 controls the display unit 605 to change to the display state in FIG. 40C. The window in FIG. 40C shows a state after document merge is designated. Then, the operator presses the print start key 4003, and the controller unit 402 accepts the printing execution request.

In this case, the controller unit 402 determines that the job to be processed is a "job requiring successive printing of documents A and B in order of document A document B and requiring document merge". In addition, the controller unit 402 determines that the job is a "job requiring printing of four copies in total and stacking of printed materials while classifying them every printed materials of one copy". The controller unit 402 controls the printing system to execute a series of printing operations based on the process conditions set by the operator for the job. More specifically, the controller unit 402 controls the printing system to execute, for the job, a series of printing operations for obtaining a sheet bundle 4100B illustrated in FIG. 41B as the final stacking result of the printed materials of the job on the stacking unit (e.g., the delivery tray 722). Control executed by the controller unit 402 for the job will be explained in more detail with reference to FIG. 41B.

Figure 41B:
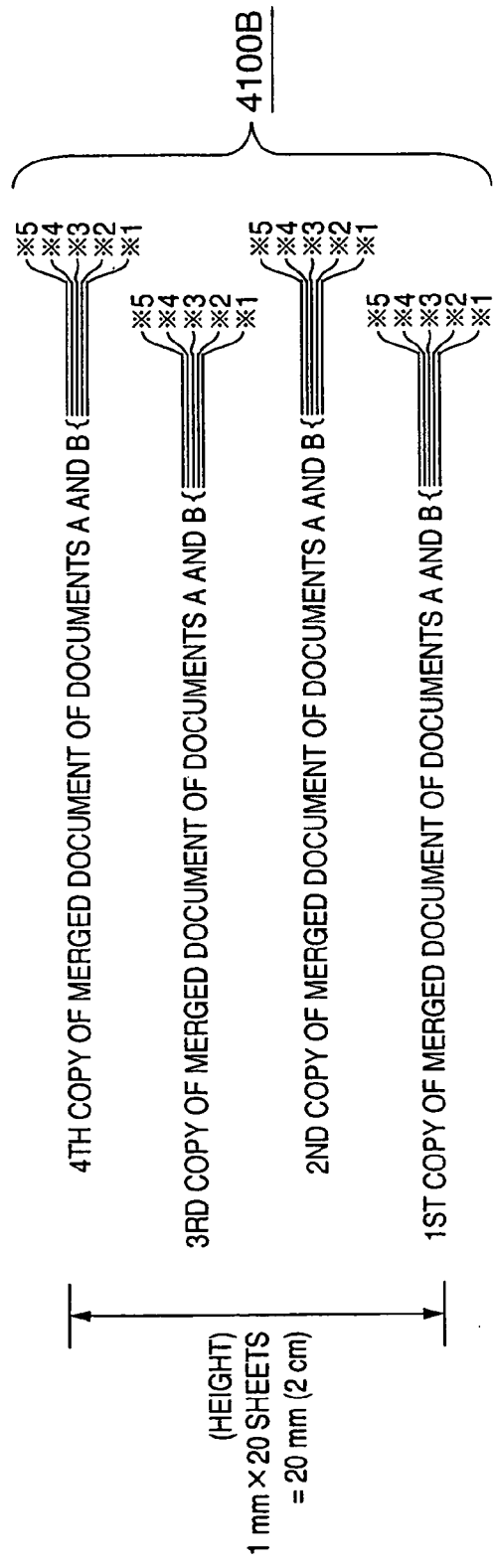

For example, on the basis of the above-mentioned setting instruction by the operator on the operation unit 404, the controller unit 402 determines that the process conditions of the job are those shown in (case B) of FIG. 41B. That is, the operator inputs the following process conditions via the operation unit 404 for the job.

(Condition 1) Document A of 3-page document data and document B of 2-page document data are printed as one document. This means that "successive printing is performed, and document merge is performed".

In the third embodiment, a document obtained by merging a plurality of documents into one will be referred to as a merged document. In this example, the controller unit 402 executes data read control from the HD and a data creation process so as to print a merged document of five pages in total that is made up of document data of 3-page document A and that of 2-page document B. Documents A and B which form the merged document are merged in the same order as the document selection order by the operator in the list 3901. In this example, the operator selects document A and then document B from the list 3901. Hence, the controller unit 402 executes the data read control from the HD and the data generation process so that the first to third pages of the 5-page merged document are the first to third pages of document A and the fourth and fifth pages of the merged document are the first and second pages of document B.

(Condition 2) The output paper size is A4 size, the output paper type is thick paper, the thickness of one paper sheet is 1 mm, the total output count is four copies, and single-sided printing is executed.

In this case, the total number of sheets (also called print paper or print media) necessary for the job is 5 pages×4 copies=20 sheets which is the number of print sheets necessary to print the 5-page merged document by four copies by single-sided printing. The stacking amount (total height) of all printed materials of the job is 20 sheets×1 mm=2 cm.

(Condition 3) The job requires a printed material classification process every printed materials of one copy. In other words, the first mode is designated as a sorting method for the job.

The controller unit 402 controls the printing system to execute a series of printing operations complying with these process conditions so as to obtain the stacking result as shown in FIG. 41B for the job. In the series of printing operations, the following steps are executed sequentially in the following order. Note that the reference method for the sheet bundle 4100B in FIG. 41B is also the same as that described with reference to FIG. 26 and the like, and will be briefly explained.

[Step 1] Data of document A and that of document B are read out from the HD to create a merged document of five pages in total by merging documents A and B in the above-mentioned merge order using the free space of the HD. Then, single-sided printing of the generated merged document is executed. The printed materials are defined as those of the first set. The bundle is so delivered as to align the edges of the printed materials of the merged document of the first set at the first stacking reference position (see FIG. 34) on the delivery tray 722.

The merged document made up of the data of documents A and B is used repetitively for four copies until a series of operations for the job ends. For this purpose, the controller unit 402 holds the generated merged document data in the memory of the HD until all the processes for the job end.

[Step 2] Single-sided printing of the generated merged document is executed. The printed materials are defined as those of the merged document of the second set. The printed materials of the merged document of the second set are stacked with a shift from those of the merged document of the first set. In other words, the shift operation and bundle delivery operation are so executed as to align the edges of the printed materials of the merged document of the second set at the second stacking reference position (see FIG. 34) on the delivery tray 722.

[Step 3] Single-sided printing of the generated merged document is executed. The printed materials are defined as those of the merged document of the third set. The printed materials of the merged document of the third set are stacked with a shift from those of the merged document of the second set. In other words, the shift operation and bundle delivery operation are so executed as to align the edges of the printed materials of the merged document of the third set at the first stacking reference position (see FIG. 34) on the delivery tray 722.

[Step 4] Single-sided printing of the generated merged document is executed. The printed materials are defined as those of the merged document of the fourth set. The printed materials of the merged document of the fourth set are stacked with a shift from those of the merged document of the third set. In other words, the shift operation and bundle delivery operation are so executed as to align the edges of the printed materials of the merged document of the fourth set at the second stacking reference position (see FIG. 34) on the delivery tray 722.

Consequently, the series of printing operations for the job is completed. The final stacking result of the job corresponding to (case B) in FIG. 41B on the delivery tray 722 is the stacking result as represented by the sheet bundle 4100B in FIG. 41B. Note that the series of printing operations in [step 1] to [step 4] for obtaining the stacking result in FIG. 41B is sequentially, automatically executed by inputting only one printing execution request by the operator with the print start key 4003.

The control example in FIG. 41A is executed by the printing system when the controller unit 402 accepts a "job requiring printing of a plurality of documents, not requiring document merge, and requiring a printed material classification process every printed materials of one copy".

The control example in FIG. 41B is executed by the printing system when the controller unit 402 accepts a "job requiring printing of a plurality of documents, requiring document merge, and requiring a printed material classification process every printed materials of one copy".

How the controller unit 402 controls the system when "it is inhibited to execute a printed material classification process every printed materials of one copy, and a classification process every printed materials in consideration of a post-process necessary after a printing process is required" will be described below in order.

This control will be explained with reference to FIG. 41C. Process conditions in (case C) in FIG. 41C are the same as those in (case A) in FIG. 41A except the sorting method. In (case C) of FIG. 41C, the fifth mode is set. In other words, this job is one for which the operator requests execution of printing with the print start key 4003 after explicitly inputting the first type instruction information. When the fifth mode is selected for the job, like (case C) in FIG. 41C, the following operation flow is executed.

For example, the operator presses the sorter key 4002 in the display of FIG. 40B. In response to the press, the controller unit 402 causes the display unit 605 to execute the display in FIG. 11. The operator presses the "sort by copy count" button 1101, and the controller unit 402 causes the display unit 605 to execute the display in FIG. 12. While the display unit 605 executes the display in FIG. 12, the operator presses the "every designated copies" button 1203 and sets "2" copies as a designated copy count via the copy count input field 1204. The display returns to the display window in FIG. 40B, and the operator presses the print start key 4003 without inputting any document merge instruction with the document merge key 4004. Then, the controller unit 402 accepts the printing execution request for the job to be processed. Through these operation procedures, a series of process conditions as represented in (case C) of FIG. 41C are set for the job to be processed. The controller unit 402 controls the printing system to execute a series of printing operations based on (case C) of FIG. 41C for the job.

When the operator makes various settings and requests execution of printing, as described above, the controller unit 402 determines that the job is a "job requiring successive printing of documents A and B in order of document A→document B, but not requiring document merge". In addition, the controller unit 402 determines that the job is a "job requiring printing of four copies in total and stacking of printed materials while classifying them every printed materials of two copies corresponding to the designated copy count". The controller unit 402 controls the printing system to execute, for the job, a series of printing operations based on the process conditions set by the operator for the job. More specifically, the controller unit 402 controls the printing system to execute, for the job, a series of printing operations for obtaining a sheet bundle 4100C illustrated in FIG. 41C as the final stacking result of the printed materials of the job on the stacking unit (e.g., the delivery tray 722). Control executed by the controller unit 402 for the job will be explained in more detail with reference to FIG. 41C.

For example, on the basis of the above-mentioned setting instruction by the operator on the operation unit 404, the controller unit 402 determines that the process conditions of the job are those shown in (case C) of FIG. 41C. That is, the operator inputs the following process conditions for the job via the operation unit 404.

(Condition 1) Document A of 3-page document data and document B of 2-page document data are successively printed as separate documents in print order of document A→document B. This means that "successive printing is performed, but no document merge is performed".

(Condition 2) The output paper size is A4 size, the output paper type is thick paper, the thickness of one paper sheet is 1 mm, the total output count is four copies, and single-sided printing is executed.

In this case, the total number of sheets (also called print paper or print media) necessary for the job is 20 sheets=a sum of 12 sheets necessary to print 3-page document A by four copies by single-sided printing, and 8 sheets necessary to print 2-page document B by four copies by single-sided printing. The stacking amount (total height) of all printed materials of the job is 20 sheets×1 mm=2 cm.

(Condition 3) The job requires a printed material classification process every printed materials of two copies corresponding to the designated copy count. In other words, the fifth mode is designated as a sorting method for the job.

The controller unit 402 controls the printing system to execute a series of printing operations complying with these process conditions so as to obtain the stacking result as shown in FIG. 41C for the job. In the series of printing operations, the following steps are executed sequentially in the following order. Note that the reference method for the sheet bundle 4100C in FIG. 41C is the same as that described with reference to FIG. 36 and the like, and will be briefly explained.

[Step 1] Data of document A are read out from the HD, and single-sided printing of the three pages of document A is executed. The printed materials are defined as those of the first set. The bundle is so delivered as to align the edges of the printed materials of the first set at the first stacking reference position (see FIG. 34) on the delivery tray 722.

[Step 2] The data of document A are read out from the HD, and single-sided printing of the three pages of document A is executed. The printed materials are defined as those of the second set. It is inhibited to stack the printed materials of the second set with a shift from those of the first set. In other words, the bundle delivery operation is so executed as to align the edges of the printed materials of the second set at the first stacking reference position (see FIG. 34) on the delivery tray 722 that is the same as that of the printed materials of the first set.

[Step 3] The data of document A are read out from the HD, and single-sided printing of the three pages of document A is executed. The printed materials are defined as those of the third set. The printed materials of the third set are stacked with a shift from those of the second set. In other words, the shift operation and bundle delivery operation are so executed as to align the edges of the printed materials of the third set at the second stacking reference position (see FIG. 34) on the delivery tray 722.

[Step 4] The data of document A are read out from the HD, and single-sided printing of the three pages of document A is executed. The printed materials are defined as those of the fourth set. It is inhibited to stack the printed materials of the fourth set with a shift from those of the third set. In other words, the bundle delivery operation is so executed as to align the edges of the printed materials of the fourth set at the second stacking reference position (see FIG. 34) on the delivery tray 722 that is the same as that of the printed materials of the third set.

[Step 5] Data of document B are read out from the HD, and single-sided printing of the two pages of document B is executed. The printed materials are defined as those of the fifth set. The printed materials of the fifth set are stacked with a shift from those of the fourth set. In other words, the shift operation and bundle delivery operation are so executed as to align the edges of the printed materials of the fifth set at the first stacking reference position (see FIG. 34) on the delivery tray 722.

[Step 6] The data of document B are read out from the HD, and single-sided printing of the two pages of document B is executed. The printed materials are defined as those of the sixth set. It is inhibited to stack the printed materials of the sixth set with a shift from those of the fifth set. In other words, the bundle delivery operation is so executed as to align the edges of the printed materials of the sixth set at the first stacking reference position (see FIG. 34) on the delivery tray 722 that is the same as that of the printed materials of the fifth set.

[Step 7] The data of document B are read out from the HD, and single-sided printing of the two pages of document B is executed. The printed materials are defined as those of the seventh set. The printed materials of the seventh set are stacked with a shift from those of the sixth set. In other words, the shift operation and bundle delivery operation are so executed as to align the edges of the printed materials of the seventh set at the second stacking reference position (see FIG. 34) on the delivery tray 722.

[Step 8] The data of document B are read out from the HD, and single-sided printing of the two pages of document B is executed. The printed materials are defined as those of the eighth set. It is inhibited to stack the printed materials of the eighth set with a shift from those of the seventh set. In other words, the bundle delivery operation is so executed as to align the edges of the printed materials of the eighth set at the second stacking reference position (see FIG. 34) on the delivery tray 722 that is the same as that of the printed materials of the seventh set.

As a result, the series of printing operations for the job is completed. The final stacking result of the job corresponding to (case C) in FIG. 41C on the delivery tray 722 is the stacking result as represented by the sheet bundle 4100C in FIG. 41C. Note that the series of printing operations in [step 1] to [step 8] for obtaining the stacking result in FIG. 41C is sequentially, automatically executed by inputting only one printing execution request by the operator with the print start key 4003 in FIG. 40B.

The control example in FIG. 41C executed by the controller unit 402 corresponds to a control example of inhibiting document merge of documents A and B, printing documents A and B, inhibiting execution of a classification process every printed materials of one copy, and executing a classification process every printed materials in consideration of a post-process.

The printing system is configured as follows when a printing process requiring document merge of documents A and B is executed, execution of a classification process every printed materials of one copy is inhibited, and a classification process every printed materials in consideration of a post-process is executed.

For example, the stage until the controller unit 402 causes the display unit 605 to execute the display in FIG. 11 in the control example illustrated in FIG. 41C proceeds basically under the same conditions as those illustrated in FIG. 41C. The operator sets one of the following sorting methods via the display of FIG. 12.

(1) The operator selects the third mode by pressing the "designate post-step" button 1103, and selects "item no 3" in the list display of FIG. 13. This means that the operator explicitly inputs the third type instruction information for a job to be processed.

(2) The operator selects the fourth mode by pressing the "sort by height" button 1102, and inputs a numerical value "10 mm" as height information in the "sort by height" button 1102. This means that the operator explicitly inputs the second type instruction information for a job to be processed.

(3) The operator selects the fifth mode by pressing the "every designated copies" button 1203, and inputs a numerical value "12 copies" as designated copy count information in the copy count input field 1204. This means that the operator explicitly inputs the first type instruction information for a job to be processed.

After the operator explicitly inputs instruction information corresponding to one of the first type instruction information to third type instruction information via the operation unit 404 for the job to be processed, the display returns to the display window in FIG. 40B.

In the display state of FIG. 40B, the operator presses the document merge key 4004 to input a document merge instruction. In this case, the controller unit 402 controls to change the display contents to those shown in FIG. 40C. Then, the operator presses the print start key 4003, and the controller unit 402 accepts the printing execution request for the job to be processed. Through these operation procedures, a series of process conditions as represented in (case D) of FIG. 41D are set for the job to be processed. The controller unit 402 controls the printing system to execute a series of printing operations based on (case D) of FIG. 41D for the job. Control executed by the controller unit 402 for the job will be explained in more detail with reference to FIG. 41D.

For example, on the basis of the above-mentioned setting instruction by the operator on the operation unit 404, the controller unit 402 determines that the process conditions of the job are those shown in (case D) of FIG. 41D. That is, the operator inputs the following process conditions via the operation unit 404 for the job.

(Condition 1) Document A of 3-page document data and document B of 2-page document data are printed as one document. This means that "successive printing is performed, and document merge is performed". This also means printing of a merged document, similar to FIG. 41B. The method of generating a merged document of documents A and B is also the same as that in FIG. 41B, and a description thereof will be omitted.

(Condition 2) The output paper size is A4 size, the output paper type is thick paper, the thickness of one paper sheet is 1 mm, the total output count is four copies, and single-sided printing is executed. The total number of sheets (also called print paper or print media) necessary for the job is 5 pages×4 copies=20 sheets which is the number of print sheets necessary to print the 5-page merged document by four copies by single-sided printing. The stacking amount (total height) of all printed materials of the job is 20 sheets×1 mm=2 cm.

(Condition 3) The job requires a printed material classification process every printed materials of one copy. In other words, the third, fourth, or fifth mode is designated as a sorting method for the job. Detailed process condition parameters in each mode have been described above and are represented by the sorting method in (case D) of FIG. 41D, and a description thereof will be omitted.

The controller unit 402 controls the printing system to execute a series of printing operations complying with these process conditions so as to obtain the stacking result as shown in FIG. 41D for the job. In the series of printing operations, the following steps are executed sequentially in the following order. Note that the reference method for a sheet bundle 4100D in FIG. 41D is the same as that described with reference to FIGS. 29, 30, and 36 and the like, and will be briefly explained.

[Step 1] Data of document A and that of document B are read out from the HD to create a merged document of five pages in total by merging documents A and B in the above-mentioned merge order using the free space of the HD. Then, single-sided printing of the generated merged document is executed. The printed materials are defined as those of the merged document of the first set. The bundle is so delivered as to align the edges of the printed materials of the merged document of the first set at the first stacking reference position (see FIG. 34) on the delivery tray 722. The merged document made up of the data of documents A and B is used repetitively for four copies until a series of operations for the job ends. For this purpose, the controller unit 402 holds the generated merged document data in the memory of the HD until all the processes for the job end.

[Step 2] Single-sided printing of the generated merged document is executed. The printed materials are defined as those of the merged document of the second set. It is inhibited to stack the printed materials of the merged document of the second set with a shift from those of the merged document of the first set. In other words, the bundle delivery operation is so executed as to align the edges of the printed materials of the merged document of the second set at the first stacking reference position (see FIG. 34) on the delivery tray 722 that is the same as that of the printed materials of the merged document of the first set.

[Step 3] Single-sided printing of the generated merged document is executed. The printed materials are defined as those of the merged document of the third set. The printed materials of the merged document of the third set are stacked with a shift from those of the merged document of the second set. In other words, the shift operation and bundle delivery operation are so executed as to align the edges of the printed materials of the merged document of the third set at the second stacking reference position (see FIG. 34) on the delivery tray 722.

[Step 4] Single-sided printing of the generated merged document is executed. The printed materials are defined as those of the merged document of the fourth set. It is inhibited to stack the printed materials of the merged document of the fourth set with a shift from those of the merged document of the third set. In other words, the bundle delivery operation is so executed as to align the edges of the printed materials of the merged document of the fourth set at the second stacking reference position (see FIG. 34) on the delivery tray 722 that is the same as that of the printed materials of the merged document of the third set.

As a result, the series of printing operations for the job is completed. The final stacking result of the job corresponding to (case D) in FIG. 41D on the delivery tray 722 is the stacking result as represented by the sheet bundle 4100D in FIG. 41D. Note that the series of printing operations in [step 1] to [step 4] for obtaining the stacking result in FIG. 41D is sequentially, automatically executed by inputting only one printing execution request by the operator with the print start key 4003.

The controller unit 402 executes the control examples as shown in FIGS. 39A to 41D. Note that a computer-readable program for executing the control examples as shown in FIGS. 39A to 41D by the controller unit 402 is also stored in advance in the memory 405 as a control program associated with the sorting operation.

As described above, the controller unit 402 controls to execute the first type printing operation of successively printing a plurality of independent document data to be stored in the HD of the printing system as separate document data without merging them into one document data. In other words, the job to be processed which is accepted by the controller unit 402 in accordance with input of a printing execution request is a "job requiring successive printing of a plurality of documents, but not requiring document merge".

In addition, the controller unit 402 controls to execute the second type printing operation of merging, into one document data, a plurality of independent document data to be stored in the HD of the printing system, and printing the merged document data. In other words, the job to be processed which is accepted by the controller unit 402 in accordance with input of a printing execution request is a "job requiring successive printing of a plurality of documents, and requiring document merge".

On the premise of the above configuration, the controller unit 402 controls to execute a classification process every printed materials of one copy in processing a "job requiring successive printing of a plurality of documents, but not requiring document merge". This process corresponds to the control example shown in FIG. 41A.

The controller unit 402 controls to execute a classification process every printed materials of one copy in processing a "job requiring successive printing of a plurality of documents and requiring document merge". This process corresponds to the control example shown in FIG. 41B.

Also, the controller unit 402 controls to execute a classification process every printed materials in consideration of a post-process necessary after a printing process for a job in processing a "job requiring successive printing of a plurality of documents, but not requiring document merge". This process corresponds to the control example shown in FIG. 41C.

Further, the controller unit 402 controls to execute a classification process every printed materials in consideration of a post-process necessary after a printing process for a job in processing a "job requiring successive printing of a plurality of documents and requiring document merge". This process corresponds to the control example shown in FIG. 41D.

As is apparent from a comparison between the stacking results of sheet bundles in FIGS. 41A to 41D on the delivery tray 722, the controller unit 402 controls the printing system to obtain different stacking results as the stacking forms of the sheet bundles 4100A to 4100D.

In other words, the controller unit 402 performs the first confirmation for determining whether the job requires document merge even in a case where the same document is successively printed. The controller unit 402 performs the second confirmation for determining whether the job requires execution of a printed material classification process every printed materials in consideration of a post-process necessary after a printing process. After that, the controller unit 402 controls to change the stacking result of printed materials on the delivery tray 722 on the basis of the results of the first and second confirmations even in a case where the same documents are successively printed.

For example, there are two jobs which are to be processed and successively printed. Both of the jobs are "jobs requiring a printed material classification process every printed materials of one copy". The jobs target the same document to be printed. Even in this case, the first job requires the first type printing operation, and the second job requires the second type printing operation. The controller unit 402 controls the printing system including the printing apparatus 101 to stack printed materials of the second job on the delivery tray 722 in a stacking form different from that of printed materials of the first job on the delivery tray 722. Although the jobs have common process conditions, the controller unit 402 stacks printed materials of the job illustrated in FIG. 41B on the delivery tray 722 in a stacking form different from the stacking result of the sheet bundle 4100A in FIG. 41A on the basis of whether to merge documents. Resultantly, the stacking result as represented by the sheet bundle 4100B in FIG. 41B is obtained as a stacking result different from that illustrated in FIG. 41A. The control for different stacking results is apparent from this configuration.

For example, there are two jobs which are to be processed and successively printed. Both of the jobs are "jobs requiring a printed material classification process every printed materials in consideration of a post-process (post-step) after a printing process". The jobs target the same document to be printed. Even in this case, the first job requires the first type printing operation, and the second job requires the second type printing operation. The controller unit 402 controls the printing system including the printing apparatus 101 to stack printed materials of the second job on the delivery tray 722 in a stacking form different from that of printed materials of the first job on the delivery tray 722. Although the jobs have common process conditions, the controller unit 402 stacks printed materials of the job illustrated in FIG. 41D on the delivery tray 722 in a stacking form different from the stacking result of the sheet bundle 4100C in FIG. 41C on the basis of whether to merge documents. The stacking result as represented by the sheet bundle 4100D in FIG. 41D is obtained as a stacking result different from that illustrated in FIG. 41C. The control for different stacking results is apparent from this configuration.

For example, there are two jobs which are to be processed and successively printed. Both of the jobs are "jobs not requiring document merge". The jobs target the same document to be printed. Even in this case, the first job is a "job which inhibits a printed material classification process every printed materials in consideration of a post-process (post-step) after a printing process". The second job is a "job which requires a printed material classification process every printed materials in consideration of a post-process (post-step) after a printing process". In this case, the controller unit 402 controls the printing system including the printing apparatus 101 to stack printed materials of the second job on the delivery tray 722 in a stacking form different from that of printed materials of the first job on the delivery tray 722. Although the jobs have common process conditions, the controller unit 402 stacks printed materials of the job illustrated in FIG. 41C on the delivery tray 722 in a stacking form different from the stacking result of the sheet bundle 4100A in FIG. 41A on the basis of whether the operator inputs instruction information in consideration of the post-process. The stacking result as represented by the sheet bundle 4100C in FIG. 41C is obtained as a stacking result different from that illustrated in FIG. 41A. The control for different stacking results is apparent from this configuration.

For example, there are two jobs which are to be processed and successively printed. Both of the jobs are "jobs requiring document merge". The jobs target the same document to be printed. Even in this case, the first job is a "job which inhibits a printed material classification process every printed materials in consideration of a post-process (post-step) after a printing process". The second job is a "job which requires a printed material classification process every printed materials in consideration of a post-process (post-step) after a printing process". In this case, the controller unit 402 controls the printing system including the printing apparatus 101 to stack printed materials of the second job on the delivery tray 722 in a stacking form different from that of printed materials of the first job on the delivery tray 722. Although the jobs have common process conditions, the controller unit 402 stacks printed materials of the job illustrated in FIG. 41D on the delivery tray 722 in a stacking form different from the stacking result of the sheet bundle 4100B in FIG. 41B on the basis of whether the operator inputs instruction information in consideration of the post-process. The stacking result as represented by the sheet bundle 4100D in FIG. 41D is obtained as a stacking result different from that illustrated in FIG. 41B. The control for different stacking results is apparent from this configuration.

In this manner, according to the third embodiment, the controller unit 402 determines whether a job to be successively printed exists. This determination corresponds to whether a plurality of documents are selected by the operator from the list 3901 displayed on the operation unit 404. The controller unit 402 also determines whether the job to be successively printed requires document merge. This determination corresponds to whether a document merge instruction for a plurality of documents selected from the list 3901 is input by the operator with the document merge key 4004 displayed on the operation unit 404. The controller unit 402 determines whether the job requires the printed material classification process in correspondence with a post-process. This determination corresponds to whether instruction information corresponding to one of the first type instruction information to third type instruction information is explicitly input by the operator via the displays in FIGS. 11 to 13. Based on the three determination results, the controller unit 402 determines the stacking form of printed materials of a job to be processed on the delivery tray 722. The controller unit 402 controls the printing system to classify printed materials of the job to be processed in the determined stacking form. Note that all the three determinations may not be made. For example, the controller unit 402 may execute control on the classification operation for printed materials to be processed on the basis of one or two of the three determinations.

As described above, document data of a job to be processed with the box function illustrated in FIGS. 39A to 41D in the third embodiment is held in the hard disk of the memory 405 of the printing apparatus 101. In the third embodiment, the controller unit 402 controls to hold print document data to be processed with the box function in the HD of the memory 405 unless the operator explicitly inputs an instruction with, e.g., the "erase key" of a window 3900B in FIG. 39B. With this configuration, document data can be repetitively printed every time the operator inputs a printing execution request with the print start key 4003 illustrated in FIG. 40A or the like. The printing system comprises this re-print function.

The above configuration considers user merits, and need not always comprise all the building elements. The present invention can be applied to, e.g., a configuration which can perform the successive printing operation but does not have any document merge function, or a configuration which can perform the successive printing operation but does not have any document non-merge function. However, the configuration can execute at least the classification process in consideration of a post-process. The configuration is arbitrary as far as at least some of various effects described in the third embodiment can be achieved. This applies to all the embodiments in this specification.

With the above building elements as illustrated in FIGS. 39A to 41D, the effects described with reference to FIGS. 1 to 38 and the like can be further improved. In particular, the effect capable of flexibly meeting various use cases and user needs which may occur in a printing environment such as the POD environment can be further enhanced with the building elements as illustrated in FIGS. 39A to 41D.

In a printing environment such as the POD environment, the operator engaged at the site in the POD environment coordinates the schedule in advance in order to meet various printing order requests from various customers by quick delivery within short periods. According to the schedule, the operator inputs, stores, and holds many jobs in the storage unit of a printing apparatus at the work site concentratedly at the same time. The operator instructs the printing apparatus from its operation unit in accordance with the schedule to concentratedly print at once the documents of many jobs stored in advance in the internal memory of the printing apparatus. This case is assumed at the work site in a printing environment such as the POD environment. On this ground, the third embodiment pays attention to needs to when a plurality of processes to be performed at once exist, process them at once in consideration of working efficiency in a printing environment such as the POD environment. On the same ground, the third embodiment pays attention to needs to shorten the down time by intermittently operating the printing apparatus (without stopping the printer engine as much as possible) in a printing environment such as the POD environment.

As described above, at the printing work site, the schedule is coordinated in advance, the print order is determined in accordance with the schedule, and many documents of many jobs are held in the memory of the printing apparatus. Even in this case, the schedule may be coordinated again suddenly to change the printing process order of many documents input in advance. On this ground, the third embodiment assumes a situation in which the process order of many jobs must be changed hurriedly if the customer makes an urgent printing order request or re-printing request (additional printing request) with high priority in a printing environment such as the POD environment.

If such a situation occurs, many jobs must be processed in an order different from the original one, and post-processes necessary after a printing process and the contents of intervention work by the operator change entirely. If control as described in the third embodiment cannot be executed in this situation, the effect of increasing the efficiencies of post-processes and intervention work by the operator which are necessary after a printing process by the printing apparatus 101 in the third embodiment may be influenced.

To prevent this problem, the third embodiment can provide the user interface environment described with reference to FIGS. 39A to 40C and the like to the operator via the operation unit 404 of the printing apparatus 101. Thus, even if the above-mentioned situation occurs, it can be flexibly dealt with in real time. By executing control as illustrated in FIGS. 39A to 41D in the third embodiment, the above situation can be coped with without minimizing the influence on various effects described above in the third embodiment. The third embodiment can expect this effect.

The third embodiment finds out use cases and user needs unique to a printing environment such as the POD environment that are not expected in the office environment, and provides the mechanism capable of dealing with these use cases and user needs. The third embodiment may comprise the following configuration for further enhancing this operation effect.

For example, a case is assumed where many documents of many jobs are concentratedly printed in a printing environment such as the POD environment, as described above. In order to cope with this case, the printing system is equipped with, e.g., a large-capacity stacker illustrated in FIG. 44A.

The large-capacity stacker can stack, e.g., a maximum of 5,000 printed materials of jobs printed by the printer unit 403. The large-capacity stacker can be directly connected to the main body of the printing apparatus 101 instead of the sheet processing apparatus 720, and can receive sheets from the printer unit 403 without the mediacy of intervention work by the operator. The large-capacity stacker incorporates various sensors, and the CPU of the large-capacity stacker notifies the controller unit 402 via a signal line in the apparatus of various types of status information (e.g., the sheet status) in the large-capacity stacker. That is, the large-capacity stacker corresponds to an in-line type post-processing apparatus defined in the third embodiment.

Figure 44A:
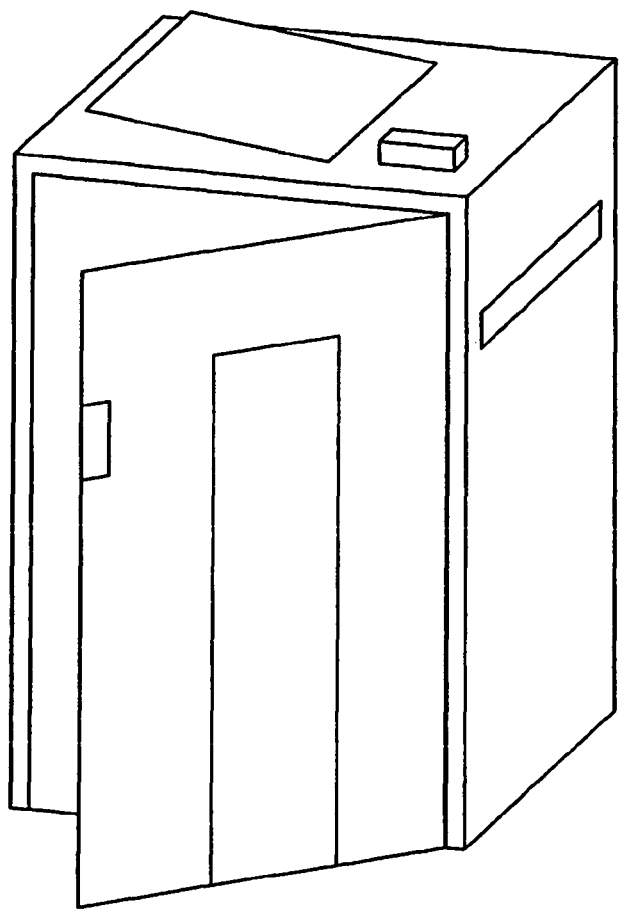
FIGS. 44A and 44B are views for explaining control examples in the embodiment.
Figure 44B:
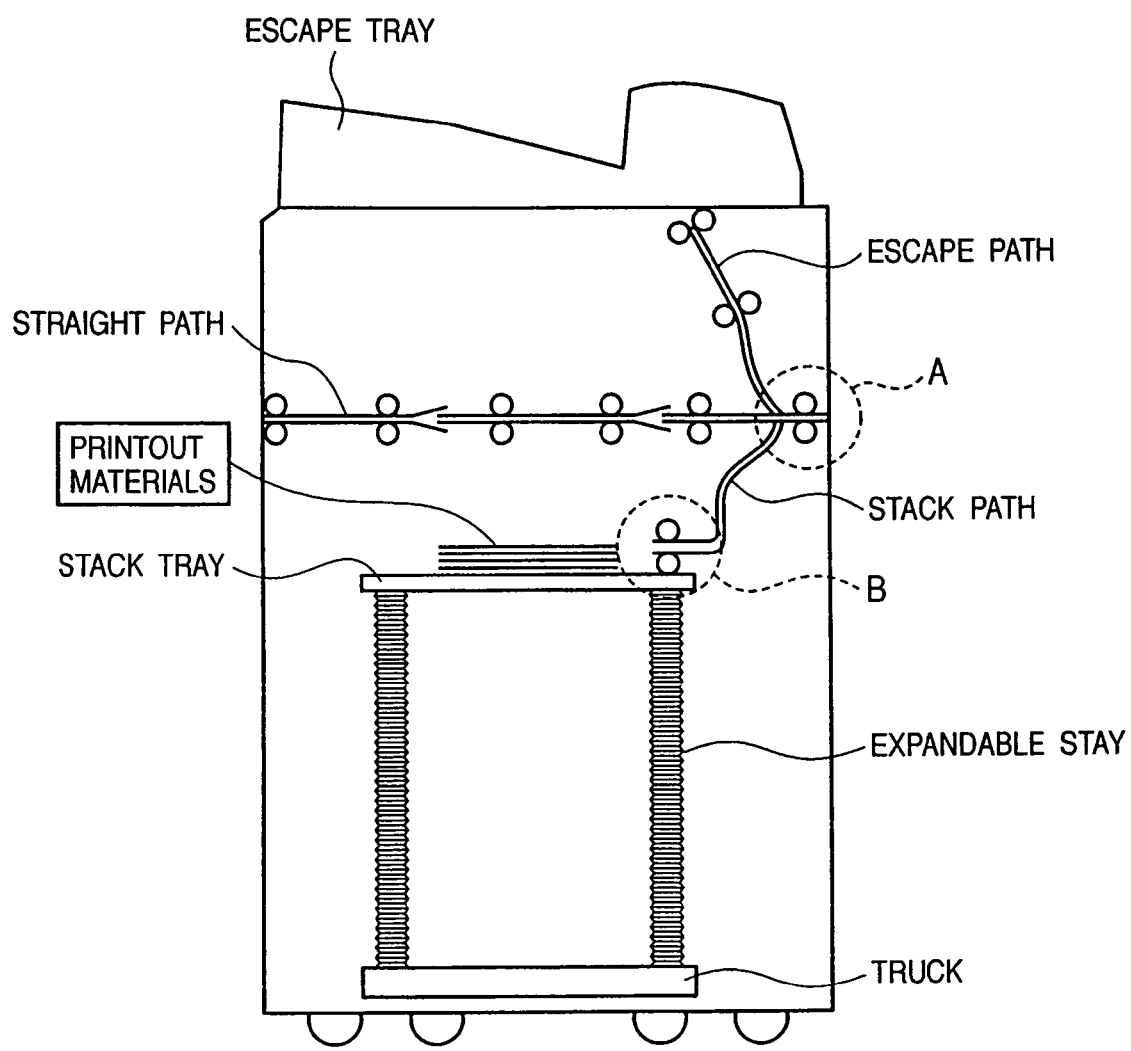

The large-capacity stacker has an internal configuration as illustrated in FIG. 44B. A material printed by the printer unit 403 is introduced into the sheet convey path in the large-capacity stacker via the convey rollers (discharge rollers 717 in FIG. 7) in the main body of the printing apparatus 101 and a point A in FIG. 44A. As illustrated in FIG. 44B, the large-capacity stacker incorporates a stack tray. The large-capacity stacker comprises, at a point B in FIG. 44B, a shift delivery unit (not shown) capable of executing a shift operation and bundle delivery operation for printed materials of a job to be stacked on the stack tray in FIG. 44B. The same function as the shift delivery function illustrated in FIG. 34 can also be implemented by the stack tray in the large-capacity stacker.

For example, when printed materials are stacked on the stack tray in the large-capacity stacker, the controller unit 402 controls the large-capacity stacker to introduce a material printed by the printer unit 403 into the sheet convey path toward the stack tray in FIG. 44B via the point A in FIG. 44B. Then, the controller unit 402 causes the shift delivery unit disposed at the point B in FIG. 44B to execute both of the shift delivery operation and bundle delivery operation or only the bundle delivery operation for the printed materials. Accordingly, the printed materials of the job to be processed are stacked on the stack tray in FIG. 44B.

Printed materials are stacked on the stack tray in FIG. 44B with their edges being aligned at the first or second alignment reference position, similar to FIG. 34. The large-capacity stacker comprises expandable stays as illustrated in FIG. 44B so that the tray can move down in accordance with the stacking amount of printed materials when the printed materials are stacked on the stack tray in FIG. 44B. Printed materials stacked on the stack tray in the large-capacity stacker can be taken out by opening the front door by the operator, as shown in the schematic view of the outer appearance of the housing in FIG. 44A. The printed materials can also be conveyed on a truck in FIG. 44B.

As described above, in the printing system in the third embodiment, the large-capacity stacker as illustrated in FIGS. 44A and 44B can be connected to the printing apparatus 101 as a mechanism capable of dealing with printing of many jobs which may concentrate at the same time in a printing environment such as the POD environment.

As described above, printing of many jobs concentrated at the same time may be requested of the operator at the site in a printing environment such as the POD environment. In this situation, assume that a factor to interrupt the printing operation by the printing system occurs during execution of the printing operation by the printing apparatus 101.

In this case, the controller unit 402 controls to interrupt the current printing operation of the job to be processed by the printing apparatus 101 in response to generation of the printing interrupt factor of the job. The controller unit 402 controls to automatically resume the series of printing operations for the job in response to cancellation of the printing interrupt factor of the job. In order to recover a job during interruption of printing, the controller unit 402 holds print data of the interrupted job in the internal HD of the memory 405. By using the print data of the job that is held in the memory 405, the controller unit 402 controls to continue the series of printing operations for the job from interrupted data after the printing interrupt factor of the job is canceled. The series of printing operations described here contains a printing process for an interrupted job by the printer unit 403, and a stacking operation for printed materials of the interrupted job on the stacking unit. That is, the printed material classification process for the interrupted job is also contained in the series of printing operations. The printing interrupt factor corresponds to, e.g., one of the following factors.

(Factor 1) A paper absence error for a print medium necessary for a job to be printed.

(Factor 2) A trouble in the scanner unit 401 such as a document jam or scan error in a job to be printed.

(Factor 3) A memory-full error in the hard disk of the memory 405.

(Factor 4) An explicit printing interrupt instruction by the operator for a job to be input via the operation unit 404.

As described above, the controller unit 402 controls the printing system so that a series of printing operations for a job for which the printing operation is interrupted by generation of a printing interrupt factor can automatically continue in response to cancellation of the printing interrupt factor of the job.

If the printing operation simply resumes after the printing interrupt factor is canceled, the effects described in the third embodiment may not be satisfactorily obtained. Thus, the third embodiment can provide a mechanism capable of preventing even such a problem.

For example, the job during interruption of printing requires a printed material classification process every printed materials in consideration of a post-process by a non-in-line type post-processing apparatus. That is, the job requires stacking of printed materials by a sorting method in at least one of the third to fifth modes. In this case, attention must be paid especially when printing resumes upon cancellation of a printing interrupt factor. In other words, if the printing operation resumes by the same recovery method as that for a job requiring the operation in the first or second mode, the working efficiency of the operator may be influenced or a trouble occurs.

As described above, printed materials of a job which requires the printed material classification process every printed materials in consideration of a post-process by a non-in-line type post-processing unit cannot be stacked on the stacking unit by sequentially switching the stacking position every printed bundle of one copy. This job requires a classification process every printed materials complying with instruction information in consideration of the post-process for the job. For this job, a stacking form complying with the instruction information which is explicitly input by the operator in consideration of the post-process should be maintained even after printing resumes.

For example, a job during interruption of printing is one for which the operator inputs instruction information in consideration of a post-process. However, the sorting mode before generation of a printing interrupt factor is ignored, and an operation to shift printed materials every copy may function as a printing resume operation of the job after the printing interrupt factor of the job is canceled. In this case, a stacking result which considers the post-process for the job, as shown in FIGS. 29, 30, 31, 36, 41C, and 41D, cannot be obtained as the final stacking result on the stacking unit of the printing system. Although the job is kept unchanged, the stacking form of printed materials of the job that have already been stacked on the stacking unit of the system before generation of a printing interrupt factor and that of printed materials of the job that are to be stacked on the stacking unit of the system after the printing interrupt factor is canceled and printing resumes may become different from each other.

If such a situation occurs, the operator who visually checks printed materials output after printing resumes may misunderstand that the printed materials of the job are different from those of a job that have already been output before printing resumes. Owing to this misunderstanding, the operator may do an erroneous operation. Even if this problem does not occur, other problems may occur: for example, the operator issues a printing request in demand for a classification process in consideration of a post-process, but the work load of the operator does not decrease after all. For example, the following intervention work may be requested of the operator. As described in the first embodiment, the operator arranges printed bundles shifted from each other, then manually counts the number of printed bundles in consideration of the non-in-line type post-processing unit, and manually sorts the printed bundles in accordance with the post-process.

If a trouble as described above occurs during the successive printing operation of many documents concentrated at the same time at the work site in the POD environment, the trouble may lead to a serious trouble.

For example, many other jobs wait for a printing operation in addition to the current job after printing resumes, and the operator plans to take out printed materials from the large-capacity stacker in FIGS. 44A and 44B after all the jobs are processed.

In this situation, printed materials of another subsequent job are delivered and stacked on printed materials of the job in trouble for which the stacking form is not maintained between printed materials stacked before printing interrupts and those stacked after printing resumes. Subsequently, many jobs are sequentially called from the printing queue, printed, delivered, and stacked. The operator may not determine which job corresponds to printed materials. If this problem occurs, it may influence not only working efficiency but also productivity. In this way, the trouble may become fatal in a printing environment such as the POD environment where productivity is important.

The third embodiment pays attention to potential problems which may occur in a printing environment such as the POD environment, and the printing system can provide a mechanism capable of solving these problems. In other words, the third embodiment finds out and can satisfy potential needs which may arise as requests unique to a printing environment such as the POD environment. For example, the controller unit 402 executes the following control operations.

In the third embodiment, the controller unit 402 holds management information of a job to be processed in the HD OF the memory 405 so as to complete the process by the system in a stacking form requested by the job. The management information is held until the process of the job is completed by the printing system. For example, when all printed materials of a job to be processed are stacked on the stacking unit (e.g., the delivery tray 722 or the stack tray in the large-capacity stacker in FIGS. 44A and 44B) of the system, the controller unit 402 permits erase of the management information from the HD. As an example of the management information, the third embodiment adopts management information 4200A shown in FIG. 42A. The management information is held in the table form in the HD in the example of FIG. 42A, but may be managed in another form. The management information 4200A is generated and managed for each job to be processed.

For a job for which execution of printing is requested, the management information 4200A contains various types of management information in information items 4201A to 4217A, as shown in FIG. 42A. Note that the contents of (information 1) to (information 17) in the respective items are described in FIG. 42A, and an explanation thereof will be omitted. These pieces of information of the items are generated by the controller unit 402 on the basis of, e.g., various printing process condition data set by the operator for a job to be processed, and information unique to print data to be printed in the job. These pieces of information of the items can be properly read out from the HD and referred to. These pieces of Information are treated as information recognizable by the controller unit 402. For example, on the basis of information of the management information 4200A, the controller unit 402 can execute a series of printing operations for a job in correspondence with the management information in the printing system. In addition, information based on the management information 4200A can be displayed on the display unit 605.

On the premise of this configuration, how to use the management information will be concretely explained. For example, a printing execution request for a given job is accepted from the operator via the start key 606 of the operation unit 404. This job will be referred to as job X. In response to the printing execution request, the controller unit 402 causes the printing system to start a series of printing operations for job X. In this situation, for example, the controller unit 402 generates management information 4200B in FIG. 42B as the management information of job X, and stores the management information 4200B in the HD.

At present, job X is being printed by the printer unit 403. The controller unit 402 sets, in an item 4216B, information representing that job X is being printed. For job X, the total number of pages is 4, the total print count set by the operator is 4. For job X, the operator designates a sorting operation (classification operation), and designates execution of the first mode as a sorting condition. In other words, when all printed bundles of job X are stacked on the stacking unit, the total number of classifications of the printed materials is 4÷1=4 classifications. The controller unit 402 sets various types of attribute information including these pieces of information for job X in items 4201B to 4215B, respectively. All pieces of information in items which are not particularly described are the same as those in FIG. 42B, and a description thereof will be omitted.

As described above, job X is being printed now, and the controller unit 402 sets even the progress representing how much printing is completed, in an item 4217B as information contained in the management information 4200B. In the example of FIG. 42B, sheets up to the second sheet of the second copy of job X have been printed as progress information (process status) of job X, and information "sheets up to the second sheet of the second copy have been printed" is stored by the controller unit 402 in the item 4217B as information capable of specifying the progress of job X. As an expression rephrasing the progress of job X, the controller unit 402 also stores, in the item 4217B, information expressing "sheets up to the second sheet of the second classification have been printed".

[Information of job X during printing (before printing interrupts)] shown in FIG. 42B has been explained.

If a printing interrupt factor of job X occurs during printing, the controller unit 402 controls the printing apparatus 101 to interrupt the printing operation of job X. The controller unit 402 controls the HD to update the management information 4200B of job X so as to reflect this state in the management information 4200B of job X. This example is shown in [information of job X during interruption of printing] described in the lower table in FIG. 42B. For example, the job status of job X is "during interruption of printing" at present, and this information is reflected in the item 4216B. In this example, sheets up to the second sheet of the third copy of job X have been printed immediately before interruption of printing. The controller unit 402 also reflects this progress in the item 4217B. As an expression rephrasing this information, information "sheets up to the second sheet of the third classification have been printed" is also reflected in the item 4217B. The actual status of the stacking unit upon interruption of printing of job X is shown in the upper half of FIG. 43A. Note that the printing interrupt factor of job X is one of (factor 1) to (factor 4) described above.

Thereafter, the printing interrupt factor of job X is canceled through intervention work by the operator. The intervention work by the operator is at least one of the following work operations.

(Work 1) Replenishment of print media necessary for a job to be printed.

(Work 2) Cancellation of an error in the scanner unit 401, including removal of a document jam in the scanner unit 401.

(Work 3) Reserve of a free space of the memory by erasing data from the hard disk of the memory 405.

(Work 4) An explicit printing resume instruction input by the operator via the operation unit 404 for a job.

A unit concerned notifies the controller unit 402 that the printing interrupt factor of job X to be printed has been canceled by the above-mentioned intervention work by the operator. In response to cancellation of the printing interrupt factor of job X, the controller unit 402 controls to resume a series of printing operations for the job from a print page at which printing is interrupted. As the printing resume operation for job X, the controller unit 402 controls the printing system to execute an operation based on information set in the management information 4200B described in the lower table of FIG. 42B. The controller unit 402 executes the following steps sequentially in order as a resume operation (recovery operation) for a series of printing operations for job X.

[Step 1] Printing is executed on the third print medium of the third copy of job X and the fourth print medium of the third copy of job X. Without executing any shift operation, these two print media are delivered onto the second printed material of the third copy of job X that has been processed immediately before interruption. As a result, one bundle of the third copy has been printed.

[Step 2] Printing is executed on the first to fourth print media of the fourth copy of job X. The shift operation is executed to stack the four print media on the fourth printed material of the third copy of job X with a shift from the fourth print medium of the third copy. After that a bundle of the four print media is delivered. Accordingly, one bundle of the fourth copy has been printed.

All processes which must be executed after cancellation of the printing interrupt factor of job X requiring the classification process every printed bundle of one copy are completed. That is, the controller unit 402 can stack printed materials of job X after interruption of printing in a stacking form consistent with that of printed materials of job X before interruption of printing, as represented by the stacking result of job X shown in the lower half of FIG. 43A.

Figure 43A:
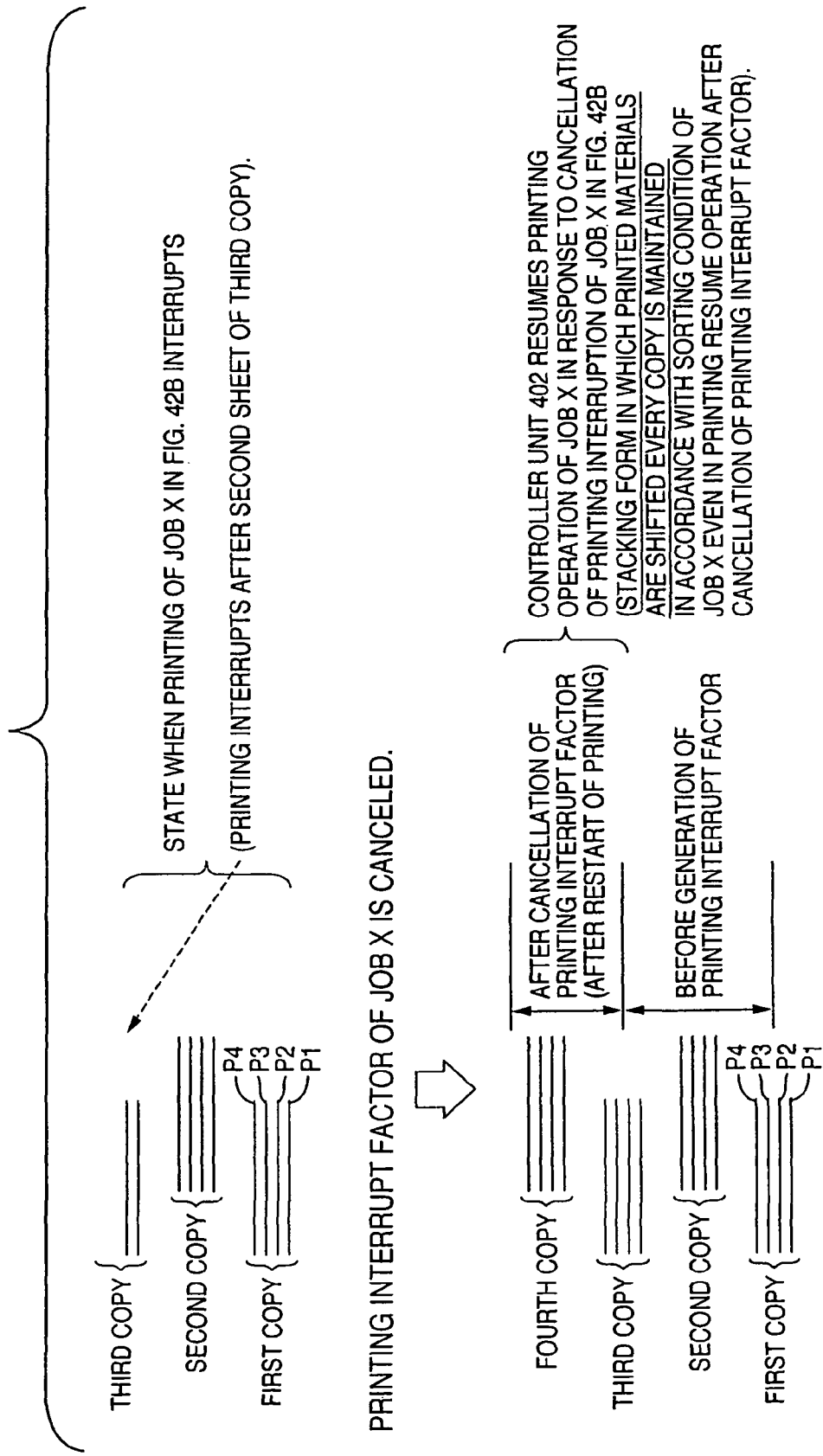

Similar to the control example illustrated in FIGS. 42B and 43A, a job during interruption of printing is one for which the operator does not input any of the first type instruction information to third type instruction information. In addition, the job during interruption of printing requires a classification process every printed bundle of one copy. In this case, the controller unit 402 controls to continue the printing operation for the job after the printing interrupt factor of the job is canceled. When printing of the job resumes, the controller unit 402 controls to stack printed materials on the stacking unit while maintaining a stacking form complying with the instruction of the job. In this example, the controller unit 402 controls the printing system to execute the shift delivery operation every time printing of one copy is completed, so as to maintain the same stacking method as that of printed materials of job X to be processed before interruption of printing. More specifically, the controller unit 402 controls to maintain the stacking form "shift printed materials every copy" in accordance with the sorting condition of job X even if a series of situations "generation of a printing interrupt factor→interruption of printing→cancellation of the printing interrupt factor→resume of printing" occurs in job X.

In this manner, after the printing interrupt factor is canceled, the controller unit 402 can continue the stacking operation of printed materials of a job for which the printing operation is interrupted by generation of the printing interrupt factor. The controller unit 402 confirms, on the basis of information in the item 4214B of the management information 4200B illustrated in FIG. 42B, that the job during interruption of printing is one for which the above-described instruction information is not input. When the printing interrupt factor is canceled, the controller unit 402 confirms pieces of information in the items 4214B, 4215B, and 4217B of the management information 4200B illustrated in the lower table of FIG. 42B. Based on these pieces of confirmation information, the controller unit 402 controls the printing system to continue the stacking operation of printed materials of the job after cancellation of the printing interrupt factor while maintaining the stacking form of printed materials of the job that have already been stacked on the stacking unit before the printing interrupt factor occurs.

As described above, the controller unit 402 confirms that the job during interruption of printing is one for which the operator does not explicitly input instruction information in consideration of a post-process. Even for this job, the controller unit 402 controls the printing system to continue the stacking operation of printed materials of the job after cancellation of the printing interrupt factor while maintaining the stacking form of printed materials of the job that have already been stacked on the stacking unit before the printing interrupt factor occurs.

On the premise of the above configuration, the third embodiment further comprises the following configuration.

For example, job X illustrated in FIGS. 42B and 43A requires the printed material classification process every printed materials of one copy. In this example, the "shift delivery operation" is described as an example of the classification process. Even for another job, the controller unit 402 controls to obtain the same effect.

For example, the job during interruption of printing is not one for which none of the first type instruction information to third type instruction information is input, like job X. That is, the job during interruption of printing is one for which the operator explicitly inputs instruction information corresponding to one of the first type instruction information to third type instruction information. In other words, the job during interruption of printing requires a printed material classification process in a unit in consideration of a post-process necessary after a printing process by the printing apparatus 101. In this example, even for this job, the controller unit 402 controls to continue the stacking operation of printed materials of the job after cancellation of the printing interrupt factor while maintaining the stacking form of printed materials of the job that have already been stacked on the stacking unit before the printing interrupt factor occurs. An example of this control will be described with reference to FIGS. 42C and 43B.

In this example, a job to be managed with management information 4200C in FIG. 42C will be referred to as job Y hereinafter. For example, a printing execution request for job Y is accepted from the operator via the start key 606 of the operation unit 404. In response to the printing execution request, the controller unit 402 causes the printing system to start a series of printing operations for job Y. At this time, the controller unit 402 generates the management information 4200C in FIG. 42C as management information of job Y, and stores the management information 4200C in the HD.

Items 4202C to 4213C in the management information 4200C of job Y are the same as the contents of job X which is controlled by the controller unit 402 on the basis of the management information 4200B in FIG. 42B. However, an item 4214C of job Y has contents different from those of management information in the item 4214B of job X. More specifically, for job X, the operator explicitly inputs a first mode execution instruction as the sorting condition. To the contrary, for job Y, the operator explicitly inputs a fifth mode execution instruction as the sorting condition. In other words, job Y is a "job for which the operator explicitly inputs the first type instruction information via the UI unit". More specifically, job Y is a "job which requires the shift delivery operation at a designated copy count of two copies". The controller unit 402 manages the total number of classifications of job Y as "4 copies÷2 copies=2 classifications". The controller unit 402 writes, in the item 4214C and an item 4215C, pieces of information corresponding to pieces of management information of items for job Y.

At present, job Y which is managed by the controller unit 402 on the basis of the management information 4200C containing various types of information described above is being printed by the printer unit 403. The controller unit 402 sets, in an item 4216C as status information of job Y, information representing that job Y is being printed. As the current progress of job Y, sheets up to the second sheet of the second copy have been printed. That is, the progress of job Y is the same as that illustrated for job X. The controller unit 402 stores, in an item 4217C, information representing that "sheets up to the second sheet of the second copy have been printed" as information representing the progress of job Y during printing. Job Y requires execution of the shift delivery operation every printed materials of two copies. In other words, job Y requires stacking of printed materials every printed materials of two copies. This means that the stacking form (stacking method) of printed materials of job Y is different from that of job X. For example, the total number of document pages of job Y is four, and job Y requires four copies in total. For job Y, printed bundles must be stacked on the stacking unit while being classified every two copies. The number of printed sheets of printed bundles of one classification is "4 sheets (one set)×2 copies=8 sheets". As an expression rephrasing the progress of job Y, the controller unit 402 stores, in the item 4217B, information expressing "sheets up to the sixth sheet of the first classification have been printed".

[Information of job Y during printing (before printing interrupts)] shown in FIG. 42C has been explained. By utilizing the management information 4200C, the controller unit 402 can implement control illustrated in FIG. 43B. Note that pieces of information in the remaining management items are described in FIG. 42C, and an explanation thereof will be omitted.

If the printing interrupt factor of job Y occurs during printing, as described above, the controller unit 402 controls the printing apparatus 101 to interrupt the printing operation of job Y. The controller unit 402 controls the HD to update the management information 4200C of job Y so as to reflect this state in the management information 4200C of job Y. This example is shown in [information of job Y during interruption of printing] described in the lower table in FIG. 42C. For example, the job status of job Y is "during interruption of printing" at present, and this information is reflected in the item 4216C. In this example, sheets up to the second sheet of the third copy of job Y have been printed immediately before interruption of printing. The controller unit 402 also reflects this progress in the item 4217C. The controller unit 402 further updates the information rephrasing the status of the process immediately before interruption of job Y by an expression based on the classification of printed materials. When the progress of job Y immediately before interruption of printing is expressed by the number of copies, "sheets up to the second sheet of the third copy have been printed". As described above, for job Y, the number of printed sheets of printed bundles of one classification is "4 pages×2 copies=8 sheets". When the progress of job Y immediately before interruption of printing is expressed by the classification, "sheets up to the second sheet of the second classification have been printed". Thus, the controller unit 402 stores, in the item 4217C, information expressing "sheets up to the second sheet of the second classification have been printed" as the expression rephrasing the progress of job Y.

In this fashion, job X and job Y are different in only the sorting method, and have the same remaining process conditions. In addition, job X and job Y are identical in the progress and the timing when printing interrupts. However, as represented by the item 4217C, the controller unit 402 manages information of job Y with management contents discriminated from those of the item 4217B of job X. That is, job X is a "job which does not require any classification process in consideration of a post-process". Job Y is a "job which requires a classification process in consideration of a post-process". The controller unit 402 controls to generate and manage pieces of information on the progresses of these jobs with management forms which can be discriminated between the jobs.

The actual status of the stacking unit (e.g., the delivery tray 722 or the stack tray of the large-capacity stacker in FIG. 44B) upon interruption of printing of job Y is shown in the upper half of FIG. 43B. Note that the printing interrupt factor of job Y is also one of (factor 1) to (factor 4) described above.

As shown in the upper half of FIG. 43B, the controller unit 402 causes the printing system including the printing apparatus 101 to execute the following operations as a series of printing operations for job Y.

[Step 1] Printed materials of the first to fourth pages of job Y are stacked as one set on the stacking unit. The controller unit 402 causes the printer unit 403 to print materials of the second set of job Y. At this time, it is inhibited to stack printed materials with a shift. That is, printed media of four sheets of the first set and a printed bundle of four sheets of the second set are delivered onto the stacking unit as a printed bundle belonging to the first classification. As a result, the first classification of job Y that is made up of a total of eight printed materials of printed bundles of the first and second sets is printed and stacked.

[Step 2] Printing of the first sheet of the third copy of job Y, i.e., the first sheet of the second classification of job Y, and printing of the second sheet of the third copy of job Y, i.e., the second sheet of the second classification of job Y are executed. At this timing, however, the printing interrupt factor of job Y occurs in the printing system. Thus, at this timing, the controller unit 402 forcibly stacks these two print media on the printed bundle of the first classification of job Y.

The above steps are performed immediately before printing of job Y interrupts. The stacking status of printed materials of the job on the stacking unit in the printing system is shown in the upper half of FIG. 43B.

After that, the printing interrupt factor of job Y is canceled through intervention work by the operator. The intervention work by the operator is one of (work 1) to (work 4) described above.

A unit concerned notifies the controller unit 402 that the printing interrupt factor of job Y to be printed has been canceled by the above-mentioned intervention work by the operator. In response to cancellation of the printing interrupt factor of job Y, the controller unit 402 controls to resume a series of printing operations for job Y from a print page at which printing interrupted. As the printing resume operation for job Y, the controller unit 402 controls the printing system to execute an operation based on information set in the management information 4200C described in the lower table of FIG. 42C. The controller unit 402 executes the following steps sequentially in order as a resume operation (recovery operation) for a series of printing operations for job Y.

[Step 1] Printing is executed on the third print medium of the third copy of job Y and the fourth print medium of the third copy of job Y, completing printing of the third set. The controller unit 402 inhibits the bundle delivery operation on the stacking unit. That is, the bundle delivery operation on the stacking unit waits until printing on the first to fourth sheets of the fourth copy of job Y is completed. The controller unit 402 executes printing on all the first to fourth print media of the fourth copy of job Y. Then, the controller unit 402 delivers, as a set of printed materials belonging to a printed bundle of one classification, a total of six print media including two, third and fourth print media belonging to a printed bundle of the third copy of job Y and four, first to fourth print media belonging to a printed bundle of the fourth copy of job Y. This process will be explained on the basis of the classification. Without executing any shift operation, the controller unit 402 delivers "the third to eighth printed materials of the second classification of job Y" which are printed by the printer unit 403 after printing resumes, onto "the second printed material of the second classification of job Y" which has already been stacked on the stacking unit immediately before printing interrupts. Resultantly, printed materials of the same classification of job Y can be stacked in the same stacking form even after interrupted printing resumes.

All processes which must be executed after cancellation of the printing interrupt factor of job Y requiring the classification process every printed bundle of two copies corresponding to a designated copy count are completed.

That is, the controller unit 402 can stack printed materials of job Y after interruption of printing in a stacking form consistent with that of printed materials of job Y before interruption of printing, as represented by the stacking result of job Y shown in the lower half of FIG. 43B.

Similar to the control example illustrated in FIGS. 42C and 43B, a job during interruption of printing is one for which the operator inputs one of the first type instruction information to third type instruction information. Even in this case, the controller unit 402 controls to continue the printing operation for the job after the printing interrupt factor of the job is canceled. When printing of the job resumes, the controller unit 402 controls to stack printed materials on the stacking unit while maintaining a stacking form complying with the instruction of the job. In this example, the controller unit 402 controls the printing system to execute the shift delivery operation every time printing of two copies is completed, so as to maintain the same stacking method as that of printed materials of job Y to be processed before interruption of printing. More specifically, the controller unit 402 controls to maintain the stacking form "shift printed materials every two copies" in accordance with the sorting condition of job Y even if a series of situations "generation of a printing interrupt factor→interruption of printing→cancellation of the printing interrupt factor→resume of printing" occurs in job Y.

In the above way, after the printing interrupt factor is canceled, the controller unit 402 can continue the stacking operation of printed materials of a job for which the printing operation is interrupted by generation of the printing interrupt factor. The controller unit 402 confirms, on the basis of information in the item 4214C of the management information 4200C illustrated in FIG. 42C, that the job during interruption of printing is one for which the above-described instruction information is input. When the printing interrupt factor is canceled, the controller unit 402 confirms pieces of information in the items 4214C, 4215C, and 4217C of the management information 4200C illustrated in the lower table of FIG. 42C. Based on these pieces of confirmation information, the controller unit 402 controls the printing system to continue the stacking operation of printed materials of the job after cancellation of the printing interrupt factor while maintaining the stacking form of printed materials of the job that have already been stacked on the stacking unit before the printing interrupt factor occurs. As a result, the stacking result as shown in the lower half of FIG. 43B can be obtained on the stacking unit of the system.

As described above, the controller unit 402 confirms that the job during interruption of printing is one for which the operator explicitly inputs instruction information in consideration of a post-process. Even for this job, the controller unit 402 controls the printing system to continue the stacking operation of printed materials of the job after cancellation of the printing interrupt factor while maintaining the stacking form of printed materials of the job that have already been stacked on the stacking unit before the printing interrupt factor occurs.

The printing system in the third embodiment can execute the above control illustrated in FIGS. 42A to 44B. Generation of troubles and the like pointed out in the description immediately before the description of FIG. 42A can also be prevented. Accordingly, the following effects can be obtained.

For examples, problems which are found out as new possible ones in the third embodiment can be coped with by a configuration capable of resuming printing after cancellation of a printing interrupt factor even for a "job which does not require any printed material classification process in consideration of a post-process" and a "job which requires the printed material classification process in consideration of a post-process". For example, this configuration can prevent even a problem such as "an operator who visually checks printed materials output after printing resumes misunderstands that the printed materials belong to a job different from that of printed materials output before printing resumes, and the operator performs an erroneous operation due to the misunderstanding."

For example, the configuration can also cope with a problem caused by generation of a printing interrupt factor in a "job which requires the printed material classification process in consideration of a post-process". For example, this configuration can prevent even a problem such as "the operator issues a printing request in demand for a classification process in consideration of a post-process, but the work load of the operator does not decrease after all." For example, the configuration can avoid even a problem such as "the operator manually counts the number of printed sheets in consideration of a post-process. The operator manually sorts the printed materials complying with the post-process. The operator is demanded of such intervention work." owing to generation of a printing interrupt factor.

Hence, the configuration can avoid a problem such as "if a trouble occurs during the successive printing operation of many documents concentrated at the same time at the work site in the POD environment, the trouble may lead to a serious trouble."

As described above, possible problems can be dealt with by a configuration capable of resuming, after cancellation of a printing interrupt factor, a "job which does not require any printed material classification process in consideration of a post-process" and a "job which requires the printed material classification process in consideration of a post-process". These problems can be dealt with without influencing the above-described effects which can be obtained by the configuration described in the embodiment with reference to FIGS. 1 to 41D.

The third embodiment finds out use cases and user needs which are not expected in the office environment and are unique to a printing environment such as the POD environment, and provides a mechanism which can satisfy the use cases and user needs. In order to further enhance the operation effects, the third embodiment may employ the following configuration.

As described above, the third embodiment contains any configuration capable of executing a sorting process by at least one of the following methods as a "printed material classification process", as illustrated in FIGS. 34, 37, and 38 and the like.

(Method 1) A shift delivery operation of executing a shift operation every printed materials of one classification.

(Method 2) A delivery bin switching operation of switching the delivery bin by using a multi-bin sorter every printed materials of one classification.

(Method 3) An interleaving sheet insertion operation of inserting an interleaving sheet every printed materials of one classification.

(Method 4) A sheet feed unit switching operation of switching the sheet feed unit every printed materials of one classification.

Assume that the printing system can execute both an operation corresponding to (method 1) and that corresponding to (method 3) in a system configuration similar to that of the above printing system. In other words, as described in the third embodiment, the printing system comprises a configuration capable of executing the "shift delivery operation" in executing the "printed material classification process". Further, the printing system comprises a configuration capable of also executing the "interleaving sheet insertion operation" in executing the "printed material classification process". The printing system comprises this system configuration.

The third embodiment finds out that the following problems may arise in this system configuration.

For example, the printing system can execute both the "shift delivery operation" and "interleaving sheet insertion operation". As described above, printed materials of a job to be processed are classified every printed materials in consideration of a post-process. As the classification process in consideration of the post-process, the "interleaving sheet insertion operation" is executed. This means that "an interleaving sheet is inserted every printed materials of one classification". In this configuration, the following problems may occur.

For example, in a printing environment such as the POD environment, an in-line type post-processing apparatus such as the large-capacity stacker illustrated in FIG. 44B and the like may be connected to the printing apparatus 101, and many documents of many jobs may be successively printed concentratedly at the same time. In other words, many documents are classified as a result of printing many documents. In this situation, many interleaving sheets are inserted in the above configuration. For example, printed materials of 300 classifications are stacked on the stack tray of the large-capacity stacker as illustrated in FIG. 44B. In this case, the 300 classifications require 299 interleaving sheets. In this situation, the following problems may arise.

[Matter of Concern 1] Work to remove an interleaving sheet inserted between printed materials by the operator is necessary before a non-in-line type post-processing apparatus performs a post-process. In the above case, to complete the post-process for all printed bundles, the operator must remove interleaving sheets from printed materials 299 times. Although the classification process in consideration of the post-process is executed, it requires many intervention work operations by the operator after all. It becomes difficult to increase the working efficiency of the operator because printed materials are stacked on the stacking unit while interleaving sheets are inserted every printed materials of one classification, and the operator must remove the interleaving sheet.

[Matter of Concern 2] To use an interleaving sheet, as described above, an interleaving sheet necessary for the printed material classification process must be prepared in advance in the sheet feed unit of the printing apparatus. In a printing environment such as the POD environment, printed materials are created in business. For this reason, it is important to process a plurality of jobs at high productivity, as described above. In business, it is also important to reduce cost as much as possible. In the above configuration, a large amount of resources, i.e., interleaving sheets originally unnecessary for final printed materials must be purchased and prepared. The cost rises because interleaving sheets not used for final printed materials must be prepared.

[Matter of Concern 3] When one job requires many classification processes, many interleaving sheets must be prepared for the job in the sheet feed unit of the printing apparatus before the start of printing. If there are a plurality of jobs to be printed, many interleaving sheets must be set in many sheet feed units. In this situation, many sheet feed units are occupied by interleaving sheets. Even if many print jobs are input concentratedly at the same time, a sheet feed unit capable of setting print media originally necessary for final printed materials cannot be utilized because many sheet feed units are occupied as those dedicated to interleaving sheets. In this case, even if a print job is input, a paper absence error frequently occurs because a print medium necessary for printing does not exist in the sheet feed unit. In other words, printing by the printer unit 403 often interrupts. As a result, the time taken to print one job becomes long, and the timing when printing of a waiting print job starts greatly delays. This means a high down time generation rate in the printing system. Sheet feed units are occupied by interleaving sheets, and the printing process of a job to be processed delays, which may influence the total productivity of a plurality of jobs.

The third embodiment finds out the possibility of these problems. As a mechanism capable of solving these problems, the third embodiment comprises, e.g., the following configuration.

For example, in order to flexibly meet various needs from users, the printing system can execute both the "printed material shift delivery operation" corresponding to (method 1) described above, and the "interleaving sheet insertion operation to printed materials" corresponding to (method 3). The controller unit 402 controls the printing system to selectively execute these two operations in accordance with an explicit request from the operator.

On the premise of this configuration, the job to be processed is one for which the operator explicitly inputs information corresponding to one of the first type instruction information to third type instruction information, as described above. In this case, as described above, the controller unit 402 controls the printing system to classify printed materials of the job in consideration of a post-process for the printed materials.

The controller unit 402 inhibits execution of the "interleaving sheet insertion operation" for the "classification process in consideration of a post-process" in a series of printing operations for a "job for which the operator explicitly inputs one of the first type instruction information to third type instruction information". In addition, the controller unit 402 controls the printing system to execute the "shift delivery operation" for the "classification process in consideration of a post-process".

In other words, the printing apparatus 101 comprises the two, shift delivery function and interleaving sheet insertion function as functions for implementing classification (sorting) of printed materials. When the classification process is executed in consideration of a post-process, the controller unit 402 inhibits the use of the interleaving sheet insertion function. In addition, when the classification process is executed in consideration of a post-process, the controller unit 402 controls to use the shift delivery function. Even with a configuration having the interleaving sheet insertion function, a stacking result shifted every printed materials of one classification can be obtained on the stacking unit (the delivery tray 722 or the stack tray in FIG. 44B), as shown in FIGS. 29, 30, 31, 36, 41B, 41C, and 41D.

The above configuration can avoid [matter of concern 1] to [matter of concern 3] described above which are found out as problems in the third embodiment.

The third embodiment comprises the following configuration in order to improve the effect capable of flexibly meeting user needs.

Figure 45:
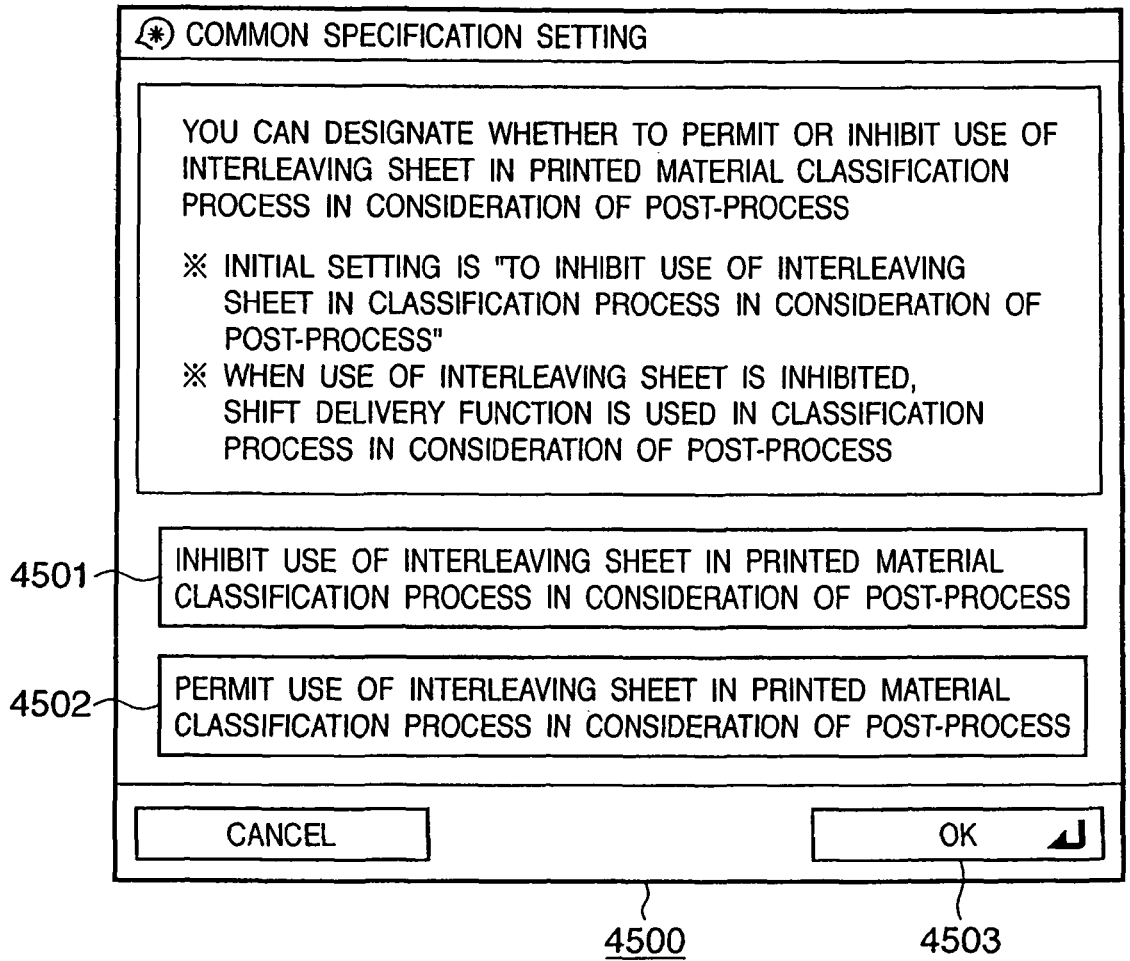
FIG. 45 is a view for explaining an example of the user interface to be controlled in the embodiment.

For example, the operator presses the user mode key (not shown) of the operation unit 404. In response to this, the controller unit 402 causes the display unit 605 to execute a display illustrated in FIG. 45. The display illustrated in FIG. 45 is a display window 4500 configured to allow the operator to determine whether to permit or inhibit the use of an interleaving sheet in the printed material classification process in consideration of a post-process. The display window 4500 which is displayed on the display unit 605 by the controller unit 402 in accordance with an instruction from the operator comprises the following display building elements.

[1. Guidance Display to Operator]

For example, the controller unit 402 controls the display unit 605 to display, in the display window 4500, guidance "You can designate whether to permit or inhibit the use of an interleaving sheet in the printed material classification process in consideration of a post-process. ※ The initial setting is "to inhibit the use of an interleaving sheet in the classification process in consideration of a post-process." ※ When the use of an interleaving sheet is inhibited, the shift delivery function is used in the classification process in consideration of a post-process.

[2. Operation Instruction Key 4501] The operation instruction key 4501 allows the operator to input an instruction to inhibit the use of an interleaving sheet in the printed material classification process in consideration of a post-process. When the operator presses the operation instruction key 4501, the controller unit 402 accepts the instruction. In the third embodiment, this instruction is accepted as the setting of the printing apparatus 101 by the controller unit 402. Assume that a "job which requires the printed material classification process in consideration of a post-process" is accepted when the instruction is set for the apparatus 101. In this case, the controller unit 402 controls the printing system including the printing apparatus 101 to inhibit execution of the "interleaving sheet insertion operation" in the classification process for the job, and execute the "shift delivery operation".

[3. Operation Instruction Key 4502] The operation instruction key 4502 allows the operator to input an instruction to permit the use of an interleaving sheet in the printed material classification process in consideration of a post-process. When the operator presses the operation instruction key 4502, the controller unit 402 accepts the instruction. In the third embodiment, this instruction is accepted as the setting of the printing apparatus 101 by the controller unit 402. Assume that a "job which requires the printed material classification process in consideration of a post-process" is accepted when the instruction is set for the apparatus 101. In this case, the controller unit 402 controls the printing system including the printing apparatus 101 to inhibit execution of the "shift delivery operation" in the classification process for the job, and execute the "interleaving sheet insertion operation". In this manner, the controller unit 402 permits execution of the "interleaving sheet insertion operation" for the "classification process in consideration of a post-process" on condition that the operator explicitly inputs, via the UI unit in the third embodiment, an instruction "to use an interleaving sheet in the classification process".

This configuration can further improve the effect capable of flexibly meeting user needs while achieving the above effects.

In the third embodiment, the setting "to inhibit the use of an interleaving sheet in the printed material classification process in consideration of a post-process" is made as a default setting. With this setting, the above-described effects can be reliably attained.

The control unit (corresponding to the central processing unit 802 in FIG. 8) of the client PC 1603 controls its display unit (corresponding to the display device 806 in FIG. 8) as an example of the UI unit in the third embodiment to execute the display in FIG. 45. The control unit (corresponding to the central processing unit 802 in FIG. 8) of the client PC 1603 mainly controls to execute an operation corresponding to an instruction from the operator of the client PC 1603. The third embodiment may further comprise this configuration. This configuration improves flexibility of the printing system, i.e., further improves the effects of the third embodiment.

In the control example using FIG. 45, a setting based on an instruction from the operator via the display in FIG. 45 targets the apparatus 101. Alternatively, the same display as that illustrated in FIG. 45 is executed by the UI unit in the third embodiment as a print setting window for a job to be processed. The same instruction as that described above can be accepted via this display. In accordance with an instruction accepted as the setting of the job, the controller unit 402 can selectively execute the two operations. In this fashion, either of the two operations may be selectively executed for each job to be processed. This configuration improves flexibility of the printing system, i.e., further improves the effects of the third embodiment.

Various configurations corresponding to features of the embodiment which have been explained with reference to FIGS. 1 to 45 are mechanisms which consider user merits, and not all the configurations may always be employed. In other words, a configuration which is at least one of various configurations corresponding to features of the embodiment and can achieve one corresponding effect falls within the technical scope of the embodiment. This is because only this configuration can solve problems assumed in BACKGROUND OF THE INVENTION, and attain more remarkable effects than those by a configuration assumed in BACKGROUND OF THE INVENTION.

As described above, the configuration in the third embodiment can achieve various effects as follows.

For example, a user-friendly convenient printing environment adaptable not only to the office environment but also to the POD environment can be provided.

A printing environment which minimizes intervention work by the operator that may occur in the POD environment due to, e.g., the configuration of a printing apparatus assuming the office environment can be provided. Efficient work can be implemented by reducing the work load of the operator at the actual work site in a printing environment such as the POD environment.

Even a printing environment can be flexibly coped with where one who receives a final material and one who requests an operation of the printing apparatus or printing system in order to create the final material are different, similar to the relationship between the customer and the operator in the POD environment. In other words, a flexible user interface environment more friendly to an operator who actually operates the printing apparatus or printing system can be provided.

The first effect capable of increasing the efficiency of intervention work of an operator who engages in a post-process necessary after printing by the printing apparatus in a job to be processed in a printing environment such as the POD environment can be achieved. In addition, an excellent operation environment where an increase in the efficiency of intervention work of an operator who engages in a post-process necessary after printing is considered and the operator will is respected as much as possible can be provided via a printing apparatus or printing system to the operator who operates the printing apparatus or printing system. The second effect capable of constructing a highly convenient user interface environment in consideration of a printing environment such as the POD environment can be achieved. These two effects in consideration of a printing environment such as the POD environment can be obtained.

Since the printing system in the embodiment comprises the above-described configuration, a printing environment capable of flexibly meeting various needs from various users as much as possible on the assumption of various situations and use environments can be provided.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved when a storage medium which records software program codes (e.g., the programs of various flowcharts described above, an operation control program for various user interface units described above, and an operation control program for causing a printing apparatus or system to execute various operations described with reference to FIGS. 26 to 45) for implementing the functions of the above-described embodiments is supplied to a system or apparatus, and the computer (or the CPU or MPU) of the system or apparatus reads out and executes the program codes stored in the storage medium.

In this case, the program codes read out from the storage medium implement the functions of the above-described embodiments, and the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

Furthermore, the present invention includes a case where, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby implements the functions of the above-described embodiments. For example, the control unit (e.g., the central processing unit 802 in FIG. 8) of the client PC 1603 stores, in the memory (e.g., the control memory 801 in FIG. 8) of the client PC 1603, the same control program as a control program for executing control associated with the classification process described in the embodiment by the controller unit 402. Then, the control unit of the client PC 1603 can read out and execute the control program. This configuration can further improve the effects of the embodiments capable of flexibly dealing with a printing environment such as the POD environment where various use forms are assumed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Applications No. 2005-210303, filed Jul. 20, 2005 and Japanese Patent Application No. 2006-162816, filed Jun. 12, 2006, which are hereby incorporated by reference herein in their entirety.

What is claimed is:

1. A printing apparatus comprising:
an input unit configured to input a print job,
a printing unit configured to execute a print processing to output a plurality of copies of sheets, based on the print job,
a stacking unit configured to stack the plurality of copies of sheets,
a setting unit configured to set height of one group among a plurality of groups into which the plurality of copies of sheets are sorted,
a determination unit configured to determine number of copies of sheets to be sorted into one group, based on the height of one group set by the setting unit,
a control unit configured to control the stacking unit to sort the plurality of copies of sheets into the plurality of groups, so that each group of the plurality of groups includes the number of copies of sheets determined by the determination unit.

2. The printing apparatus according to claim 1, further comprising a first reception unit configured to receive the height of one group from an operator of the printing apparatus,
wherein the setting unit sets the height of one group received by the first reception unit.

3. The printing apparatus according to claim 1, further comprising a second reception unit configured to receive a designation of post-processing apparatus from an operator of the printing apparatus, which should execute a post-processing on the sheet stacked by the stacking,
wherein the setting unit sets the height of one group corresponding to a performance of the post-processing apparatus designated by designation received by the second reception unit.

4. The printing apparatus according to claim 1, further comprising a first acquisition unit configured to acquire a height of one group to be set by the setting unit from print setting information included in the print job inputted from an external device,
wherein the setting unit sets the height of one group acquired by the first acquisition unit.

5. The printing apparatus according to claim 1, further comprising a second acquisition unit configured to acquire a designation of post-processing apparatus from print setting information included in the print job, which should execute a post-processing on the sheet stacked by the stacking unit,
wherein the setting unit sets the height of one group corresponding to a performance of the post-processing apparatus designated by the second acquisition unit.

6. The printing apparatus according to claim 1, further comprising a first specification unit configured to specify a height of one copy of sheets to be stacked by the stacking unit,
wherein the determination unit determines the number of copies of sheets included in one sorting based on the height of one group set by the setting unit and the height specified by the first specification unit.

7. The printing apparatus according to claim 6, wherein the determination unit determines the number of copies of sheets by dividing the height of one group set by the setting unit by the height specified by the first specification unit.

8. The printing apparatus according to claim 1, further comprising a second specification unit configured to specify a number of the sheets included in one copy of sheets,
wherein the determination unit determines the number of copies of sheets based on the height of one group set by the setting unit, the number of the sheets specified by the second specification unit and a thickness of one sheet.

9. The printing apparatus according to claim 1, wherein the stacking unit comprises a plurality of stacking section, and the control unit controls the stacking unit so as to sort the plurality of copies of sheets, so that each of the groups is stacked into respective stacking sections.

10. The printing apparatus according to claim 1, wherein the control unit controls the stacking unit to stack the plurality of copies of sheets, with interleaving sheets, so that each of the interleaving sheets is inserted between the groups.

11. The printing apparatus according to claim 1, wherein the control unit controls the stacking unit to stack the plurality of copies of sheets, so that stacking position of each of the groups is different each other.

12. A control method being for application to a printing apparatus which comprises an input unit configured to input a print job, a printing unit configured to execute a print processing to output a plurality of sheets, based on the print job, a stacking unit configured to stack the plurality of copies of sheets, and a setting unit configured to set height of one group among a plurality of groups into which the plurality of copies of sheets are sorted, the method comprising the steps of:
determining number of copies of sheets to be sorted into one group, based on the height of one group set by the setting unit, and controlling the stacking unit to sort the plurality of copies of sheets into the plurality of groups, so that each group of the plurality of groups includes the number of copies of sheets determined in the step of determining.

13. A program stored in a computer-readable storage medium which causes a computer of a printing apparatus to perform or instruct the performing of a control method, wherein the printing apparatus comprises an input unit configured to input a print job, a printing unit configured to execute a print processing to output a plurality of copies of sheets, based on the print job, a stacking unit configured to stack the plurality of copies of sheets, and a setting unit configured to set height of one group among a plurality of groups into which the plurality of copies of sheets are sorted, and wherein the control method comprises the steps of:

determining number of copies of sheets to be sorted into one group, based on the height of one group set by the setting unit, and controlling the stacking unit to sort the plurality of copies of sheets into the plurality of groups, so that each group of the plurality of groups includes the number of copies of sheets determined in the step of determining.

* * * * *